US012766448B2

(12) United States Patent
Rookey et al.

(10) Patent No.: US 12,766,448 B2
(45) Date of Patent: Oct. 20, 2026

(54) FILTER ELEMENT

(71) Applicants: Ralle Rookey, Suffield, CT (US); Justin R. Pribanic, Tolland, CT (US); Jonathan D. Moore, Ellington, CT (US); Kevin B. Downs, Coventry, CT (US); Wayne J. Dubé, Woodstock Valley, CT (US); Steven J. Merritt, Kearney, NE (US)

(72) Inventors: Ralle Rookey, Suffield, CT (US); Justin R. Pribanic, Tolland, CT (US); Jonathan D. Moore, Ellington, CT (US); Kevin B. Downs, Coventry, CT (US); Wayne J. Dubé, Woodstock Valley, CT (US); Steven J. Merritt, Kearney, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 183 days.

(21) Appl. No.: 18/338,738

(22) Filed: Jun. 21, 2023

(65) Prior Publication Data

US 2023/0330576 A1 Oct. 19, 2023

Related U.S. Application Data

(60) Division of application No. 16/365,382, filed on Mar. 26, 2019, now Pat. No. 11,731,065, which is a
(Continued)

(51) Int. Cl.
*B01D 35/30* (2006.01)
*B01D 29/21* (2006.01)
(Continued)

(52) U.S. Cl.
CPC ............ *B01D 35/30* (2013.01); *B01D 29/21* (2013.01); *B01D 35/005* (2013.01);
(Continued)

(58) Field of Classification Search
CPC ........ B01D 2201/295; B01D 2201/302; B01D 2201/347; B01D 2201/4007;
(Continued)

(56) References Cited

U.S. PATENT DOCUMENTS 2,471,069 A 5/1949 Le Clair
3,370,708 A 2/1968 Hultgren et al.
(Continued)

FOREIGN PATENT DOCUMENTS

CN 203585477 U 5/2014
CN 104455825 A 9/2014
(Continued)

OTHER PUBLICATIONS

Dahl Bladwin, Marine Diesel Fuel/Water Seperators, Installation pamphlet, 2005, 9 pages, pp. 1-9; Baldwin Filters, Inc. Keatney, Nebraska.

*Primary Examiner* — Dirk R Bass
(74) *Attorney, Agent, or Firm* — Reinhart Boerner Van Deuren P.C.

(57) ABSTRACT

A liquid filter in the form of a filter element or a filter cartridge provides torsion locking relative to a filter head when the housing of such filter is threaded onto a filter head. Many embodiments employ a filter that includes a nipple portion at a top end with the torsion lock detent provided outboard of the nipple portion or integrated into the nipple portion. Many embodiments employ a simplified shoulder transition region at the top end of a torsion locked filter element. Valve actuation and/or filter differentiation is used in some embodiments. Different torsion locking arrange-
(Continued)

ments, deformable thread profiles and other liquid filter features are disclosed.

21 Claims, 87 Drawing Sheets

Related U.S. Application Data continuation of application No. PCT/US2017/054717, filed on Oct. 2, 2017.

(60) Provisional application No. 62/548,021, filed on Aug. 21, 2017, provisional application No. 62/523,484, filed on Jun. 22, 2017, provisional application No. 62/403,608, filed on Oct. 3, 2016.

(51) Int. Cl.
*B01D 35/00* (2006.01)
*B01D 35/147* (2006.01)
*B01D 35/153* (2006.01)

(52) U.S. Cl.
CPC ......... *B01D 35/147* (2013.01); *B01D 35/153* (2013.01); *B01D 2201/295* (2013.01); *B01D 2201/302* (2013.01); *B01D 2201/347* (2013.01); *B01D 2201/4007* (2013.01); *B01D 2201/4015* (2013.01); *B01D 2201/4023* (2013.01); *B01D 2201/4053* (2013.01); *B01D 2201/4076* (2013.01); *B01D 2201/4092* (2013.01)

(58) Field of Classification Search
CPC .... B01D 2201/4015; B01D 2201/4023; B01D 2201/4053; B01D 2201/4076; B01D 2201/4092; B01D 29/21; B01D 35/005; B01D 35/147; B01D 35/153; B01D 35/30
See application file for complete search history.

(56) References Cited

U.S. PATENT DOCUMENTS 3,384,241 A 5/1968 Nostrand
3,420,377 A 1/1969 Vandersip
3,630,375 A 12/1971 Hodgkins
3,753,544 A 8/1973 Hodgkins
3,829,014 A 8/1974 Davis et al.
3,988,244 A 10/1976 Brooks
4,126,557 A 11/1978 Hodgkins
D254,086 S 1/1980 Hodgkins
4,244,916 A 1/1981 Guigan
4,265,748 A 5/1981 Villani et al.
4,312,479 A 1/1982 Tolan
4,372,847 A 2/1983 Lewis
D284,300 S 6/1986 Hodgkins
4,618,423 A 10/1986 Hodgkins
4,719,012 A 1/1988 Groezinger et al.
4,812,235 A 3/1989 Seleman et al.
4,860,713 A 8/1989 Hodgkins
4,898,668 A 2/1990 Hodgkins et al.
4,915,831 A 4/1990 Taylor
4,956,081 A 9/1990 Hodgkins et al.
4,976,852 A 12/1990 Janik et al.
5,035,797 A 7/1991 Janik
5,078,877 A 1/1992 Cudaback et al.
5,084,170 A 1/1992 Janik et al.
5,102,541 A 4/1992 Breitbach
5,114,572 A 5/1992 Hunter et al.
5,186,829 A 2/1993 Janik
5,203,994 A 4/1993 Janik
5,236,579 A 8/1993 Janik et al.
5,259,953 A 11/1993 Baracchi et al.
5,271,836 A 12/1993 Janik et al.
5,302,284 A 4/1994 Zeiner et al.
5,312,546 A 5/1994 Janik
5,342,511 A 8/1994 Brown et al.
5,350,506 A 9/1994 Dombek et al.
5,362,390 A 11/1994 Widenhoefer et al.
5,364,528 A 11/1994 Schwarz et al.
5,374,355 A 12/1994 Habiger et al.
5,390,701 A 2/1995 Lessley et al.
D356,852 S 3/1995 Janik et al.
5,413,711 A 5/1995 Janik
5,474,676 A 12/1995 Janik et al.
5,486,288 A 1/1996 Stanford et al.
5,560,824 A 10/1996 Sann et al.
5,578,221 A 11/1996 Janik
5,614,091 A 3/1997 Janik et al.
5,674,393 A 10/1997 Terhune et al.
5,698,093 A 12/1997 Pyle et al.
5,744,030 A 4/1998 Reid et al.
5,766,463 A 6/1998 Janik et al.
5,788,859 A 8/1998 Biere
5,817,234 A 10/1998 Dye et al.
5,826,854 A 10/1998 Janvrin et al.
5,837,137 A 11/1998 Janik
5,868,931 A 2/1999 Janik et al.
5,868,932 A 2/1999 Guichaoua et al.
5,876,600 A 3/1999 Matsubara et al.
5,887,573 A 3/1999 Janik et al.
5,906,737 A 5/1999 Hoeppner
5,915,926 A 6/1999 Janik et al.
5,938,921 A 8/1999 Janik et al.
5,985,142 A 11/1999 Belden
6,007,711 A 12/1999 Atwood
6,019,890 A 2/2000 Janik et al.
6,048,455 A 4/2000 Janik
6,051,144 A 4/2000 Clack et al.
6,068,763 A 5/2000 Goddard
D435,631 S 12/2000 Janik et al.
6,171,491 B1 1/2001 Popoff et al.
6,187,188 B1 2/2001 Janik et al.
6,193,884 B1 2/2001 Magnusson et al.
6,217,763 B1 * 4/2001 Lawrence .............. B01D 29/96
210/DIG. 17
6,387,259 B1 5/2002 Roll
6,444,121 B1 9/2002 Maxwell
6,485,635 B1 11/2002 Gandini et al.
6,488,845 B1 12/2002 Neufeld et al.
6,495,042 B1 12/2002 Knight
6,500,335 B2 12/2002 Janik et al.
6,506,302 B2 1/2003 Janik
6,517,717 B1 2/2003 Håkansson
D472,299 S 3/2003 Fritze
6,533,933 B1 3/2003 Stankowski et al.
D472,604 S 4/2003 Fritze
6,565,746 B1 5/2003 Stamey, Jr. et al.
D479,300 S 9/2003 Janik et al.
6,615,990 B1 9/2003 Jokschas et al.
6,652,740 B2 11/2003 Schoess
D484,568 S 12/2003 Janik et al.
6,662,954 B2 12/2003 Gottwald-Grill et al.
6,673,250 B2 1/2004 Kuennen et al.
6,716,348 B1 4/2004 Morgan
6,723,239 B2 4/2004 Maxwell
6,740,234 B1 5/2004 Williams et al.
6,755,308 B2 6/2004 Janik et al.
6,863,811 B2 3/2005 Janik
6,881,334 B2 4/2005 Janik
6,896,803 B2 5/2005 Cline et al.
6,977,006 B2 12/2005 Reid
7,042,346 B2 5/2006 Paulsen
7,048,488 B1 5/2006 Kuznetsov et al.
7,070,692 B2 7/2006 Knight
7,081,201 B2 7/2006 Bassett et al.
7,412,896 B2 8/2008 Janik et al.
7,695,618 B2 4/2010 Mules
7,744,758 B2 6/2010 Dworatzek et al.
7,997,421 B2 8/2011 Maurer et al.
8,057,669 B2 11/2011 Beard et al.
8,733,555 B2 5/2014 Moore et al.
8,991,619 B2 3/2015 Schweitzer

(56) References Cited

U.S. PATENT DOCUMENTS

| | | | |
|---|---|---|---|
| 9,023,202 | B2 | 5/2015 | Beard et al. |
| 9,067,156 | B2 | 6/2015 | Moore et al. |
| 9,314,722 | B2 | 4/2016 | Reid |
| 9,492,768 | B2 | 11/2016 | Fick et al. |
| 9,695,966 | B2 | 7/2017 | Lombardi et al. |
| 10,252,193 | B2 | 4/2019 | Rolle et al. |
| 11,731,065 | B2 | 8/2023 | Rookey et al. |
| 2001/0042709 | A1 | 11/2001 | Janik |
| 2002/0014452 | A1 | 2/2002 | Janik |
| 2002/0043491 | A1 | 4/2002 | Janik et al. |
| 2002/0130072 | A1 | 9/2002 | Vardion |
| 2002/0162782 | A1 | 11/2002 | Maxwell |
| 2002/0166805 | A1 | 11/2002 | Minns et al. |
| 2002/0185008 | A1 | 12/2002 | Anderson et al. |
| 2002/0185454 | A1 | 12/2002 | Beard et al. |
| 2003/0019805 | A1 | 1/2003 | Fritze |
| 2003/0019819 | A1 | 1/2003 | Fritze |
| 2003/0196947 | A1 | 10/2003 | Gundrum et al. |
| 2003/0226800 | A1 | 12/2003 | Brown et al. |
| 2004/0084360 | A1 | 5/2004 | Janik |
| 2004/0084361 | A1 | 5/2004 | Janik et al. |
| 2004/0084362 | A1 | 5/2004 | Janik |
| 2004/0084363 | A1 | 5/2004 | Janik |
| 2005/0056582 | A1 | 3/2005 | Patel et al. |
| 2005/0103692 | A1 | 5/2005 | Stanhope et al. |
| 2005/0161386 | A1 | 7/2005 | Gustafson et al. |
| 2005/0194317 | A1 | 9/2005 | Ikeyama et al. |
| 2006/0016769 | A1 | 1/2006 | Hacker et al. |
| 2006/0037908 | A1 | 2/2006 | Parkins |
| 2006/0054547 | A1 | 3/2006 | Richmond et al. |
| 2006/0060512 | A1 | 3/2006 | Astle et al. |
| 2006/0096934 | A1 | 5/2006 | Weinberger et al. |
| 2006/0118475 | A1 | 6/2006 | Girondi |
| 2006/0124516 | A1 | 6/2006 | Merritt et al. |
| 2006/0151371 | A1 | 7/2006 | Weinberger et al. |
| 2006/0180539 | A1 | 8/2006 | Wolf et al. |
| 2006/0186031 | A1 | 8/2006 | Fick et al. |
| 2006/0191836 | A1 | 8/2006 | Dworatzek et al. |
| 2006/0219621 | A1 | 10/2006 | Dworatzek |
| 2006/0219626 | A1 | 10/2006 | Dworatzek et al. |
| 2007/0034560 | A1 | 2/2007 | Janik et al. |
| 2007/0056888 | A1 | 3/2007 | Williams et al. |
| 2007/0108119 | A1 | 5/2007 | Mandt et al. |
| 2007/0114170 | A1 | 5/2007 | Krull et al. |
| 2007/0125179 | A1 | 6/2007 | Janik et al. |
| 2007/0187316 | A1 | 8/2007 | Weinberger et al. |
| 2007/0215561 | A1 | 9/2007 | Yates et al. |
| 2007/0227959 | A1 | 10/2007 | Sinur et al. |
| 2008/0142426 | A1 | 6/2008 | Greco et al. |
| 2008/0245719 | A1 | 10/2008 | Beard et al. |
| 2008/0264850 | A1 | 10/2008 | Amesoder et al. |
| 2008/0314819 | A1 | 12/2008 | Ferreira et al. |
| 2009/0078626 | A1 | 3/2009 | Krull et al. |
| 2009/0321340 | A1 | 12/2009 | Rampen et al. |
| 2010/0155321 | A1 | 6/2010 | Sasur et al. |
| 2011/0017649 | A1 | 1/2011 | Sasur |
| 2011/0203985 | A1* | 8/2011 | Reid .................... B01D 35/301 210/236 |
| 2011/0272340 | A1 | 11/2011 | Sasur et al. |
| 2012/0037556 | A1 | 2/2012 | Beard et al. |
| 2013/0081990 | A1 | 4/2013 | Roesgen |
| 2013/0256206 | A1 | 10/2013 | Thalmann et al. |
| 2013/0298702 | A1 | 11/2013 | Lam et al. |
| 2014/0190880 | A1 | 7/2014 | Krull |
| 2014/0197087 | A1 | 7/2014 | Pribanic et al. |
| 2014/0231336 | A1 | 8/2014 | Pribanic et al. |
| 2014/0305858 | A1 | 10/2014 | Downs et al. |
| 2015/0090651 | A1 | 4/2015 | Kotale et al. |
| 2015/0090653 | A1 | 4/2015 | Kotale et al. |
| 2016/0023133 | A1 | 1/2016 | Sasur et al. |
| 2016/0271533 | A1 | 9/2016 | Honermann et al. |

FOREIGN PATENT DOCUMENTS

| | | | |
|---|---|---|---|
| CN | 104645681 | A | 5/2015 |
| CN | 105899271 | A | 8/2016 |
| CN | 205654917 | U | 10/2016 |
| EP | 0 880 987 | A1 | 12/1998 |
| EP | 0 890 385 | A2 | 1/1999 |
| EP | 1 188 469 | A1 | 3/2002 |
| EP | 1690581 | A1 | 8/2006 |
| FR | 2883198 | A1 | 9/2006 |
| JP | 9173717 | A | 7/1997 |
| JP | 10-184482 | | 7/1998 |
| JP | 10-249109 | | 9/1998 |
| JP | 3653837 | B2 | 6/2005 |
| JP | 5525603 | B2 | 6/2014 |
| KR | 20-1990-0006356 | U | 4/1990 |
| WO | WO 02/078816 | A1 | 10/2002 |
| WO | WO 2006/091557 | A2 | 8/2006 |
| WO | WO 2006/120241 | A2 | 11/2006 |
| WO | WO 2007/053228 | A2 | 5/2007 |
| WO | WO 2009/117564 | A1 | 9/2009 |
| WO | WO 2018/222804 | A2 | 12/2018 |

* cited by examiner

FILTER ELEMENT

CROSS-REFERENCE TO RELATED PATENT APPLICATIONS

This patent application is a Divisional application of U.S. patent application Ser. No. 16/365,382, filed Mar. 26, 2019, which is now pending, which is a continuation of U.S. Patent Application No. PCT/US2017/054717, filed Oct. 2, 2017, which is now Inactive and published as WO 2018/067437; the entire teachings and disclosure of each of these patent applications are incorporated herein by reference thereto. This patent application claims the benefit of U.S. Provisional Patent Application No. 62/403,608, filed Oct. 3, 2016; U.S. Provisional Patent Application No. 62/523,484, filed Jun. 22, 2017; and U.S. Provisional Patent Application No. 62/548,021, filed Aug. 21, 2017; the entire teachings and disclosures of each of these provisional patent applications are incorporated herein by reference thereto.

FIELD OF THE INVENTION

The present application is generally directed towards liquid filters and liquid filter assemblies, and more particularly directed toward locking detent arrangements, thread locking, and/or filter construction configurations in such liquid filters and liquid filter assemblies, particularly for engine filters such as fuel filters or oil filters (e.g. lube, hydraulic, transmission) and the like.

BACKGROUND OF THE INVENTION

Liquid filters such as oil filters or fuel filters are well-known in the art. Such liquid filters often are in the form of a cartridge that comprise upper and lower housing members that are joined together to form a filter housing and enclose filter media therein. Such liquid filter examples include the following U.S. patent publications: U.S. Pub. No. 2015/0090653 entitled Fuel Filter Cartridge and Method of Construction Thereof; U.S. Pat. No. 9,067,156 entitled Filter Cartridge Assembly and Method of Manufacture Therefor; U.S. Pat. No. 6,755,308 entitled Filter Cartridge with Grommet Springs; U.S. Pub. No. 2004/0084363 entitled Filter Cartridge Incorporating a Peripheral Compatibility Matrix; U.S. Pub. No. 2004/0084362 entitled Eccentric Interface Retention System for a Filter Cartridge; U.S. Pub. No. 2004/0084361 entitled Base Receptacle with a Fixed Retainer for Filter Cartridge Incorporating a Peripheral Compatibility Matrix; U.S. Pub. No. 2002/0014452 entitled Ecological Fuel Filter Cartridge and Element; U.S. Pat. No. 6,187,188 entitled Filter Cartridge Retention System; U.S. Pat. No. 5,837,137 entitled Base/Cartridge Location and Key System for Fuel Filter Assembly; U.S. Pat. No. 5,766,463 entitled Fuel Filter Cartridge; U.S. Pat. No. 5,474,676 entitled Filter Base Assembly; and U.S. Pub. No. 2009/0078626 entitled Filter Cartridge Housing Attachment Systems. These patent records are assigned to the present assignee or an affiliate thereof. As shown therein, these fuel filters often include a filter housing comprising an upper member and a lower member that are joined together either permanently or removably to enclose filter media therein. In some of these, two metal cans are connected by a roll seam to form a filter housing, and then the filter housing of the filter cartridge may be then attached by a separate collar member of a filter head to a filter head mounting base. In other such situations, there can be a filter thread on the filter itself that allows for twisting rotational movement of the filter to attach to a filter head.

In the instances where twisting of the filter is implemented using such a thread on the filter, it is desirable to prevent the filter from backing off or becoming detached from the filter head. Accordingly, in an attempt to provide such a filter, reference can be made to U.S. Pat. No. 8,057,669 entitled Filter Element and Filter Assembly Including Locking Mechanism (also assigned to the present assignee or an affiliate thereof) including certain embodiments thereof such as at FIGS. 64-66 for example that show a filter cartridge that includes a lower member that includes a thread and an upper member that includes a torsion lock detent. The lower member and the upper member are keyed and clocked at a predetermined orientation by way of keys at a keyed interface between these two components. The upper member comprises torsion lock detents. To connect the upper and lower members together, the filter includes an outer ridge forming an upright vertically and axially extending wall that supports an external seal member. The external seal member engages with the filter head base and prevents fluid from passing between the outer periphery of the cover and the inner surface of the sidewall of the lower housing member.

While the construction with locking detents such as shown in U.S. Pat. No. 8,057,669 provides certain benefits, such as positive torsion locking, it has disadvantages associated with complexity and difficulty in practicality from manufacturability to accomplish certain aspects both on the filter and the filter head, that have been realized by the present inventors and will be realized upon an understanding of the present disclosure. Further, notwithstanding the '669 patent advances, as it relates to the particular field of engine filters, conventionally, many liquid engine filters typically still employ a thread such as in a spin-on filter that may involve torqueing to a predetermined quantity for attachment, or replaceable filter cartridge inserts that are removably mounted in reusable housings, in which such housings need to be disassembled and/or the filter insert disassembly from the housing. This requires inconvenient, messy or time consuming effort for a service mechanic that is typically changing working on several vehicles. At the same time, it is relevant that the engine filter environment is a harsh working environment in that filter retention must account not only for fluid pressures that are experienced, but also vibration loads and in many instances shock loads such as when the engine is incorporated into a vehicle which is subject to road or off-road impacts such as bumps and sudden acceleration. Certain inventive aspects are directed at more convenient, less difficult or less time consuming filter change in such engine filters while provide necessary retention in the difficult engine operating environment for such filters. Further other inventive aspects other than more convenient or faster engine filter change are also presented herein as described below.

BRIEF SUMMARY OF THE INVENTION

According to an embodiment of the present invention, a filter cartridge includes a torsion lock detent member that is elevated above a top annular end wall and extends axially higher than a shoulder region. The filter cartridge comprises a filter housing including a top end, a bottom end, and an annular sidewall extending therebetween. The top end includes the top annular end wall. A nipple portion is at the top end with the top annular end wall extending radially outwardly from the nipple portion and connecting with the annular sidewall at the shoulder region. The nipple portion projects away from the bottom end and above the top annular end wall. The cartridge also includes a fluid flow interface at the top end, the fluid flow interface including an inlet port for receiving unfiltered fluid and an outlet port for returning filtered fluid, with at least one of the inlet and outlet ports being through the nipple portion. A thread is provided by the filter housing. Further, filter media is arranged in the filter housing and along a fluid flow path through the filter housing from the inlet port to the outlet port with the filter media being arranged in fluid series between the inlet port and the outlet port. A torsion lock detent member is also arranged at the top end.

According to a more particular embodiment, the torsion lock detent member projects from the top annular end wall and may be positioned between the nipple portion and the shoulder region. Preferably, no portion of the filter housing is elevated above the torsion lock detent member radially outside of the torsion lock detent member. Also preferably, the thread is located along the annular sidewall.

According to a more particular embodiment, the nipple portion can comprise an outer annular wall extending axially; an inner annular wall extending axially, the inner annular wall concentrically located within the outer annular wall; an outer radial seal supported by the outer annular wall and having a first radially outer sealing surface; an inner radial seal supported by the inner annular wall and having a second radially outer sealing surface. The inner radial seal and the outer radial seal may also be positioned above the torsion lock detent member.

According to a more particular embodiment using a nipple portion with inner and outer annular walls and radial seals, the filter cartridge is configured for use with a mounting head (also referred to as filter head) having a mating fluid flow interface having a discharge port for unfiltered fluid and return port for filtered fluid (such a mounting head also includes an outer cylindrical wall defining a thread ramp, an outer port wall, and an inner port wall concentric with the outer port wall, and a lock assembly comprising a lock member having a lock member detent and a spring member arranged to bias the lock member axially). The filter cartridge is configured with a connection arrangement with the mounting head with the inner annular wall being sized to be received with the inner port wall, and with the inner radial seal sized and located to form a radial seal with the inner port wall, and the outer annular wall being sized to be received with the outer port wall with the outer radial seal sized and located to form a radial seal with the outer port wall. The filter cartridge is adapted to be connected to the filter head with the inlet port sealingly connected to the discharge port for unfiltered fluid flow and with the outlet port sealingly connected to the return port for filter fluid flow. Further, the thread of the filter cartridge is configured to ride along the thread ramp with the torsion lock detent member arranged to align and configured to lock with the lock member detent after a predetermined rotation of between ¼ rotational turn and ½ rotational turn between the filter cartridge and the mounting head when engaged.

According to a more particular embodiment, the torsion lock detent member may comprise a torsion lock tab projecting from and above the top annular end wall, elevated below a free end of the nipple portion. Each torsion lock tab can comprise: a height of between 0.25 and 10 millimeters above the top annular end wall; a radial length of between 1 and 40 millimeters; a thickness of between 1 and 10 millimeters, the thickness being perpendicular to the height and the radial length. The nipple portion extends between 1 and 30 millimeters above each torsion lock tab with each torsion locking tab including an engagement region located between 5 and 45 millimeters radially spaced from a central axis of the filter cartridge. Preferably, such a torsion lock tab is radially elongated with the radial length at least double the thickness.

According to a more particular embodiment, the filter cartridge comprises a filter element contained in the filter housing. The filter element includes a ring of filter media (preferably pleated filter media); a top end cap sealingly bonded to an upper end of the ring of pleated filter media and positioned below the top annular end wall, with a fluid flow path provided between the top end cap and the top annular end wall; and a bottom end cap sealingly bonded to a lower end of the ring of pleated filter media.

According to a more particular embodiment involving such a filter element, the top end cap can be an open end cap with a ring portion for sealingly bonding to the upper end and a snout extending axially from the ring portion. The snout provides the outlet port and extends above the top annular end wall to provide a first part of the nipple portion. A second part of the nipple portion can be provided by the housing.

According to a more particular embodiment involving such a filter element, the filter cartridge is free of keying between the filter element and the filter housing. Advantageously in this embodiment, the angular orientation of the filter element does not impact a predetermined angular orientation between the torsion lock detent member and the thread.

According to a more particular embodiment, the shoulder region defines an external dome surface.

In such a particular dome surface embodiment, the external dome surface comprises a curved surface tapering continuously downwardly as the external dome surface extends from the top annular end wall toward the thread.

According to a more particular embodiment, the top annular end wall defines an external upper surface that is non-flat and tapers continuously downwardly as the filter housing extends along top annular end wall from the nipple portion through shoulder region with the shoulder region continuing to taper continuously downwardly to transition into the annular sidewall.

According to a more particular embodiment, the filter housing comprises a metal can member and a plastic cap member joined together. The metal can member can be wrapped around a radial flange projection of the plastic cap member. The cap member defines a radially extending abutment facing upwardly and defines the thread.

According to a more particular embodiment, the filter housing comprises a top member and a bottom member that are formed separate and joined together. The top member provides the top end, and the bottom member provides the bottom end. The top member unitarily provides both the thread and the torsion lock detent member in fixed non-movable predetermined angular relative angular orientation.

According to a more particular embodiment involving such top and bottom members, advantageously the top member and the bottom member can be joined at a key-free interface.

According to a more particular embodiment, the bottom end of the housing defines a gravitational bottom providing a sump, and further comprises a drain opening through the bottom end and a drain cock connected to the bottom end. The drain cock has an open position allowing drainage through the drain opening and a closed position closing the bottom end, preventing drainage.

According to a more particular embodiment, the nipple portion includes external seals and advantageously the filter cartridge can be free of any external seals radially outboard of the nipple portion.

According to a more particular embodiment, the torsion lock detent member comprises two torsion lock tabs or slots located axially above the top annular end wall and spaced 180 degrees apart about a central axis of the filter cartridge.

According to a more particular embodiment, a filter head and filter cartridge assembly is provided, and further comprises a mounting head having the filter cartridge mounted thereto in a secured condition. The mounting head comprising: (a) a mating fluid flow interface having a discharge port for unfiltered fluid and return port for filtered fluid, the discharge port being directly connected to the inlet port at the mating fluid flow interface and the return port being directly connected to the outlet port; (b) an outer peripheral wall including a thread ramp, the thread ramp engaging the thread of the filter cartridge and keeping the filter cartridge retained to the mounting head; and (c) a lock assembly comprising a lock member having a lock member detent, a spring member biasing the lock member and the filter cartridge axially together, wherein the lock member detent is engaged with the torsion lock detent member to prevent rotational disengagement between the filter cartridge and the filter head.

According to a more particular embodiment of such a filter head and filter cartridge assembly, the mounting head has an internal surface facing and receiving the filter cartridge. The internal surface is free of annular grooves in a transition region between the lock assembly and the thread ramp.

According to a more particular embodiment, the transition region can be curved and continuously extending outwardly and downwardly from the lock assembly to the thread ramp. The filter cartridge can have a complimentary dome region received proximate the transition region.

According to a more particular embodiment, a filter cartridge differentiation system including such a filter cartridge and further comprises at least a second filter cartridge of common size. The differentiation system includes means at the top ends of the filter cartridge and the second filter cartridge for differentiating between the filter cartridge and second filter cartridge. Alternative structural examples of such means are disclosed in the detailed description of embodiments.

According to a more particular embodiment, the torsion lock detent member can comprise a raised ring surrounding and spaced outward from the nipple portion. The raised ring can project from the top annular end wall and define at least one of a detent tab and a detent slot configured for torsion locking.

According to a more particular embodiment, such a raised ring can include an upper ramp surface facing axially outward. The upper ramp surface can be connected at a front location of the at least one of a detent tab and a detent slot and tapering in diminishing axial height as the upper ramp surface extends away from such detent.

According to a more particular embodiment, the torsion lock detent member can comprise at least one of the detent tab and the detent slot, with a cam edge configured for reducing torque required to engage or disengage the torsion lock detent member.

According to a more particular embodiment, such a raised ring when employed can be elevated above the annular end wall between 1 and 10 millimeters, with the nipple portion elevated above the top annular end wall between 5 and 20 millimeters, and with the nipple portion elevated above the raised ring between 2 and 10 millimeters.

According to a more particular embodiment, the nipple portion comprises an outer annular wall extending axially, and an inner annular wall extending axially with the inner annular wall concentrically located within the outer annular wall. The torsion lock detent member can be provided by the inner annular wall.

According to a more particular embodiment, a contained filter element can provide the torsion lock detent member. The filter element can be contained in the filter housing with the filter element including the filter media. The filter element has a top end cap providing the inner annular wall with can provide the torsion lock detent member.

According to a more particular embodiment where the filter element provides the torsion lock detent member, the housing may comprise a top member and a bottom member joined together to enclose the filter element therein. The outer annular wall of the nipple portion can be provided by the top member of the housing and the inner annular wall can be provided by the top end cap of the filter element.

According to a more particular embodiment with such a filter element, the filter element comprises a ring of pleated filter media providing the filter media; the top end cap being sealingly bonded to an upper end of the ring of pleated filter media, the top end cap being positioned below the top annular end wall, wherein a fluid flow path is provided between the top end cap and the top annular end wall; and a bottom end cap sealingly bonded to a lower end of the ring of pleated filter media. Further, a spring can be supported by the housing and biasing the filter element against the top member. Accordingly, the torsion lock detent member can be movable relative to the top member via the spring.

According to a more particular embodiment with a filter element spring, the spring comprises a biasing force of between 10 and 80 pounds, with the filter element having a travel movement relative to the housing of between 0.5 and 3 millimeters through biasing resiliency of the spring (i.e. corresponding to the travel movement of the detent during engagement).

According to a more particular embodiment with a filter element spring, the inner annular wall can project further than the outer annular wall in an unloaded condition (and may be movable to become even with the outer annular wall through loading of the spring).

According to a more particular embodiment, the inner annular wall of the filter cartridge includes an axially outermost annular edge defining a torsion lock detent of the torsion lock detent member, the inner annular wall having a radial seal member thereon.

According to a more particular embodiment, the inner annular wall comprises a snout portion defining the outlet port. The snout has a radial seal member thereon. A ring wall portion surrounds the snout portion to provide the torsion lock detent member. The ring wall portion has an axially outermost edge defining a torsion lock detent of the torsion lock detent member.

According to a more particular embodiment, the torsion lock detent member includes a torsion lock detent. The filter cartridge further comprises a spring that supports the torsion lock detent, the torsion lock detent being movable relative to the housing through resiliency of the spring.

According to a more particular embodiment, the torsion lock detent member comprises such a spring. The torsion lock detent member comprises a base portion anchored to the top annular end wall, and a spring arm extending in cantilevered fashion from the base portion and movable relative to the top annular end wall to provide for said spring. The torsion lock detent can be defined by the spring arm.

According to a more particular embodiment where the torsion lock detent member comprises such a spring, the spring arm defines an outer facing ramp surface leading to the torsion lock detent. The torsion lock detent can be defined by a slot at an end portion of the spring arm.

According to a more particular embodiment where the torsion lock detent member comprises such a spring, the housing includes a top cap member and the torsion lock detent includes a preformed metal member secured to the top annular end wall.

According to a more particular embodiment where the torsion lock detent member comprises such a spring, the housing includes a top cap member, with the torsion lock detent member formed of plastic material integrally molded with the top end cap member.

According to a more particular embodiment, the nipple portion comprises: an outer annular wall extending axially and having an outer seal; and an inner annular wall extending axially and having an inner seal, with the inner annular wall concentrically located within the outer annular wall. The inner and outer annular walls provide the outlet and inlet ports of the cartridge, with the inner and outer seals arranged to provide radial seals.

According to a more particular embodiment and relative to such a nipple portion, the outer annular wall is elevated axially above the top annular end wall by between 3 and 20 millimeters higher than the inner annular wall.

According to a more particular embodiment and relative to such a nipple portion, the inner annular wall is elevated axially above the top annular end wall by between 3 and 20 millimeters higher than the outer annular wall.

According to a more particular embodiment and relative to such a nipple portion, the inner annular seal and the outer annular seal are axially offset by between 3 and 20 millimeters.

According to a more particular embodiment and relative to such a nipple portion, the inner annular wall supports a radially inward directed seal, and the outer annular wall supports a radially outward directed seal.

According to a more particular embodiment and relative to such a nipple portion, the inner annular wall supports a radially outward directed seal, and the outer annular wall supports a radially inward directed seal.

According to a more particular embodiment, the torsion lock detent member comprises a radially acting detent radially outboard of the nipple portion.

According to a more particular embodiment with a radially acting detent, the nipple portion extends above the radially acting detent with at least one seal located above the radially acting detent.

According to a more particular embodiment with a radially acting detent, the radially acting detent comprising a raised wall axially extending from the top annular end wall by between 2 and 15 millimeters. The raised wall can have a radially outward directed detent face having a first portion located at a different diameter than a second portion by a diameter difference of between 0.5 and 4 millimeters.

As an example, the radially acting detent can comprise a raised polygon plateau, and preferably an equilateral polygon.

According to a more particular embodiment, the filter cartridge further comprises a filter element having the filter media. The filter element is contained in the filter housing. The torsion lock detent member includes at least one detent tab integrally formed into the top annular end wall and projecting therefrom. At least one detent tab along an internal surface of the filter housing defines a flow channel between the filter housing and the filter element.

According to a more particular embodiment with such a flow channel feature, the cartridge includes a filter element comprising: a ring of pleated filter media; a top end cap sealingly bonded to an upper end of the ring of pleated filter media and positioned below the top annular end wall, wherein a fluid flow path is provided between the top end cap and the top annular end wall; and a bottom end cap sealingly bonded to a lower end of the ring of pleated filter media. A spring biases the filter element into abutting relation with the annular end wall with the flow channel providing continuous fluid communication along the fluid flow path between the nipple portion and an outer periphery of the top end cap when in abutting relation.

According to a more particular embodiment with a flow channel feature, a flow area of between 50 and 200 square millimeters is provided collectively by the at least one detent tab.

According to a more particular embodiment where detent tabs are used, at least 2 detent tabs are provided.

In some embodiments, only 2 detents (e.g. tabs or slots) may be employed.

According to a more particular embodiment with a flow channel feature, each detent tab comprises an elongated rib. The flow channel having a flow area that is matched to or greater than a flow area of the inlet port or the outlet port.

According to a more particular embodiment, the thread of the filter cartridge comprises a resiliently deformable thread member.

According to a more particular embodiment, the resiliently deformable thread member is formed from resilient plastic material.

According to a more particular embodiment, the thread comprises at least 2 spiral thread members extending less than 360 degrees around the filter cartridge and arranged at different angular orientations on different locations around the filter housing, the thread members providing for between a ¼ to a ½ turn filter cartridge.

According to a more particular embodiment involving a resiliently deformable thread feature, each spiral thread member comprises first and second flange members defining a spiral channel therebetween. The first and second flange members are configured to be pinched (e.g. by a thread channel in the filter head when in use) resiliently together to narrow the spiral channel.

According to a more particular embodiment involving a resiliently deformable thread feature, each spiral thread member comprises first and second flange members defining a spiral channel therebetween. The first and second flange members are configured to be spread resiliently apart to widen the spiral channel. The thread member is configured for a mounting head having a corresponding thread channel with a wedge with the thread channel configured to be received in the wedge.

According to a more particular embodiment, the thread member is configured for a mounting head having a corresponding thread channel with a tip of the thread member configured to resiliently deflect between 0.5 and 3 millimeters when installed in the mounting head.

According to a more particular embodiment, the filter cartridge further comprises a valve actuator member provided at the nipple portion. The valve actuator member is offset from a central axis of the filter cartridge.

According to a more particular embodiment involving a valve actuator feature, the valve actuator member comprises a valve actuator within the nipple portion.

According to a more particular embodiment involving a valve actuator feature, the valve actuator member is provided by a filter element contained internal to the filter housing.

According to a more particular embodiment involving a valve actuator feature, the filter element comprises a top end cap sealingly bonded to a top end of the filter media with the valve actuator abutment being supported by and extending from the top end cap.

According to a more particular embodiment involving a valve actuator feature on a filter element top end cap, a support rib at a base of the valve actuator abutment is provided along the top end cap.

According to a more particular embodiment involving a valve actuator feature, the valve actuator member comprises at least one abutment base or abutment platform extending inside the nipple portion and below a top tip of the nipple portion.

According to a more particular embodiment involving a valve actuator feature, the valve actuator member is provided by a filter element contained internal to the filter housing.

According to a more particular embodiment involving a valve actuator feature and filter element feature, the filter element comprises a top end cap sealingly bonded to a top end of the filter media. At least one platform is supported by and extends above the top end cap (i.e. above the ring portion of the top end cap that can be used to bond to filter media). The top end cap further includes an inner annular wall defining the outlet port. The inner annular wall extends above the platform with the inner annular wall carrying a radial seal member above the platform.

According to a more particular embodiment involving a valve actuator feature, the valve actuator member comprises at least one slot formed into a terminating top edge of an outer annular wall of the nipple portion. Each slot has a slot sidewall providing for the torsion lock detent member and a slot base providing for the valve actuator member.

According to a more particular embodiment, the valve actuator member is provided by the filter housing.

According to a more particular embodiment involving a valve actuator feature, an assembly is provided with the mounting head having the filter cartridge mounted thereto in a secured condition. The mounting head comprises: (a) a mating fluid flow interface having a discharge port for unfiltered fluid and return port for filtered fluid, the discharge port being directly connected to the inlet port at the mating fluid flow interface and the return port being directly connected to the outlet port; (b) an outer peripheral wall including a thread ramp, the thread ramp engaging the thread of the filter cartridge and keeping the filter cartridge retained to the mounting head; (c) a lock assembly comprising a lock member having a lock member detent and a spring member biasing the lock member axially toward the filter cartridge, wherein the lock member detent is engaged with the torsion lock detent member to prevent rotational disengagement between the filter cartridge and the filter head; and (d) a valve member having an open position and a closed position allow flow or closing flow through the discharge port, respectively, the valve actuator member maintaining the valve member in the open position in the secured position.

According to a more particular embodiment involving a valve actuator feature in a filter head and cartridge assembly, the valve member covers the discharge port in the mounting head when the filter cartridge is unsecured from the mounting head.

According to a more particular embodiment involving a valve actuator feature in a filter head and cartridge assembly, the valve actuator member comprises an abutment provided by a valve actuator pin, while the valve member comprises a valve disc rotatably carried by a mounting base of the mounting head. The valve disc has an opening therein that aligns with the discharge port in the secured position. The valve disc also has a latch tab arranged to be rotationally engaged by the valve actuator abutment during a movement of the filter cartridge from an unsecured position to the secured position.

According to a more particular embodiment involving a valve actuator feature, that feature comprises a valve actuator pin axially extending in the inlet port.

According to a more particular embodiment involving a valve actuator feature as a pin, the valve actuator pin extends axially above the nipple portion.

According to a more particular embodiment involving a valve actuator feature in an assembly, the valve member is axially movable and biased to the closed position by a valve spring supported by a mounting base of the mounting head. The valve actuator member props the valve member open against the valve spring in the secured position.

According to a more particular embodiment involving a valve actuator feature in an assembly, the valve actuator member comprises at least one abutment base or abutment platform extending inside the nipple portion, the valve member comprising an annular L-shaped disc member, a leg of the annular L-shaped disc member being engaged by the at least one abutment base or abutment platform.

According to a more particular embodiment involving a valve actuator feature in an assembly, the lock member and the valve member are integrated into a valve and lock assembly, the lock member extending from the valve member and being engaged by the valve actuator member and the torsion lock detent member.

According to a more particular embodiment involving a valve actuator feature, a slot member is provided in the filter cartridge, the slot member having a slot sidewall providing for the torsion lock detent member and a slot base providing for the valve actuator member.

According to a more particular embodiment, the nipple portion defines the slot member formed axially into a free end thereof.

According to a more particular embodiment, the outlet port is through the nipple portion and wherein the inlet port is formed though the top annular end wall radially outboard of the nipple portion.

According to a more particular embodiment, the torsion lock detent member is positioned radially between the inlet port and the outlet port.

According to a more particular embodiment with a radially outboard inlet port, the inlet port comprises a ring array of inlet port openings proximate the shoulder region, the inlet port openings being located radially beyond the filter media.

According to a more particular embodiment with a radially outboard inlet port, the torsion lock detent member comprises at least two torsion lock tabs projecting from and above the top annular end wall, the at least two torsion lock tabs arranged at a regular angular spacing around the nipple portion and elevated below a free end of the nipple portion. Each torsion lock tab comprises: a height of between 0.25 and 10 millimeters above the top annular end wall; a radial length of between 1 and 40 millimeters; a thickness of between 1 and 10 millimeters, the thickness being perpendicular to the height and the radial length. Further the nipple portion extends between 1 and 30 millimeters above each torsion lock tab, with each torsion locking tab includes an engagement region located between 5 and 45 millimeters radially spaced from a central axis of the filter cartridge.

According to a more particular embodiment, the filter housing comprises a reusable bowl member, and the top annular end wall being provided by a disposable filter element freely slidable into and out of the reusable bowl member. The bowl member comprises an outer flange member with the bowl member defining the thread in a region of the annular sidewall above the outer flange member. Further, a first external seal located below the thread and along the flange member.

According to a more particular embodiment with a reusable bowl feature, the nipple portion provides a second external seal axially and radially spaced from the first external seal.

According to a more particular embodiment with a reusable bowl feature, the first and second external seals are provided by first and second gaskets, respectively received into radially outwardly facing grooves in the outer flange member and the nipple portion.

According to a more particular embodiment with a reusable bowl feature, the filter may further comprise a keying interface between the reusable bowl member and the disposable filter element clocking the torsion lock detent member relative to the thread at a predetermined angular orientation.

According to a more particular embodiment with a reusable bowl feature, the key interface can be provided at a slide interface between the disposable filter element and the reusable bowl at the shoulder region.

Alternatively in another particular embodiment, the keying interface can be provided proximate the nipple region.

According to a more particular embodiment with a bowl feature, the bowl further comprises a separator tube having a fuel/water separator screen. The separator tube extends to proximate a key interface being provided an upper free end of the separator tube and along an inner surface of the disposable filter element below the nipple portion.

In some embodiments, the filter housing is permanently secured to the bowl (e.g. the filter being a bowl and filter element as a disposable cartridge), while in other embodiments, the filter cartridge comprises a reusable bowl and filter in the form of a filter element removably mounted in the bowl.

According to a more particular embodiment with a bowl feature, the bowl comprises an outer shell defining a gravitational bottom providing a sump for water and a drainage aperture at the gravitational bottom, and a separator tube extending concentrically within the outer shell. The separator tube has a fuel/water separator screen and defines an internal drainage port therethrough below the fuel/water separator screen. The filter element comprises: a ring of pleated filter media surrounding the separator tube with an axial flow path therebetween to facilitate water drainage toward the internal drainage port; a top end cap sealingly bonded to an upper end of the ring of pleated filter media; and a bottom end cap sealingly bonded to a lower end of the ring of pleated filter media. Further, an outer ring seal seals the bottom end cap to the shell and an inner ring seal seals the top end cap to the separator tube.

According to a more particular embodiment with a bowl feature, the top end cap of a filter element defines the top annular end wall. The top end cap rests on an upper peripheral edge of the shell to define the shoulder region.

According to a more particular embodiment with a bowl feature, the top end cap defines the inlet port as a series of inlet flow openings radially outside of the torsion lock detent member.

According to a more particular embodiment with a bowl feature, the nipple portion is provided entirely by the filter element.

According to a more particular embodiment with a bowl feature, the bowl defines the thread and provides the annular sidewall.

According to a more particular embodiment, a torsion lock detent member of the filter cartridge comprises a cylindrical ring extending axially from the top annular end wall, the cylindrical ring defining the thread.

For example, the torsion lock detent can comprise a slot formed in the cylindrical ring.

According to a more particular embodiment, the filter cartridge further comprises a unitary cap member defining the top end and including the shoulder region, the top annular end wall, the cylindrical ring and at least a first portion of the nipple portion that is concentric within the cylindrical ring.

According to a more particular embodiment of the filter cartridge, the torsion lock detent member includes a tab or a slot, the tab or the slot including a cam surface on a leading face, the cam surface being canted or rounded over a travel distance of at least 3 millimeters.

According to a more particular embodiment of the filter cartridge, the torsion lock detent member further includes a ramp leading up to the tab or the slot.

For example, the ramp can extend in at least a portion of a circle leading up to the tab or the slot.

When used, the ramp can have an incline grade of between 2 and 10 degrees and can span a circular angular span about a central axis of the filter cartridge of 45 degrees.

According to a more particular embodiment of the filter cartridge, the torsion lock detent member includes a tab or a slot having a radial span of between 1 and 40 mm, an axial height span of between 0.25 and 10 mm, and a thickness or tangential span of between 1 mm and 10 mm.

According to a more particular embodiment of the filter cartridge, the torsion lock detent member is a slot, with a radial span of between 5 and 30 mm, and an axial height span of between 1 and 5 mm.

According to a more particular embodiment of the filter cartridge, the torsion lock detent member includes a tab, with a radial span of between 5 and 30 mm, an axial height span of between 1 and 5 mm, and a tangential span of between 2 mm and 5 mm.

According to a more particular embodiment of the filter cartridge, the torsion lock detent has an engagement region (configured to correspond to the corresponding detent on the filter head) located at a radial distance from a central axis of the filter cartridge of between 10 mm and 30 mm.

Another embodiment of the present invention is directed toward a filter cartridge, wherein a top member thereof integrally provides both of a thread and a torsion lock detent member in a predetermined angular orientation. The cartridge also comprises a filter housing including a top end, a bottom end, and an annular sidewall extending therebetween. The top end includes a top annular end wall. The filter housing comprises a top member and a bottom member that are formed separate and joined together with the top member providing the top end and the bottom member providing the bottom end. A fluid flow interface is at the top end with the fluid flow interface including an inlet port for receiving unfiltered fluid and an outlet port for returning filtered fluid. A thread is provided by the filter housing. A filter media is arranged in the filter housing and along a fluid flow path through the filter housing from the inlet port to the outlet port with the filter media being arranged in fluid series between the inlet port and the outlet port. The torsion lock detent member is also arranged at or proximate the top end.

According to a more particular embodiment, the predetermined angular orientation is fixed and non-movable as between the thread and the torsion lock detent member.

For example, the top member can unitarily provide both of the thread and the torsion lock detent member.

According to a more particular embodiment, the filter cartridge comprises a filter element contained in the filter housing. The filter element comprises a ring of pleated filter media; a top end cap sealingly bonded to an upper end of the ring of pleated filter media, the top end cap being positioned below the top member, wherein a fluid flow path is provided between the top end cap and the top member; and a bottom end cap sealingly bonded to a lower end of the ring of pleated filter media.

According to a more particular embodiment, the filter cartridge includes a nipple portion at the top end. The top annular end wall extends radially outwardly beyond the nipple portion and connects with the annular sidewall at a shoulder region. The nipple portion projects away from the bottom end and above the top annular end wall. The torsion lock detent member extends between the nipple portion and the shoulder region. The torsion lock detent member is positioned axially below the nipple portion and axially above a surface of the top annular end wall and entirely above the shoulder region. At least part of the nipple portion is integrally provided by the top member.

According to a more particular embodiment, the torsion lock detent member projects from the top annular end wall, with no portion of the filter housing is elevated above the torsion lock detent member radially outside of the torsion lock detent member.

According to a more particular embodiment, wherein the torsion lock detent member comprises at least two torsion lock tabs projecting from and above the top annular end wall, the at least two torsion lock tabs arranged at a regular angular spacing about the annular end wall.

For example, each torsion lock tab may comprise: an axial height of between 0.25 and 10 millimeters above the top annular end wall; a radial length of between 1 and 40 millimeters; and a thickness of between 1 and 10 millimeters, the thickness being perpendicular to the height and the radial length.

According to another embodiment of the present invention, a filter cartridge comprises a thread and a torsion lock detent member that are arranged in a predetermined angular orientation with a key free relationship therebetween. The filter cartridge also comprises a filter housing including a top end, a bottom end, and an annular sidewall extending therebetween. The top end includes a top annular end wall. A fluid flow interface is at the top end that includes an inlet port for receiving unfiltered fluid and an outlet port for returning filtered fluid. The thread is provided by the filter housing. A filter media is arranged in the filter housing and along a fluid flow path through the filter housing from the inlet port to the outlet port with the filter media being arranged in fluid series between the inlet port and the outlet port. The torsion lock detent member is also arranged at or proximate the top end.

According to a more particular embodiment, the filter housing includes a top cap member joined to a bottom can member, wherein both the torsion lock detent member and the thread are integrally provided by the top cap member to thereby accomplish the key free relationship.

According to a more particular embodiment, the torsion lock detent member projects from the top annular end wall, with no portion of the filter housing being elevated above the torsion lock detent member radially outside of the torsion lock detent member.

According to a more particular embodiment, the filter element is mounted without seals in the filter housing such that fluid can flow between the filter housing and the filter element.

According to a more particular embodiment, the filter cartridge further comprises a nipple portion at the top end with the top annular end wall extending radially outwardly beyond the nipple portion and connecting with the annular sidewall at a shoulder region. The nipple portion projects away from the bottom end and above the top annular end wall. The torsion lock detent member is positioned axially between the nipple portion and the shoulder region, with the torsion lock detent member being elevated below the nipple portion and above a surface of the top annular end wall and entirely above the shoulder region. Further at least part of the nipple portion can be integrally provided by the top member and at least part of the nipple portion can be integrally provided by the top end cap.

According to another embodiment of the present invention, a filter cartridge includes a unique combination of constituent parts/portions. The cartridge comprises a filter housing that includes a top end, a bottom end, and an annular sidewall extending therebetween. The top end includes a top annular end wall. A nipple portion is at the top end, with the top annular end wall extending radially outwardly beyond the nipple portion and connecting with the annular sidewall at a shoulder region. The nipple portion projects away from the bottom end and above the top annular end wall. A fluid flow interface is at the top end, with the fluid flow interface consisting of an inlet port for receiving unfiltered fluid and an outlet port for returning filtered fluid (e.g. to provide for only two way flow with the filter head without a third or further flow path therebetween). At least one of the inlet and outlet ports is through the nipple portion. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent member is arranged at or proximate the top end. The nipple portion includes a first radial seal surrounding the inlet port and having a first radially directed sealing surface. The nipple portion also includes a second radial seal surrounding the outlet port and having a second radially directed sealing surface.

According to a more particular embodiment of the filter cartridge, the nipple portion includes an outer annular wall extending axially; an inner annular wall extending axially, the inner annular wall concentrically located within the outer annular wall. The first and second radial seals provide an outer radial seal supported by the outer annular wall and an inner radial seal supported by the inner annular wall.

According to a more particular embodiment of the filter cartridge, the outer radial seal is provided by a first gasket and the inner radial seal is provided by a second gasket. The first and second gaskets can be formed from elastomeric material separate from and non-unitary with the inner and outer annular walls.

According to a more particular embodiment of the filter cartridge, the outer annular wall and the inner annular wall are formed from rigid material more rigid than the elastomeric material to provide support for first and second gaskets.

To provide for retention, the cartridge can further comprise first and second radially outward grooves (e.g. in the event outwardly directed radial seals are employed) formed in the inner and outer annular walls, respectively, with the inner and outer radial seals retained in the first and second radially outward grooves, respectively.

According to a more particular embodiment of the filter cartridge an external surface of the filter housing is seal free outside of the torsion lock detent member.

According to another embodiment of the present invention, a filter head and filter cartridge assembly is provided comprising a filter cartridge and a filter head. The cartridge comprises: (a) a filter housing including a top end and a bottom end and an annular sidewall extending therebetween, the top end including a top annular end wall transitioning into the annular sidewall at a shoulder region; (b) a fluid flow interface at the top end, the fluid flow interface including an inlet port for receiving unfiltered fluid and an outlet port for returning filtered fluid; (c) a thread provided by the filter housing; (d) a filter media arranged in the filter housing and along a fluid flow path through the filter housing from the inlet port to the outlet port with the filter media being arranged in fluid series between the inlet port and the outlet port; and (e) a torsion lock detent member arranged at or proximate the top end. The filter head or mounting head has the filter cartridge mounted thereto in a secured condition and comprises: (a) a mating fluid flow interface having a discharge port for unfiltered fluid and return port for filtered fluid, the discharge port being directly connected to the inlet port at the mating fluid flow interface and the return port being directly connected to the outlet port; (b) an outer peripheral wall including a thread ramp, the thread ramp engaging the thread of the filter cartridge and keeping the filter cartridge retained to the mounting head; and (c) a lock assembly comprising a lock member having a lock member detent and a spring member biasing the lock member axially toward the filter cartridge, wherein the lock member detent is engaged with the torsion lock detent member to prevent rotational disengagement between the filter cartridge and the filter head. Further, the mounting head has an internal surface facing and receiving the filter cartridge. Advantageously, the internal surface may be free of annular grooves in a transition region between the lock assembly and the thread ramp, with the transition region accommodating the shoulder region.

According to a more particular embodiment of the assembly, the transition region is curved and continuously extending outwardly and downwardly from the lock assembly to the thread ramp. The filter cartridge has a complimentary dome region received proximate the transition region.

According to a more particular embodiment of the assembly, the mounting head includes an outer port wall and an inner port wall concentric with the outer port wall. The inner port wall and the outer port wall together provide for the discharge port and the return port. The filter cartridge further includes a nipple portion at the top end, with the top annular end wall extending radially outwardly from the nipple portion. The nipple portion projects away from the bottom end and above the top annular end wall. The nipple portion includes: an outer annular wall extending axially; an inner annular wall extending axially, the inner annular wall concentrically located within the outer annular wall; an outer radial seal supported by the outer annular wall and having a first radially outer sealing surface; and an inner radial seal supported by the inner annular wall and having a second radially outer sealing surface. Further the inner annular wall is received with the inner port wall with the inner radial seal forming a radial seal with the inner port wall, and the outer annular wall is received with the outer port wall with the outer radial seal forming a radial seal with the outer port wall. As a result, the inlet port is sealingly connected to the discharge port for unfiltered fluid flow and the outlet port is sealingly connected to the return port for filter fluid flow.

According to a more particular embodiment of the assembly, the thread of the filter cartridge is configured to ride along the thread ramp with the torsion lock detent member arranged to align and configured to lock with the lock member detent after a predetermined rotation of between ¼ rotational turn and ½ rotational turn between the filter cartridge and the mounting head when engaged.

For example, many of the examples herein of such an particular embodiment is for a ½ rotational turn filter cartridge.

According to a more particular embodiment of the assembly, the lock member provides a force to hold the filter cartridge to the filter head in conjunction with the thread and thread ramp with a torque of between 1 and 20 newton-meters required to disengage the torsion lock detent member from the lock member detent and move to release the filter cartridge from the filter head.

According to a more particular embodiment, the torsion lock detent member comprises a tab and the lock member detent comprises a slot.

According to a more particular embodiment of the assembly, the lock member comprises a ramp leading to the slot and the tab is arranged to slide along the ramp during rotation of the filter cartridge relative to the head.

Another embodiment of the present invention is directed to a method involving simplified interaction between a filter cartridge and a filter head while achieving torsion locking. The method involves providing a filter cartridge, comprising: a filter housing including a top end, a bottom end, and an annular sidewall extending therebetween, top end including a top annular end wall transitioning into the annular sidewall at a shoulder region; a fluid flow interface at the top end, the fluid flow interface including an inlet port for receiving unfiltered fluid and an outlet port for returning filtered fluid; a thread provided by the filter housing; a filter media arranged in the filter housing and along a fluid flow path through the filter housing from the inlet port to the outlet port with the filter media being arranged in fluid series between the inlet port and the outlet port; and a torsion lock detent member arranged at or proximate the top end. The method also involves providing a mounting head comprising: a mating fluid flow interface having a discharge port for unfiltered fluid and return port for filtered fluid; an outer peripheral wall including a thread ramp; and a lock assembly comprising a lock member having a lock member detent and a spring member biasing the lock member axially toward the filter cartridge. The method contemplates rotating the filter cartridge with the thread engaging along the thread ramp to axially move the filter cartridge toward the filter head until the lock member detent is engaged with the torsion lock detent member to prevent rotational disengagement between the filter cartridge and the filter head; and sealingly connecting ports with the discharge port being directly connected to the inlet port at the mating fluid flow interface and the return port being directly connected to the outlet port. Finally, the method involves preventing interference between the filter cartridge and the filter head radially outboard of the torsion lock detent member, wherein the mounting head has an internal surface facing and receiving the filter cartridge and wherein the internal surface is free of annular grooves in a transition region between the lock assembly and the thread ramp, the transition region accommodating the shoulder region.

According to a more particular embodiment, a method of using a filter cartridge and mounting head assembly can further comprise providing clearance and avoiding engagement between the mounting head and the filter cartridge in the transition and shoulder region.

Another embodiment of the present invention is directed toward a filter cartridge comprising a ramping feature in combination with a torsion lock feature. The cartridge includes a filter housing including a top end, a bottom end, and an annular sidewall extending therebetween. The top end includes a top annular end wall. A nipple portion is at the top end. Also, a fluid flow interface is at the top end. The fluid flow interface includes an inlet port for receiving unfiltered fluid and an outlet port for returning filtered fluid, at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. Further, a torsion lock detent member is arranged at or proximate the top end. The torsion lock detent member includes: (a) at least one of a slot and a tab; and (b) a ramp leading and connecting with the at least one of a slot and a tab.

According to a more particular embodiment with a ramping feature, the ramp is defined above the top annular end wall and extending in a circular configuration of at least 45 angular degrees and at an incline grade of between 2 and 10 degrees.

According to a more particular embodiment with a ramping feature, the torsion lock detent member comprises a raised ring surrounding and spaced outward from the nipple portion. The raised ring projects from the annular end wall, with the raised ring defining at least one of a detent tab and a detent slot.

According to a more particular embodiment, wherein the raised ring defines the thread.

According to a more particular embodiment with a ramping feature, the raised ring includes an upper ramp surface facing axially outward to provide for the ramp. The upper ramp surface can be connected at a foremost location to at least a detent tab or detent slot and can taper in diminishing axial height as the upper ramp surface extends away therefrom.

According to a more particular embodiment with a ramping feature, a cam is disposed at a forward end the detent tab or the detent slot. The cam is configured for reducing torque required to engage or disengage the torsion lock member.

According to a more particular embodiment with a ramping feature, the filter cartridge is configured for use with a mounting head having a mating fluid flow interface having a discharge port for unfiltered fluid and return port for filtered fluid. The mounting head includes an outer cylindrical wall defining a thread ramp, an outer port wall, an inner port wall concentric with the outer port wall, and a lock assembly comprising a lock member having a lock member detent and a spring member arranged to bias the lock member axially. The filter cartridge further comprises an arrangement whereby the nipple portion is sized and configured to connect with the outer port wall and the inner port wall with the filter cartridge being adapted to be connected to the filter head with the inlet port connected to the discharge port for unfiltered fluid flow and with the outlet port connected to the return port for filter fluid flow. The thread of the filter cartridge is configured to ride along the thread ramp with the torsion lock detent member arranged to align and configured to lock with the lock member detent after a predetermined rotation of between ¼ rotational turn and ½ rotational turn between the filter cartridge and the mounting head when engaged. The ramp (of the cartridge) is positioned to engage with lock member detent during the predetermined rotation.

According to a more particular embodiment with a ramping feature, the torsion lock detent member comprises a spring detent arm resiliently movable relative to the top annular end wall, with the spring detent arm defining the ramp.

According to another embodiment of the present invention, a filter cartridge provides for torsion locking via a raised ring to provide the torsion lock detent member. The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. The torsion lock detent member is arranged at the top end. The torsion lock detent member comprises a raised ring surrounding and spaced outward from the nipple portion. The raised ring projects from the annular end wall, with the raised ring defining at least one of a detent tab and a detent slot.

According to a more particular embodiment, the raised ring defines the thread on an outer peripheral surface thereof.

According to a more particular embodiment, the raised ring includes an upper ramp surface facing axially outward to provide for a ramp. The upper ramp surface can be located in front of the detent tab or detent slot and can taper in diminishing axial height as the upper ramp surface extends away therefore.

According to another embodiment of the present invention, a filter cartridge comprises a spring action torsion locking detent member. The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. The torsion lock detent member is arranged at the top end, and comprises: a base portion anchored to the top annular end wall, a spring arm extending in cantilevered fashion from the base portion and movable relative to the top annular end wall to provide for said spring arm; and a torsion lock detent defined by the spring arm.

According to a more particular embodiment, the spring arm defines an outer facing ramp surface leading to the torsion lock detent, with the torsion lock detent defined by a slot at an end portion of the spring arm.

According to a more particular embodiment, the filter housing includes a top cap member providing the top annular end wall, and wherein the torsion lock detent includes a preformed metal member secured to the top annular end wall.

According to a more particular embodiment, the housing includes a top cap member of a plastic material, wherein the torsion lock detent member is formed of the plastic material integrally molded with the top end cap member.

According to another embodiment of the present invention, a filter cartridge comprises a torsion locking detent member on a nipple portion. The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. The torsion lock detent member is arranged on the nipple portion.

According to a more particular embodiment, the nipple portion comprises an outer annular wall extending axially and an inner annular wall extending axially. The inner annular wall is concentrically located within the outer annular wall.

According to a more particular embodiment, the torsion lock detent member comprises at least one of a tab and a slot extending axially in a terminating free end of the outer annular wall.

According to a more particular embodiment where the torsion lock detent member is on the nipple portion, no portion of the torsion lock detent member is on the top annular end wall.

According to another embodiment of the present invention, a filter cartridge comprises radially acting detent as opposed to axially acting detent. The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent member comprises a radially acting detent arranged radially outboard of the nipple portion.

According to a more particular embodiment, the nipple portion extends above the radially acting detent with at least one seal located above the radially acting detent.

According to a more particular embodiment, the radially acting detent comprising a raised wall axially extending from the top annular end wall by between 2 and 15 millimeters, the raised wall having a radially outward directed detent face having a first portion located at a different diameter than a second portion by a diameter difference of between 0.5 and 4 millimeters, the first and second portions being spaced by an angular span about a central axis of the filter cartridge of at least 45 degrees.

According to a more particular embodiment with radial detent action, the filter cartridge is configured for use with a mounting head having a lock member with a lock member detent and a spring member arranged to bias the lock member radially inward toward a central axis. The radially acting detent is sized and configured to engage and lock with the lock member detent when the filter cartridge is secured to the filter head.

According to a more particular embodiment with radial detent action, the radially acting detent includes a radially outward directed face having portions at different diameters from a central axis of the filter cartridge and covering an angular span of at least 45 degrees about the central axis.

According to a more particular embodiment with radial detent action, the radially outward directed face has an axial height of between 2 and 15 millimeters.

According to a more particular embodiment with radial detent action, the torsion lock detent member is positioned along the annular sidewall and below a shoulder region (the shoulder region being formed at an intersection between the annular sidewall and the top annular end wall).

According to a more particular embodiment with radial detent action, the torsion lock detent member comprises a strip of radial detents in the form of detent tabs forming a gear rack.

For example, radially acting detent tabs can be triangular.

According to a more particular embodiment with radial detent action, a cartridge and head assembly is provided, where the mounting head includes a lock assembly comprising a lock member having a lock member detent movable radially into and out of engagement with the radially acting detent. A spring member supported by the mounting head biases the lock member radially inward toward the filter cartridge. The lock member detent is radially engaged with the torsion lock detent member to prevent rotational disengagement between the filter cartridge and the filter head.

According to a more particular embodiment with radial detent action, the mounting head can comprise a ratchet. The spring can be integrated and comprise a resilient arm of the ratchet that resilient flexes to move the radially acting detent radially inwardly and outwardly.

According to a more particular embodiment with radial detent action, the lock member of a mounting head can comprise a pin biased by the spring member radially inwardly, with the spring member being separate from the lock member.

According to a more particular embodiment with radial detent action, the filter housing comprises a top member assembly and a bottom member that are formed separate and joined together, with the top member assembly providing the top end and the top annular end wall, and the bottom member providing the bottom end. The top member assembly unitarily provides both of the thread and the torsion lock detent member in fixed non-movable predetermined angular relative angular orientation.

According to a more particular embodiment with radial detent action, the top member assembly forms the nipple portion and further comprises a top end cap portion for a filter element. The filter element comprises a tubular ring of the filter media sealingly bonded to the top end cap portion.

According to a more particular embodiment with radial detent action, the top member assembly is a single component unitary part, and the bottom member comprises a can joined to the top member assembly.

According to a more particular embodiment with radial detent action, the nipple portion includes a snout portion and an outer rim projection. The snout portion surrounds a central opening in the top end member assembly, with the outer rim projection at a periphery of the top annular end wall proximate a shoulder region of the housing. The shoulder region is at an intersection between the top end and the annular sidewall, with the snout portion having a first seal member and the outer rim projection having a second seal member.

According to a more particular embodiment with radial detent action, ribs connect the outer rim projection and the snout portion. This provides inlet flow openings outboard of the top end cap portion that are formed between adjacent ribs to provide the inlet port, with the outlet port being provided by the snout portion.

According to a more particular embodiment with radial detent action, the thread is along the annular sidewall and the radially acting detent is formed into the thread.

According to a more particular embodiment with radial detent action formed into the thread, the thread comprises at least two threads in angular spaced relation about a central axis of the filter cartridge. The radially acting detent comprises at least two corresponding notches formed into the at least two threads, respectively.

For example, each notch can be formed proximate a leading end of each of the at least two threads, the leading end being closer to the top end as compare to a trailing end of each of the at least two threads.

According to a more particular embodiment with radial detent action formed into the thread, the radially acting detent comprises a notch formed into the thread. The thread includes an installation cam surface in the form of a first ramp defined into the thread and removal cam surface in the form of a second ramp formed into the thread and a stop surface. The first and second ramp surface intersect at a ridge region formed along the thread, with the mechanical stop surface and the removal cam surface defining end walls of the notch.

According to a more particular embodiment with radial detent action, the outer port wall comprises a wall region above the outer cylindrical wall and above the thread ramp, with the radially acting detent provided by a notch formed into the thread.

According to a more particular embodiment with radial detent action, a filter assembly including a filter head is provided in combination with the filter cartridge. The lock member detent and the spring member are provided by at least one of a spring loaded pin or a leaf spring, with the spring loaded pin or the leaf spring having a detent projection projecting into at least one thread groove formed into the outer cylindrical wall which provides the thread ramp.

For example, two thread grooves and two corresponding spring loaded pins or leaf springs are provided, respectively, in angular spaced relation about a central axis of the filter cartridge.

According to another embodiment of the present invention, a filter cartridge comprises a fluid flow channel defined through the detent member. The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent member is integrally formed into the top annular end wall and forms the flow channel along an internal surface of the filter housing between the filter housing and the filter element.

According to a more particular embodiment with detent flow channel features, the torsion lock detent member comprises at least one detent tab raised axially above the top annular end wall, with the at least one detent tab defining along the internal surface the flow channel.

According to a more particular embodiment with detent flow channel features, a flow area of between 50 and 200 square millimeters is provided collectively by the at least one detent tab (with preferably at least two detent tabs being provided at regular spacing).

According to a more particular embodiment with detent flow channel features, and when used with an internal filter element, a spring can bias the filter element into abutting relation with the annular end wall with the flow channel providing continuous fluid communication along the fluid flow path between the nipple portion and an outer periphery of the top end cap when in abutting relation.

According to another embodiment of the present invention, a filter is provided with resiliently deformable threads. The filter housing includes a top end, a bottom end, and an annular sidewall extending therebetween. The top end includes a top annular end wall. A fluid flow interface is at the top end, with the fluid flow interface including an inlet port for receiving unfiltered fluid and an outlet port for returning filtered fluid. A filter element provides a filter media arranged in the filter housing and along a fluid flow path through the filter housing from the inlet port to the outlet port, with the filter media being arranged in fluid series between the inlet port and the outlet port. A thread is provided by the filter housing. The thread comprises a resiliently deformable thread member.

Preferably, the resiliently deformable thread member is formed from resilient plastic material of a housing cap that provides for the top annular end wall.

For example, the thread can comprises at least 2 spiral thread members extending less than 360 degrees around the filter cartridge and arranged at different angular orientations on different locations around the filter housing. The thread members can provide for between a ¼ to a ½ turn filter cartridge.

According to a more particular embodiment, the thread can be configured for a mounting head having a corresponding thread channel, with a tip of the thread member configured to resiliently deflect at least ½ millimeter when installed the corresponding thread channel in the mounting head.

According to a more particular embodiment, a tip of the thread member can be configured to resiliently deflect between 0.1 and 3 millimeters when installed in the corresponding thread channel in the mounting head.

According to a more particular embodiment, the thread comprises first and second flange members defining a spiral channel therebetween, the first and second flange members configured to be spread resiliently apart to widen the spiral channel or to be pinched resiliently together to narrow the spiral channel, and wherein the spiral channel tapers and increases in width as the spiral channel extends from a leading end to a trailing end of the first and second flange members.

According to a more particular embodiment, wherein each spiral thread member widens (and preferably continuously) as the spiral thread extends from the leading end to the trailing end to provide for wedge action in that the filter can be installed freely until almost reaching an installed conditions.

According to another embodiment of the present invention, a filter cartridge comprises a provision of torsion locking and valve actuation. The filter cartridge comprises a filter housing including a top end, a bottom end and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent member is arranged at or proximate the top end. Further, a valve actuator member is provided at the nipple portion. The valve actuator member is offset from a central axis of the filter cartridge.

According to a more particular embodiment with torsion locking and valve actuation, various configurations and features described herein can be employed. For example, the valve actuator can be on the filter housing or internal filter element. Further, different portions of the torsion lock detent slot or detent tab can provide for torsion locking detent and valve actuator (e.g. a slot base and a slot sidewall that provide for the different functions).

According to another embodiment of the present invention, a filter cartridge comprises a provision of torsion locking and an external key (e.g. for keying with a filter head). The filter cartridge comprises a filter housing including a top end, a bottom end, and an annular sidewall extending therebetween. The top end includes a top annular end wall. A nipple portion is at the top end. A fluid flow interface is at the top end. The fluid flow interface includes an inlet port for receiving unfiltered fluid and an outlet port for returning filtered fluid, with at least one of the inlet and outlet ports being through the nipple portion. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent member is arranged at the top end with the torsion lock detent member being elevated above the top annular end wall. A key is also arranged at the top end with the key being axially above the top annular end wall.

According to a more particular embodiment with an external key, the key extends radially beyond the torsion lock detent member and higher than the torsion lock detent member.

According to a more particular embodiment, the torsion lock detent member is a torsion lock tab projecting from and above the top annular end wall.

According to a more particular embodiment with an external key, the key comprises at least two key tabs that are arranged at a regular angular spacing around a central axis of the filter cartridge and that project from and above the top annular end wall.

According to a more particular embodiment with an external key, a filter head and filter cartridge assembly is provided. A filter head has the filter cartridge mounted thereto in a secured condition. The filter head comprises: (a) a mating fluid flow interface having a discharge port for unfiltered fluid and return port for filtered fluid, the discharge port being directly connected to the inlet port at the mating fluid flow interface and the return port being directly connected to the outlet port; (b) an outer peripheral wall including a thread ramp, the thread ramp engaging the thread of the filter cartridge and keeping the filter cartridge retained to the filter head; and (c) a lock assembly comprising a lock member having a lock member detent and a spring member biasing the lock member axially toward the filter cartridge, wherein the lock member detent is engaged with the torsion lock detent member to prevent rotational disengagement between the filter cartridge and the filter head. Further, the filter head comprises a latch member movable between from a latched condition preventing axial movement of the lock member and an unlatched condition allowing axial movement of the lock member. The key in the secured condition acts upon the latch member to provide the latch member in the unlatched condition.

According to a more particular embodiment with an external keying cartridge and head assembly, the latch is pivotably mounted to a base of the filter head radially outboard of the lock member. The latch in the latched condition is pivoted radially inwardly over the lock member, and in the unlatched condition is pivoted radially outwardly clear of the lock member.

According to a more particular embodiment with an external keying cartridge and head assembly, the key is arranged at a predetermined orientation relative to the lock member such that during rotation of the filter cartridge from an unsecured position to the secured position, the key is sufficiently forward of the torsion lock member to engage the latch member before the torsion lock member drives the lock member against the action of the spring member.

According to another embodiment of the present invention, a filter comprises a torsion lock detent member that is elevated above a top annular end wall and that extends axially higher than any portion of a top member assembly radially outside of the torsion lock detent member. The filter further includes a ring of filter media. The top end member assembly is sealingly bonded to and supports an upper end of the ring of filter media. The top end member assembly defines an upper annular end wall, a central opening through the upper annular end wall, and a snout extending above the upper annular end wall. The top end member assembly also has a fluid flow interface. The fluid flow interface includes an inlet port for receiving unfiltered fluid and an outlet port for returning filtered fluid, with at least one of the inlet and outlet ports being through the snout. A bottom end member is sealingly bonded to and supports a lower end of the ring of filter media. The torsion lock detent member is arranged at or proximate the top end.

According to a more particular embodiment of such filter, the filter further comprises a radial seal supported on an outer surface of the snout.

According to a more particular embodiment of such filter, the snout defines a radially outward facing groove, with the radial seal being a gasket situated in the groove.

According to a more particular embodiment of such filter, the torsion lock detent member comprises at least one torsion lock tab projecting from and above the top annular end wall, and elevated axially below a free end of the snout, each torsion lock tab comprises: a height of between 0.25 and 19 millimeters above the top annular end wall; a radial length of between 1 and 40 millimeters; and a thickness of between 1 and 10 millimeters, the thickness being perpendicular to the height and the radial length.

According to a more particular embodiment of such filter, the snout extends between 1 and 30 millimeters above each torsion lock tab, and each torsion locking tab includes an engagement region located between 10 and 30 millimeters radially spaced a central axis of the filter cartridge.

According to a more particular embodiment of such filter, the top end member assembly comprises a unitary one-piece top end cap sealing bonded to the upper end of the ring of filter media, with the top end cap defining the torsion lock detent member.

For example, the filter can be a filter element, preferably a disposable filter element.

According to a more particular embodiment of such filter, the top end member assembly defines the inlet port through the upper annular end wall radially outside of the filter media, with the outlet port being through the snout.

According to a more particular embodiment of such filter, the inlet port comprises a plurality of inlet flow holes through the upper annular end wall and radially outside of the torsion lock detent member.

According to a more particular embodiment of such filter, the filter is a disposable filter element configured for use with a reusable bowl. The filter can comprise keys for clocking with the reusable bowl.

According to a more particular embodiment of such filter, the filter is a filter cartridge comprising a filter housing including a top end, a bottom end, and an annular sidewall extending therebetween, with a filter element housed within the filter housing.

According to a more particular embodiment of such filter, the top end member assembly comprises a top end cap and a top housing cap. The top housing member can form part of the filter housing. The top end cap is part of the filter element and enclosed within the housing, with the top end cap integrally providing the snout that extends into a central opening of the top housing cap.

According to a more particular embodiment of such filter, the filter includes a nipple portion at the top end. The top annular end wall extends radially outwardly from the nipple portion and connects with the annular sidewall at a shoulder region. The fluid flow interface includes both the inlet port and the outlet port through the nipple portion.

According to a more particular embodiment of such filter, the nipple portion can be configured with inner and outer annular walls and corresponding inner and outer radial seals.

According to a more particular embodiment of such filter, the shoulder region can define an external dome surface.

Preferably, when the filter includes a filter housing and an internal filter element, a thread is defined along the annular sidewall of the filter housing.

According to a more particular embodiment of such filter, the filter is a filter element mounted in a housing bowl.

According to a more particular embodiment of such filter, the housing bowl comprises a thread and the filter element is coupled to the housing bowl at a predetermined angular orientation to facilitate torsion locking via the torsion lock detent member.

According to another embodiment of the present invention, a filter element comprises an outlet port that is defined by a snout and an inlet port that is defined by an upper annular end wall radially spaced outward from the snout and a nipple portion. The filter element comprises a ring of filter media and a top end member assembly sealingly bonded to and supporting an upper end of the ring of filter media. The top end member assembly defines an upper annular end wall, a central opening through the upper annular end wall, and a snout extending above the upper annular end wall to provide the nipple portion. A fluid flow interface is provided through the top end member assembly. The fluid flow interface includes an inlet port for receiving unfiltered fluid and an outlet port for returning filtered fluid. Further the filter element comprises a bottom end member sealingly bonded to and supporting a lower end of the ring of filter media.

According to a more particular embodiment with a radially spaced inlet port feature, a torsion lock detent member is arranged at the top end positioned radially outside of the nipple portion.

According to a more particular embodiment with a radially spaced inlet port feature, an innermost portion of the inlet port can be positioned radially outward from an innermost position of the torsion lock detent member.

According to a more particular embodiment with a radially spaced inlet port feature, the inlet port can be positioned radially outward of the torsion lock detent member.

According to a more particular embodiment with a radially spaced inlet port feature, the inlet port comprises a plurality of openings formed in the top end member assembly proximate a radial periphery thereof.

Preferably, such inlet openings comprise fully enclosed thru-holes.

According to a more particular embodiment with a radially spaced inlet port feature, the torsion lock detent member is elevated above the top annular end wall and extends axially higher than any portion of the top member assembly radially outside of the torsion lock detent member.

According to a more particular embodiment with a radially spaced inlet port feature, the filter element is free of any seals along a top surface of the top member radially outside of the nipple portion.

According to a more particular embodiment of such filter element, the torsion lock detent member comprises a torsion lock tab projecting from and above the top annular end wall. The torsion lock tab is elevated below a free end of the nipple portion, and comprises: a height of between 0.25 and 10 millimeters above the top annular end wall; a radial length of between 1 and 40 millimeters; and a thickness of between 1 and 10 millimeters, the thickness being perpendicular to the height and the radial length.

According to a more particular embodiment of such filter element, the filter element, includes a first seal supported by the bottom end member radially outside of the ring of filter media and a second seal supported by the top end member assembly radially inside of the ring of filter media and proximate a bottom portion of the snout.

According to a more particular embodiment of such filter element, the ring of filter media is a hollow pleated ring of filter media defining an internal volume providing an axial flow path.

According to a more particular embodiment, such a filter element is combined with a filter bowl to provide a filter cartridge. The filter element is received in the housing bowl with the housing bowl surrounding the ring of filter media.

According to a more particular embodiment of such cartridge with an element and bowl combination, a standpipe extends axially from and inside the housing bowl. The standpipe has a water strainer arranged to strain fluid flowing from the inlet port to the outlet port. The standpipe and the water strainer are positioned radially inside of the ring of filter media.

According to a more particular embodiment of such cartridge with an element and bowl combination, the bowl defines a gravitational bottom providing a water sump and a drainage aperture through the gravitational bottom.

For example, this particular embodiment can be used for fuel filtration for particulate and water removal.

According to a more particular embodiment of such cartridge with an element and bowl combination, the filter element comprises a first seal supported by the bottom end member radially outside of the ring of filter media and a second seal supported by the top end member assembly radially inside of the ring of filter media and proximate a bottom portion of the snout. The first seal seals against the housing bowl and the second seal seals against the standpipe.

According to another embodiment of the present invention, a filter differentiation system is provided that includes a first filter and a second filter of common size. Each of the first and second filters comprise: (a) a top end and a bottom end, the top end including a top annular end wall; (b) a nipple portion at the top end, the top annular end wall extending radially outwardly from the nipple portion to a shoulder region, the nipple portion projecting away from the bottom end and above the top annular end wall; (c) a fluid flow interface at the top end, the fluid flow interface including an inlet port for receiving unfiltered fluid and an outlet port for returning filtered fluid, at least one of the inlet and outlet ports being through the nipple portion; (d) a filter media arranged in the filter housing and along a fluid flow path through the filter housing from the inlet port to the outlet port with the filter media being arranged in fluid series between the inlet port and the outlet port; (e) a torsion lock detent member arranged at or proximate the top end; and (d) means at the top end for differentiating between the first filter and the second filter.

According to a more particular embodiment of such filter differentiation system, the differentiating means is provided by the nipple portion. The nipple portion can comprise an outer annular wall extending axially; an inner annular wall extending axially, the inner annular wall concentrically located within the outer annular wall; an outer radial seal supported by the outer annular wall; and an inner radial seal supported by the inner annular wall.

In one alternative, the differentiating means comprises an axial height difference on one of the inner or outer annular walls as between the first and second filters.

In another alternative, the differentiating means comprises a radial width difference on one of the inner or outer annular walls as between the first and second filters.

In yet another alternative, the differentiating means comprises different sealing directions between the inner and outer radial seals as between the first and second filters, the sealing directions consisting of a radially inward directed seal surface for external sealing and a radially outward directed seal surface for external sealing.

In yet another alternative, the differentiating means comprises different axial locations of the inner and outer radial seals as between the first and second filters.

In yet another alternative, the differentiating means comprises a configuration difference between the torsion lock detent member as between the first and second filters.

According to another embodiment of the present invention, a filter cartridge is provided with a thread formed integrally into a canister of a filter housing and projecting radially outward and along a spiral path along an outer surface thereof, with the thread defining a spiral channel along an inner surface of the canister. The cartridge comprises the filter housing including a top end, a bottom end, and an annular sidewall extending therebetween. The top end includes a top annular end wall. A fluid flow interface is at the top end, with the fluid flow interface including an inlet port for receiving unfiltered fluid and an outlet port for returning filtered fluid. A filter media is arranged in the filter housing and along a fluid flow path through the filter housing from the inlet port to the outlet port with the filter media being arranged in fluid series between the inlet port and the outlet port.

According to a more particular embodiment with a thread channel feature, the filter cartridge comprises a top end member assembly capping an open end of the canister. The filter media can be formed into a pleated ring and sealingly connected to the top end member assembly. Further the spiral channel can define a fluid flow path around at least part of the top end member assembly.

According to a more particular embodiment with a thread channel feature, the filter cartridge comprises radial flow paths through the top end member assembly radially connecting the inlet port with the spiral channel.

According to a more particular embodiment, the canister is a formed metal can.

According to a more particular embodiment, wherein a terminating free end of the formed metal can is wrapped around and jointed to the top end member assembly.

According to a more particular embodiment, the top end member assembly comprises a nipple portion at the top end. The top annular end wall extends radially outwardly from the nipple portion and connecting with the annular sidewall at a shoulder region. The nipple portion projects away from the bottom end and above the top annular end wall, with at least one of the inlet and outlet ports being through the nipple portion.

According to a more particular embodiment, the top end member assembly comprises a torsion lock detent member arranged at the top end, with the torsion lock detent member being elevated above the top annular end wall.

Another embodiment of the present invention is directed toward port pressurization aspects. Such embodiment includes a filter cartridge and a mounting head. The filter cartridge comprising: (a) a filter housing including a top end and a bottom end and an annular sidewall extending therebetween; (b) a nipple portion at the top end, wherein the nipple portion includes a snout portion and an outer rim projection, the snout portion surrounding a central opening in the top end member assembly, the outer rim projection being at a shoulder region of the housing, the shoulder region being at an intersection between the top end and the annular sidewall, the snout portion having a first seal member and the outer rim projection having a second seal member; (c) a fluid flow interface at the top end, the fluid flow interface including an inlet port for receiving unfiltered fluid and an outlet port for returning filtered fluid; (d) a thread provided by the filter housing, the thread being below the outer rim projection along the annular sidewall; and (e) a filter media arranged in the filter housing and along a fluid flow path through the filter housing from the inlet port to the outlet port with the filter media being arranged in fluid series between the inlet port and the outlet port. The mounting head comprises: (a) a mating fluid flow interface having a discharge port for unfiltered fluid and return port for filtered fluid, (b) an outer cylindrical wall defining a thread ramp, an outer port wall, and an inner port wall concentric with the outer port wall, the thread being engaged with the thread ramp to retain the filter cartridge to the mounting head, the nipple portion sealing against the outer port wall with the second seal member and sealing against the inner port wall with the first seal member so that the inlet port is connected to the discharge port for unfiltered fluid flow and the outlet port is connected to the return port for filter fluid flow; and wherein the outer port wall comprises a region above the outer cylindrical wall and above the thread ramp with the second seal member in sealing relation with the outer port wall.

In a more particular embodiment relating to port pressurization aspects, an enlarged pressure region is formed between the inner port wall and the outer port wall that achieves a natural frequency of 200 Hz or higher when subjected to a pressurization to a point between 2 Bar and 6 Bar.

In a more particular embodiment relating to port pressurization aspects, an enlarged pressure region is formed between the inner port wall and the outer port wall that creates an axial force of at least 200 pounds upon the thread when subjected to a pressurization of 2 Bar.

In a more particular embodiment relating to port pressurization aspects, the filter cartridge comprises a torsion lock detent member comprising a radially acting detent arranged radially outboard of the nipple portion. The mounting head comprises a lock assembly including a spring loaded detent biased radially inward toward a central axis. The spring loaded detent engages the radially acting detent to torsionally lock the filter cartridge to the mounting head.

In a more particular embodiment relating to port pressurization aspects, the torsion lock detent member is formed into the thread and the spring loaded detent extends into a thread groove forming the thread ramp.

In a more particular embodiment relating to port pressurization aspects, the filter housing comprises a top member assembly and a bottom member that are formed separate and joined together. The top member assembly provides the top end and a top annular end wall, and the bottom member provides the bottom end. The top member assembly unitarily providing both of the thread and the torsion lock detent member in fixed non-movable predetermined angular relative angular orientation.

In a more particular embodiment relating to port pressurization aspects, the top member assembly forms the nipple portion and further comprises a top end cap portion for a filter element. The filter element comprises a tubular ring of the filter media sealingly bonded to the top end cap portion.

In a more particular embodiment relating to port pressurization aspects, the top member assembly is a single component unitary part, and the bottom member comprises a can joined to the top member assembly.

In a more particular embodiment relating to port pressurization aspects, ribs connect the rim portion and the snout portion. Inlet flow openings outboard of the top end cap portion are formed between adjacent ribs to provide the inlet port, with the outlet port being provided by the snout portion.

In a more particular embodiment relating to port pressurization aspects, a torsion lock comprising corresponding torsion lock detents between the filter cartridge and the mounting head prevent the filter cartridge from being unthreaded from the mounting head, and with the torsion lock located below the shoulder region.

For example, the torsion lock can be located along the annular sidewall.

As a further example, corresponding torsion lock detents between the filter cartridge and the mounting head can be provided along the thread and the thread ramp, respectively.

Another embodiment that may be combined with any of the torsion locking embodiments is that a keying feature that works by means of interrupting the thread on the element with various length gaps and shapes in axially extending channels. The header (i.e. filter head) uses (male) keys at a plane perpendicular to the element axis. The keys can be incorporated into a secondary ring which can be mounted to the header. The keys can also be molded into the header.

In that regard, an embodiment of the present invention is directed toward a filter element assembly including an axially extending channel defined along the length of the thread. Such an embodiment includes a ring of filter media circumscribing a central axis and defining a central cavity, and an end cap assembly at an end of the media ring. The end cap assembly includes i) a an annular sidewall portion; and ii) an annular end wall connected to the annular sidewall portion at a shoulder; iii) a central opening into the central cavity through the annular end wall, and b) a helical thread on an exterior surface of the sidewall portion. The sidewall portion defining an annular clearance area adjacent the helical thread on a side opposite of the shoulder to provide for key clearance.

According to a more particular embodiment, the filter element assembly is for use with a radial key with such axially extending channel. The axially extending channel enables the radial key to be axially inserted through the axially extending channel and received within the annular gap.

According to a more particular embodiment, the axially extending channel comprises at least two axially extending channels that are defined along the helical thread in angular space locations about the central axis to provide a multi-faceted keyway along the helical thread.

According to a more particular embodiment, a canister surrounds the ring of filter media. The canister has a distal end fixed to the sidewall portion at a flange portion the clearance area being provided by an annular gap defined between the flange portion and the helical thread.

According to a more particular embodiment, the end cap assembly includes an axially-projecting attachment outer nipple wall surrounding the central opening, and having a peripheral annular seal. The assembly further comprises a torsion lock detent member provided along the annular end wall.

According to a more particular embodiment, such an axially extending channel may be used for torsion locking. The axially extending channel is adapted for use with a filter header having a radially movable lock element, wherein the axially extending channel is a torsion locking detent arranged and configured to be releasably engaged with the radially movable lock element.

Such a filter element assembly may be in combination with a header to form a filter head and element assembly. The header includes an interior chamber circumscribing the central axis. The header has a helical flight and a radially-inward projecting key along an inside surface of the chamber, with the radial key spaced axially-outward from the flight. The key has a configuration that is received through the axially extending channel in the thread of the body on the end cap assembly and into the annular clearance area to enable the helical thread on the end cap assembly to cooperate with the helical thread on the header to enable the filter element assembly to be threaded onto and off of the header.

According to a more particular embodiment, engagement between the key and the axially aligns the thread with the radial flight at a start location of threaded engagement between the helical flight and the helical thread.

In any of the embodiments and aspects herein, most preferably, the filter media is arranged in the filter housing providing an engine filter for fuel or oil filtration, such that the filter is in the form an engine fluid filter.

For example, the filter media for such an engine filter comprises a barrier filter media sheet comprising a fuel filter media or an oil filter media (e.g. transmission fluid, hydraulic oil or lube oil). It is also contemplated for use in other engine filters in addition to fuel and oil filters, such as an antifreeze coolant filter media, or urea filter media.

Preferably, the barrier filter media sheet comprises one or more layers of cellulose, glass or polymeric fibers that is one or several layers for filtering out particulates.

Preferably such a filter media sheet is gathered such as by pleating or otherwise to provide a surface area many times larger (e.g. at least 5 times more) than a surface area of a ring (e.g. cylinder) of such media. For example, a pleated cylindrical ring of such filter media sheet has many times the filter media surface area than the circumference (π×Diameter) multiplied by the axial length of such pleated cylindrical ring.

When a fuel filter is provided for any of the above embodiment or aspects, often a water stripper is provided either as part of the filter media or as a separate coalescer to filter out water and prevent water from flowing from the inlet to the outlet.

For such a fuel filter, typically a sump for water collection with a drainage aperture that is provided at an end opposite the nipple portion and/or fluid flow interface. The drainage aperture may be closed and opened with a valve to facilitate water drainage from the fuel filter.

It is understood that the various features of any particular embodiment as summarized above and/or in any independent or dependent claim appended hereto may be combined with each other such as shown and realized in the specific various illustrated different embodiments in the Figures and discussed in the detailed description below, unless otherwise indicated or evident from such illustrated embodiments.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 60 is an isometric view of the top end cap employed in the filter cartridge shown in FIG. 53, but also is the same top end cap that can be employed in the first embodiment of FIGS. 1-5;

FIG. 61 are directed toward a twenty-third embodiment of the present invention which is similar and can encompass the embodiment shown in FIG. 27 and illustrate an isometric view of a top portion of a filter cartridge employing a thread formed into the can of the filter housing;

Figure 1:
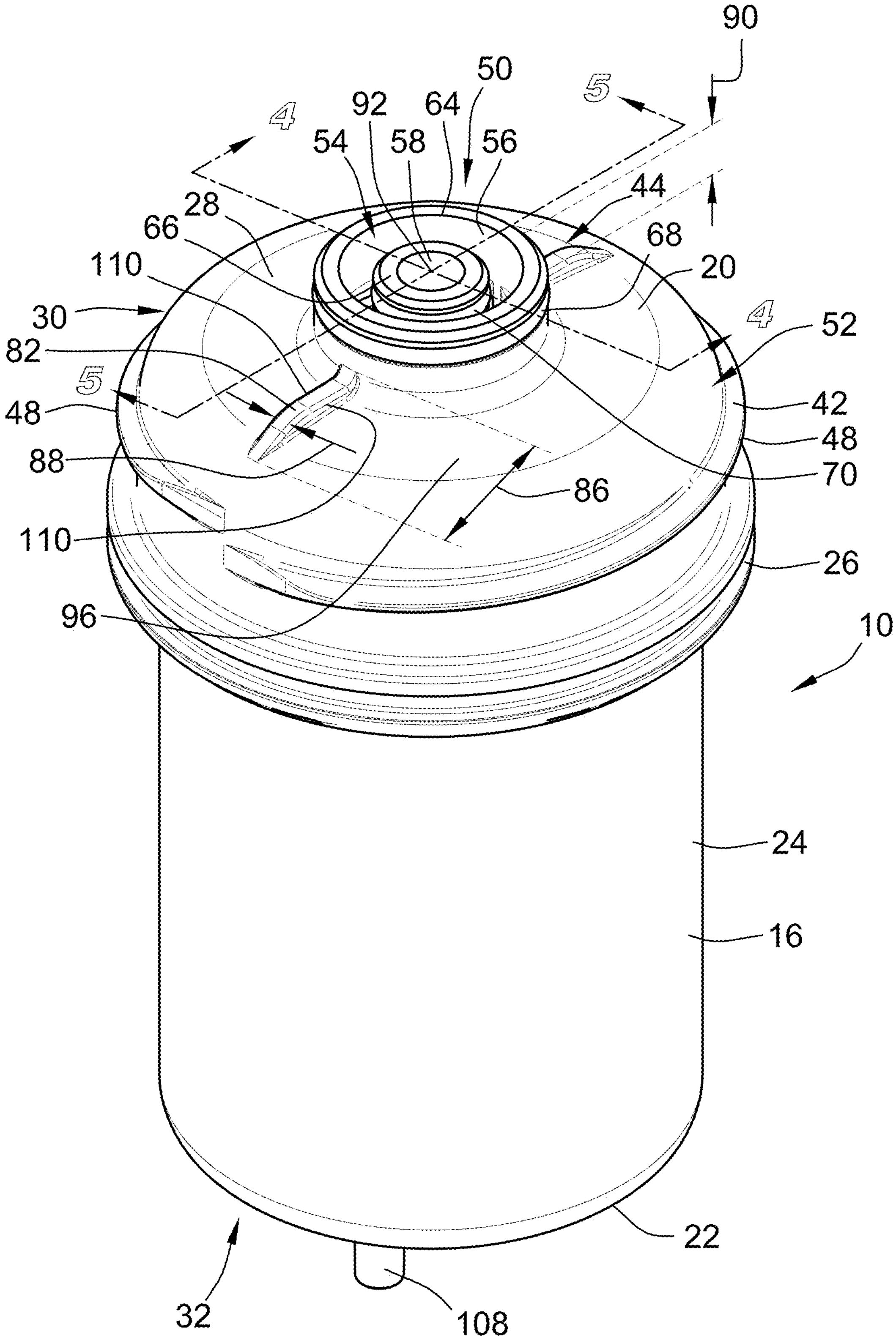
FIG. 1 is an isometric view of a filter cartridge in accordance with a first embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

First to provide some orientation and understanding to the present patent application, some meanings will be afforded.

"Radially extending" and similar variants mean primarily in the radial direction (more radial than axial) relative to a central axis of the filter. In a similar vein, "axially extending" and similar variants means primarily in the axial direction (more axial than radial).

While the patent illustrations show the filters in a typical orientation during use, the filter may be used in different orientations in practice, but the filter itself is understood not to be limited to actual use in that orientation (unless otherwise clearly indicated such as when "gravitational bottom" or "sump" are used and discussed below). Therefore, "top end" is understood to be a relative term that is considered when the filter is situated in an upright position (e.g. such as typically shown in the Figures) with either of the fluid flow interface (e.g. for use with the filter head) or nipple located at the top such that the bottom end is below the top end in this position. The nipple or filter head fluid interface of such filter is therefore at the "top end" regardless of the orientation, even if the filter is upside down or used in an upside down orientation. Likewise, "bottom end" is also relative term when the filter is situated in an upright position with either of the fluid flow interface or the nipple portion located at the top.

Based upon these understandings that the filter can be installed or used in different orientations with the top end horizontal relative to the bottom end or with the top end positioned below the bottom end, for example, but the terms top and bottom (and other similar variants as upper or lower) are defined by an orientation when the filter is positioned or situated in an upright position with the fluid flow interface or nipple portion located at the top, even though the filter may be situated or positioned in various positions when used on a vehicle, engine or other filtration application. Accordingly, such broad interpretations relative to the claims is intended.

In contrast to "top" and "bottom," the more specific phrases "gravitational bottom" or "sump" do impart specific vertical orientation of the filter as the location of the "gravitational bottom" or "sump" is at, or sufficiently near, the vertical bottommost location to facilitate water collection or gravitational drainage, for example. When used in claims, "gravitational bottom" or "sump" impart a narrower specific definition with a specific vertical arranged orientation.

Finally, it is noted herein that "filter housing" generally refers to the casing that at least partially encloses or protects filter media or affords fluid flow paths, may include a bowl, an adaptor, outer shell, and/or part of the filter element such as upper end cap for example if the end cap provides the external annular top end wall, depending upon the embodiment.

With the above understanding, attention will now be directed toward a filter in the form of a filter cartridge 10 in accordance with a first embodiment of the present invention as shown in FIG. 1. The filter cartridge 10 is shown in conjunction with a filter head 12 to provide a filter cartridge and filter head assembly 14 in FIGS. 4 and 5. The filter head 12 is generally the component that may be permanently mounted to an engine or other fluid system; whereas, the filter cartridge 10 can be mounted or detached from the filter head 12; and, if desired, replaced at periodic maintenance intervals.

Turning to the filter cartridge 10, filter cartridge 10 includes a filter housing generally indicated at 16 that at least partially or fully encloses or protects filter media 18 contained within. The filter housing 16 includes a top end 20, a bottom end 22, and an annular sidewall 24 extending therebetween, which may be cylindrical in shape (e.g. a cylinder other than interruptions such as an outward flange abutment 26, or a cylinder may have wall taper due to mold-ability when manufacturing and/or other inconsequential taper that is less than 10 degrees for example). The filter housing also includes a top annular end wall 28 that when in use faces a corresponding surface of the filter head 12.

To provide for the filter housing 16, and although a 1-piece construction is possible, preferably an assembly of different component parts may be used. For example, the filter housing 16 may comprise a top member such as cap 30, and a bottom member such as can 32 that are joined together. Cap 30 may be plastic and can 32 is steel sheet metal in an embodiment, although all plastic housing or all metal housing may be done in other embodiments. For example, an end portion 34 of the metal can 32 can be wrapped around a radial flange projection 36 of the plastic cap 30.

An internal seal such as provided by O-ring gasket 38 can be provided at the juncture of top and bottom housing members and internal to the filter housing 16 at the interface between the metal can 32 and the plastic cap 30 to seal therebetween and prevent fluid leakage to the outside of the housing at this location. It is also seen that the wrap-around metal edge portion of the can 32 at the juncture provides for the outward flange abutment 26 which has a radially extending abutment surface that faces the terminating end of the filter head and when in use may be positioned to prevent too much overtightening even though a slight annular clearance gap between the radial extending abutment surface 40 and the filter head 12 are typically provided.

As can be seen in this embodiment, the top member and the bottom member, such as metal can 32 and plastic cap 30 of the housing can be joined at a key-free interface. It is therefore an advantage in some embodiments discussed herein that a key free configuration can be obtained between top and bottom housing members in that no keying may be necessitated because a thread 42 can be provided by the top member which also supports a torsion lock detent member 44 that is arranged at the top end 20.

However, if desired, keying could be used to prevent rotation of the internal filter element relative to the filter housing.

A thread 42 is configured as a projection that is adapted and configured to ride along a thread ramp 46 such as defined by helical channel formed in the filter head 12. For example, the thread 42 can include first and second helical thread ribs 48 in a preferred embodiment. Alternatively, the thread 42 can be other such similar spiral ramp structure or can be another projection that is structured and configured to engage and ride along the thread ramp 46 of the filter head 12.

In this embodiment, two helical thread ribs 48 are provided on opposite sides and arranged over about a 180° span with each helical thread rib 48 extending only partially around the filter housing such that the thread 42 is configured to provide between a quarter rotation turn and a half rotation turn between the filter cartridge and the filter head when engaged.

In this embodiment and in many of the embodiments herein, the thread is configured to provide for a half rotation turn (therefore between ½ and ¼ rotation), but it is also possible that to provide for a quarter rotation turn or even, if desired, something intermediate such as a third rotation turn for filter cartridge attachment to the head. At least two thread ribs 48 at different angular locations on the filter housing are preferred to provide such a partial rotation turn type filter. However, alternative embodiments such as for higher pressure applications may employ at least a full rotation/turn (360 degrees or more of rotation) type cartridge and corresponding thread that may be a single thread rib extending 360 degrees or more.

The filter cartridge also includes a nipple portion 50 at the top end 20 which may be provided by the filter housing and/or the filter element.

In the case of the present embodiment, the nipple portion 50 is a combination of the two components (i.e. part of the filter element top end cap and part of the housing top member).

The top annular end wall 28 extends radially outward from the nipple portion 50 and connects with the annular side wall 24 at a shoulder region 52. Shoulder region 52 is generally located at the corner between the annular side wall and the top annular end wall 28 and forms the transition from the radially extending top annular end wall 28 into the side wall 24. The nipple portion 50 therefore extends axially away from the bottom end 22 and above the top annular end wall 28.

The filter cartridge 10 includes a fluid flow interface 54 at the top end 20. The fluid flow interface 54 generally includes an inlet port 56 for receiving unfiltered fluid and an outlet port 58 for returning filtered fluid. Each of the inlet port and outlet port may be in the form of a single annular opening (e.g. concentric annular openings in the present embodiment), although as will be seen in other embodiments, each port may include multiple openings to provide for the port. At least one of the inlet and outlet ports 56, 58 is through the nipple portion 50 and, in this embodiment, both such ports 56, 58 are through the nipple portion 50. However, as discussed later on, some embodiments only have one of the ports through the nipple portion.

It should be realized that the nipple portion 50 can be provided entirely by the filter housing 16, or, if desired, by the internal filter element to be described, or by a combination of the internal filter element and the filter housing. In the various embodiments, variations are shown with the nipple portion at the top end.

Figure 4:
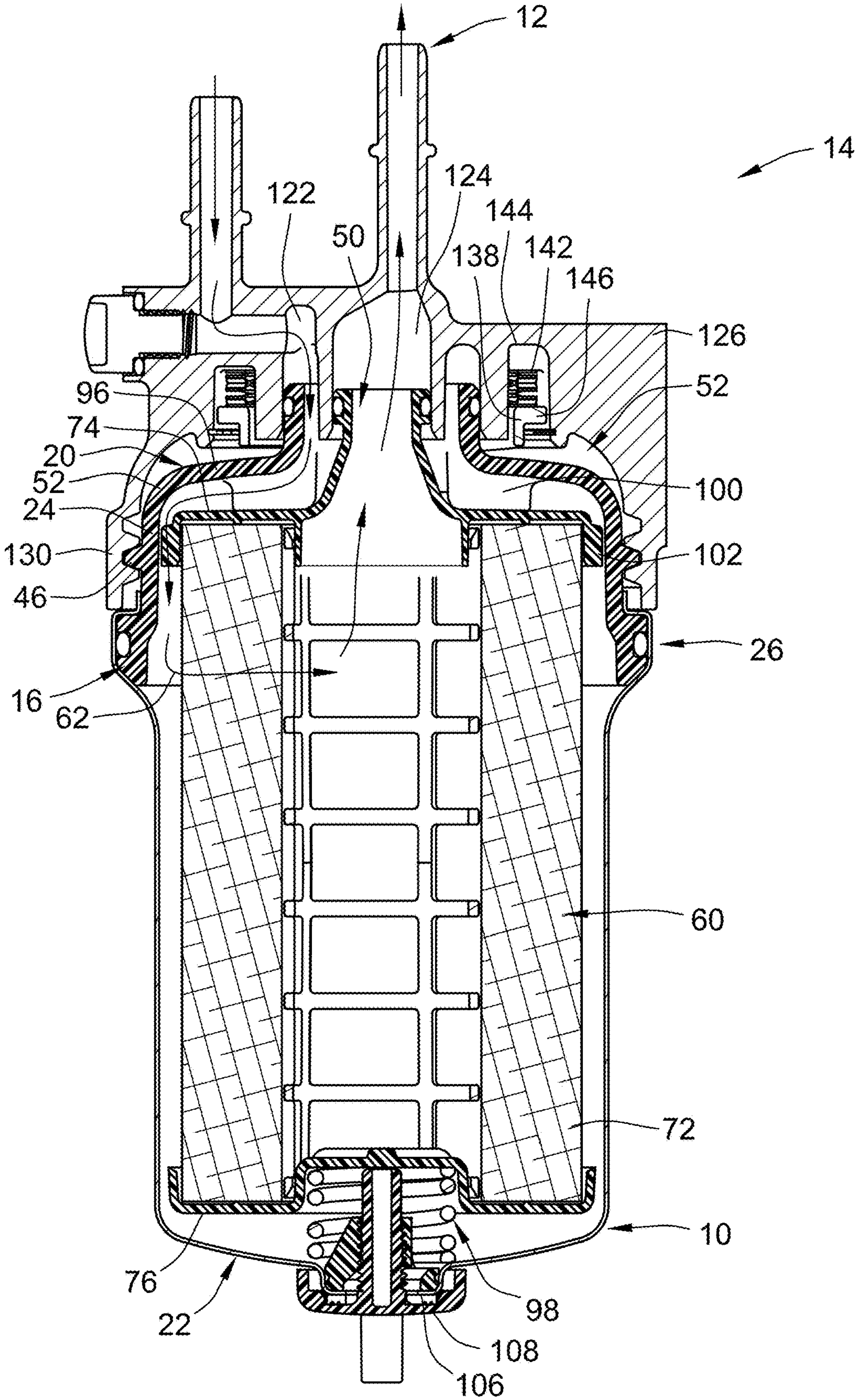
FIG. 4 is a cross section view of the filter head and filter cartridge assembly shown in the previous figures but in a secured state with the filter cartridge threaded and locked to the filter head, taken about line 4-4 through FIG. 1.
Figures 5, 5A:
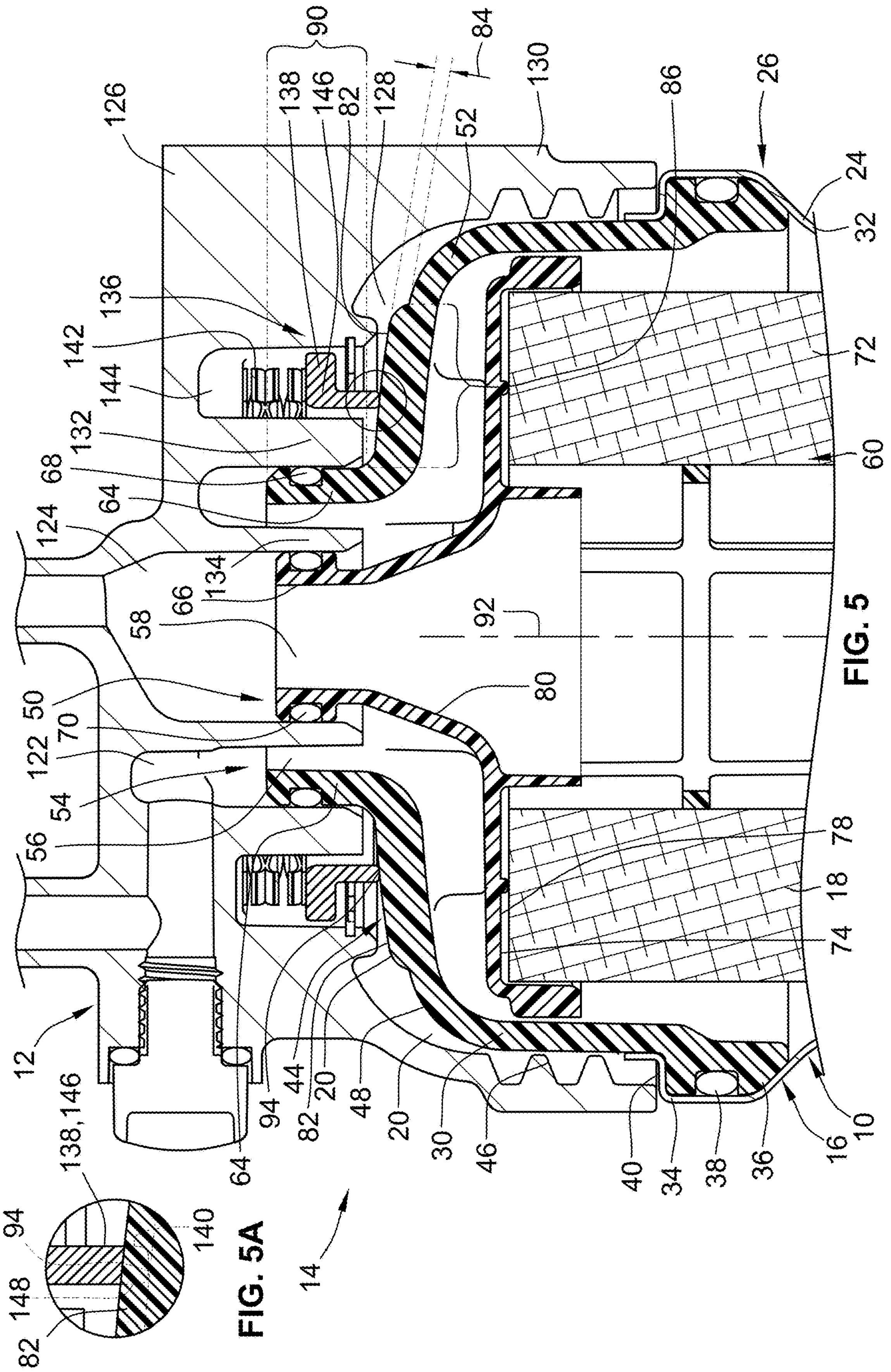
FIG. 5 is an enlarged view of an upper portion of a cross section similar to that of FIG. 4 to better illustrate features at the upper portion thereof, but taken about a perpendicular cross-section (e.g. line 5-5 through FIG. 1 to show the torsion lock detents)
FIG. 5A is an enlarged view of a portion of FIG. 5, to better show the torsion locking.

The filter media 18 may be part of an internal filter element 60 that is contained inside the filter housing 16. As can be seen in FIGS. 4 and 5, the filter media 18 is arranged along a fluid flow path running through the filter housing 16 from the inlet port 56 to the outlet port 58 with the flow path 62 being schematically indicated in FIG. 5. Thus, the filter media is arranged in fluid series between the inlet and outlet ports 56, 58 to provide for filtration of contaminants such as particulates or undesirable materials from a fluid strain as the fluid flows through the filter cartridge in use. Preferably, outside to inside flow is provided whereby the outlet port is the innermost port on central axis 92, but inside to outside flow may be done is some embodiments, in which the inlet port would be the innermost port on central axis.

In an embodiment, the nipple portion 50 can comprise various structural configurations. In this embodiment, nipple portion 50 includes an outer annular wall 64 extending axially, an inner annular wall 66 extending axially and concentrically located within the outer annular wall 64. Further, the nipple portion 50 can include seals such as an outer radial seal 68 supported by the outer annular wall 64 that has a radially outwardly directed sealing surface, and likewise an inner radial seal 70 supported by the inner annular wall and having a second radially outward sealing surface. The seals 68, 70 may be integrated into the walls for support (e.g. formed as a thin resilient wiper flange unitary with the wall), but preferably are separate resilient gaskets, such as O-rings that can be arranged in outwardly facing grooves formed in the respective walls 64, 66. Gaskets which provide seals 68, 70 therefore advantageously can be of a different material that can be more resilient and with better sealing properties as compared with the walls that may be less resilient plastic.

In this embodiment, the outer annular wall and the outer radial seal are provided by the filter housing 16, whereas, the inner annular wall 66 and the inner radial seal 70 are provided by the internal filter element 60.

Referring to the filter element 60 in greater detail, the filter element 60 includes a pleated ring 72 of the filter media 18, which ring is shown as circular, but such ring can be oval, rectangular or other shape. The filter media 18 is preferably a planar sheet of filter media that is then pleated to form a plurality of pleats and then is wrapped around to form the pleated ring 72 (typically a hollow cylindrical ring) of the filter media 18. In this manner, the filter element 60 provides an internal chamber for clean or filtered fluid and an outer chamber between the filter element 60 and the filter housing 16 for dirty or unfiltered fluid in an outside to inside flow arrangement.

The filter element 60 includes a top end cap 74 sealingly bonded to an upper end of the pleated filter media ring 72. While the top end cap 74 in some embodiments can provide for the top end 20 of the filter housing 16 and/or provide for the top annular end wall 28, in this embodiment, the top end cap 74 is separate from the filter housing 16 and positioned below the top annular end wall 28 to provide a radially extending flow path therebetween to allow incoming unfiltered fluid through the inlet port 56 to surround the pleated ring 72 of filter media 18.

Further, the filter element 60 also includes a bottom end cap 76 sealingly bonded to a lower end of the pleated ring 72 of filter media 18.

The end caps 74, 76 can be sealingly bonded in a variety of manners. For example, as shown in the cross sections, there are annular potting wells to which plastisol or other sealing adhesive is used to bond and attach the end caps to the respective top and bottom ends of the pleated ring 72. Alternatively, the pleated ring 72 may be integrally attached or directly imbedded into the end cap to provide a sealing bonded connection as is alternatively known in the art.

As shown, the top end cap 74 is an open end cap and comprises a ring portion that provides for the sealing bonding and a snout 80 extending axially from the ring portion 78 that provides for the outlet port 58 as well as the inner annular wall 66 thereby provides a first part of the nipple portion. As mentioned above, the other part of the nipple portion in this embodiment is provided by the filter housing 16 in which the outer annular wall 64 is an integral part of the top end member of the housing separate and apart from the filter element.

Further, the filter cartridge 10 includes the torsion lock detent member 44 arranged at the top end 20. In this, and many of the embodiments, the torsion lock detent member 44 is elevated above the top annular end wall 28 and extends axially higher than the shoulder region 52.

In this embodiment, the torsion lock detent member 44 comprises at least two torsion lock tabs 82 that are arranged at a regular spacing around the nipple portion 50, and elevated below a free end of the nipple portion 50 in this embodiment.

Where two torsion lock tabs 82 are provided for detents, the lock tabs 82 may be arranged 180 degrees apart or at equal angular intervals about central axis 92.

Preferably, each torsion lock tab 82 may be integrally formed as a unitary part of the filter housing 16. For example, torsion lock tabs 82 can be formed as part of the plastic cap 30 or other top end members.

The filters of the various embodiments of all of the Figures are particularly advantageous for fuel and/or oil filtration applications that often have a cartridge outer diameter of between 5 and 15 centimeters (more often between 8 and 12 centimeters). As such, various dimensional ranges are presented below with those types of cartridge sizes in mind, but that could be applied in other embodiments to larger or smaller filter cartridges outside of 5 and 15 cm. For example, locomotive filters and other applications may be at least few times larger in diameter size while diesel-exhaust fluid filters (e.g. urea filters) or other applications could be smaller. Thus, embodiments of the invention may fall out of ranges and be larger or smaller, and have dimensions that fall outside of the ranges discussed below. Thus, unless specifically claimed in the appended claims, the dimensional ranges provided are provided as examples and contemplated typical ranges for certain preferred embodiments.

Each torsion lock tab may comprise certain dimensions to allow it to interact and function for detent torsion locking with an appropriate filter head such as an axial height 84 of between 0.25 and 10 millimeters above the top annular end wall 28 (preferably between 1 and 5 millimeter, and more preferably not greater than 3 mm); a radial length 86 (extending radially outward relative to central axis 92) of between 1 and 40 millimeters (preferably between 5 and 30 mm); a thickness 88 of between 1 and 10 millimeters (it is noted that the thickness is measured generally perpendicular to the height and the radial length as shown) (the thickness being preferably between 2 and 5 mm). Preferably, the radial length 86 is at least double (more typically 3-5 times) the thickness 88 as illustrated to thereby provide an elongated torsion lock tab that can engage over substantial length for retaining force needed in engine applications.

Further, the nipple portion 50 can extend the height span 90 of between 1 and 30 millimeters (preferably between 10 and 20 mm) above each torsion lock tab 82.

In these various embodiments to facilitate torsion locking in many sizes of filter cartridges, it is advantageous to have an engagement region 94 of the torsion lock tabs 82 located between 5 and 45 millimeters (preferably between 10 and 30 mm) radially outward from the central axis 92 so as to be able to interact and co-act with a corresponding lock member detent of the filter head herein described. The relative diameter and radius location of the lock member detent and the torsion lock tabs 82 are matched so that they catch and engage with each other during use.

In the present embodiment and other embodiments herein, no portion of the filter housing 16 may be elevated above the torsion lock detent member 44 radially outside of the torsion lock detent member 44.

Further, the thread 42 can be located along the annular side wall 24 of the housing.

More preferably, the thread 42 is inwardly provided and by the cap member 30 of the housing that provides for the torsion lock detent member 44, so that the thread 42 and the torsion lock detent member 44 are always arranged at a predetermined angular orientation without the need for keying between upper and lower housing members.

Preferably, this can be accomplished through a single piece unitary component part such as the plastic end cap 30 as shown or other top housing member.

With this arrangement, the filter cartridge 10 can therefore be free of keying, if desired, between the filter element 60 and the filter housing 16 as no clocking to set the predetermined angular orientation is necessitated. The angular orientation of the filter element 60 within the filter housing 16 does not impact a predetermined angular orientation between the torsion lock detent member 44 and the thread 42 (such as the spiral thread ribs 48). In this, and many of the embodiments herein, the shoulder region 52 defines an external dome surface as shown in FIGS. 1-5. The external dome surface can provide a curved surface tapering continuously downwardly as the external dome surface extends from the top annular end wall 28 toward the thread 42. This can be seen with reference to the shoulder region 52 in the FIGS. 1-5.

While in some embodiments the top annular end wall 28 can be flat, in the present embodiment, and certain embodiments herein, the top annular end wall 28 defines an external upper surface 96 that is non-flat and tapers continuously downwardly as the top annular end wall extends from the nipple portion through the shoulder region with the shoulder region continuing to taper continuously downward to transition into the annular side wall 24. Top annular end wall 28 for example may be conical or another tapering configuration.

A further advantage that may be realized with the present arrangement, and as shown, is that while the nipple portion 50 can include external seals such as seals 68, 70, the filter cartridge otherwise can be free of any external seals (e.g. seals that would seal against or be engaged against the filter head 12) radially outward of the nipple portion 50. As can be seen, shoulder region 52, for example, can be free of external seals entirely.

To position the filter element 60 within the filter housing 16, the filter cartridge may also include a spring 98 that, for example, can be supported by the bottom end of the filter housing and acts upon the bottom end cap 76 to urge the filter element axially toward the top end 20. Further, positioning means may be provided such as axial spacer member 100 interposed between top end cap 74 and filter housing 16 at the top end 20 and that accommodates and allows for fluid flow radially outward as shown. The axial spacer member 100 may be integrated and formed as tabs along the underside of the plastic cap 30 as a one-piece unitary component.

Radial spacers such as integral spacer tabs 102 can be formed at the periphery of the top end cap 74 that allow for fluid flow between integral spacer tabs 102. The integral spacer tabs 102 can co-act with the inner surface of the filter housing 16 to better concentrically locate the filter element about the central axis 92 with gaps between integral spacer tabs 102 providing for flow around the periphery of the top end cap 74.

Additionally, in a preferred embodiment, the bottom end 22 of the filter housing 16 is preferably a gravitational bottom and provides for a sump 104. This, for example, can be advantageous in certain liquid filter applications such as fuel filtration where heavier water can migrate to the sump 104 where it can be collected, become trapped in the filter and not returned to an engine. For example, the filter media 18 may be a combination of particulate media as well as coalescing/stripper media to filter both particulates and separate water droplets. Water droplets can aggregate and collect in sump 104 over time. To allow for drainage of such water collected therein or other heavier liquid, the filter housing 16 may include a drain opening 106 that is formed through an otherwise closed end wall of the housing.

Further, a drain cock (i.e. valve) can be connected to the bottom end and has opened and closed positions to allow for drainage through the drain opening 106 and a closed position closing the bottom end preventing drainage through drain opening 106. Such drain cocks are known in the art, for example, as shown and described in U.S. Pat. Pub. No. 2007/0114170, entitled Fuel Filter Cartridge Apparatus, which is incorporated by reference to illustrate such a drain cock in operation thereof which may be employed and used in embodiments disclosed herein. Alternatively, a water collection bowl may be connected at drain opening 106.

Now that description and understanding of the filter cartridge 10 has been developed, further attention will now be directed toward the filter head 12 and its interaction and use with filter cartridge 10 and which together form assembly 14, which are shown in FIGS. 2-5.

The filter cartridge 10 is configured for use with the filter head 12 which includes a corresponding fluid flow interface 120 that sealingly connects with cartridge fluid flow interface 54. Mating flow interface 120 includes discharge and return ports 122, 124 for receiving unfiltered fluid from a circuit and return filtered fluid. For example, filter head 12 can be mounted on an engine (such as a vehicle engine) to filter fuel in which discharge port 122 receives unfiltered fuel from a fuel tank or a intervening inline prefilter assembly, and return port 124 returns fuel to the engine for combustion.

The discharge and return ports 122, 124 can be defined by mounting base member 126 and generally in the area of a filter cartridge receptacle 128 defined by the mounting base member 126. The base portion of mounting base member 126 also may include connector port fittings (not numbered) but shown external and opposite the discharge and return ports 122, 124 and which are fluidly connected separately thereto respectively to facilitate the fluid connection with an engine to receive unfiltered fluid from the engine and return filtered fluid to an engine. For example, in a fuel flow arrangement, the discharge port which receives unfiltered fuel would be connected to a fuel tank (perhaps with intervening pumps and/or prefilters therebetween); while the return port would return filter fuel toward an engine for combustion.

The mounting base member 126 further includes outer cylindrical wall that includes the thread ramp 46 to allow for threaded attachment of the filter cartridge 10 to the filter head 12 by means of the filter cartridge thread 42 which is configured to ride along thread ramp 46. It is noted that the thread ramp 46 of the filter head 12 faces radially inwardly; while the thread 42 of the filter cartridge faces radially outwardly relative to the central axis 92.

Thread ramp 46 may include two spiral and helical thread channels spaced 180 degrees apart relative to central axis 92 to correspond with thread ribs 48 in a ½ turn element mounting attachment.

To provide for the mounting fluid flow interface 120, the filter head mounting base member 126 further includes an outer port wall 132 and an inner port wall 134 that is arranged concentric with the outer port wall. These can be cylindrical. These walls 132, 134 define the discharge port 122 and return port 124, respectively. The filter cartridge is sized to interact and connect with these mounting base walls. For example, the filter cartridge has the inner annular wall 66 that is sized to be received into the inner port wall 134 with the inner radial seal 70 sized and located to form a radial seal with the inner port wall 134. Likewise, the outer annular wall 64 of the filter cartridge is sized to be received into the outer port wall 132 of the filter head with the outer radial seal 68 sized and located to form a radial seal with this outer port wall 132. When connected, radial seals are formed to provide a sealing connection between the respective fluid flow interfaces 120 and 54. Accordingly, the filter cartridge 10 is adapted to be connected to the filter head 12 with the inlet port sealingly connected to the discharge port for unfiltered fluid and with the outlet port sealingly connected to the return port for filtered fluid. In a secured mounted position of the filter cartridge, this fluid connection and sealing occurs.

Further, the filter head 12 additionally includes a lock assembly 136 comprising a lock member 138 having a lock member detent 140 that is configured to interact with the torsion lock detent member 44 of the filter cartridge 10. Lock member 138 is axially movable and located within annular chamber 144. Annular chamber also houses a spring 142 that urges the lock member 138 axially toward the filter cartridge 10.

To ensure that the lock member 138 is arranged at a predetermined and constant angular orientation, lock member 138 may include a keyway such as spline slot 238 which mates with a corresponding key projection 166 from the mounting base member 126Q.

Torsion lock member 138 can comprise, for example, an L-shaped annular ring 146; and lock member detent 140 may be configured in this embodiment as lock slots 148 formed in the terminating free end of the L-shaped annular ring 146 that faces filter cartridge 10. Accordingly, the torsion lock detent member 140 is arranged to align and configure to lock with the lock member detent 140.

For example, in the present embodiment, the torsion lock tabs 82 are arranged and spaced to snap into and engage with the corresponding lock slots 148. Each of the lock slots 148 have a corresponding sidewall that catches and engages with corresponding sidewall of each of the tabs 82. To facilitate movement and actuation of the lock member 138 as the filter cartridge 10 is threaded onto the filter head 12, the end of lock member 138 may include ramp surfaces 150 upstream of the corresponding lock member detent 140 (e.g. lock slots 148).

In the filter cartridge 10, the torsion lock detent member 44 (such as torsion lock tabs 82) are spaced axially above a predetermined distance above the thread 42, such that as the thread 42 is engaged with the thread ramp 46, the torsion lock detent member 44 will act upon the lock member 138 to start to move the lock member axially during the twisting movement of the filter cartridge to the filter head. This loads the spring 142. When the movement is complete (for example, a one-quarter turn or a one-half turn as in the present embodiment), the torsion lock detent member (such as torsion lock tabs 82) reaches the corresponding lock member detent 140 (such as lock slots 148) and pops into and catches to provide positive locking. This prevents the filter cartridge from inadvertently being detached from the filter head due to the torsion locking between the torsion lock detent member 44 and lock member detent 140. In order to remove the filter cartridge 10 from the filter head 12, additional rotational force is required to twist the filter cartridge 10 to unsecure the filter cartridge from the filter head.

This is done by resilient action and typically includes a cam interface between torsion lock members. For example, the sidewalls of lock slots 148 may be curved and slanted to provide for cam surfaces 111. Additionally or alternatively, rounded cam surfaces 110 are provided at the corners of lock tabs 82. As a result, during rotational movement of the filter cartridge, and while more force is required while the corresponding detent members are engaged, the slanted sidewalls will engage to impart axial motion and start to drive the lock member 138 against the action of the spring 142 to allow the lock member detent 140 to disengage from the torsion lock detent member 140, and thereby release the filter cartridge from the locking engagement and allow an operator to remove the filter cartridge 10 from the filter head with sufficient torque applied. This may be done during regular maintenance intervals when it is desired to remove and replace a spent filter.

It is noted that snap ring 152 may be used as a retainer to secure lock member 138 within annular chamber 144 that houses lock member 138 and spring 142.

Accordingly, the lock member detent is engaged with the torsion lock detent member to prevent rotational disengagement between the filter cartridge and the filter head, however, this can be overcome through manual force such as may be employed by a typical service mechanic. For example, when applied toward between 1 and 20 newton-meter newton-meters (more preferably between 4 and 15 newton meters) may be sufficient to overcome the locking engagement between the lock member detent and torsion lock detent member and secured arrangement of the filter cartridge. The torsion lock detent member (e.g. a combination of lock tabs 80 in the first embodiment) may be configured relative to the filter head and its lock assembly to cause such applied torque in these ranges to overcome torsion locking between the filter and the filter head in use.

Additionally, this arrangement can also facilitate advantages for the filter head construction. For example, the filter head 12 (also referred to as mounting head) has an internal surface 154 defining the filter cartridge receptacle 128 and that faces and receives the filter cartridge 10. Notably, the internal surface 154 can be free of any annular grooves in a transitional region between the lock assembly 136 and the thread ramp 46 thereby simplifying construction.

For example, the internal surface 154 facing the shoulder region 52 can have a complimentary dome shape.

In this complimentary shoulder transition region 156, it may be curved and continuously extending outwardly and downwardly from the lock assembly 136 to the thread ramp 46 with the filter cartridge having a complimentary dome region at the shoulder region proximate this transition region.

Turning to the second embodiment of a present invention shown in FIGS. 6-7, a filter is shown in the form of a filter cartridge 10A for use with a filter head 12A that is understood to be the same as filter cartridge 10, filter head 12 and assembly 14 of FIGS. 1-5 and operates in the same manner as filter cartridge 10, filter head 12, and assembly 14, other than as described and indicated below. Thus, the disclosure of the first embodiment of FIGS. 1-5 is fully applicable to the present embodiment other than as indicated below. Like reference numbers will be used (i.e. the same reference numbers can be used for the same component features, and if a modified portion or part, the same number may be used with an alphanumeric modifier at the end of that number for that embodiment), and focus will be had relative to modifications and different parts relative to the first embodiment.

Filter cartridge 10A is the same as filter cartridge 10 of the first embodiment except for a modified top member that takes the form of plastic cap 30A. Specifically, the only filter cartridge difference is that the configuration of a torsion lock detent member 44A on cap 30A is different. In this embodiment, the plastic cap 30A also similarly includes top annular end wall 28 and the shoulder region 52 that may take the form of a dome shape and that can transition into annular sidewall 24 of a filter house and into which the thread 42 is also provided by plastic cap 30A. However, the torsion lock detent member 44A comprises a raised ring 170 surrounding and spaced readily outward from the nipple portion 50. The raised ring may project from the top annular end wall 28 in which the raised ring defines at least one of a detent tab and a detent slot, and in this embodiment the detent slot 172 that is configured for torsion locking.

Preferably, the raised ring 170 is a cylindrical structure as shown and concentric with the nipple portion 50.

The raised ring 170 may further include an upper ramp surface 174 facing axially outward that is configured to co-act with the filter head when in use. Accordingly, the ramp surface 174 can be provided in this embodiment by the filter cartridge 10A instead of the filter head as was the case with the first embodiment. The upper ramp surface 174 is connected at a trailing end location (e.g. at the front end of the detent slot) to the detent slot 172 and tapers in diminishing axially height as the ramp surface 174 extends away from the detent slot 172.

On the rear end side of the detent slot 172 opposite the ramp surface, the torsion lock detent member 44A may also include a stop member such as a projection in the form of a tooth 176 that can engage a corresponding structure on the filter head that may prevent over rotation of the filter cartridge when installed in the filter head as may be discussed below. However, slot 172 does not need to be delimited by a stop projection such as tooth 176.

Additionally, the torsion lock detent member 44A may further comprise a cam surface 178 at the upstream location of the detent slot 172 that reduces the torque required to engage or disengage the torsion lock detent member when in use with a filter head 12A. For example, if a locking tab from the filter head is engaged in the torsion lock detent slot 172, rotation will cause it to engage and strike against the cam surface 178 which will start axial movement of the filter cartridge away and allow for such a detent lock tab to move out of detent slot 172, and then on to ramp surface 174 to allow for disengagement and removal of the filter cartridge 10A.

As can be seen, the slope of the cam surface 178 is much more rapid than ramp surface 174, thus requiring substantially more force and torque required to dislodge from the detent slot 172, as compared with riding along the ramp surface 174. For example, the slope on cam surface 178 may be at least five times as great as ramp surface 174.

Additionally, it is noted that along the other side of the detent slot 172 at stop member projection tooth 176 that a harder or more vertical edge may be provided as compared with ramp cam surface 178. This is because stopping rotational movement is desired by stop member projection tooth 176, if it were engaged.

In some embodiments wherein a ring detent member is used as in the second embodiment, preferably, the raised ring 170A may be elevated above the top annular end wall 28 between 1 and 10 millimeters (more preferably between 3 and 8 millimeters); and the nipple portion 50 (the second embodiment being similar to the first embodiment in this dimension) may be elevated above the top annular end wall 28 between 5 and 20 millimeters (preferably more between 7.5 and 15 millimeters), and further the nipple portion 50 may be elevated above the raised ring 170 between 2 and 10 millimeters (more preferably between 3 and 7 millimeters).

The filter cartridge 10A is usable with the modified filter head 12A as compared with the first embodiment. The filter head 12A may be the same as filter head 12 except for the configuration of the spring loaded lock member 138A shown in this second embodiment. In this embodiment, as opposed to a pair of lock slots as in the first embodiment, this embodiment employs a lock member 138A with an axially extending lock tab 148A that extends from the free terminating end surface of the L shaped annular ring 146A. This lock tab 148A is configured to interact and be received with the detent slot 172. The lock tab 148A is configured to ride along the ramp surface 174 of the filter cartridge 10A during use and during rotation and installation of the filter cartridge 10A into filter head 12A.

Thus, other than the configuration and torsion lock interface between the filter head 12A and filter cartridge 10A, it is understood that the components and parts of this second embodiment is the same as that of the first embodiment shown in FIGS. 1-5.

Turning next to the third embodiment shown in FIGS. 8-12, a filter is shown in the form of a filter cartridge 10B and filter head 12B that is understood to employ the same components and be the same as filter cartridge 10, filter head 12 and assembly 14 of FIGS. 1-5, other than as indicated below. Accordingly, the disclosure of the first embodiment of FIGS. 1-5 is fully applicable to this third embodiment other than as indicated below. Like references will be used and focus will be had relative to the modifications and different parts relative to the first embodiment.

In this embodiment, the filter cartridge 10B is the same as that shown for filter cartridge 10 of the first embodiment other than the configuration of top end cap 74B, which in this embodiment includes a torsion lock detent member 44B instead of top cap member 30B.

Accordingly, the two parts that are different relative to this embodiment are that it includes a top member in the form of the plastic cap 30B, that is free of and does not include any torsion lock detent member in comparison with plastic cap 30 of the first embodiment. The other difference is that this third embodiment includes the top end cap 74B (as part of the filter element) that is differently configured and provides for a differently configured torsion lock detent member 44B. In this embodiment, the torsion lock detent member 44B is therefore still arranged at the same top end 20. However, in this embodiment, it is provided along the inner annular wall 66B and not along the top annular end wall 28. Thus, the plastic cap 30B and top annular end wall 28 that can be provided thereby may be free of any torsion lock detent members.

Figure 6:
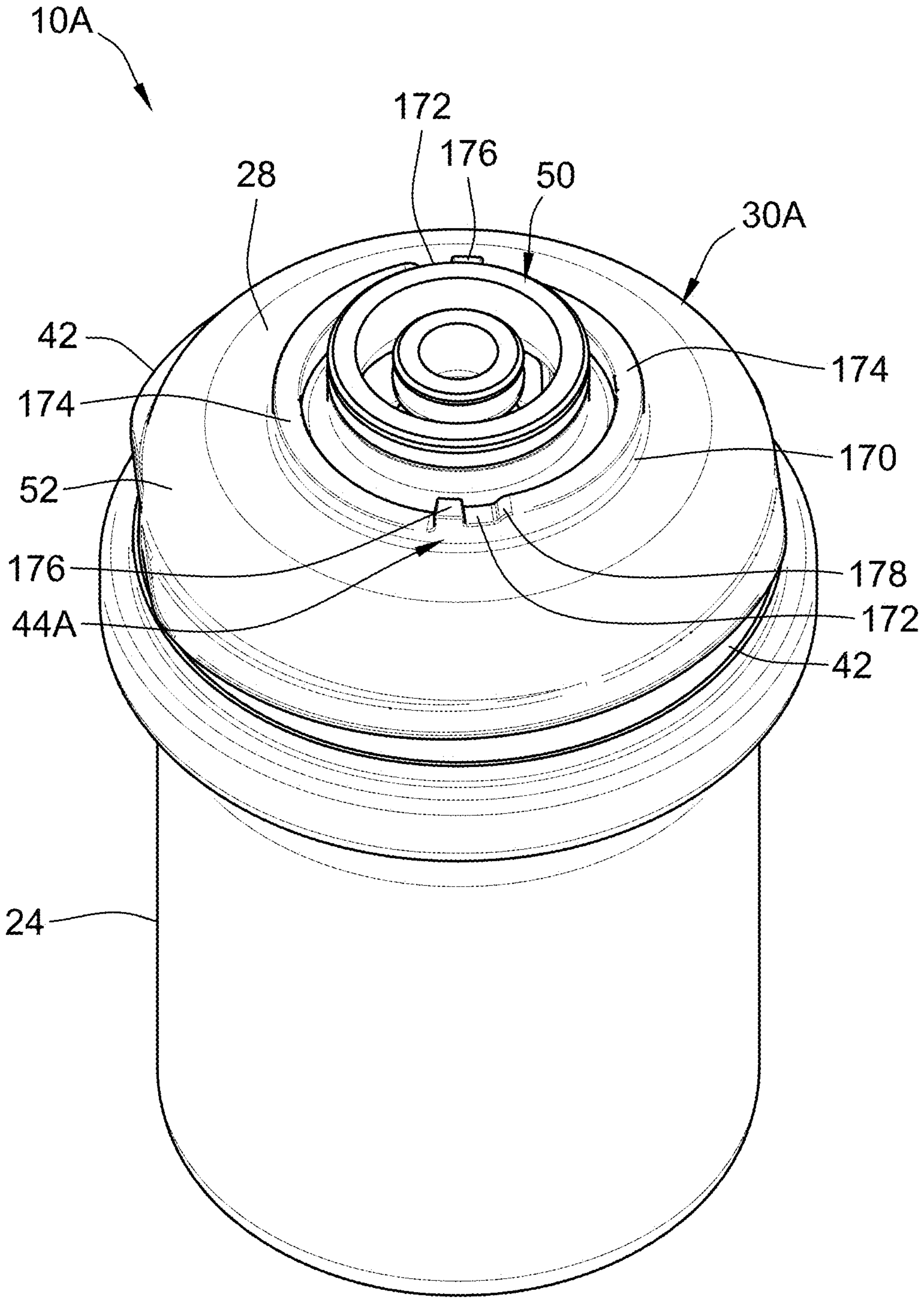
FIG. 6 is an isometric illustration of a filter cartridge according to a second embodiment of the present invention.
Figure 7:
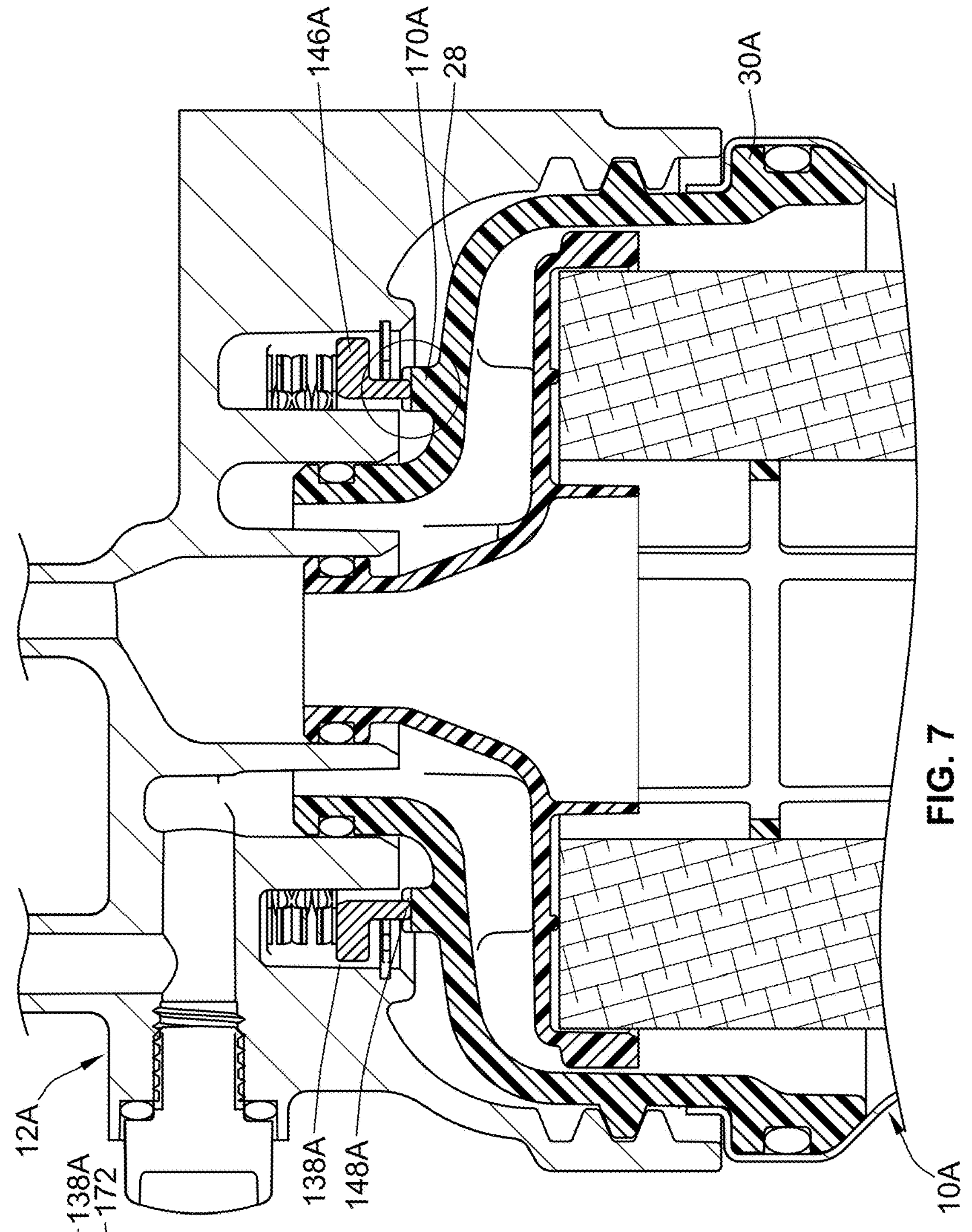
FIG. 7 is a cross-sectional illustration of a top portion of the filter cartridge shown in FIG. 6 in conjunction with a filter head forming an assembly.
Figure 7A:
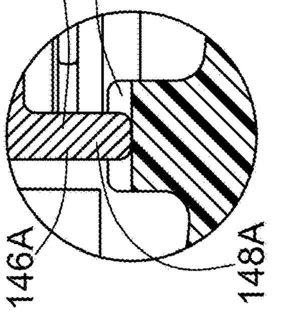
FIG. 7A is an enlarged view of a portion of FIG. 7 to better show the interlocking tab and slot with tooth portion of FIG. 7.

It can be noted that the torsion lock detent member 44B of this embodiment is configured quite similar to that of the second embodiment shown in FIGS. 6-7 except in this case it is provided by the inner annular wall 66B as opposed to a separate ring 170 (as in FIGS. 6-7) around the outer annular wall 64.

Specifically, in this embodiment, the torsion lock detent member 44B also includes a similar raised ring 170B extending at the top end 20 (e.g. a terminating free end portion of the snout), and that also similarly defines a detent slot 172B (in this case two detent slots 172B being shown), corresponding ramp surfaces 174B, stop member 176B at the back end of each detent slot 172B and corresponding cam surface 178B at the front portion of each detent slot 172B. These structures operate and are configured the same as those of the second embodiment (i.e., raised ring 170, detent slot 172, ramp surface 174, stop member 176, cam surface 178) of that shown in FIGS. 6 and 7 and operate in the same way. However, these are of a smaller diameter and configured along the inner annular wall 66B as opposed around the outer annular wall 64.

Figure 10:
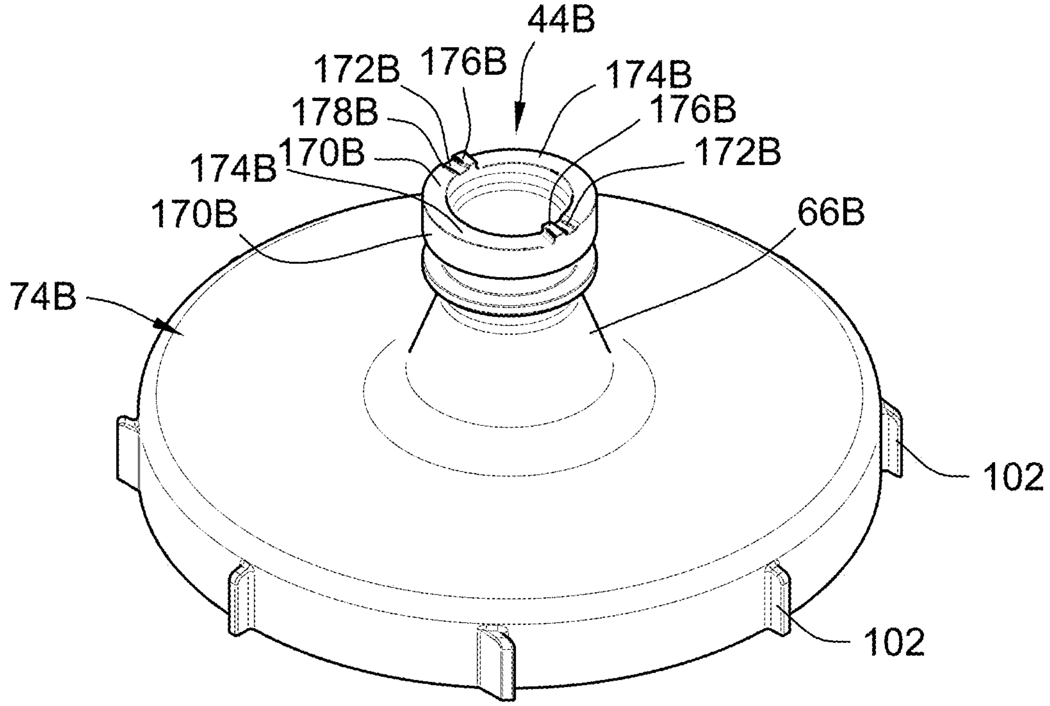
FIG. 10 is an isometric illustration of the top end cap that is employed in the filter cartridge of FIG. 8.

Further, due to the provision that the filter element 60B in this embodiment provides for and carries the torsion lock detent member 44B, this embodiment can use the axial loading force provided by the spring 98 (FIG. 8) to assist in keeping a locked and secured position of the filter cartridge 10B relative to filter head 12B in use. Specifically, it can be seen in this embodiment that the spring 98 urges the filter element axially upward and extends the torsion lock detent member 44B for engagement with the filter head 12B. However, the filter element 60B is moveable against the action of the spring and when engaged with the filter head 12B to compress and move the filter element axially allowing the filter element 60B to travel relative to filter housing 16B. The integral spacer tabs 102 provided at the periphery can guide the axial sliding movement of filter element 60B relative to filter housing 16B. The spacer tabs 102 can be keyed to ride within sliding keyed splines (not illustrated) on the inner periphery of the cap 30B to fix the torsion lock detent member 44 B at a predetermined angular position relative to the thread provided by the cap member 30B. The tabs 102 as shown in FIG. 10 can have different orientations forming a keying relationship that corresponds to slot orientations on the cap 30B so as to fit or orient at a predetermined clocked location in the cap 30B.

By using the spring 98 of the filter element to provide for torsion locking in this embodiment, it also can be realized that no such spring or sliding lock assembly may be in the filter head itself but instead the lock assembly in this embodiment uses the spring 98 of the filter cartridge to facilitate torsion locking. Thus, the spring member 98 in this embodiment similar to the spring 142 of the first embodiment facilitates to bias the lock member and the filter cartridge axially together.

Accordingly, the filter head may enjoy the benefits and use the spring employed by the filter cartridge. In this embodiment, the mounting base member 126B can be configured differently in that it may include a fixed lock tab

148B to provide for a torsion lock member 138B, that is not movable relative to the remainder of the filter mounting base 126B.

However, in use, installation and threading engagement of the third embodiment accomplishes similar torsion locking of the first and second embodiments to allow for the threading engagement to remain and prevent the filter cartridge from backing off due to vibration or from otherwise inadvertently becoming disengaged with the filter head during use due to torsion locking engagement between the filter cartridge 10B and the filter head 12B.

During installation, the filter cartridge 10B can be rotated via a half turn (or a quarter turn in another embodiment), onto the filter head 12B using the thread provided on the filter cartridge and that rides along the thread ramp of the filter head. The fixed lock tab 148B from the filter head (and typically two lock tabs 148B for separate detent slots 172B) will ride along the corresponding ramp surface 174B during twisting threaded engagement which starts to load the cartridge spring 98 and cause the filter element 60B to slide axially within the filter housing 16B until reaching the detent slot 172B where the spring 98 pushes the filter element back axially with the lock tab 148B being received into the detent slot 172B. Thus, the spring 98 holds the torsion lock tab 148B within the detent slot 172B until sufficient loosening torque is applied by a service mechanic to overcome the force. The torque necessitated can be controlled or determined by the configuration of the cam surface 178B as it is the case with the cam surfaces provided in the first and second embodiments which starts to impart axial movement to the torsion lock detent structures of the respective filter cartridge and the filter head to move those structures apart when sufficient rotational force is provided because the cam surface starts to turn rotational force into axial force.

For example, in the various embodiments disclosed herein including not only the third embodiment but other embodiments that employ cam and/or ramp structures, the average slope on a cam surface may be between 20 and 80 degrees (the cam surface may often spans at least 1 millimeter and more preferable at least 3 millimeters in travel distance); in comparison the corresponding grade on a ramp surface such as ramp surface 174 or 174B or 150 may have an average slope of between 2 and 10 degrees. It is also noted that the ramp and/or cam surfaces may be provided by either the filter cartridge or the filter head or by both structures in which cam surfaces on respective filter cartridges and filter heads will engage each other. This also applies to the various different embodiments disclosed herein.

Typically, the spring force acting on the torsion lock detent member will provide a biasing force of between 10 and 80 pounds (more typically between 20 and 50 pounds), regardless of whether the spring is provided by the filter head or the filter cartridge.

Relative to the third embodiment, the spring 98 may therefore apply a spring force in that range. Further, the filter element may have a travel movement relative to the housing of between 0.5 and 3 millimeters through resilient biasing of the spring 98. As can be seen, the inner annular wall 66B may project axially farther and higher than the outer annular wall 64 in this third embodiment in the detached condition.

Turning to the fourth embodiment shown in FIGS. 11-12, a filter is shown in the form of a filter cartridge 10C as well as a filter head 12B and assembly 14B that is understood to employ the same components and be the same as filter cartridge 10, filter head 12 and assembly 14 of FIGS. 1-5, other than as indicated below. Accordingly, the disclosure of the first embodiment of FIGS. 1-5 is applicable to the fourth embodiment other than as indicated below. Like references may be used and focus will be had relative to modifications and different parts relative to the first embodiment.

Figure 8:
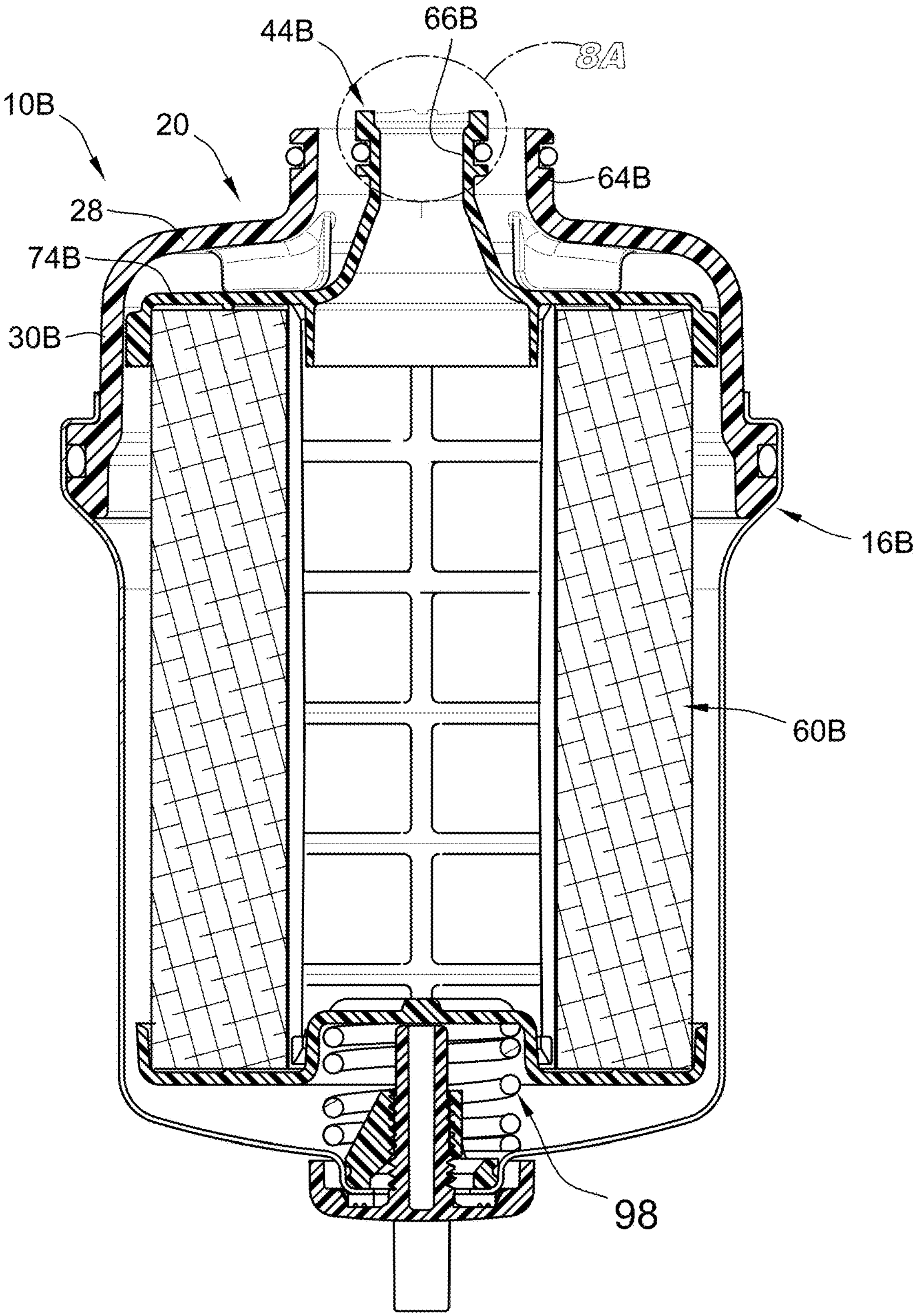
FIG. 8 is a cross-sectional illustration of a filter cartridge in accordance with a third embodiment of the present invention.
Figure 8A:
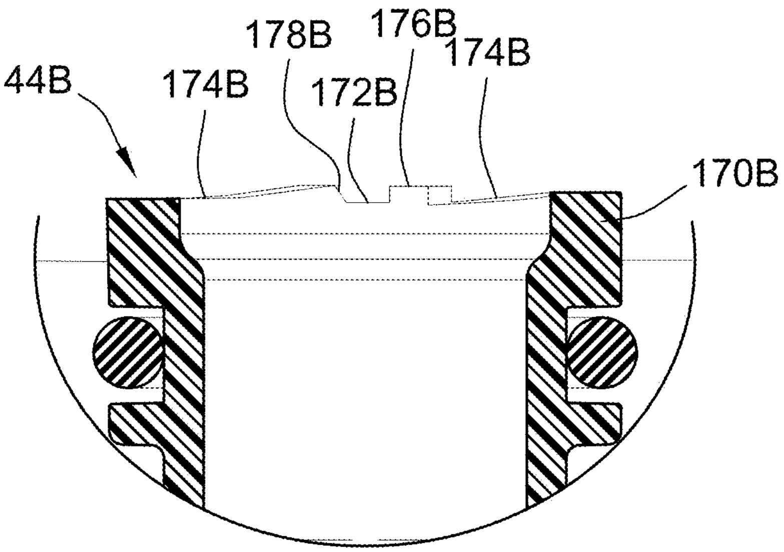
FIG. 8A is an enlarged view of a portion of FIG. 8.
Figure 9:
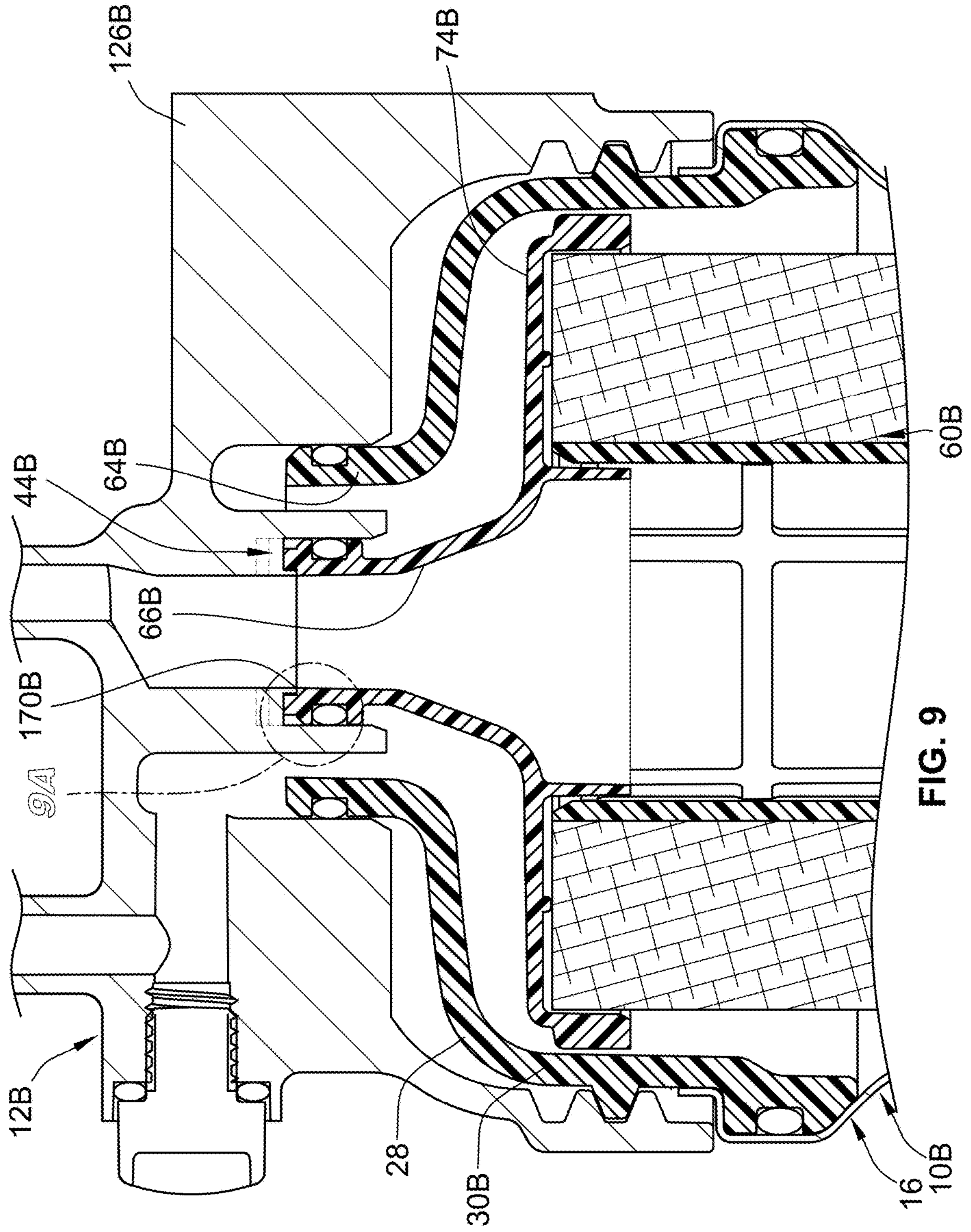
FIG. 9 is a cross section of a top portion of the filter cartridge shown in FIG. 8 in combination with a filter head to form an assembly.
Figure 9A:
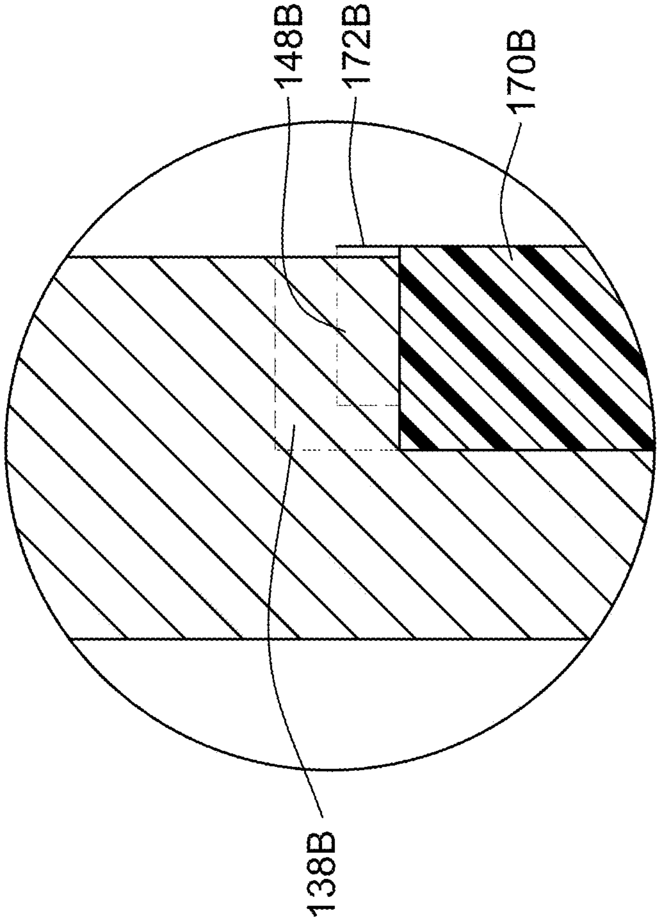
FIG. 9A is an enlarged view of the interlocking slot and tab portion of FIG. 9.

Additionally, it is noted that the fourth embodiment is almost the same as the third embodiment shown in FIGS. 8-10 with the same components and modifications shown therein because in this fourth embodiment the torsion lock detent member 44C is also provided by the filter element and configured as part of the top end cap 74C. Thus, the changes and variations of the fourth embodiment are the same as the third embodiment relative to the first embodiment. The difference between the fourth embodiment and the third embodiment is that this fourth embodiment as shown in FIG. 11 provides the torsion lock detent member 44 as a raised ring 170C radially outward from the inner annular wall 66C.

In contrast, the third embodiment showed that the inner annular wall 66B included the axially outermost annular edge that defined the torsion lock detent member 44B including its torsion lock detent.

Figure 11:
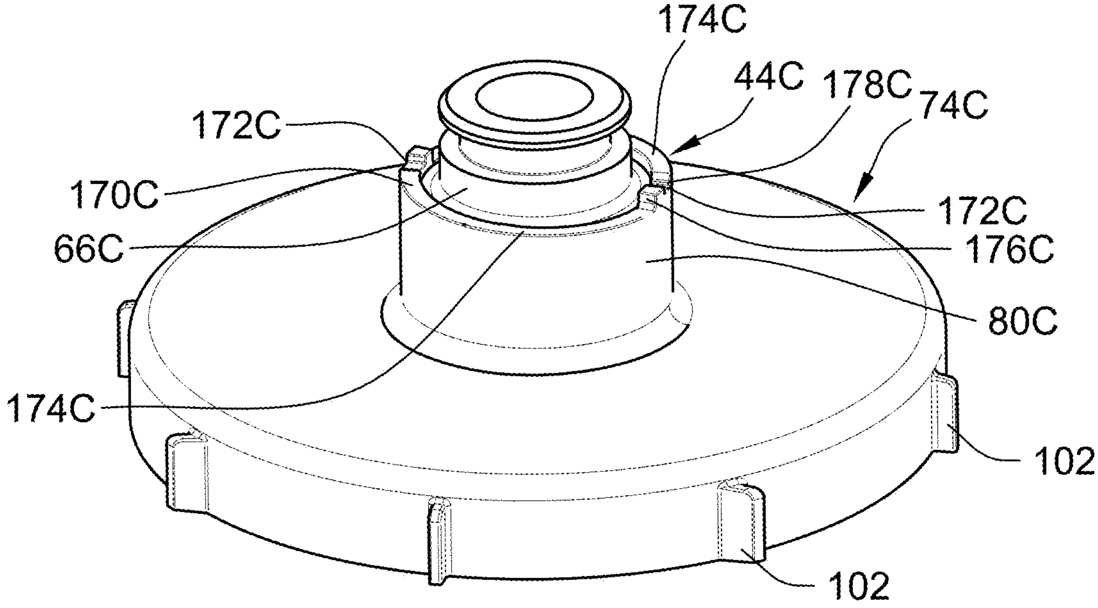
FIG. 11 is an isometric view of a top end cap of a filter element employed in a further alternative embodiment similar to the third embodiment shown in FIGS. 8-10 but with a modification.
Figures 12, 12A:
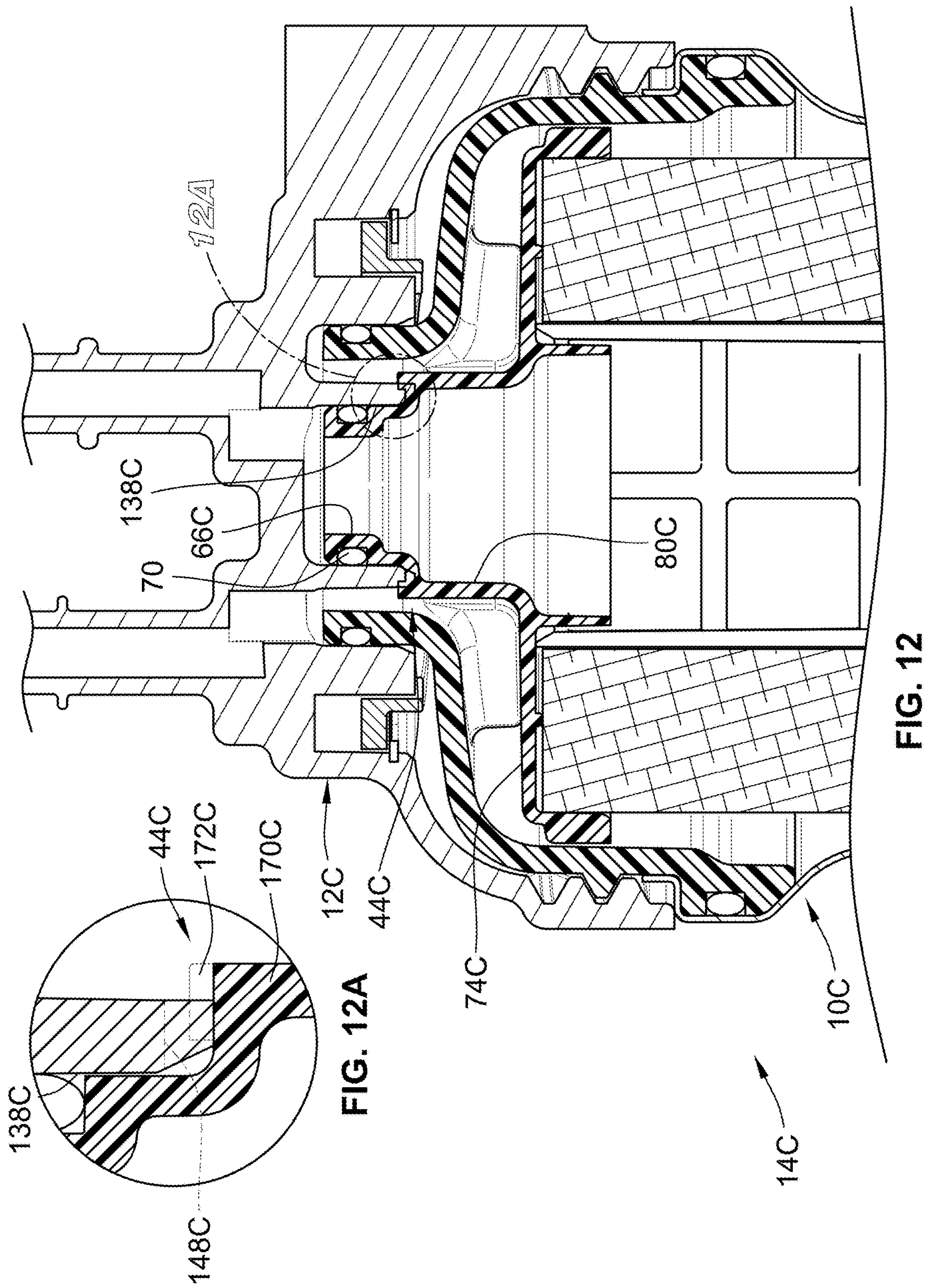
FIG. 12 is a cross-sectional view of a top portion of a filter cartridge and filter head assembly employing the top end cap shown in FIG. 11.
FIG. 12A is an enlarged view of the interlocking tab and slot portion of FIG. 12.

In the fourth embodiment and referring to FIG. 11, it can be seen in this embodiment the top annular end cap, the raised ring 170C may be formed as a cylindrical wall that is concentric and spaced radially outward in surrounding relation of the inner annular wall 66C. Further, in this embodiment, the top end cap 74C also includes a similarly formed snout 80C to the first embodiment that defines the outlet port with an outwardly directed radial seal provided by inner radial seal 70. The raised ring 170C provides a ring wall portion that has an axially outermost edge defining the torsion lock detent which may be a detent slot or a detent tab but shown as a detent slot 172C in FIG. 11.

As shown, this axially outermost edge may be elevated axially below the terminating free end (e.g., axially outermost annular edge) of the inner annular wall 66C that is provided by the snout 80C.

Like the third embodiment, the torsion lock detent member 44C has a configuration very similar to that of the third embodiment. For example, detent member 44C also includes detent slots 172C, with corresponding ramp surfaces 174C, stop member 176C and cam surfaces 178C. In this embodiment, the torsion lock detent member 44C also uses the cartridge spring 98 which is part of the filter cartridge for torsion locking with the filter head 12C.

Also similar to the third embodiment, this embodiment also includes a fixed lock member 138C and corresponding detent slot or tab but in this embodiment is a torsion lock tab 148C that is fixed relative to mounting base 126C. Accordingly, the filter head, if desired, does not need to actuate the lock member 138C relative to the remainder of the mounting base 126C and can rely upon the spring of the filter cartridge. Of course, if desired, additionally or optionally, a spring loaded lock member on the filter head could be provided similar to that of the first embodiment.

Turning next to the fifth embodiment shown in FIGS. 13 and 14, a filter is shown in the form of a filter cartridge 10D usable with a filter head 12D to form an assembly, that is understood to employ the same components and be the same as filter cartridge 10, filter head 12 and assembly 14 of FIGS. 1-5, other than as indicated below. Accordingly, the disclosure of the first embodiment of FIGS. 1-5 is fully applicable to the present embodiment other than as indicated below. Like reference numbers may be used and focus will be had relative to modifications in different parts relative to the first embodiment.

Figure 13:
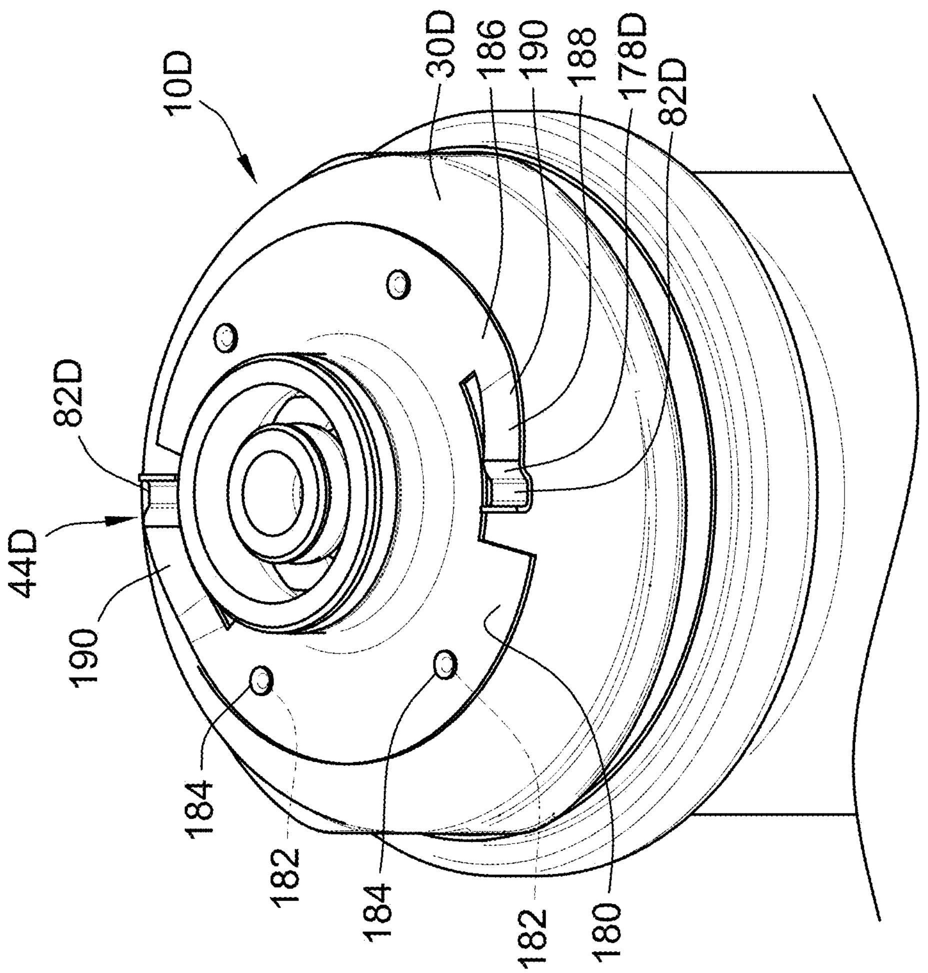
FIG. 13 is an isometric illustration of a filter cartridge according to a fifth embodiment of the present invention employing a spring loaded torsion lock detent member.
Figure 14:
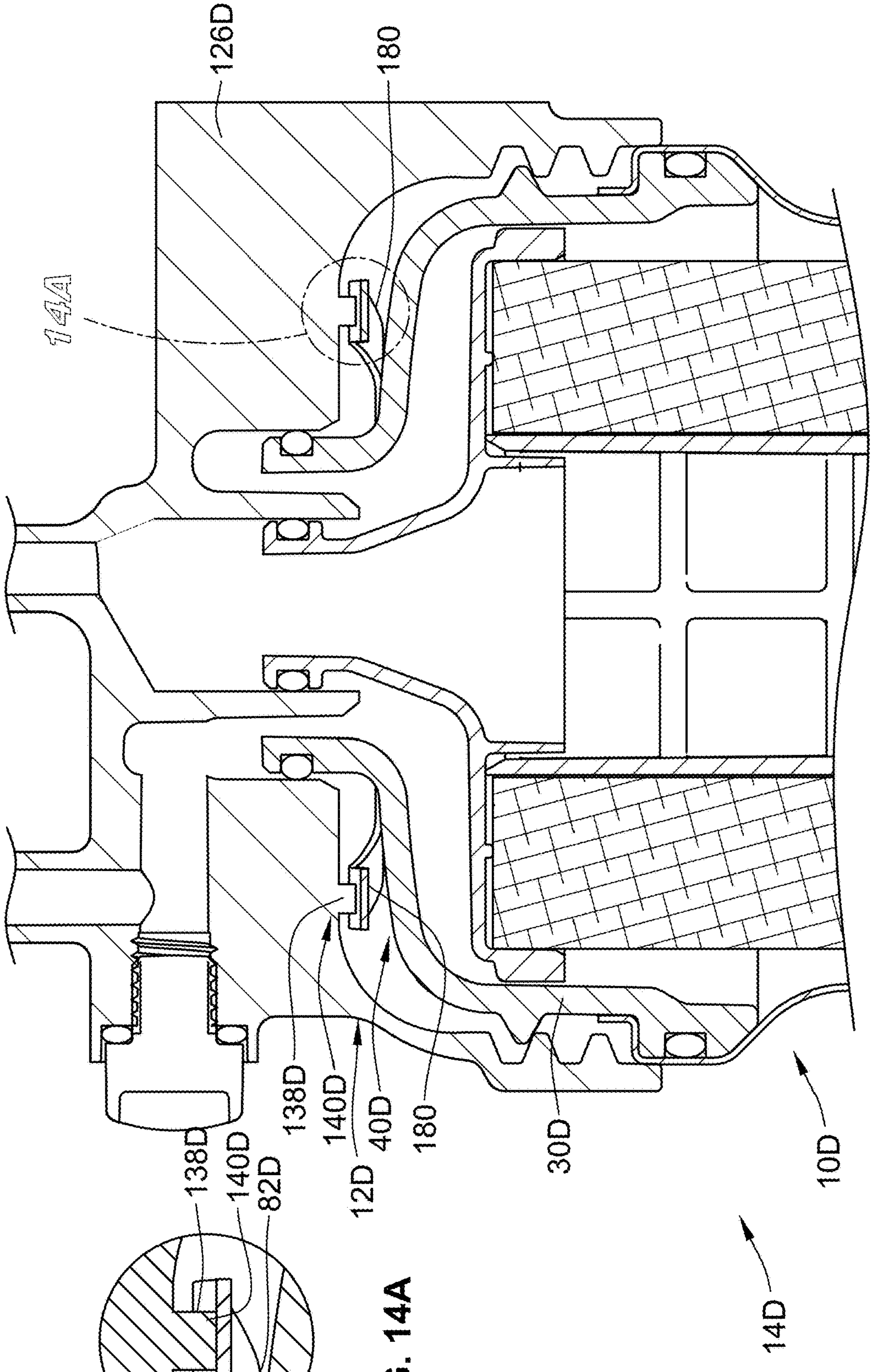
FIG. 14 is a cross-sectional illustration of a top portion of the filter cartridge shown in FIG. 13 in combination with a filter head to form an assembly.
Figure 14A:
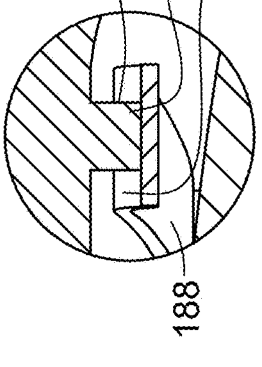
FIG. 14A is an enlarged view of a portion of FIG. 14.

In this fifth embodiment, and referencing FIG. 13, filter cartridge 10D is the same as filter cartridge 10 except for the configuration of a torsion lock detent member 44D and the configuration of the upper member of the housing that may take the form of a plastic cap member 32D. Otherwise, all of the parts and components of this filter cartridge 10D are the same as that of FIG. 1, and will not be again described.

The plastic cap member 30D is almost the exact same as plastic cap 30 of the first embodiment other than it does not integrally form the torsion lock detent member as a one-piece unitary component therewith.

Instead, the torsion lock detent member 44D may be provided by a preformed relatively thin metal ring member 180 that can be bonded or secured to plastic cap member 30D. For example, ring member 180 has holes 182 that receive staking post 184 extending from the top annular end wall 28 of plastic cap member 30D. Staking posts 184 are received by through holes 182 and melted/staked and thereby deformed to be larger than holes 182 to thereby secure the ring member 180 to the plastic cap member 30D. In this manner, ring member 180 may be considered to be part of cap member 30D, but simply not as a unitary single piece component therewith.

The torsion lock detent member 44D includes a base portion (that may be provided by ring member 180 or other such base member) that is anchored to the top annular end wall 28. Further, torsion lock detent member 44D includes a spring arm 188 extending in a cantilevered fashion from the base portion 186 and moveable relative to the top annular end wall 28 to provide for spring resiliency for use in the overall assembly to facilitate torsion locking when used with a filter head 12D as shown in FIG. 14. Further, a torsion lock detent is provided and defined by the spring arm 188 which may take the form of, for example, a torsion lock tab or torsion lock slot and in this case torsion lock detent slot 82D.

In this embodiment, two of such torsion lock detent slots 82D as well as spring arms 188 are provided and all connected by common base portion 186 that may be provided by ring member 180 to secure to the top annular end wall 28 of plastic cap member 30D.

With reference to FIG. 13, it can be seen that the spring arm 188 may further define an axially outwardly facing ramp surface 190 that leads to the torsion lock detent slot 82D. The torsion lock detent slot 82D may therefore be defined by a slot at the trailing end portion of the spring arm 188.

Resiliency of spring arm 188 in this embodiment is facilitated by the quite thin nature of the metal and long cantilever reach of the spring arm 188. Due to this spring arm resiliency, the filter head 12D can employ a fixed lock member 138D with a corresponding fixed lock member detent that may take the form of lock member detent 140C that are fixed relative to a remainder of the mounting base member 126D.

Therefore, like the third and fourth embodiments, the filter cartridge 10D in this embodiment is also providing the spring force to facilitate the torsion lock attachment and maintenance of the torsion lock detent slot 82D in engagement with the torsion lock tab 140D when the filter cartridge is threaded onto the filter head in a secured condition. This prevents the filter cartridge from inadvertently becoming dislodged or removed from the filter head during use such as when subjected to engine vibrations or vibrations from movement of the vehicle or the like. A similar torque requirement for overcoming the force of the torsion locking by a service mechanic may also be employed in the fifth embodiment as in the earlier embodiments described. Further, cam surfaces on the filter head lock member 138D and/or the torsion lock detent member 44D can be provided similar to previous embodiments. For example, cam surface 178D is provided along spring arm 188 in the form of a curved surface leading into the torsion lock detent slot 82D at a front portion of the lost 82D.

In previous embodiments, the ramp surfaces extended greater than 90 degrees around the filter cartridge relative to a 180 degree or half turn rotation to facilitate threaded attachment. However, in this embodiment the outer facing ramp surface 190 is much shorter and may only be a much smaller portion with the remainder not being ramped relative to rotational movement.

Turning to the sixth embodiment shown in FIG. 15, a filter is shown in the form of a filter cartridge 10E that is understood to employ and be the same as filter cartridge 10D of the fifth embodiment shown in FIG. 13, and also useable with the same filter head 12D of the fifth embodiment, other than as indicated below. Accordingly, the disclosure of the first embodiments of FIGS. 1-5, as well as the discussion of the fifth embodiment of FIG. 13, is fully applicable to the sixth embodiment of FIG. 15, other than as indicated below.

In this embodiment, filter cartridge 10E is identical to filter cartridge 10D except for the fact that torsion lock detent member 44E is integrally formed as part of the top housing member in the form of plastic cap member 30E. Specifically, in this embodiment, the torsion lock detent member 44E is integrally molded and formed with the plastic cap member 30E as a single unitary one-piece component part.

Torsion lock detent member 44E is substantially the same as torsion lock detent member 44D shown in FIG. 13. For example, the torsion lock detent member 44E shown in FIG. 15, is formed of resilient material (in this case resilient plastic rather than metal), also similarly includes a base portion 186E. However, base portion 168E is integrally molded with the top annular end wall of plastic cap member 30E. Torsion lock detent member similarly includes a cantilevered spring arm 188E, which also defines an outer ramp surface 190E, torsion lock detent slot 82E and cam surface 178E at the front end of the slot. This embodiment of FIG. 15 thus works the same, and can be substituted for, the filter cartridge shown in FIG. 13 and used with the filter head shown in FIG. 14.

Figure 16:
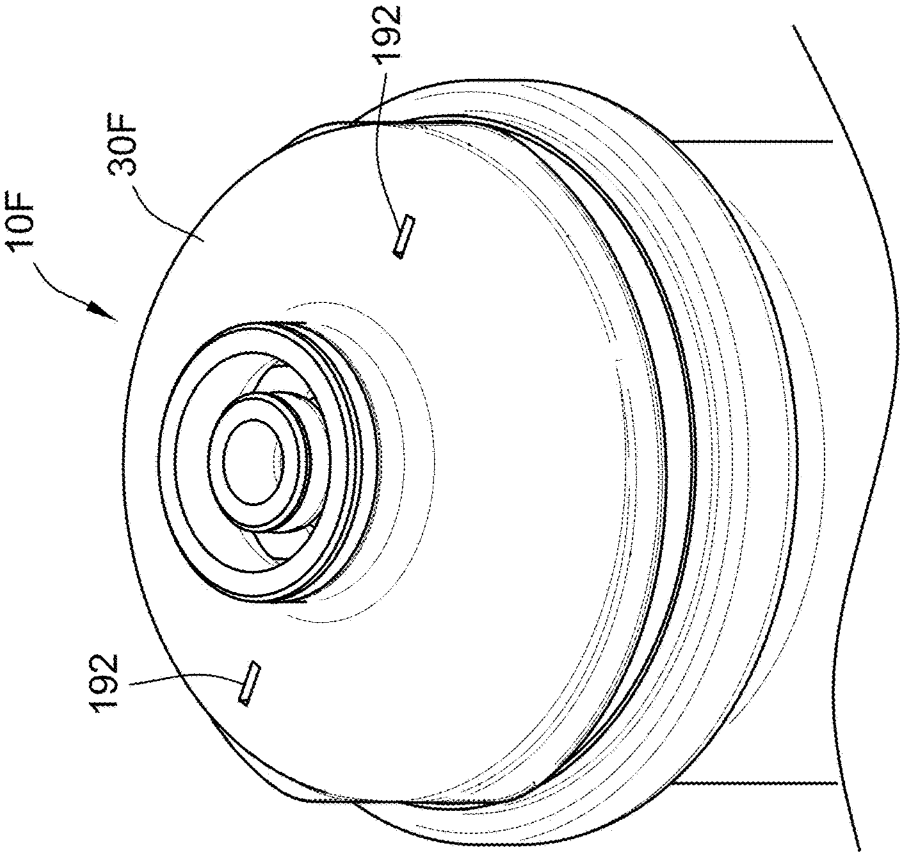
FIGS. 16 and 17 show similar isometric views as to further alternative embodiments 7 and 8 illustrating additional concepts for spring loaded torsion detent locking members similar to the embodiments in FIGS. 13-15.
Figure 15:
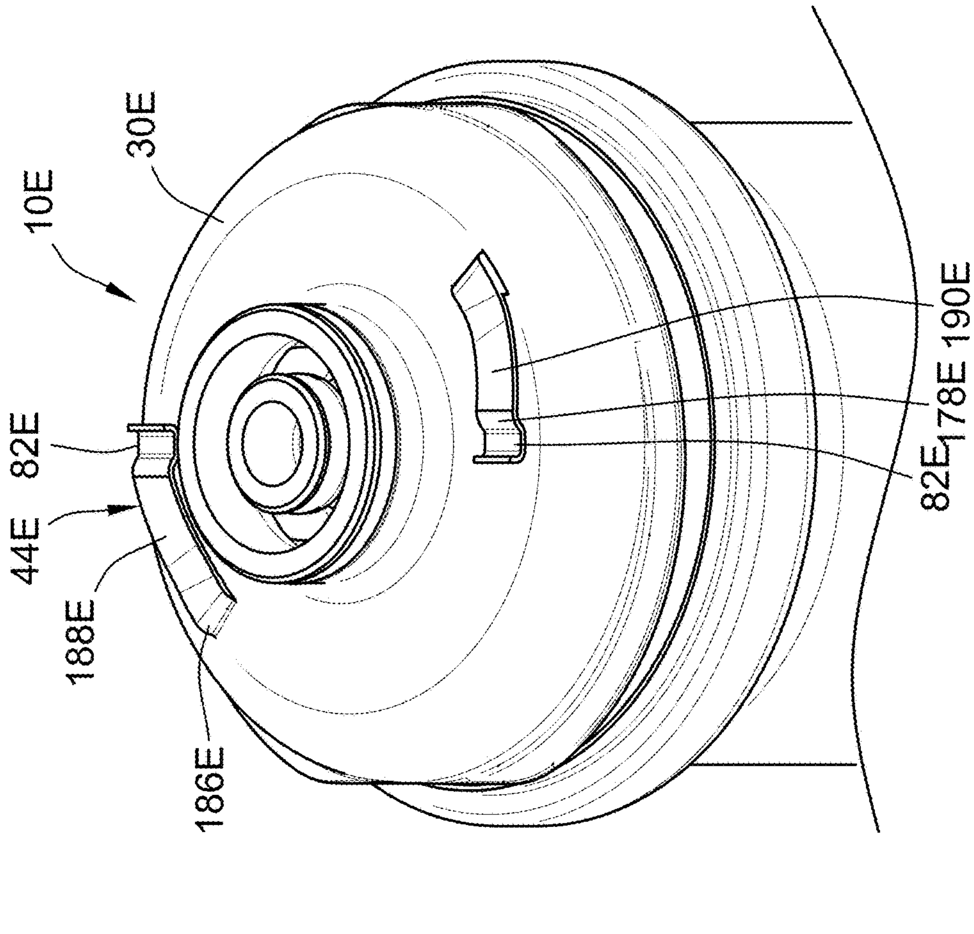
FIG. 15 is an isometric illustration of a top portion of a filter cartridge similar to that shown in embodiment 5 of FIG. 13 but with an integrally formed spring torsion lock detent member in a one-piece plastic cap in accordance with a sixth embodiment of the present invention.
Figure 17:
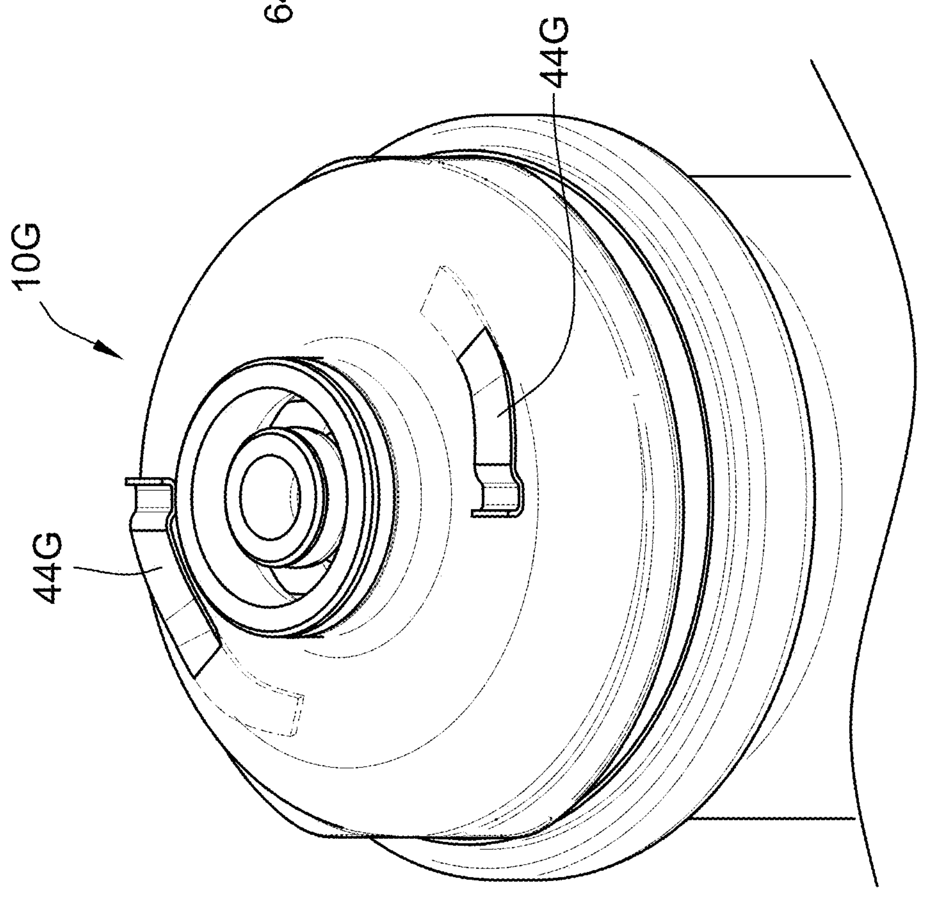
Figure 20:
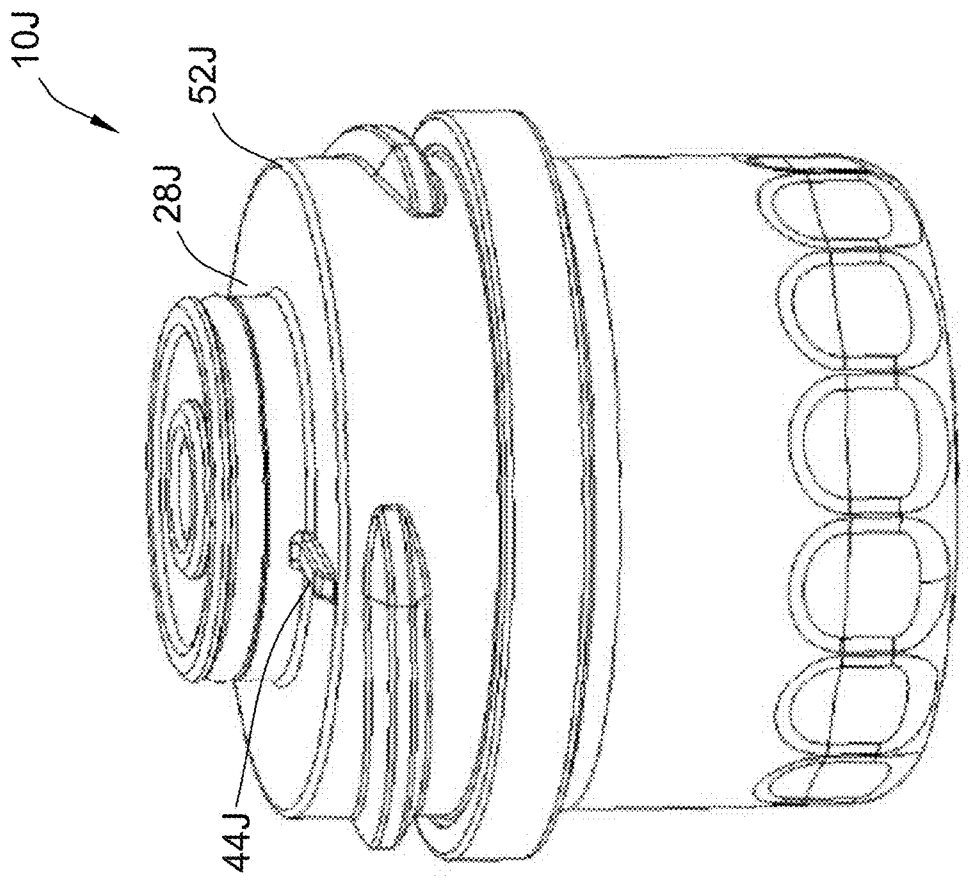
FIG. 20 is an isometric illustration of a filter cartridge in accordance with an eleventh embodiment of the present invention similar to that of the first embodiment shown in FIGS. 1-5 but with a sharper corner at a shoulder region and a flap top annular end wall to provide for filter differentiation.

FIGS. 16 and 17 show yet further concepts that may be applied to either embodiment five or six of FIGS. 13, 15.

In FIG. 16, the filter cartridge is similar to that of FIG. 15 but, instead, the plastic cap member 30F defines pockets 192 that can receive a corresponding base portion for mounting the torsion lock detent member 44E used in the sixth embodiment. Thus, rather than integrally molding as a single one-piece component part, the torsion lock detent member 44E of the embodiment FIG. 15 may alternatively be mounted and integrally attached by bonding in the pockets 192 such as through adhesive or integral welding, heat staking or otherwise, thereby to provide a spring loaded torsion lock detent member on the filter cartridge 10F.

For FIG. 17, a filter cartridge 10G is illustrated that also has a spring loaded torsion lock detent member 44G like those shown for the embodiments of FIGS. 13, 16, but with a differently configured torsion lock detent member 44G. This shows that, for example, rather than a slot formed, it could alternatively be a tab (such as projection shown) to form the torsion lock detent as part of the filter cartridge 10G. Further a complete attachment ring to provide a base is not needed, but the base may be much shorter as shown in FIG. 17.

Turning to embodiments 9-13 shown in FIGS. 18-25, various means of differentiation relative to the first embodiment shown in FIGS. 1-5 are illustrated. Further, filters are shown in the form of filter cartridges 10H, 10I, 10J, 10K and 10L that are understood to employ the same components and be the same as filter cartridge 10 and usable in filter head 12 and assembly 14 of FIGS. 1-5, other than as indicated below. Accordingly, the disclosure of the first embodiment of FIGS. 1-5 is fully applicable to embodiments 9-13 other than as indicated below. Like reference numbers may be used and focus will be had relative to modifications in different parts relative to the first embodiment.

In each of these filter cartridges 10H-10L shown in FIGS. 18-24, the filter cartridges are the same as that of the first embodiment other than means for filter differentiation being provided. Specifically, different filters may have different filtration capacities, different filtration efficiencies and amount of filter media or type of filter media employed in the filter cartridge. Because different filtration applications may require different filtration characteristics, means for filter differentiation may be provided so that inadvertently one filter cartridge usable for one particular filtration application, such as one vehicle or engine, may be differentiated from a different filter cartridge that may be usable or applied to a different engine, vehicle or filtration application. This way, one filter may not necessarily be inadvertently installed in the wrong application.

Figure 18:
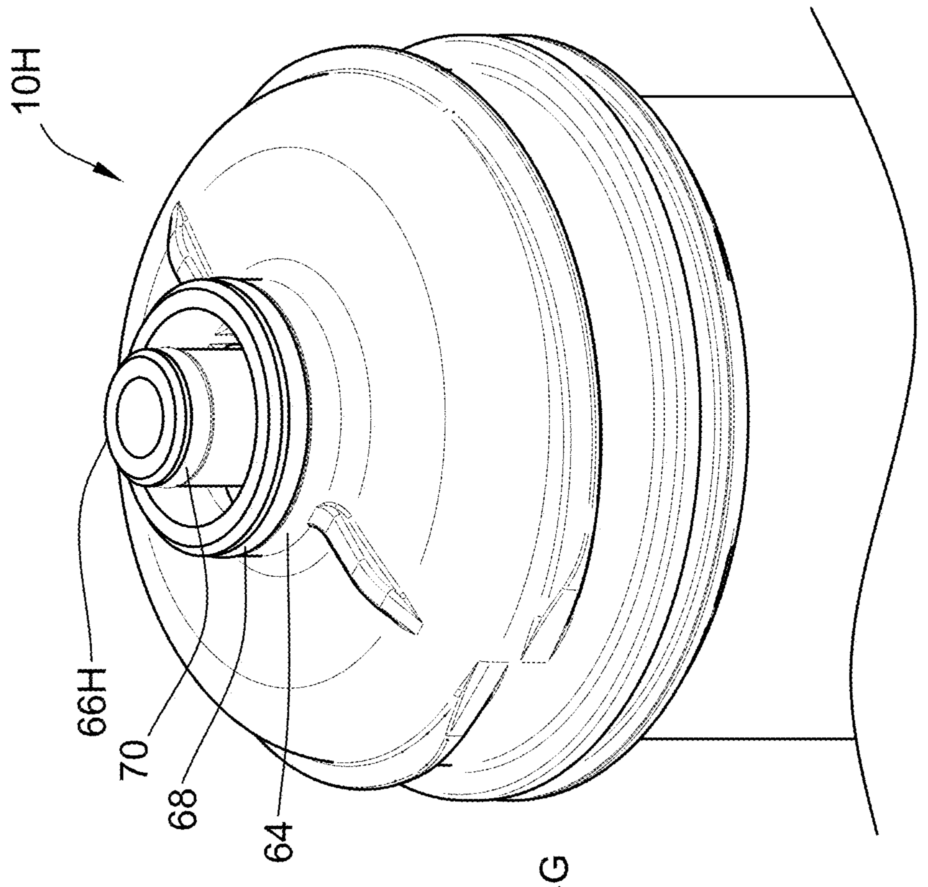
FIG. 18 is an isometric illustration of a top portion of a filter cartridge according to a ninth embodiment similar to the filter cartridge shown in FIG. 1 but with a lengthened outlet port for filter differentiation.

Turning to the 9th embodiment of FIG. 18, a filter cartridge 10H with a lengthened outlet port relative to the first embodiment is illustrated. In particular, in this embodiment the inner annular wall 66H is raised relative to the first embodiment.

For example, the inner annular wall 66H may be elevated axially above the top annular end wall by at least 3 millimeters higher than the outer annular wall 64 (and usually less than 20 mm). In this manner, it is noted that the filter cartridge 10H shown in FIG. 18 would not necessarily work in the filter head 12 shown in FIG. 4 due to the lengthened outlet port and inner wall 66H as lengthened inner annular wall 66H would bottom out on the internal surface of the filter head mounting base member 126 shown therein in FIGS. 4 and 5 (see e.g., the internal surface just below return port 124 in FIGS. 4 and 5, which would cause bottoming out before installation). Thus, a modified head with a deeper recess in the region just before return port 124 in the filter head 12 of FIGS. 4 and 5 make embodiment 9 usable therewith.

Additionally, it should be noted that the lengthened inner annular wall 66H also allows one to move the inner radial seal 70 axially upward if desired to a higher location rather than approximately or in the same horizontal plane with outer radial seal 68. In this fashion, it is also contemplated that the inner port wall 134 could be raised and the inner radial seal 70 shown in FIG. 18 may also be elevated such that they only seal when applied to a modified head as compared with filter head shown in FIGS. 4 and 5.

Accordingly, this provides one means for differentiation in the form of a length wall at the nipple portion and/or different relative seal location.

Figure 19:
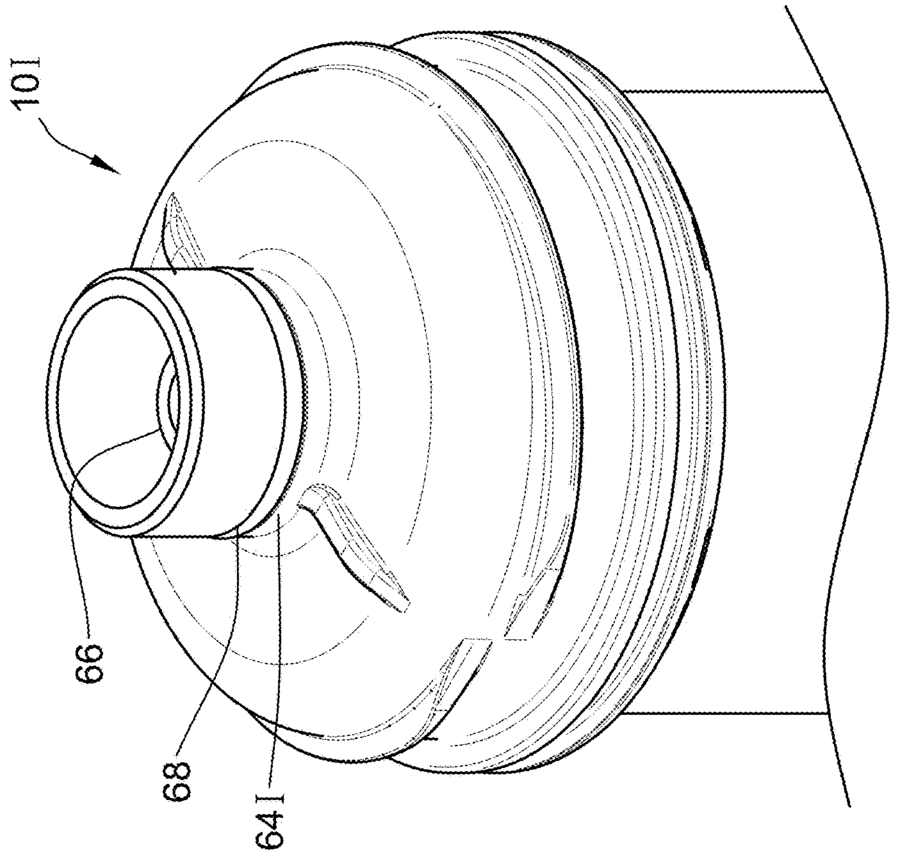
FIG. 19 is an isometric illustration of a top portion of a filter cartridge in accordance with a tenth embodiment of the present invention that is similar to that of the filter cartridge shown for the first embodiment but with a lengthened inlet port for filter differentiation.

Turning to the tenth embodiment and the filter cartridge 10I shown in FIG. 19, this is similar to the ninth embodiment except that instead of a lengthened outlet port there is a lengthened inlet port facilitated by a lengthened outer annular wall 641 relative to the inner annular wall 66.

For example, outer annular wall 641 can be elevated axially above the top annular wall by at least 3 millimeters higher than the inner annular wall 66 (and usually less than 20 mm).

In a similar fashion, the filter cartridge 10I of embodiment 19 would bottom out if attempted to be employed on the filter head 12 shown in FIGS. 4 and 5 due to the lengthened outer annular wall 641, as it would bottom out along the internal surface of mounting base 126 in a region immediately below discharge port 122 as can be seen therein. Thus, this provides a means for filtered differentiation.

A slight modification to the filter head 12 shown in FIGS. 4 and 5 by increasing the depth of the annular recess in the filter head mounting base 126 in the region immediately below discharge port 122 shown in FIGS. 4 and 5 provide for a filter head usable with that shown in FIG. 19 as will be readily understood.

Additionally, axial offset of the outer annular seal 68 relative to the inner annular seal 70 may be facilitated; for example, by raising the location of the groove for outer radial seal 68 to a higher location along outer annular wall 641.

In any of the embodiments herein such as embodiments 9 and 10 shown in FIGS. 18 and 19, respectively, when seal differentiation is provided, the inner annular seal and the outer annular seal may be axially offset, for example, by at least 3 millimeters (and usually less than 20 mm).

In a similar fashion, also if the outer radial seal 68 along the outer annular wall 641 is located at a higher location, the outer port wall 132 of the filter head may be reduced or otherwise have a non-sealing surface at a bottom portion thereof.

Turning to the filter cartridge 10J shown in an eleventh embodiment, a different form of filter differentiation is provided in the form of a flat top annular end wall 28J instead of a dome or sloped top annular end wall 28 shown in FIGS. 1-5. This locates the torsion lock detent member 44J for a different lower locking orientation relative to the first embodiment. This provides yet a further alternative means for filter differentiation.

Also, it can be observed in the eleventh embodiment that different configurations may be provided for the top annular end wall 28J and the shoulder region 52J such as a sharper corner than as compared with the first embodiment. Yet, it still accomplishes a torsion lock detent member 44J that is elevated above the top annular end wall 28J and higher than the shoulder region 52J and can accomplish if desired simplification of filter configuration.

Also, as noted, the same general nature of torsion lock detent members may also be employed. It is just the spacing or location that may be different.

Figure 21:
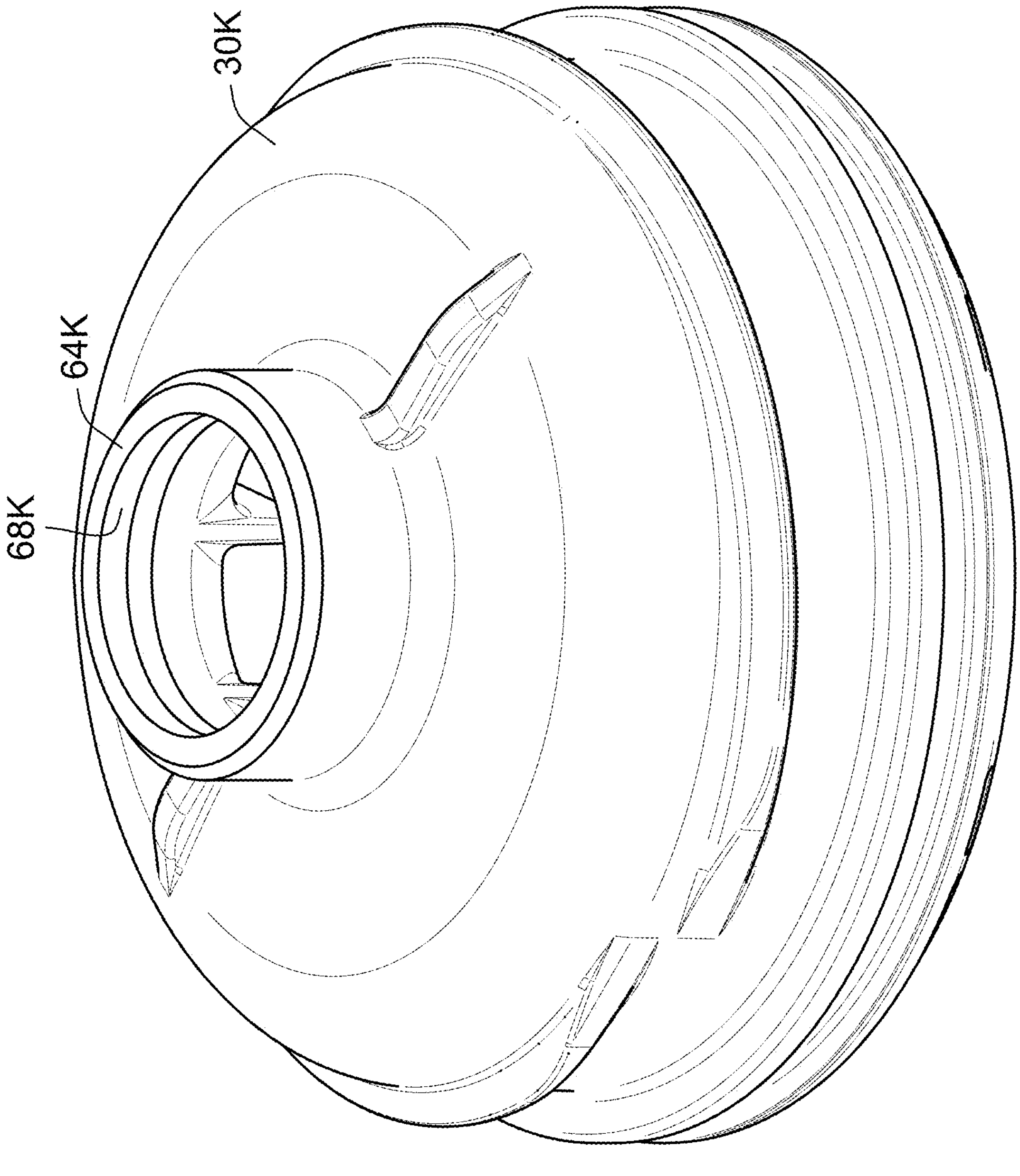
FIG. 21 is an isometric view of a top housing cap member that may be employed as an alternative to that used in the filter cartridge of the first embodiment of FIG. 1 in accordance with a twelfth embodiment of the present invention that employs for the outer seal a radially inward directed seal rather than a radially outward directed seal.
Figure 22:
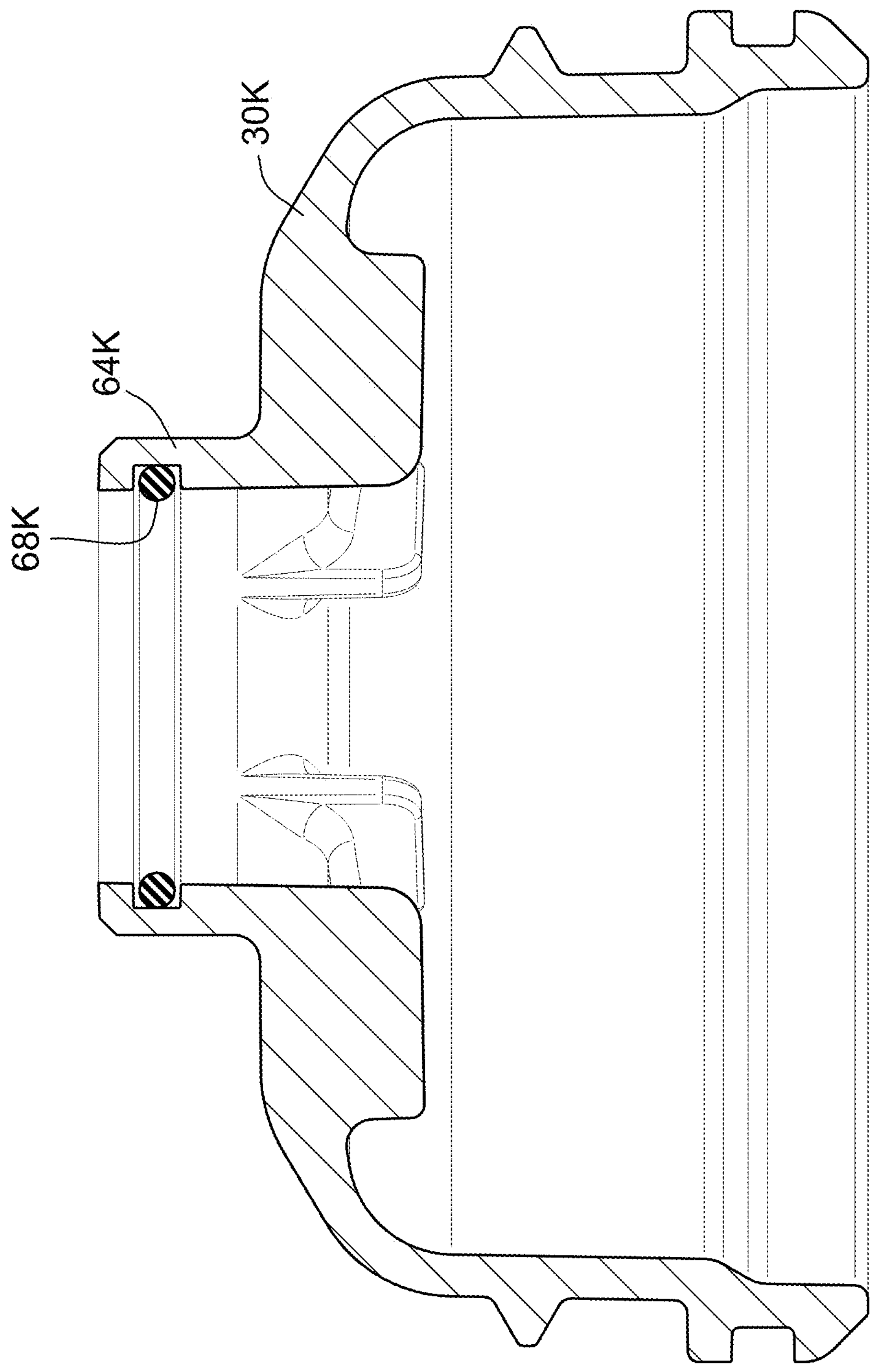
FIG. 22 is a cross section of the cap shown in FIG. 21.

Turning to FIG. 21 and a twelfth embodiment, filter cartridge 10K has a slightly modified upper member in the form of plastic cap 30K in which the outer annular wall 64K provides for an outer radial seal 68K that is radially inwardly directed rather than radially outwardly directed as was the case in the first embodiment.

For example, outer annular wall 64K may include an inwardly radially facing groove that supports a ring gasket (e.g., O-ring) to provide outer seal 68K that faces radially inwardly and is adapted to form a radially inwardly directed seal.

Figure 23:
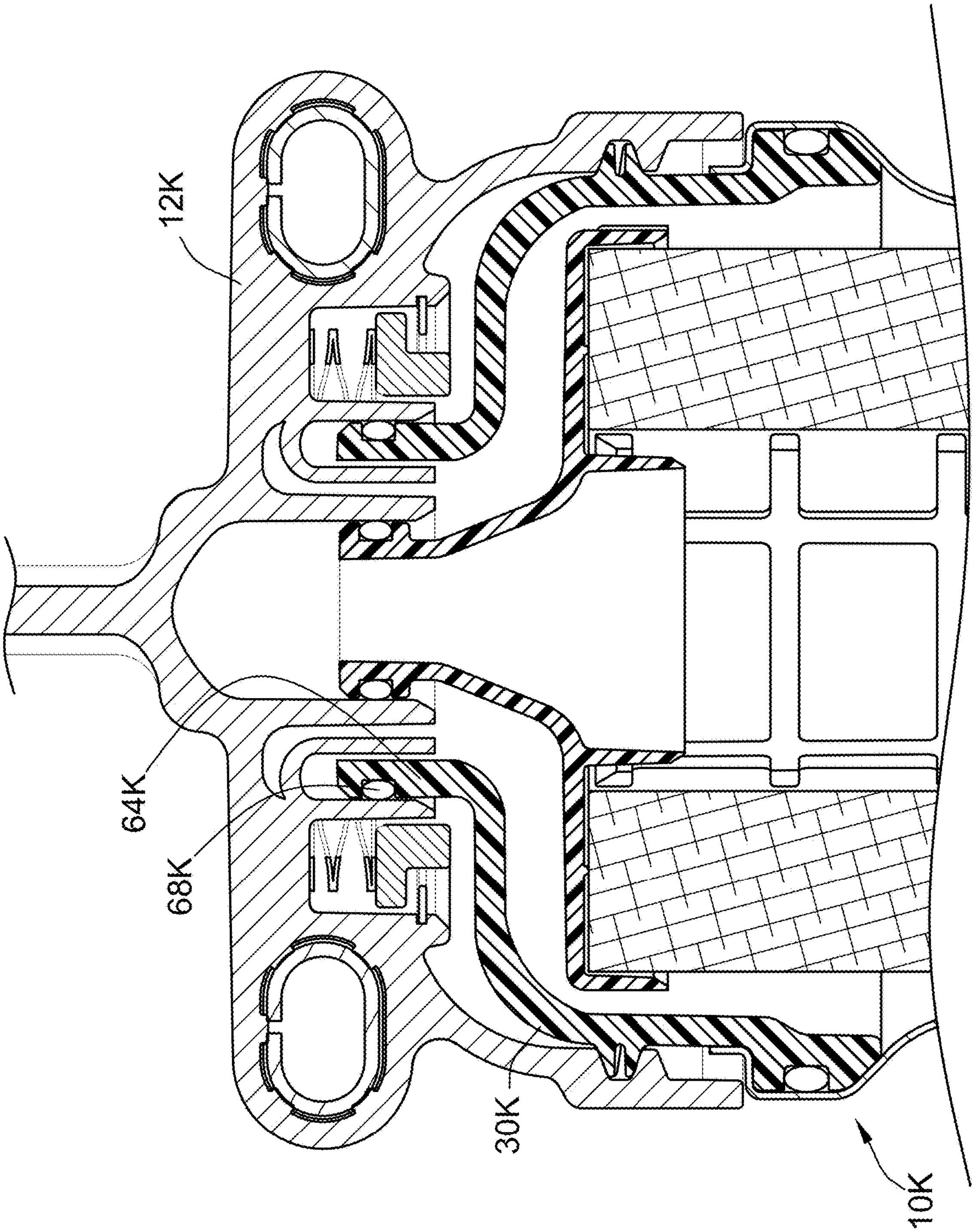
FIG. 23 is a cross sectional view illustrating the cap shown in FIGS. 21 and 22 as employed on a filter cartridge in combination with a filter head to form an assembly.

The radially inward directed seal formed by outer radial seal 68K is shown in the slightly modified filter head 12K in functioning as shown in FIG. 23. Otherwise, the filter cartridge 10K and filter head 12K are the same other than this change in inwardly directed seal used in FIGS. 21-23.

Thus, this provides for an additional means for filter differentiation by changing the sealing location and/or sealing direction in the nipple portion.

Additionally, this is also accomplished with minimal modifications to the filter head or filter cartridge in that same components and parts can be utilized and/or molding tools with possibly different molding inserts (or limited additional tooling) to create differentiated parts. For example, only a change to the top member of the filter housing and a slight modification to the base member are required for these embodiments; while the other parts remain the same, which can be accomplished with mold inserts (or limited additional tooling).

It is also noted that in a similar vein, the top end cap or inner annular wall 66 shown in FIGS. 1-5 could alternatively have a radially inward directed seal, as opposed to a radially outward directed seal to provide an alternative means for filter differentiation.

In each of these examples, the filter cartridges (where different filters are employed), are not usable with corresponding different differentiated filter heads in that the cartridges will bottom out or not form the sealing mating fluid flow interfaces between heads and cartridges.

Figure 24:
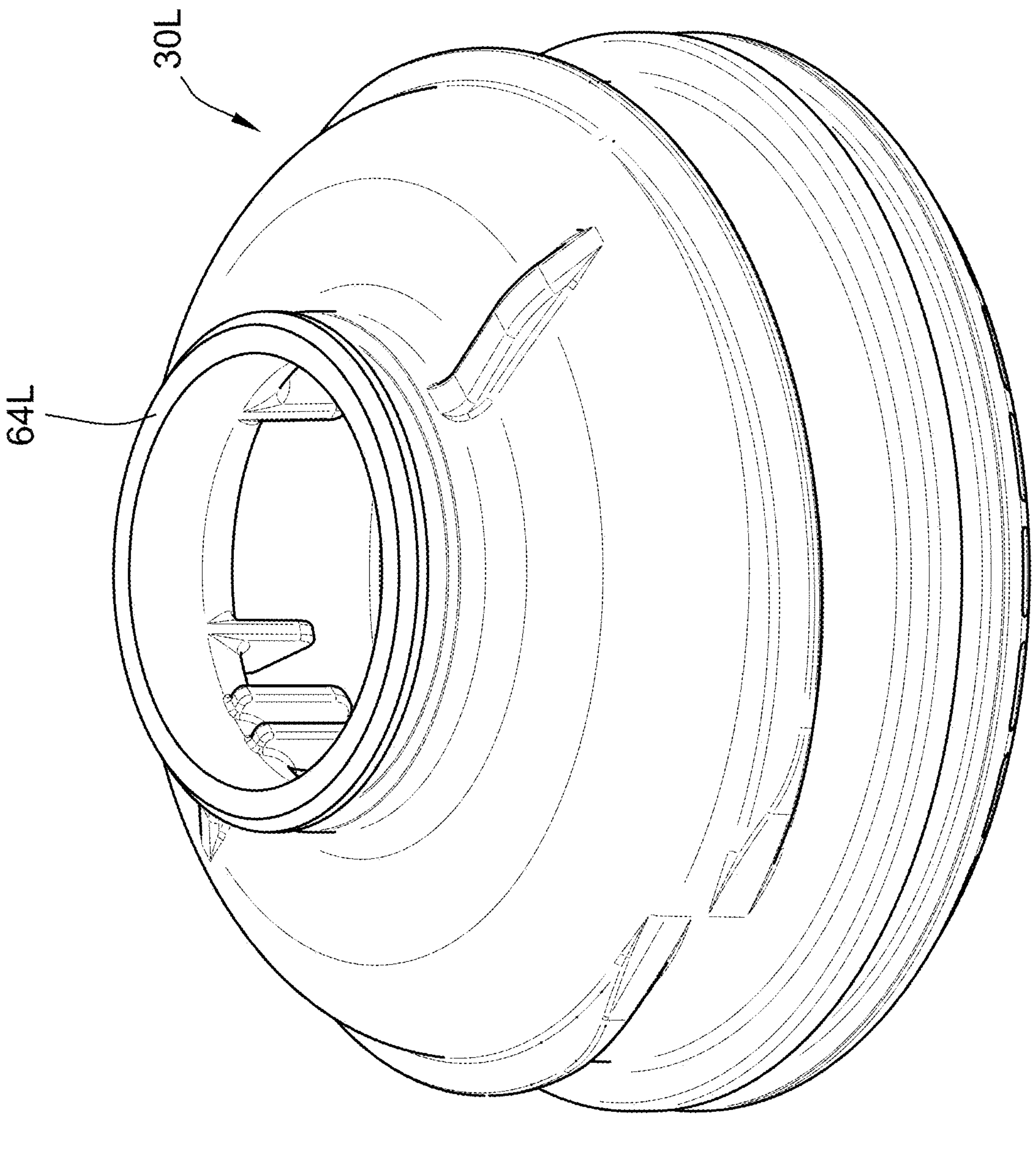
FIG. 24 is an isometric view of a cap member that employs a widened inlet mouth and shorter radial extension of torsion locking detent members that can be employed as an alternative to the top cap used on the filter cartridge shown in the first embodiment of FIGS. 1-5 in accordance with a thirteenth embodiment of the present invention.
Figure 25:
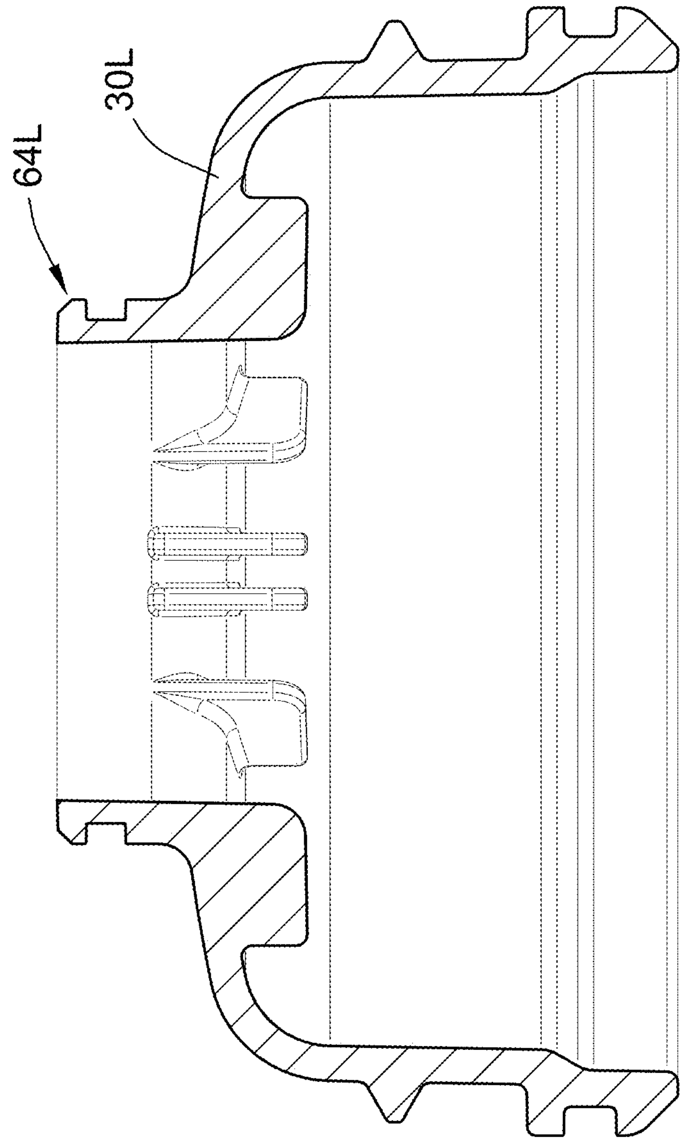
FIG. 25 is a cross section of the cap shown in FIG. 24.
Figure 26:
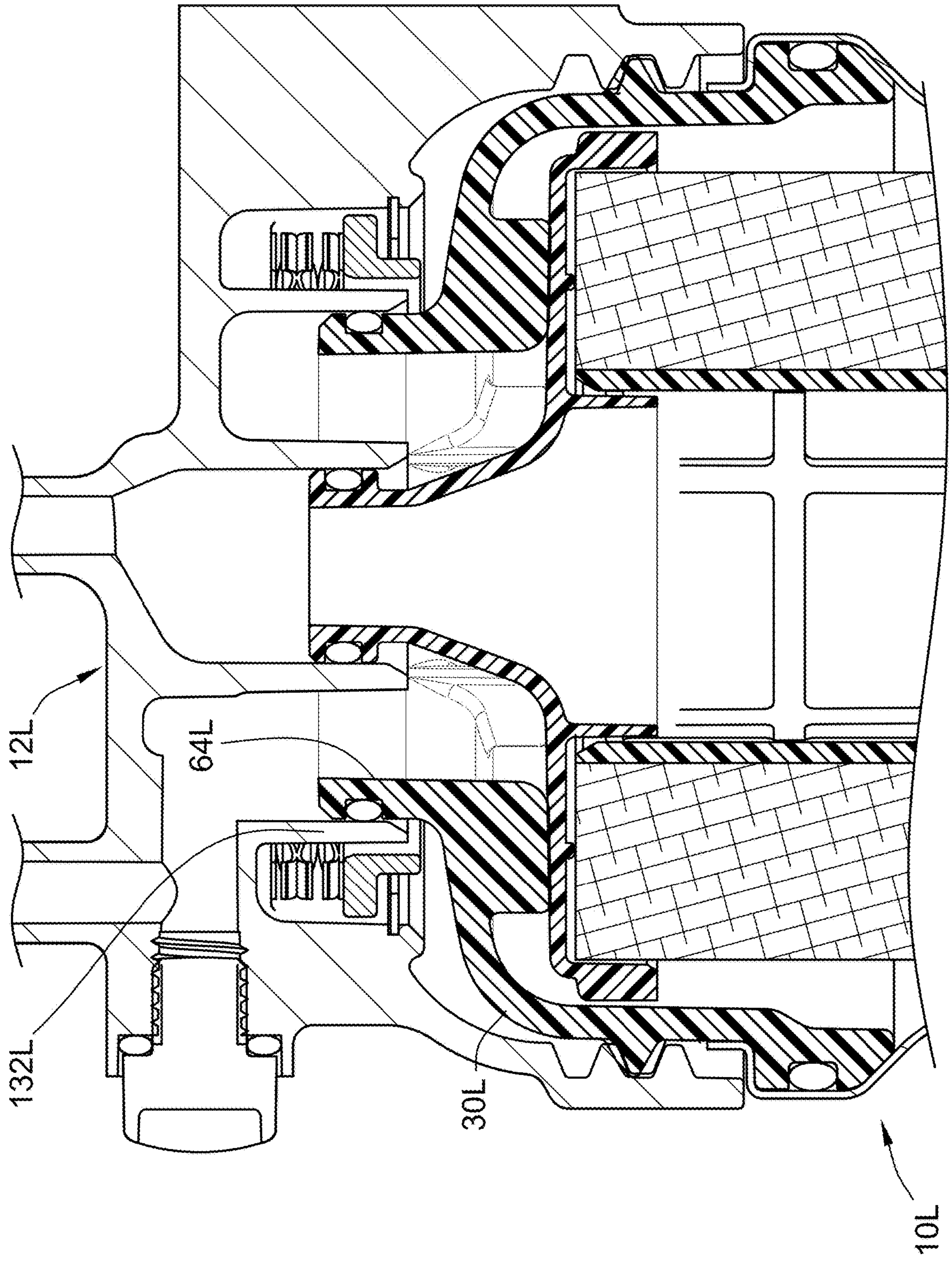
FIG. 26 is a cross section of a top portion of a filter cartridge employing the cap shown in FIGS. 24 and 25 in combination with a filter head to form an assembly.

Turning to a thirteenth embodiment and FIGS. 24-26, filter cartridge 10L is shown to include a larger mouth or a larger relative diameter outer annular wall 64L in upper housing member 30L (e.g., cap). Thus, when employed in a filter cartridge, it can be seen relative to FIG. 1-5 that outer annular wall 64L is too large and would interfere and abut with outer port wall 132 of the filter head. Accordingly, a modified filter head 12L is provided in FIG. 26 with a larger diameter outer port wall 132L.

Also, as a result, it can be seen that the radial extent or span of the torsion lock tabs in this embodiment may be shortened and not expand as long as those employed in previous embodiments.

Thus, this provides yet a further alternative means for filter differentiation.

Figure 27:
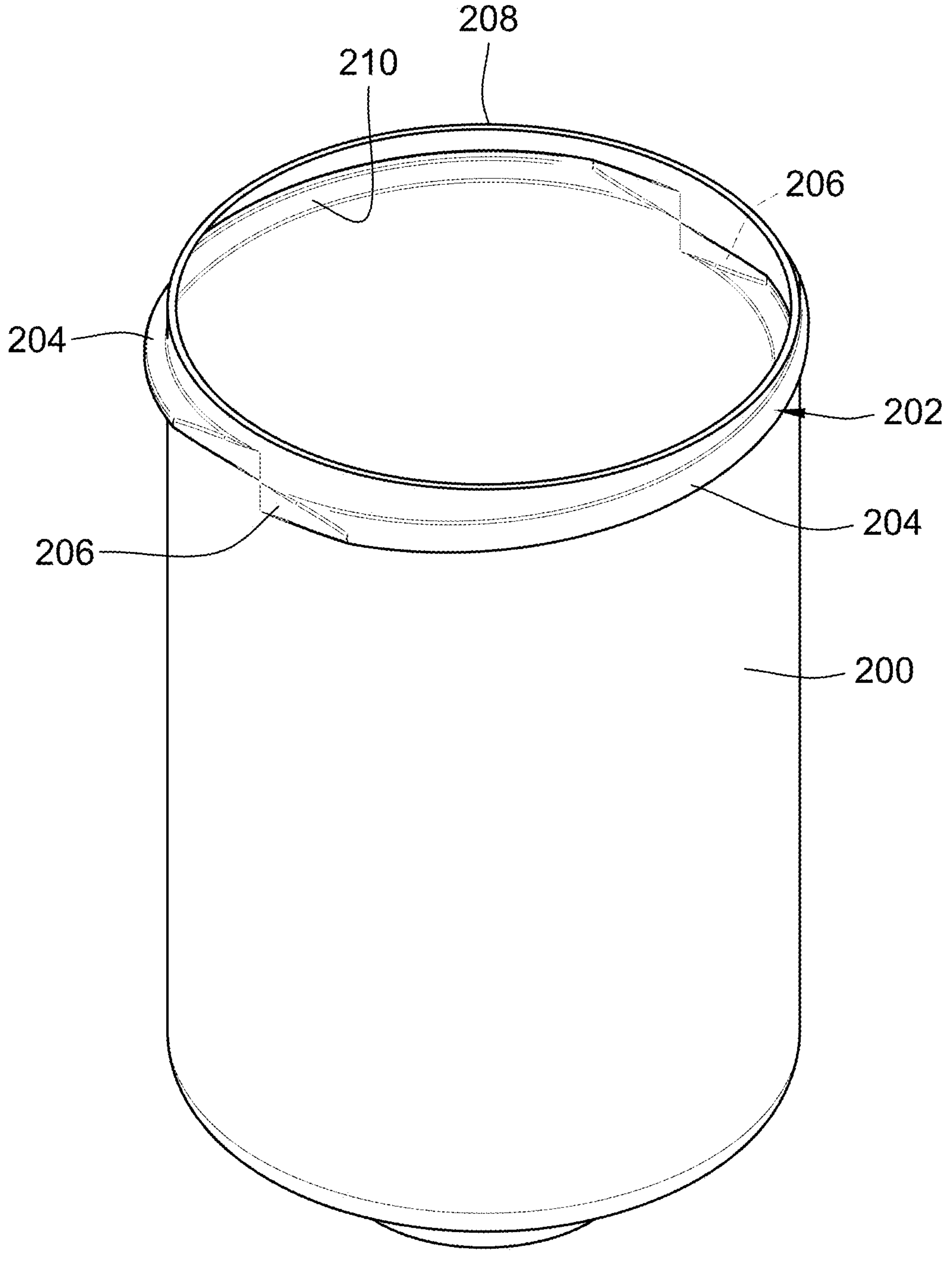
FIG. 27 is an isometric illustration of a lower housing member in the form of a can in which the threads may be formed on the lower member rather than the upper member and it can be used for the filter cartridge of FIG. 1 but with a modified/truncated top plastic cap (e.g.

Turning to the 14th embodiment as shown in FIG. 27, a portion of a filter housing is shown in the form of a canister 200 (also referred to as a "can") that may provide for a lower member of filter housing for use in any of the embodiments herein and in which the lower member rather than the upper member provides for a thread 202. The canister 202 may be formed from plastic material or metal material, but it is preferably deep drawn and formed from sheet metal in this particular embodiment. Alternatively, it may be molded from plastic material, but undercuts in the mold or a split in the mold is necessitated to form the thread 202 or opposed halves would need to be joined together to form the canister 200 in a molded plastic embodiment for manufacturer ability.

Figure 62:
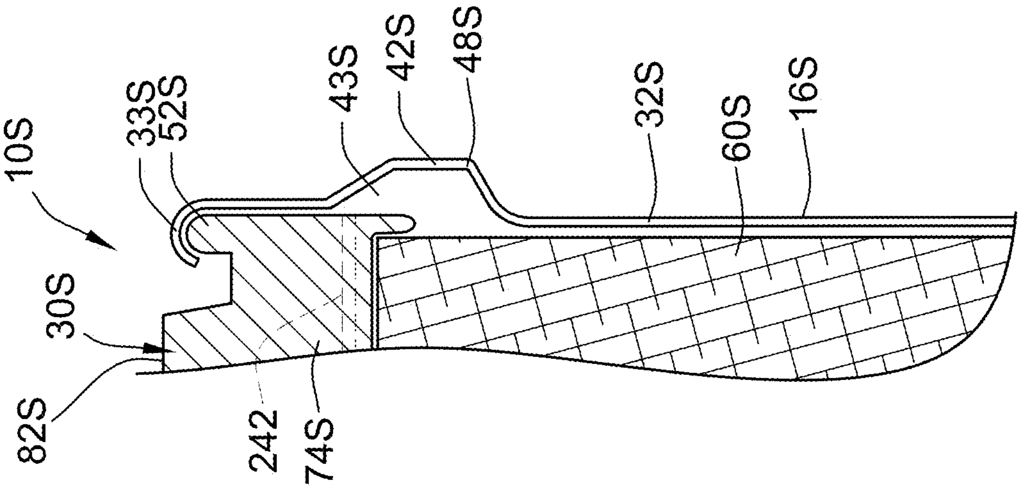
FIG. 62 is a partly schematic cross section of an upper corner portion of the filter cartridge shown in FIG. 61.
Figure 61:
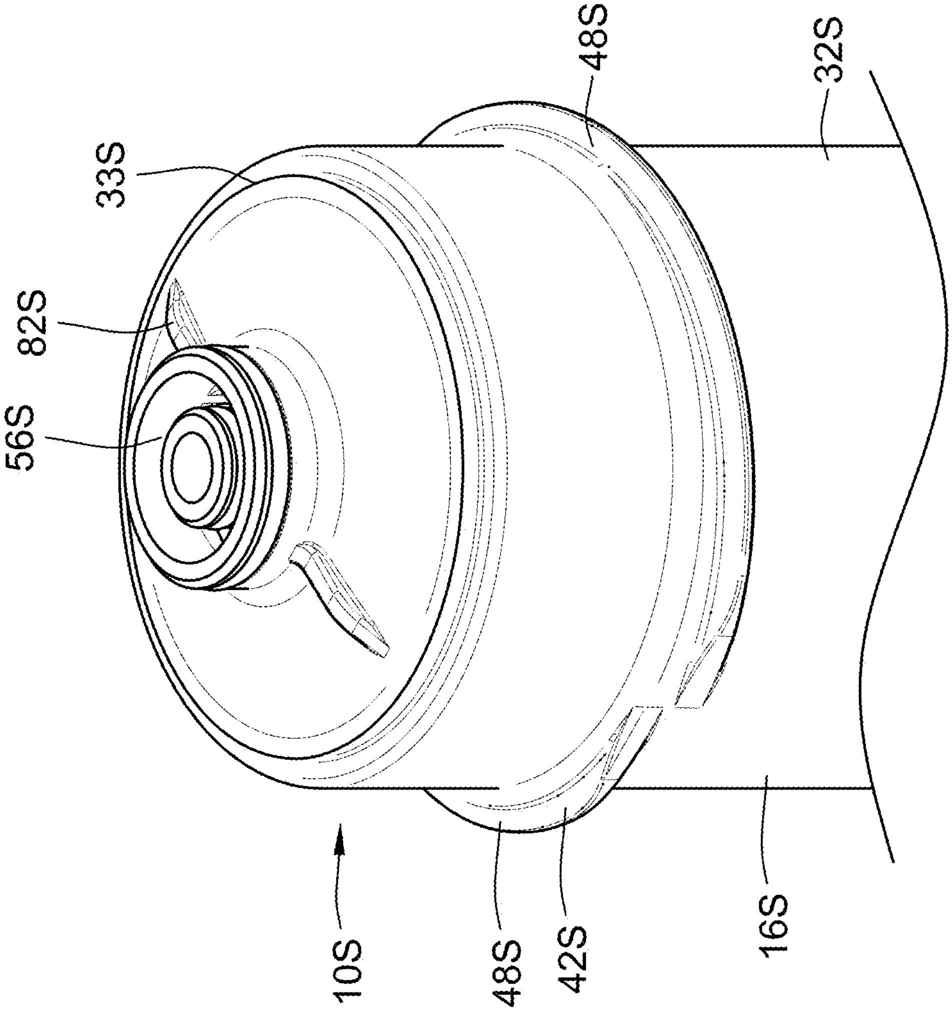

This embodiment of canister 200 can be employed and used with various embodiments disclosed herein. For example, some of the embodiments herein already have the thread on the lower housing member such as shown in FIGS. 61 and 62 (embodiment 23) and FIGS. 63-68 (embodiment 24). In these embodiments, to facilitate the torsion locking feature, the thread 202 is clocked and positioned at a predetermined angular orientation relative to the torsion lock detent member so that during installation, at the end of the threaded travel movement between the filter and the filter head, the torsion lock detent member will engage with the corresponding lock member and lock member detent of the filter head. To facilitate clocking, a less preferred embodiment may employ keys or keying such as shown in U.S. Pat. No. 8,057,669 to Beard et al., entitled Filter Element and Filter Assembly Including Locking Mechanism, and assigned to the present Assignee or affiliate thereof. This includes a key interface between the canister and the filter element to provide for the filter, but requires additional complexity, so does not accomplish the key free feature of various embodiments herein that do not need keying between the top and bottom housing members.

For the canister of FIG. 27, a key free configuration can alternatively be done using the thread configuration and a fixture. For example, the thread 202 includes two spiral ramps 204 that each cover 180° span about a central axis of the filter may each include flats 206 at opposed ends thereof that may be used for locating and positioning the metal canister 200; for example, in a fixture (not shown) so that torsion lock detent members such as shown in any of the embodiments herein may be located and then secured at a predetermined angular orientation. When an upper member such as a cap shown in, for example, any of FIGS. 61-68 are mounted to the canister 200, adhesive may be applied to secure and permanently fix the canister 200 to such upper metal filter housing member to permanently set the predetermined angular orientation between the ramp and torsion lock detent member.

Alternatively, in the case of a metal canister, the free end 208 of the canister 200 which also forms the open end thereof can be wrapped around and permanently secured to the housing upper member. For example, swaging of the metal can into corresponding notches may provide keying that permanently sets the predetermined angular orientation. It is noted that torsion lock detent members are projecting structures and therefore provides structures that can provide for location of the upper housing member relative to the canister.

This embodiment is also usable therefore with earlier embodiments such as that shown in FIG. 1, whereby the cap member can be more truncated in that the annular sidewall of the filter housing can provided entirely by the lower canister member whereas the sidewall was provided by a combination of upper and lower housing members in earlier embodiment. Also unlike earlier embodiments, the threaded region of the present embodiment are on the canister 200 as shown in FIG. 27 as opposed to the cap member 30.

An advantage of the present embodiment is that each of the spiral ramps 204 formed into the canister 200 are hollowed out and formed recesses 210 along the internal surface of canister 200 that can facilitate flow around the upper end of a filter element contained therein. Accordingly, a larger diameter filter pack may be accomplished with this embodiment to provide for more filtration capacity (or allowing a shorter element or a more compact filter element, if desired), and/or it may also be possible to reduce or eliminate the need for integral spacer tabs 102 as shown in the first embodiment for flow around the top end cap due to channels provided along the interior by the thread. Thus, it is understood that canister 200 may be used in place of metal can 32 with a modified cap 30 as for the first embodiment.

Figure 28:
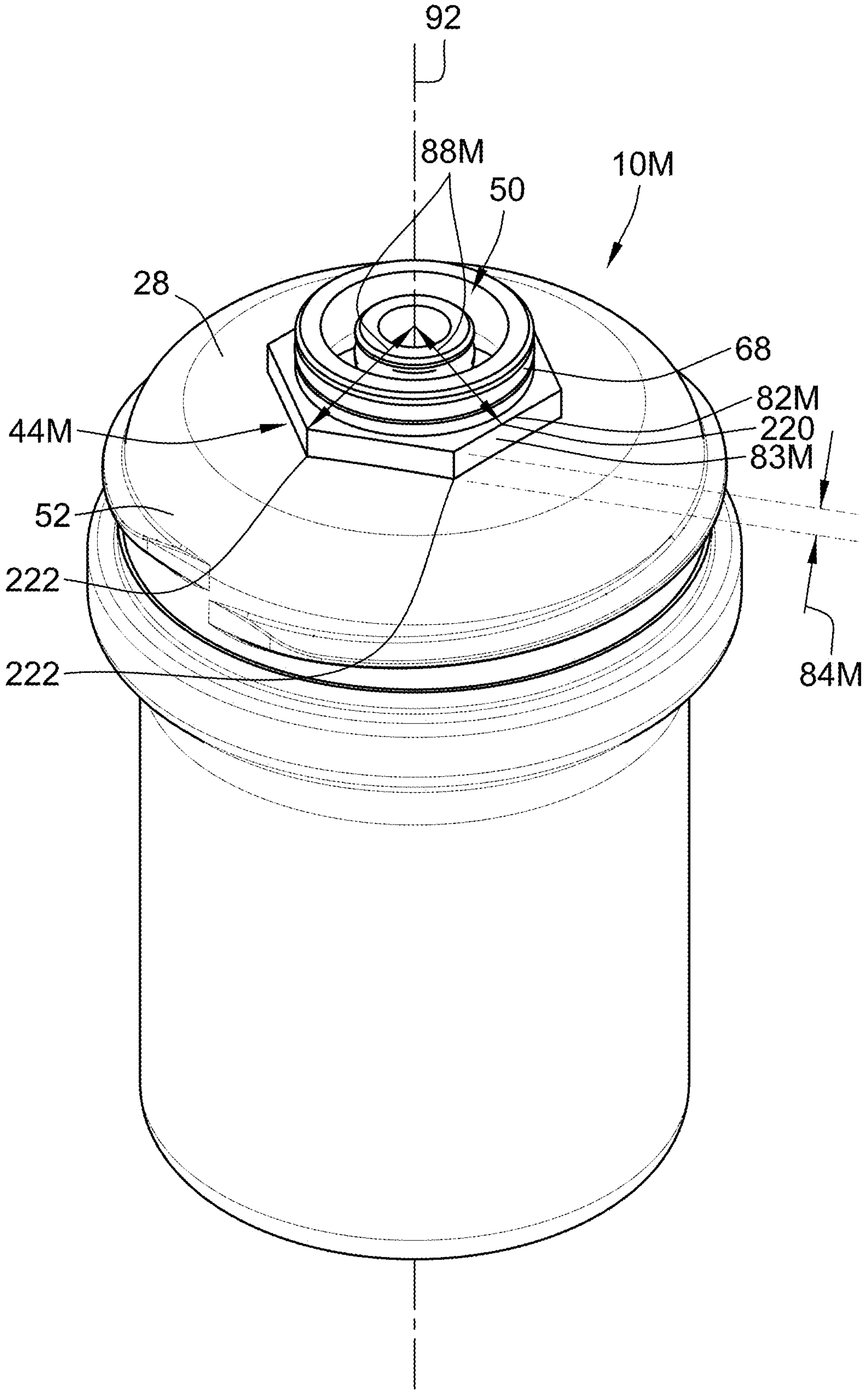
FIG. 28 is an isometric view of the filter cartridge similar to that of the filter cartridge shown in FIGS. 1-5 but with instead a radially acting torsion lock detent member.
Figure 29:
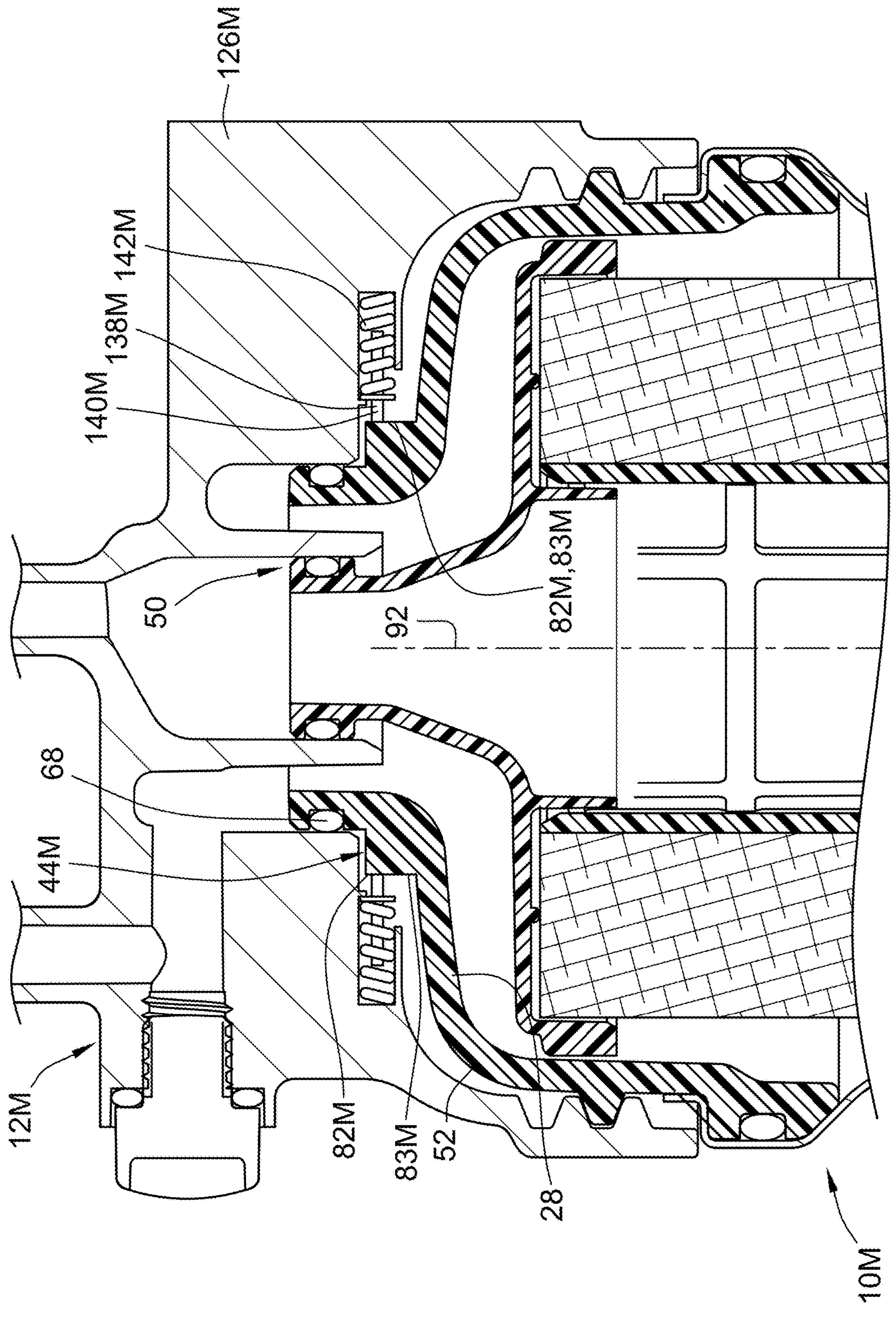
FIG. 29 is a cross-sectional view of a top portion of the filter cartridge shown in FIG. 28 in combination with a filter head to form an assembly.
Figure 30:
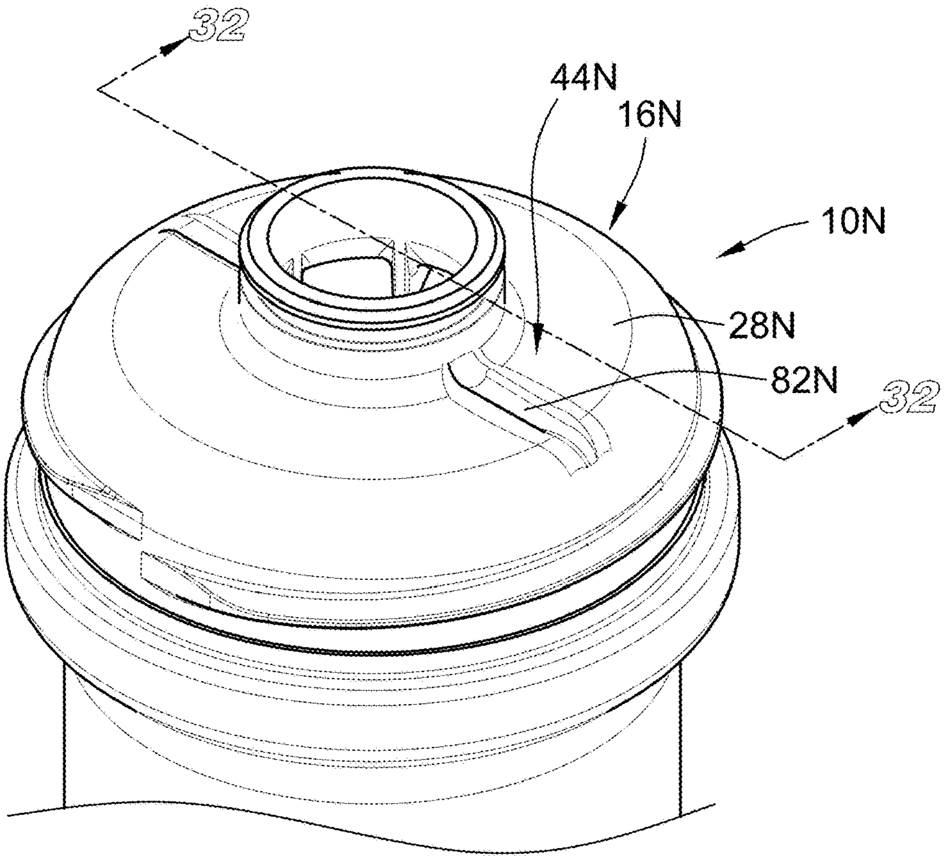
FIG. 30 is an isometric view of a top portion of a filter cartridge in accordance with a sixteenth embodiment of the present invention that is similar to that shown in FIG. 1-15 but with a flow-through key rib to provide a torsion lock tab which defines an internal flow channel for liquid flow.

Turning to the 15th embodiment shown in FIGS. 28-29, a filter is shown in the form of a filter cartridge 10M for use with a filter head 12M that is understood to employ the same components and be the same as filter cartridge 10, filter head 12 and assembly 14 of FIGS. 1-5, other than as indicated below. Accordingly, the disclosure of the first embodiment of FIGS. 1-5 is fully applicable to the present embodiment other than is indicated below Like reference numbers may be used and focus will be had relative to modifications and different parts relative to the first embodiment.

The filter cartridge 10M is identical to the filter cartridge 10 of the first embodiment other than the configuration of torsion lock detent member 44M, which in this embodiment is configured for radial action rather than axial action as in the first embodiment. In this embodiment, nipple portion 50 also extends above the radially acting torsion lock detent member 44M and also, the outer radial seal 68 can also be located above torsion lock detent member 44M. Likewise, torsion lock detent member 44M is disposed axially above the shoulder region 52 which also is dome-shaped in this embodiment.

To facilitate radially directed locking action, the radially acting torsion lock detent member 44M, comprises a raised wall 82M that extends from the top annular end wall 28 with a radially outwardly directed detent face 83M having a first portion 220 located at a different diameter than a second portion 222 relative to central axis 92.

For example, raised wall 82M may extend an axial height 84M of between 2 and 15 millimeters. The first portion 220 may be located at a different diameter from the second portion 222 by a separation span 88M that provides a diameter difference of between 0.5 and 4 millimeters.

As a consequence, a spring loaded lock member 138M may be arranged on the mounting base member 126M of filter head 12M, that moves in the radial direction as opposed to the axial direction. Lock member 138M includes lock member detent 140M that is movable radially and extends radially relative to central axis 92. Lock member detent 140M is arranged to slide along the raised wall 82M and detent face 83M during rotational and threaded engagement between the filter head 12M and filter cartridge 10M. During rotation and torque applied by a mechanic, and as the lock member 138M actuated by spring 142M slides along detent face 83M, additional force is necessitated to torque or twist the filter to force the lock member detent 140M radially outward as the lock member detent 140M transitions from the smaller diameter first portion 220 to the larger diameter second portion 222.

Preferably, the raised wall 82M may take the form of a raised polygon plateau and more preferably an equilateral polygon such as a hexagonal polygon as shown herein, or other polygonal shape as may be desired.

As a consequence, when the filter cartridge is engaged, the lock member detent 140M is spring-loaded against the detent face 83M and will require more force as it approaches the larger second portion and as it goes around the corner of the polygonal surface. Upon lock member detent 140M passing the corner (e.g. larger diameter portion 222), the torque required drops off as the lock member detent 140 starts to assist with installation and move toward the smaller diameter first portion 220 where the torsion lock detent normally wants to reside.

Accordingly, it is desirable to locate the predetermined angular orientation for the fully installed position of the lock member detent 140M and the filter cartridge 10M to be situated such that lock member detent 140M resides at the smaller diameter first portion 220 in the fully installed and secured position.

This embodiment, like the first embodiment, shows a one-half turn element (thus between a quarter and one-half turn element) and lock member detent 140M would therefore be positioned in the region of the smaller diameter first portion 220 in the installed secured position.

Turning to the 16th embodiment shown in FIGS. 30-33, a filter is shown in the form of a filter cartridge 10N that is understood to employ the same components and be the same as filter cartridge 10 (and also usable with the same filter head) of FIGS. 1-5 other than as indicated below. Accordingly, the disclosure of the first embodiment of FIGS. 1-5 is fully applicable to the present embodiment other than is indicated below. Like reference numbers may be used and focus will be had to modifications and different parts relative to the first embodiment.

In this embodiment, the only difference is the configuration of the torsion lock detent member 44 and, in particular, in the form of torsion lock tabs 82N are shown to be hollowed out along the internal surface to provide for additional flow capacity along the internal surface of the filter housing 16 and in this embodiment.

Figure 31:
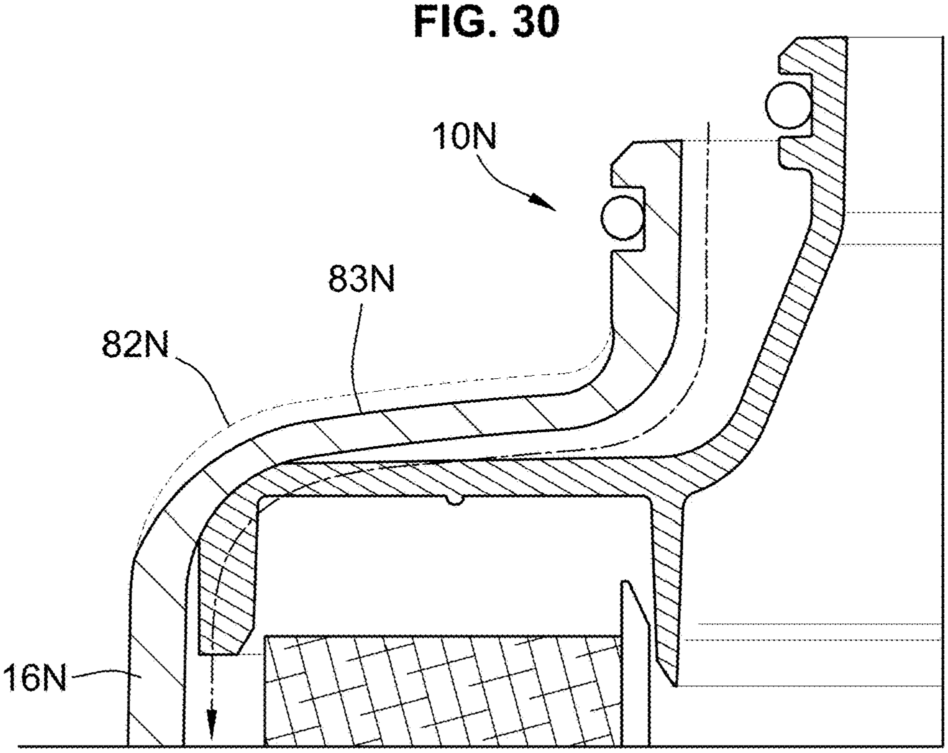
FIG. 31 is a schematic cross-sectional view through a portion of the filter cartridge shown in FIG. 30 with the internal filter element axially abutting the filter housing at the top end, with the flow channel indicated schematically.
Figure 32:
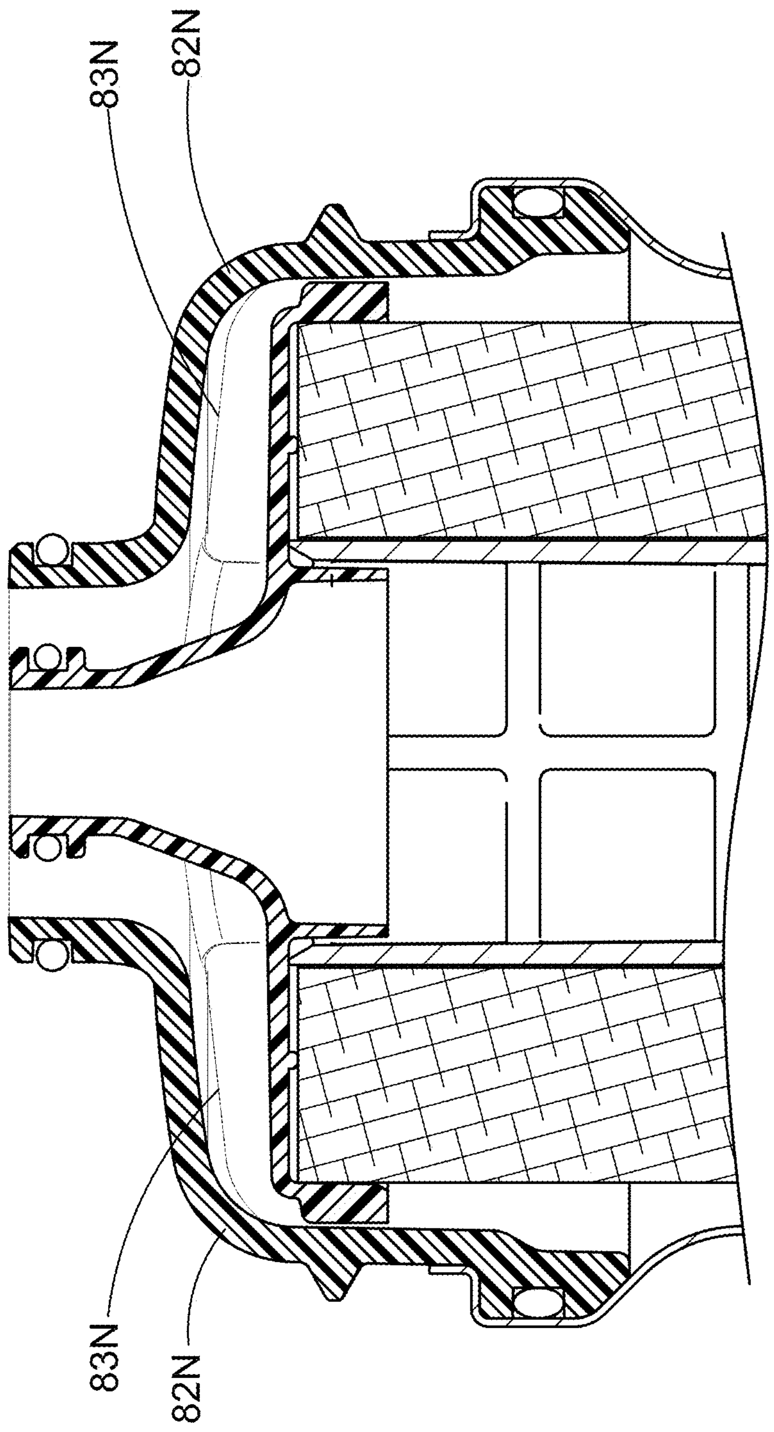
FIG. 32 is a cross-section view of a top portion of the filter cartridge shown in FIGS. 30 and 31 but with the internal filter element axially displaced (due to engagement with a filter head not shown in FIG. 32)
Figure 33:
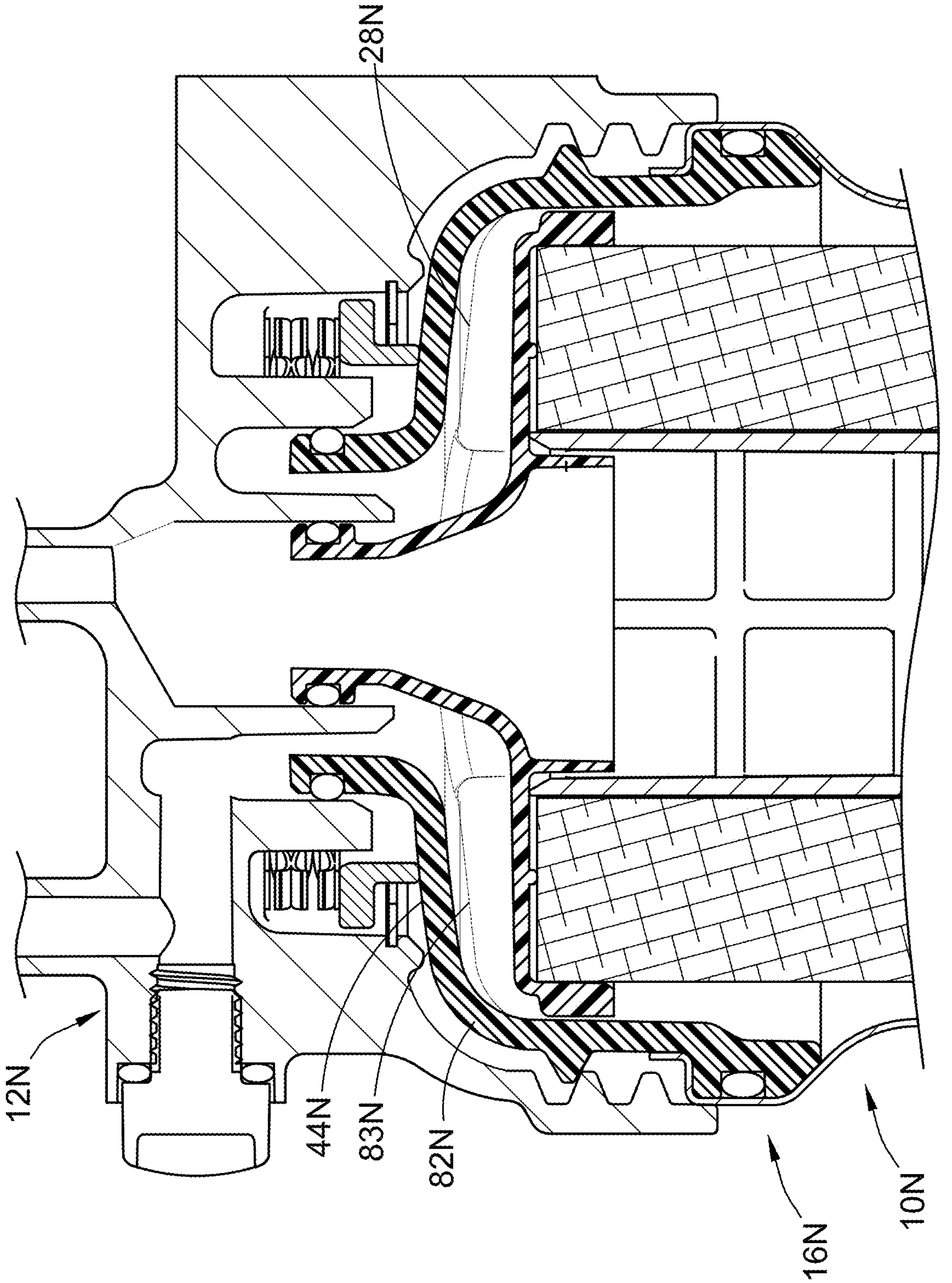
FIG. 33 is an illustration of the filter cartridge shown in FIG. 30 in combination with a filter head to form an assembly.

This can be accomplished by forming integrally the torsion lock detent member 44N into the top annular end wall 28N as shown in FIGS. 30-33. This provides a flow channel 83N along the internal surface of the filter housing 16 and provides for continuous fluid communication around the internal filter element and filter housing even if the internal filter element is spring-loaded in complete abutting relation to the top cap member such as shown in FIG. 33 with the channel being schematically indicated and overlaid in FIG. 31.

The channel 83N (or channels 83N when multiple torsion lock tabs are used), provide a flow area collectively that is matched to (e.g. equal or at least 80%) or greater than that of the inlet port and/or outlet port flow area so as to not provide undue flow restriction. A collective flow area (e.g. flow area of the inlet port, the outlet port and/or of the channels 83N) for most typical sized elements may be at least 50 and more preferably at least 100 square millimeters (for many sizes, flow area will not exceed 200 square millimeters). Preferably at least two such torsion lock tabs are provided although one tab may be provided.

An advantage of this configuration is that it allows for additional flow around the top end cap of the internal filter element in use. This can be used to start flow even if the filter cartridge is bottomed out or to provide for flow around the filter cartridge in a bottomed-out relationship as shown in FIG. 31 or provide for additional flow when there is spacing such as shown in FIG. 32. An advantage of this feature is that an additional axial length of filter media that can be employed. For example, the ring of filter media may extend several additional millimeters to provide for additional filtration capacity. This can be seen with the schematic indications indicated in FIGS. 31 and 32.

Figure 34:
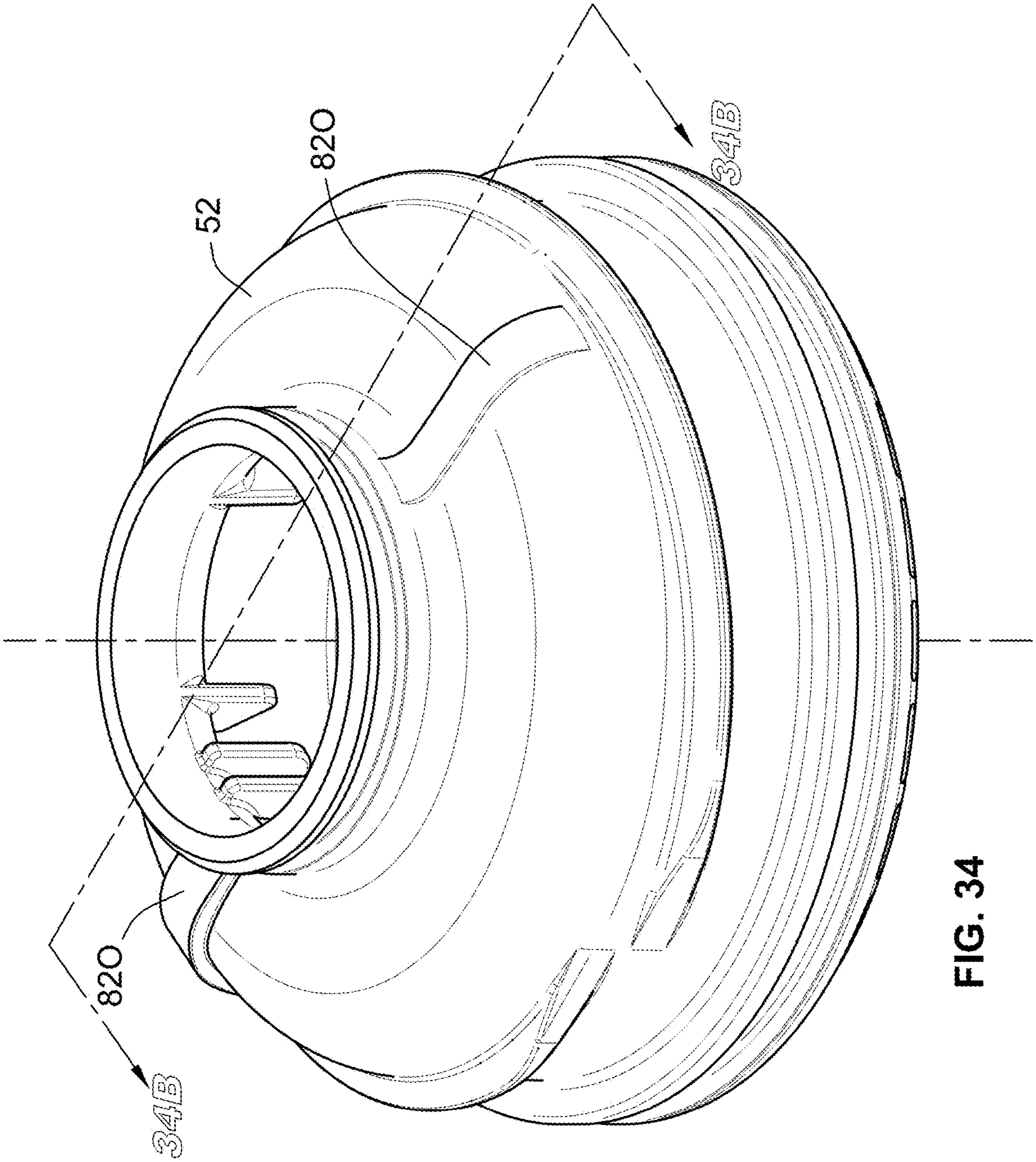
FIG. 34 illustrates an isometric view of a top cap member with a flow through torsion locking rib to provide a tab similar to that shown in FIG. 30 but with a further extension that rib but is otherwise the same as that shown in FIG. 30 in accordance with a seventeenth embodiment of the present invention.
Figure 35:
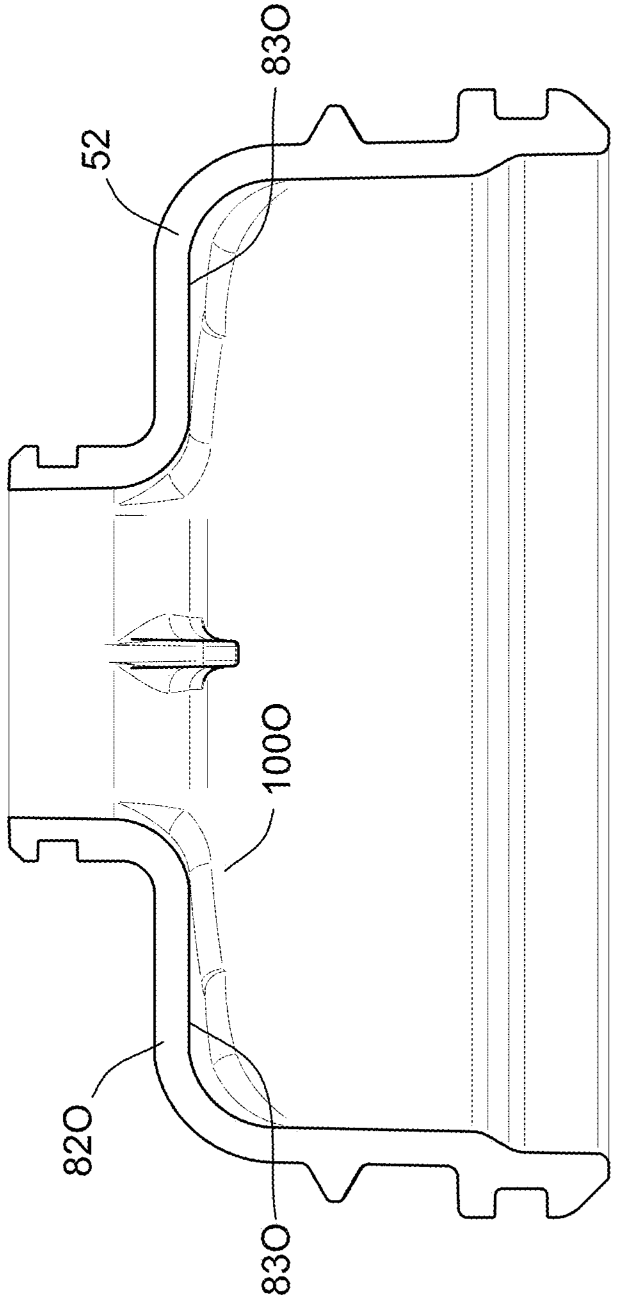
FIG. 35 is a cross section of the top cap member shown in FIG. 34.

Turning to FIGS. 34, a 17th embodiment is shown similar to that of FIGS. 30-33 but with a slightly different configured torsion lock tab that is hollowed out and extends around the shoulder region 52. For example, a torsion lock tabs 82O provide additional radial length and span and include a hollowed-out corner region that can facilitate even additional flow along the internal surface. Additionally, integral axial spacers 1000 along the inner peripheral surface to establish a set spacing with the channel 83O providing additional flow capacity.

Turning to the 18th and 19th embodiments shown in FIGS. 36-40, deformable threads are illustrated that can be incorporated into the filters of any of the various embodiments disclosed herein. Accordingly, the disclosure of FIGS. 36-40 and specifically the threads employed on the filter and the filter head illustrated may be employed in any of the embodiments disclosed herein.

As shown, the thread 42P of a filter cartridge 10P (which filter cartridge 10P may be otherwise the same as any of the filters shown in any of the other embodiments such as filter cartridge 10 of FIG. 1 for example) is a resiliently deformable thread member.

For example, the resiliently deformable thread member 42P may be formed from resilient plastic material.

Figure 37:
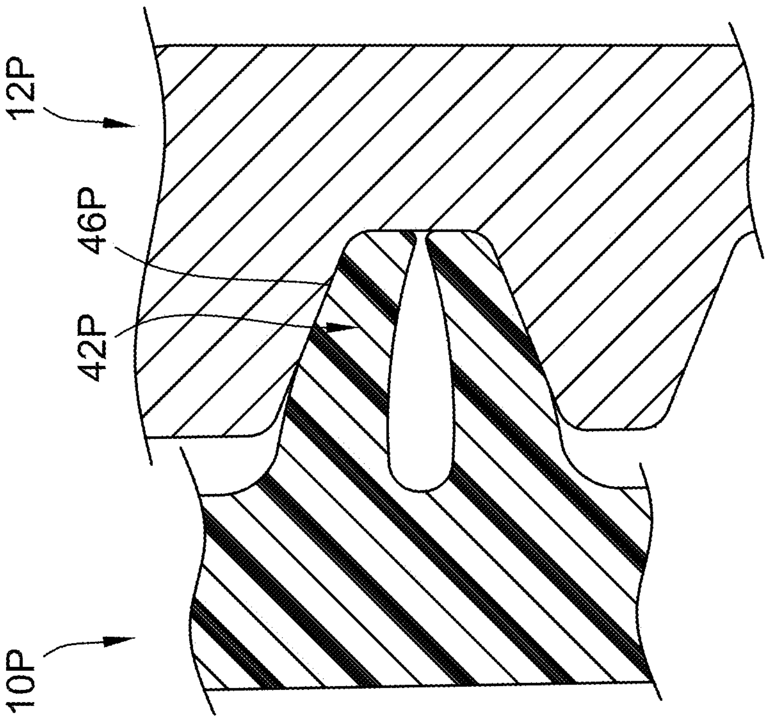
FIGS. 36-40 illustrate cross-sectional views of the thread region of a portion of the filter cartridge and a portion of the filter head (e.g., the corresponding thread and thread rap provided by a helical groove in the filter head) that can be employed on any of the numerous embodiments disclosed in the present patent application as an alternative, with the thread being partially deformable to aid in securement in combination with the torsion lock detent member or even potentially eliminating the torsion lock detent member in accordance with eighteenth and nineteenth embodiments of the present invention.

To provide for resilient deformation, the spiral thread member 42P may comprise a spiral and preferably helical thread rib 48P (and in the case of a half-turned cartridge, two spiral thread ribs), which can comprise first and second flange members 49P that also may extend in a spiral and define a spiral channel 51P therebetween. The first and second flange members 49P are adapted to be resiliently pinched together to narrow the spiral channel as can be seen in FIG. 37.

For example, when mounted on a corresponding filter head 12P, which defines a thread ramp as part of a spiral receiving thread channel 46P, the width of the spiral receiving channel 46P is configured to be tighter or narrower than the spacing of the flange members 49P such that during threading engagement, the resiliency contained in the plastic material of thread 42 allows for deflection of the tips of flange members 49P inwardly which provides for tight frictional engagement between the outer surfaces of flange members 49P and the opposed facing walls defining the spiral receiving channel 46P. The flange members 49P are put under resilient force with this deflection increases the frictional force.

In an embodiment, the tip of the thread member such as the tips of flange members 49P are configured to resiliently deflect between 0.1 and 3 millimeters when installed in the mounting head of 12P, and preferably greater than ½ mm. This can be measured by comparing the condition of the tips of the flange members 49P out of the spiral receiving channel 46P as shown in FIGS. 36 and 37, as compared with the spacing of the flange members 49P when pinched and installed within the filter head and spiral receiving channel 46P.

The material of the thread 42P may also have a high frictional coefficient to provide substantial engagement and to prevent backing off when installed and/or similar high frictional conditions may be present on the surfaces and opposed wall faces of the spiral receiving channel 46P.

The threads can intentionally deform during the act of installing the element to the filter head. This can help with the rigidity of the connection between the filter cartridge 10P and the filter head 12P, which is valued from a vibrational standpoint. The partially deformable thread 42P can also aid in preventing the filter cartridge 10P from backing off and inadvertently becoming dislodged from the filter head 12P during use and when subjected to vibration from the vehicle engine or otherwise. In some embodiments it may be even strong enough with sufficient frictional force with the resilient deformation effect to even eliminate the need for torsion lock detent members in some embodiments and accomplish attachment without separate torsion locking.

Figure 36:
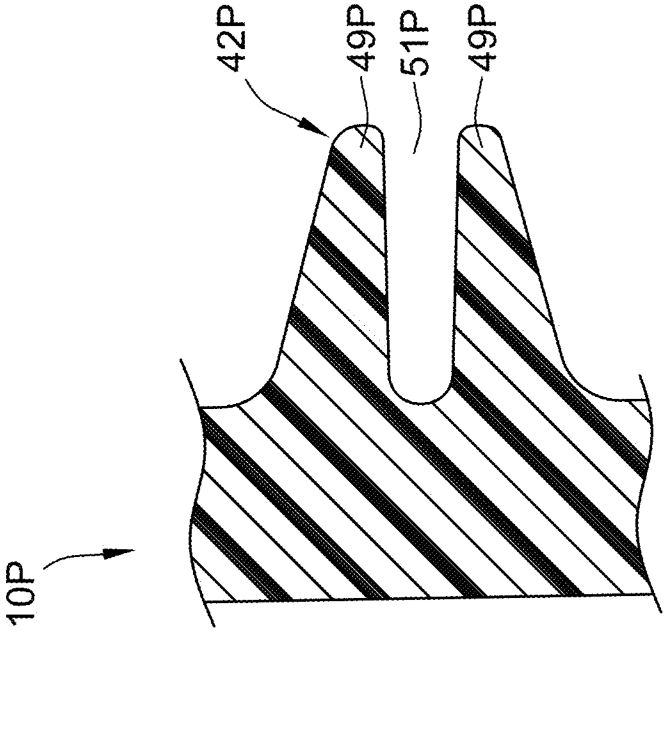
Figure 39:
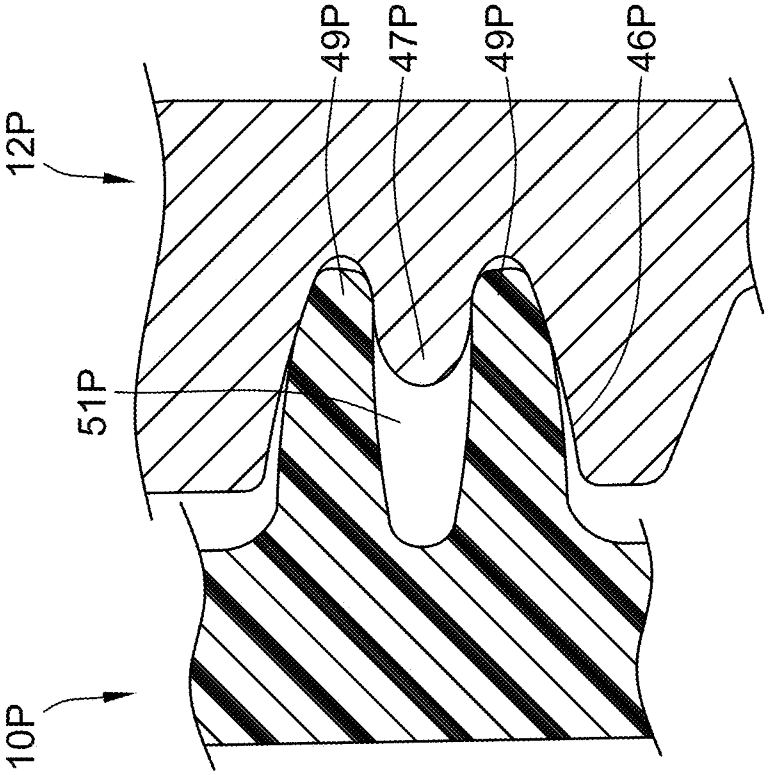
Figure 38:
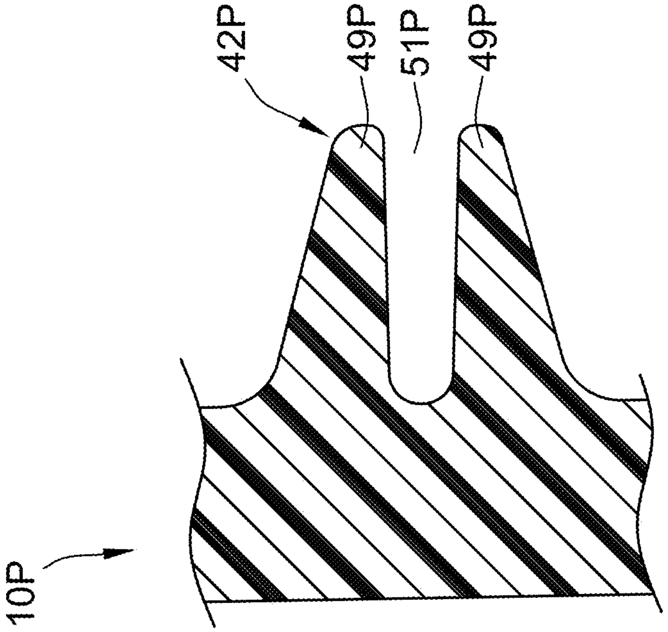
Figure 40:
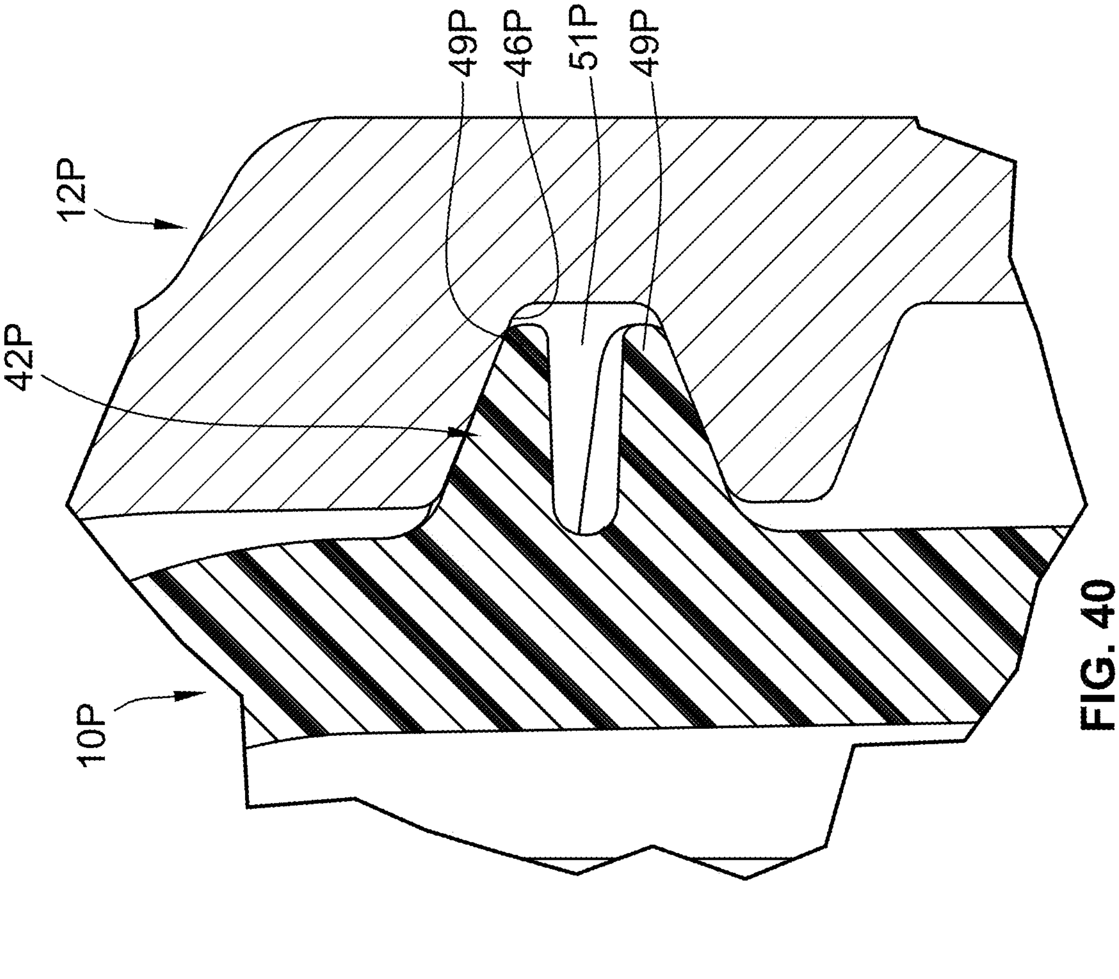

As shown in FIG. 38, a further alternative is shown to that shown in FIGS. 36 and 37 in that rather than the tips of the flange members 49P being pinched together, alternatively, the filter head may include additionally a wedge 47P positioned within the spiral receiving channel that is configured to resiliently spread apart flange members 49P. The effect is the same in that the resilient deformation in this acts in the opposite direction of that of the previous embodiment, but similar effects by causing increased frictional engagement to prevent the filter cartridge from inadvertently backing off from the filter head can be obtained.

Figure 42:
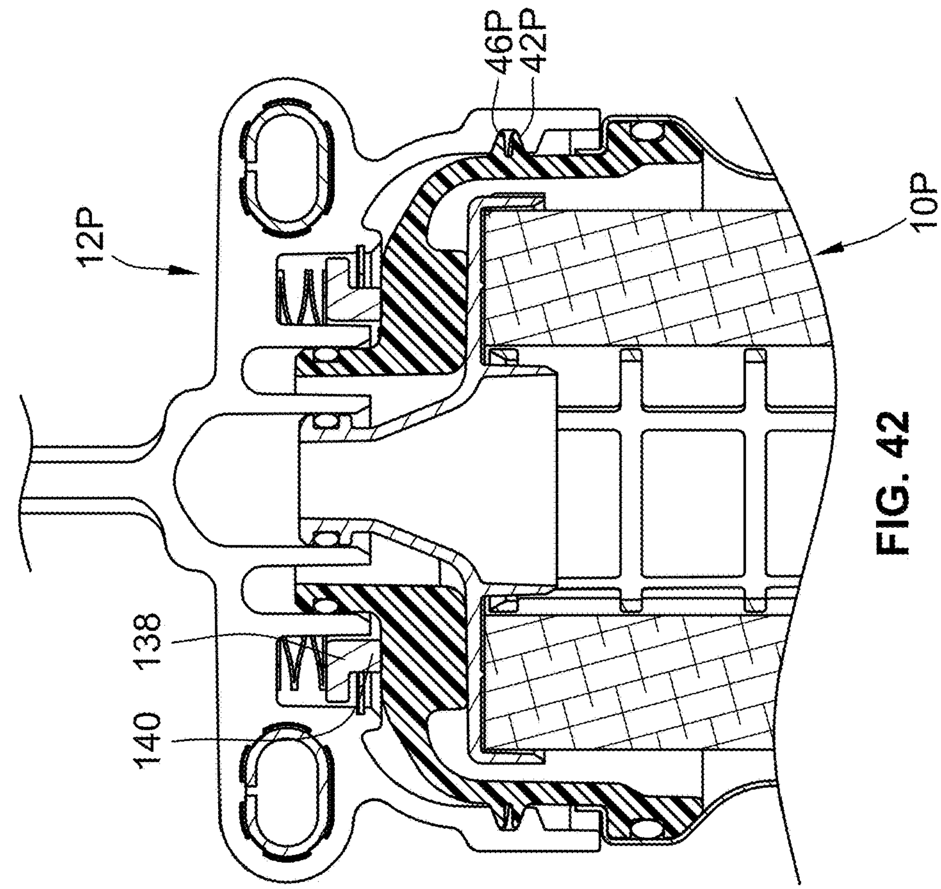
FIG. 42 is a cross-section view of a top portion of the filter cartridge shown in FIG. 41 in combination with a filter head to form an assembly.
Figure 41:
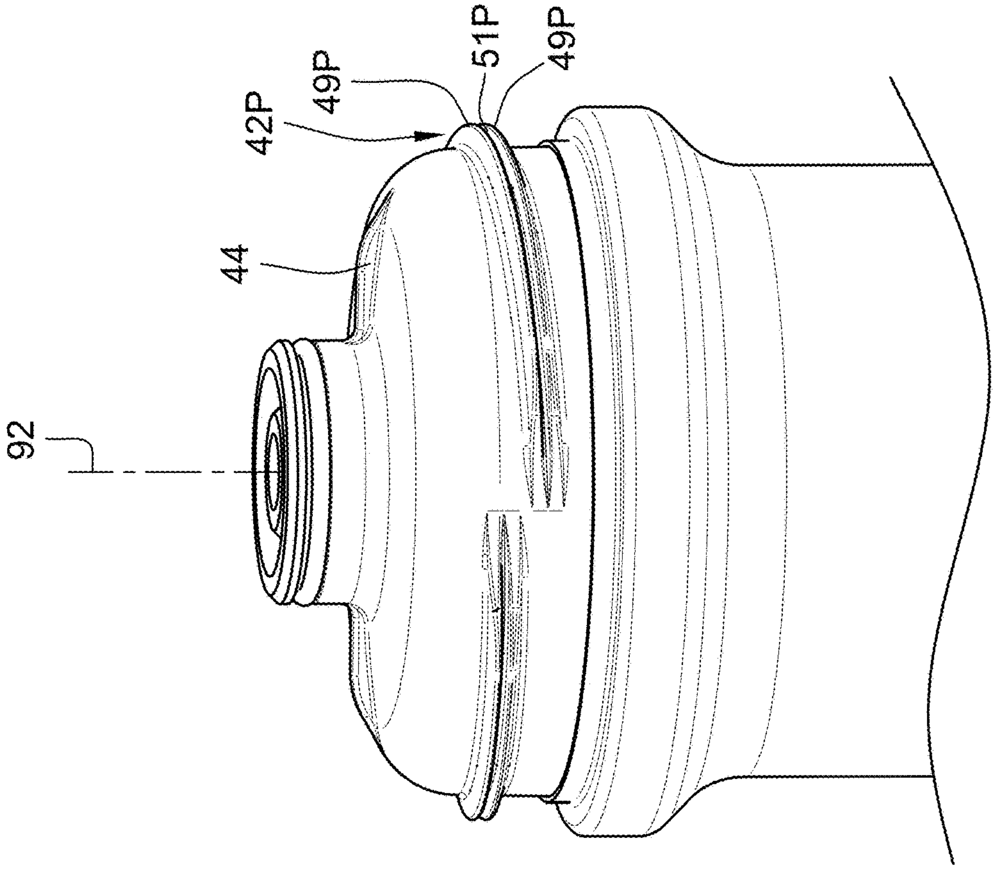
FIG. 41 is an isometric view of an example of a filter cartridge employing the thread shown in FIGS. 36-40 in which the filter cartridge is otherwise similar to that shown in FIGS. 1-5.
Figure 43:
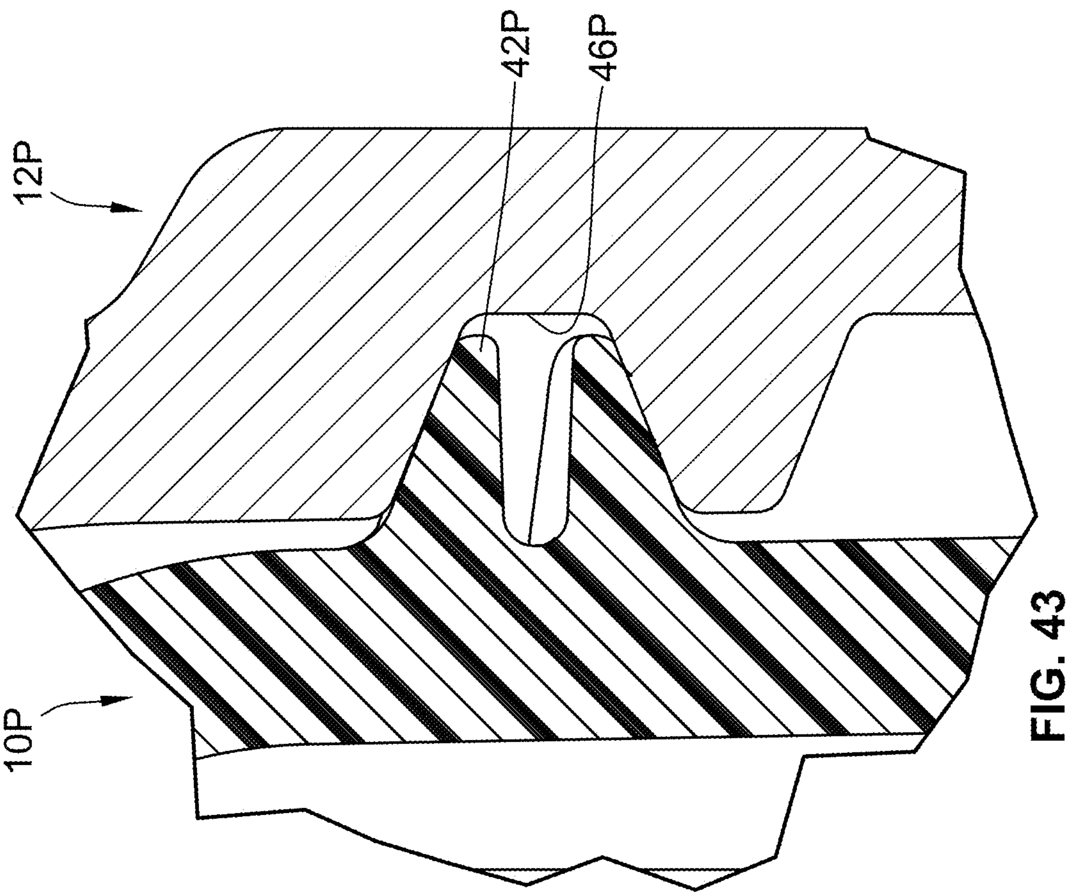
FIG. 43 is an enlarged cross-section view of a portion of FIG. 42.

Turning to FIGS. 41 and 42, it can be seen that the flange members 49P may form two separate helical thread ribs 48P. Each of the helical thread ribs 48P may each extend 180 angular degrees about the central axis 92 and on opposite sides to provide for a filter cartridge that is a half-turned filter cartridge. A rotational turn of the cartridge of one-half (e.g. 180 degrees) completes attachment (or detachment in the reverse direction) between the filter cartridge 10P and the filter head 12P.

Figure 45:
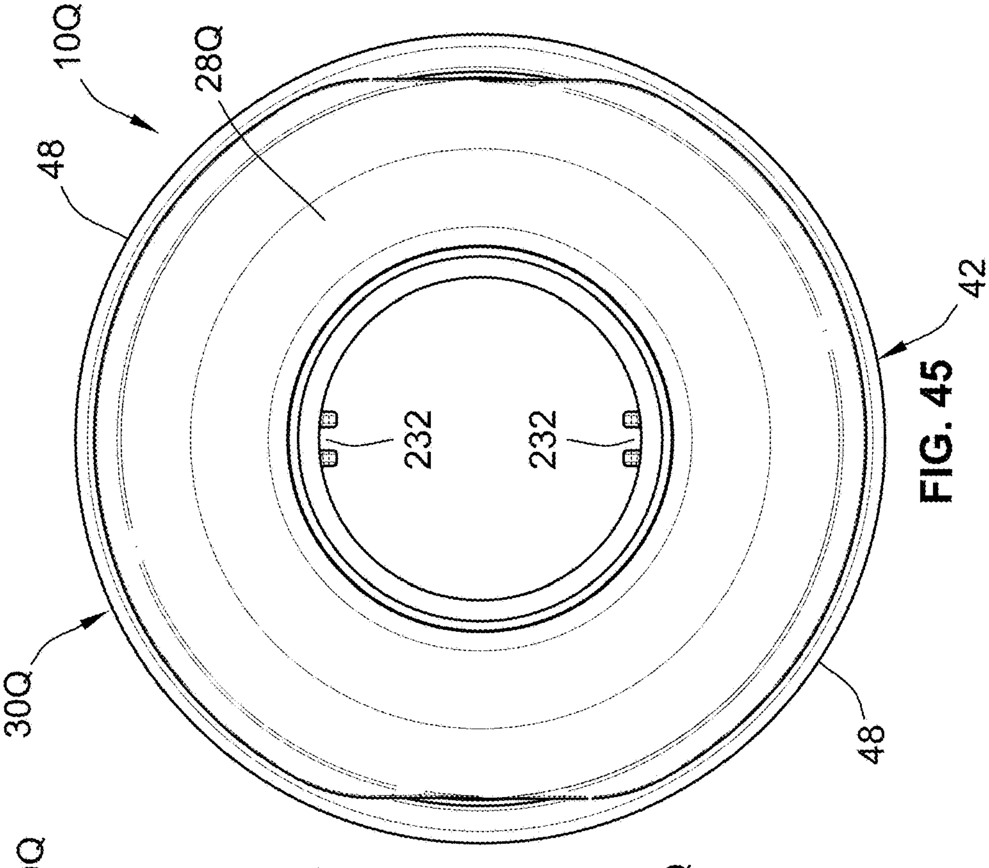
FIG. 45 is a top view of the top cap member employed in the filter cartridge shown in FIG. 44.
Figure 44:
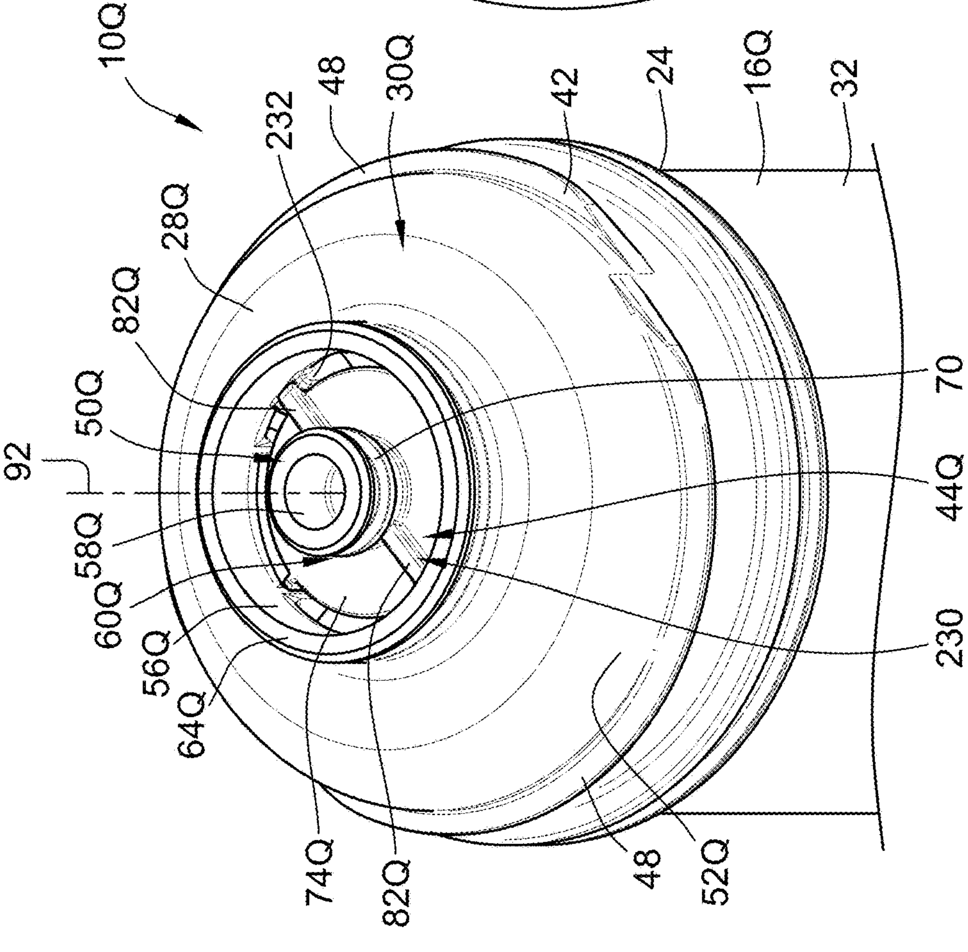
FIG. 44 is an isometric view of a top portion of a filter cartridge in accordance with the twentieth embodiment of the present invention.
Figure 46:
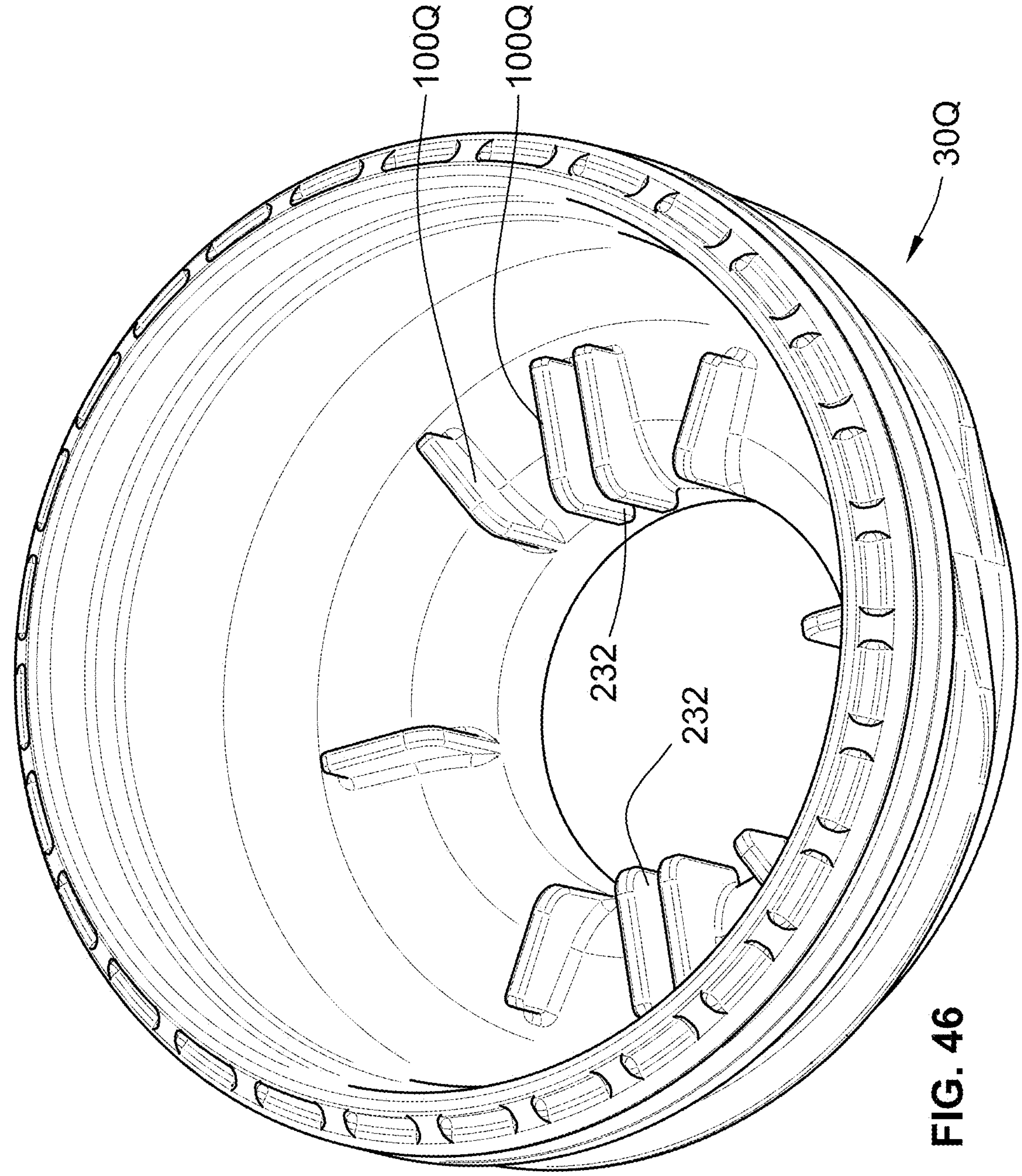
FIG. 46 is an isometric bottom view of the top cap member shown in FIG. 45.
Figure 47:
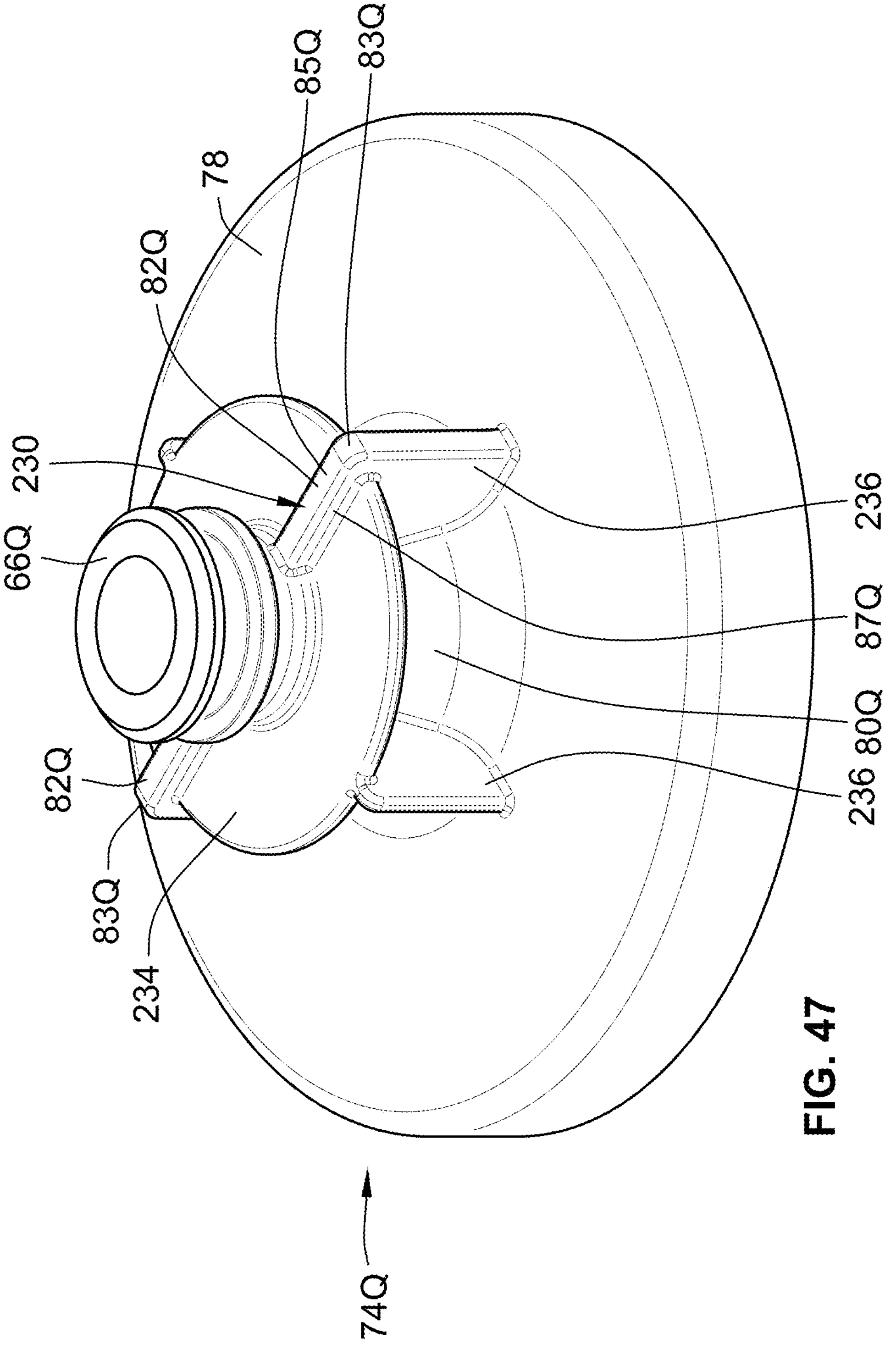
FIG. 47 is an isometric view of a top end cap used in a filter cartridge shown in FIG. 44.
Figure 48:
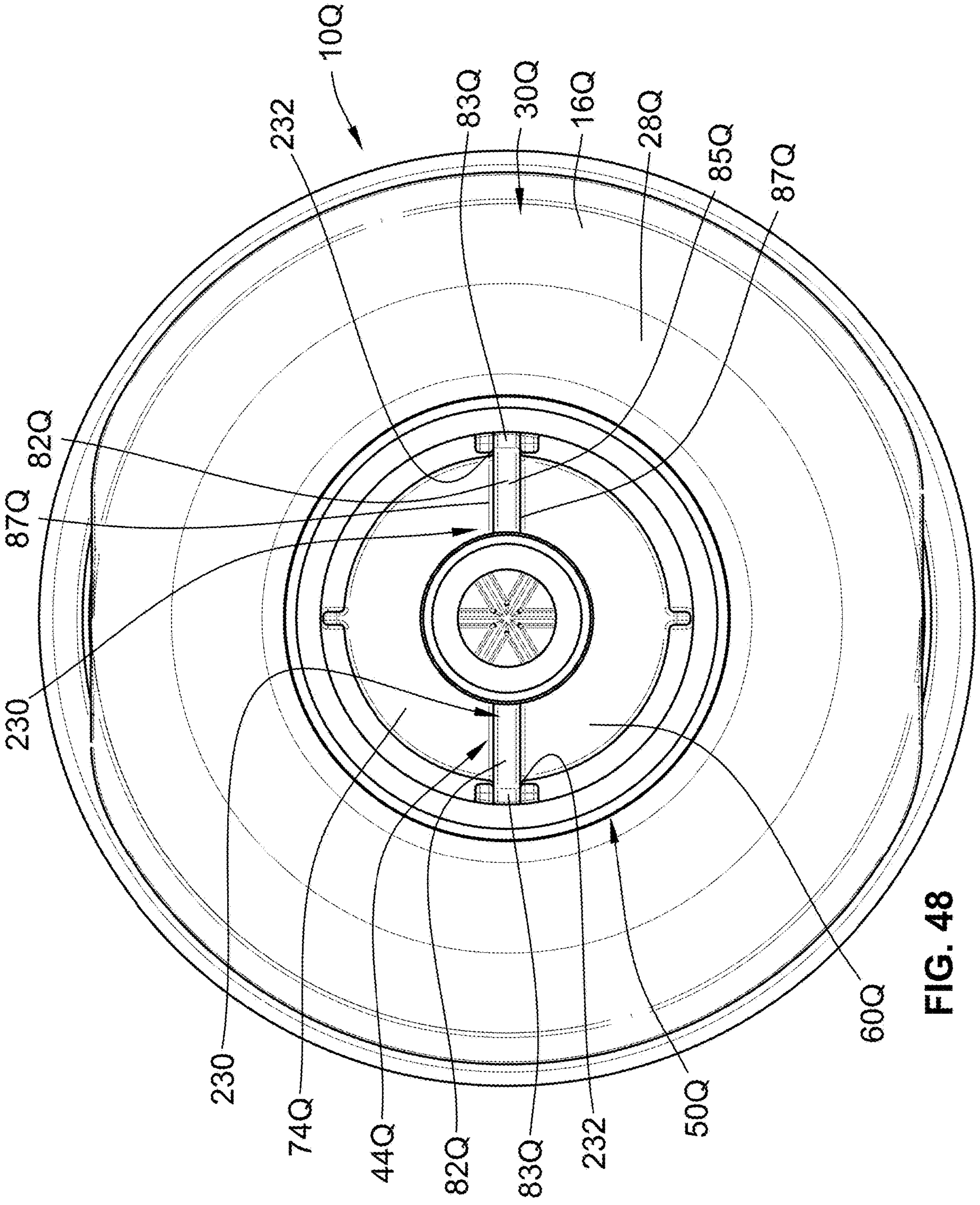
FIG. 48 is a top view of the filter cartridge shown in FIG. 41.
Figure 49:
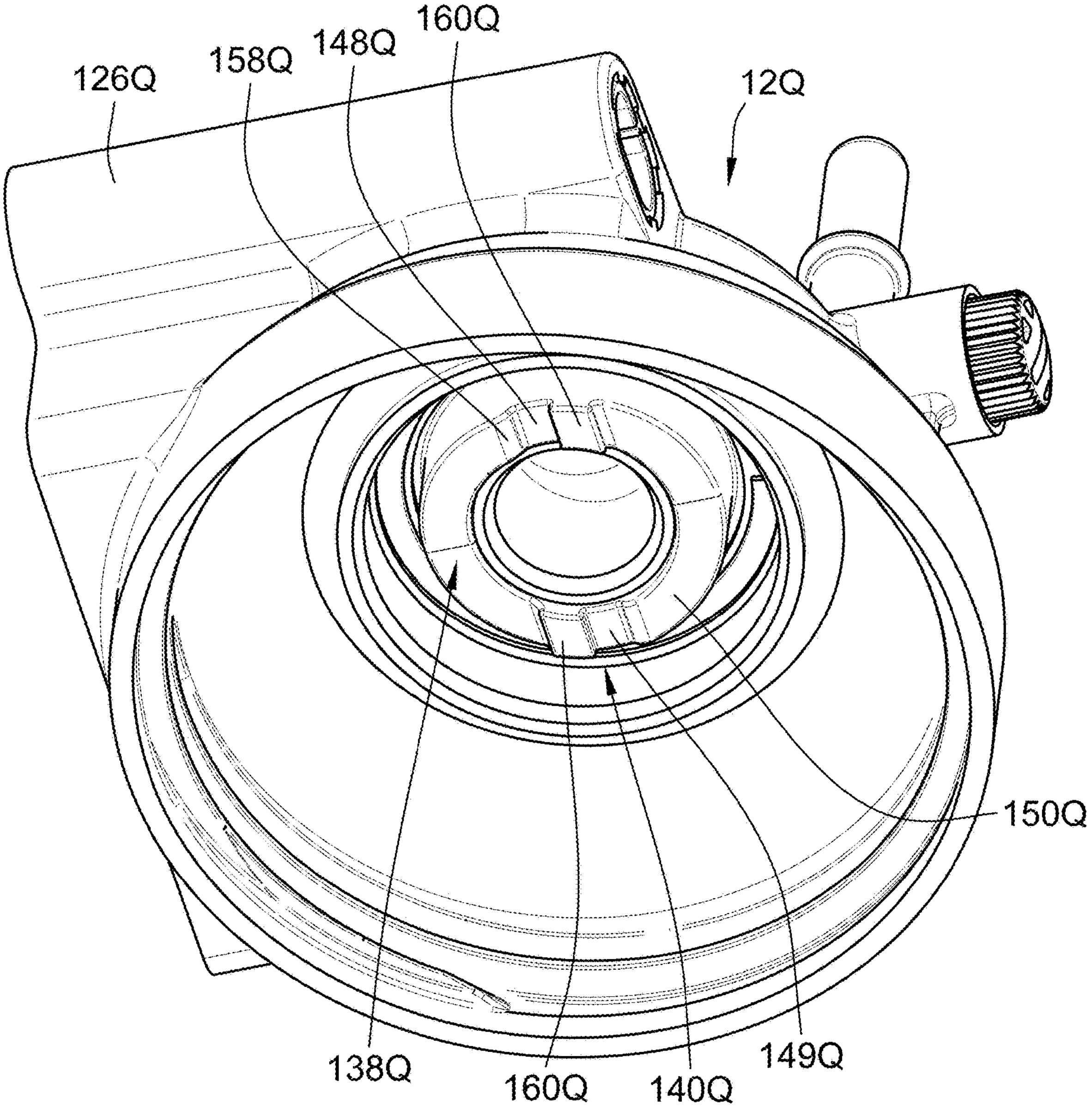
FIG. 49 is an isometric bottom side view of a filter head usable with the filter cartridge shown in FIG. 44.
Figure 50:
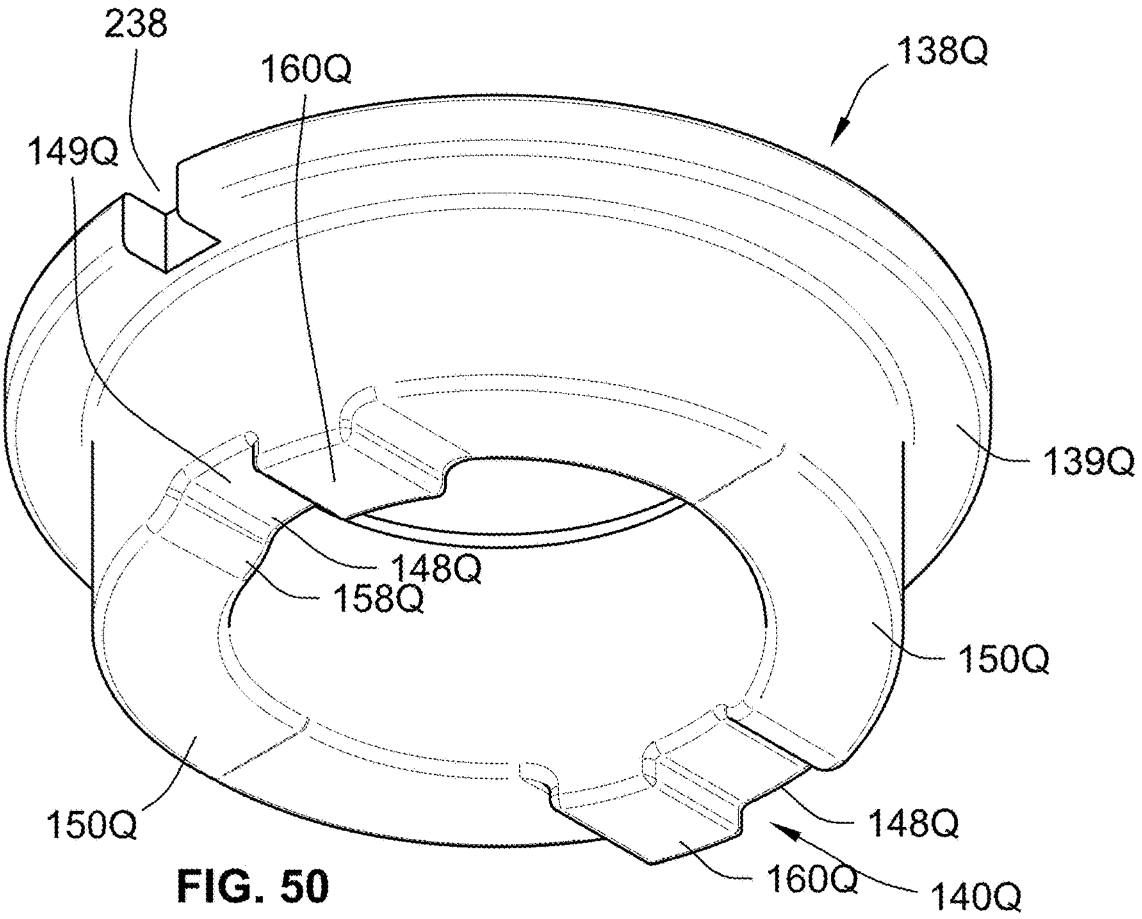
FIG. 50 is an isometric illustration of the lock member that can be employed in the filter head shown in FIG. 49.
Figure 51:
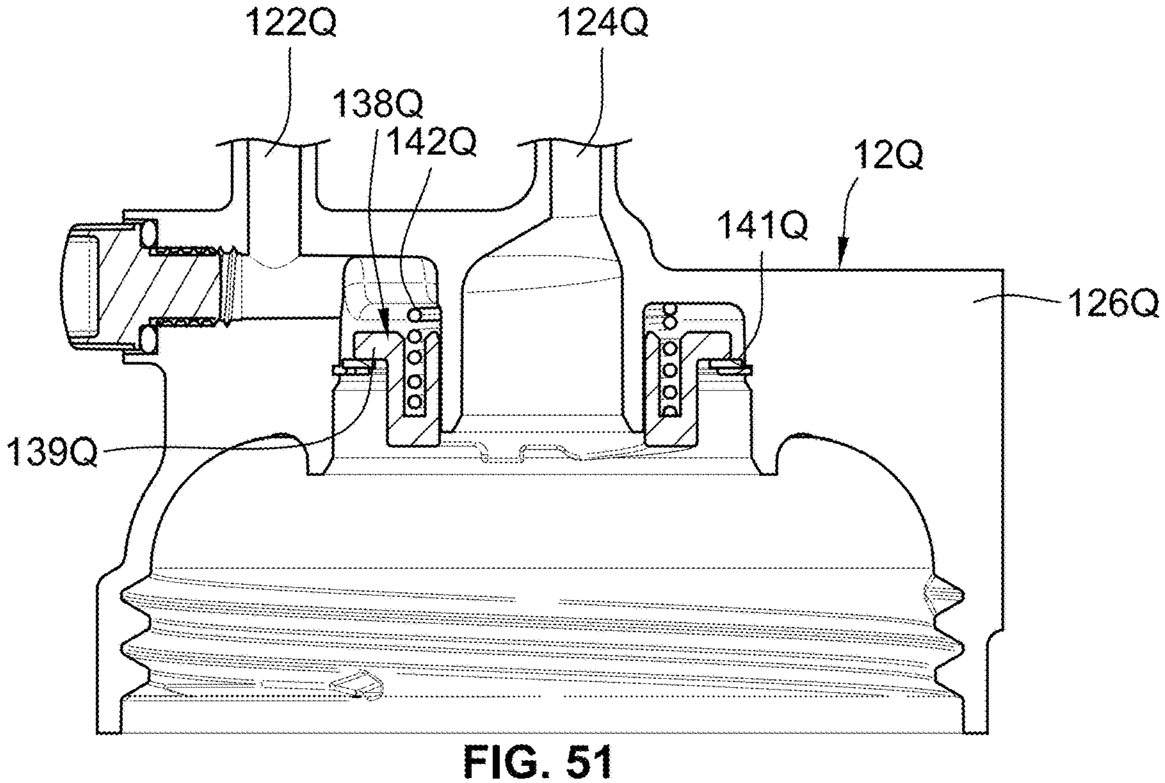
FIG. 51 is a cross-sectional view of the filter head shown in FIG. 49.
Figure 52:
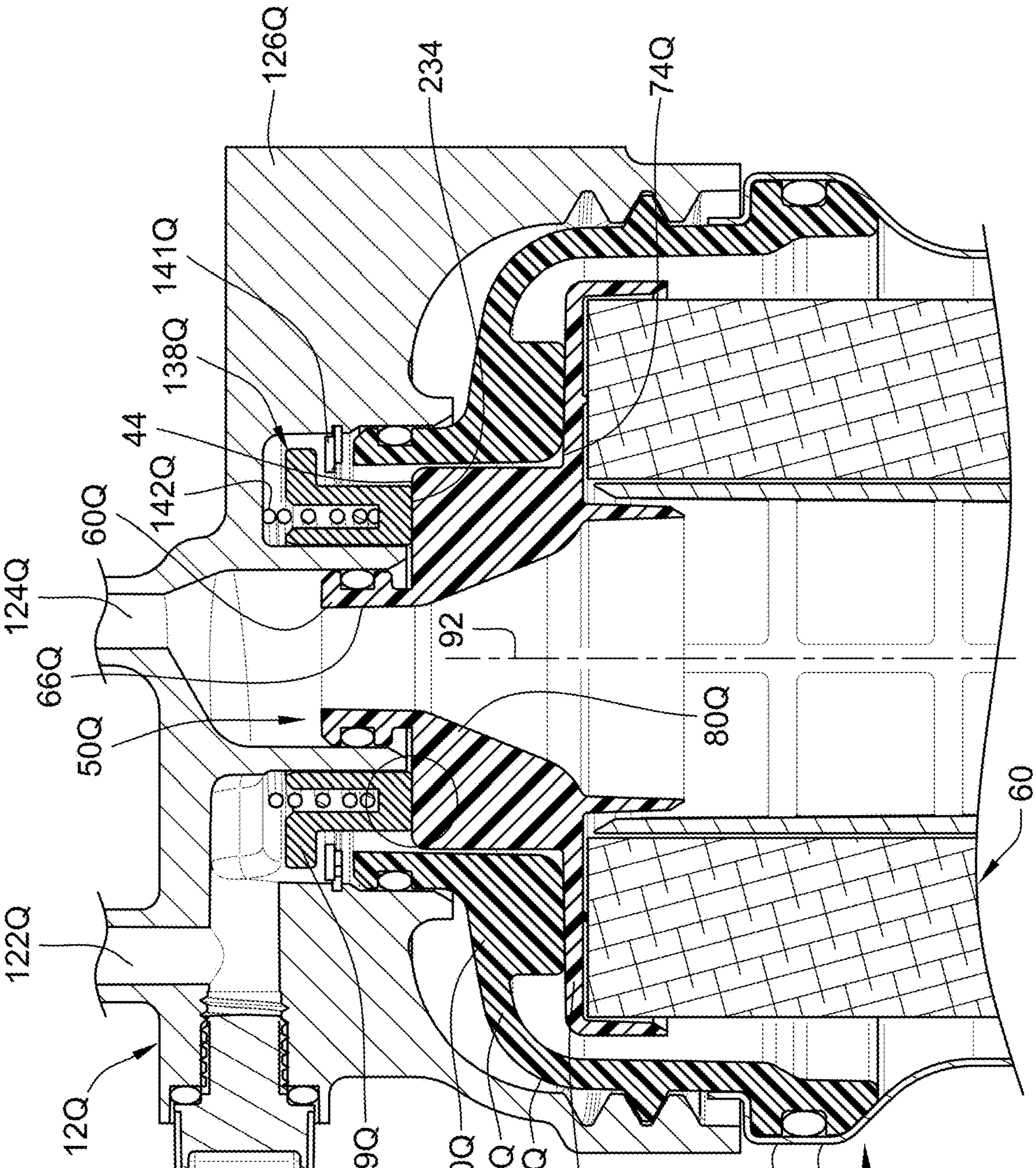
FIG. 52 is a cross-sectional illustration of a top portion of the filter cartridge shown in FIG. 44 in combination with the filter head shown in FIG. 49 to form a cartridge and head assembly.
Figure 52A:
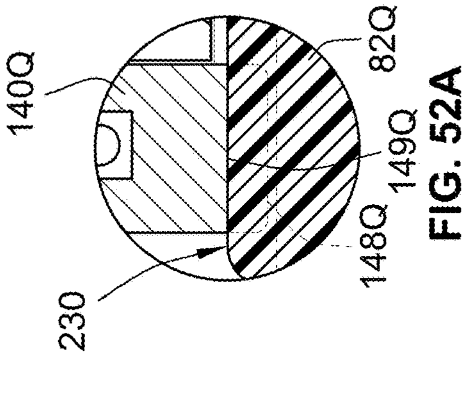
FIG. 52A is an enlarged view of the interlocking slot and tab portion of FIG. 52.
Figure 53:
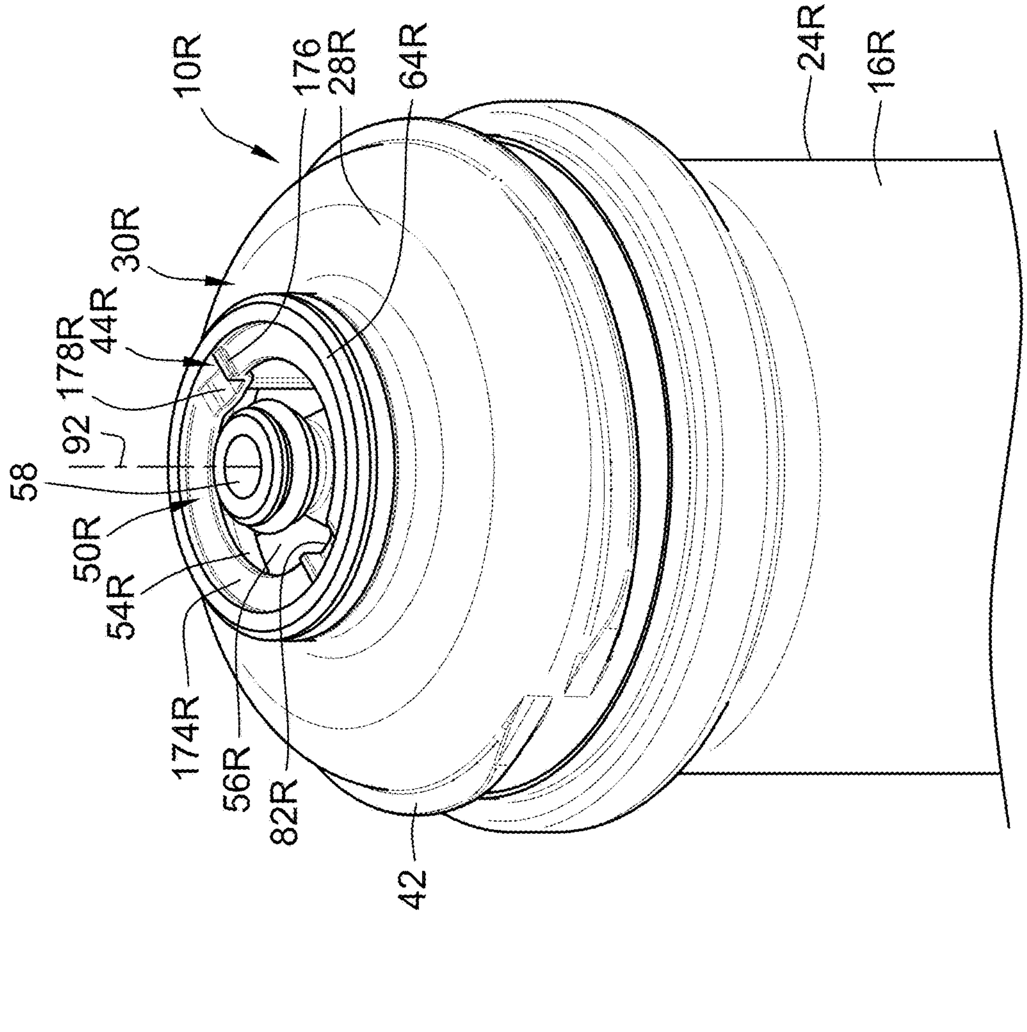
FIG. 53 is an isometric view of a top portion of a filter cartridge in accordance with the twenty-first embodiment of the present invention.
Figure 54:
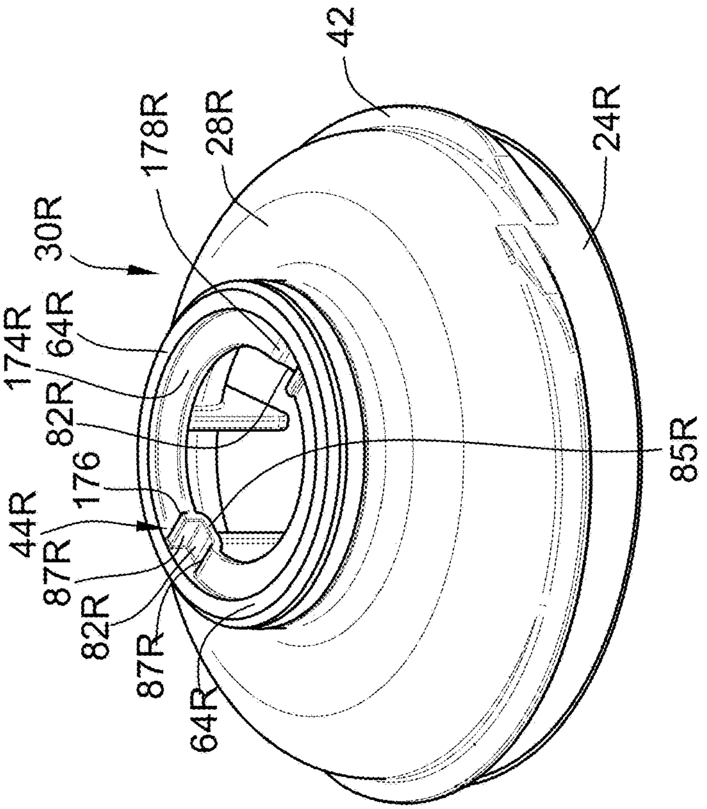
FIG. 54 is an isometric illustration of the top member in the form of a cap employed in the filter cartridge of FIG. 53.
Figure 56:
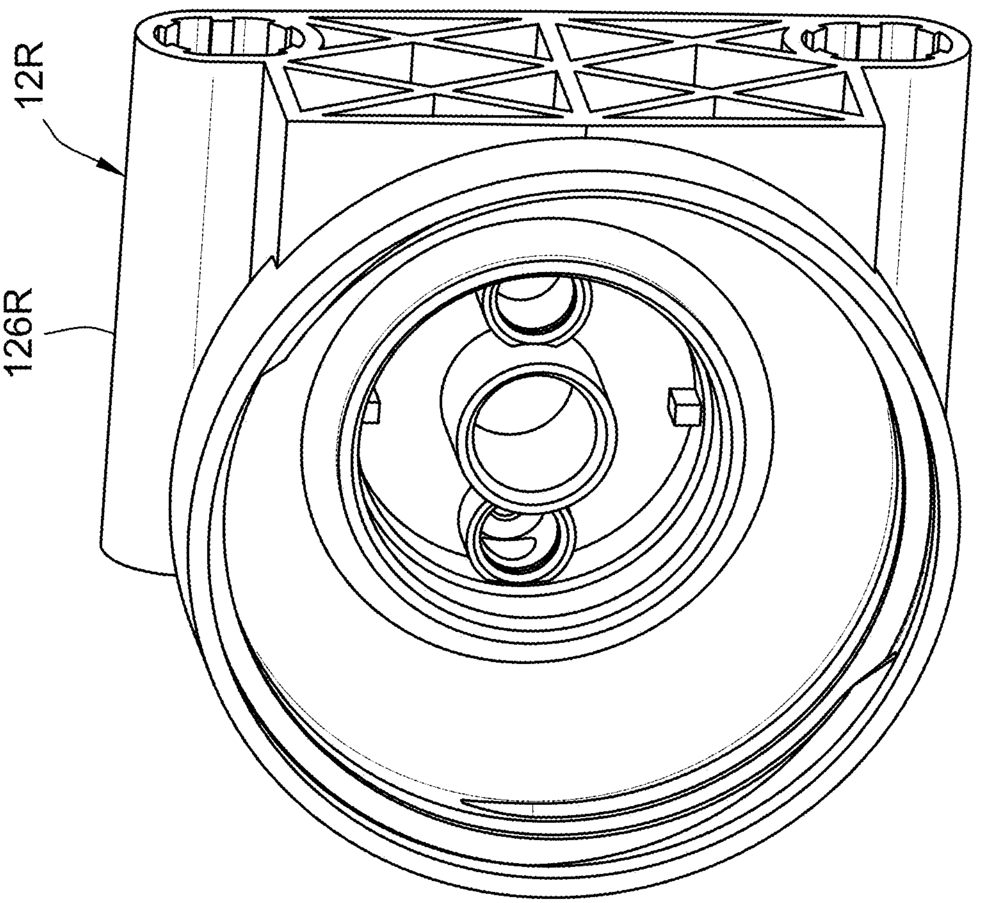
FIG. 56 is an isometric bottom side view of a filter head usable with the filter cartridge shown in FIG. 53.
Figure 55:
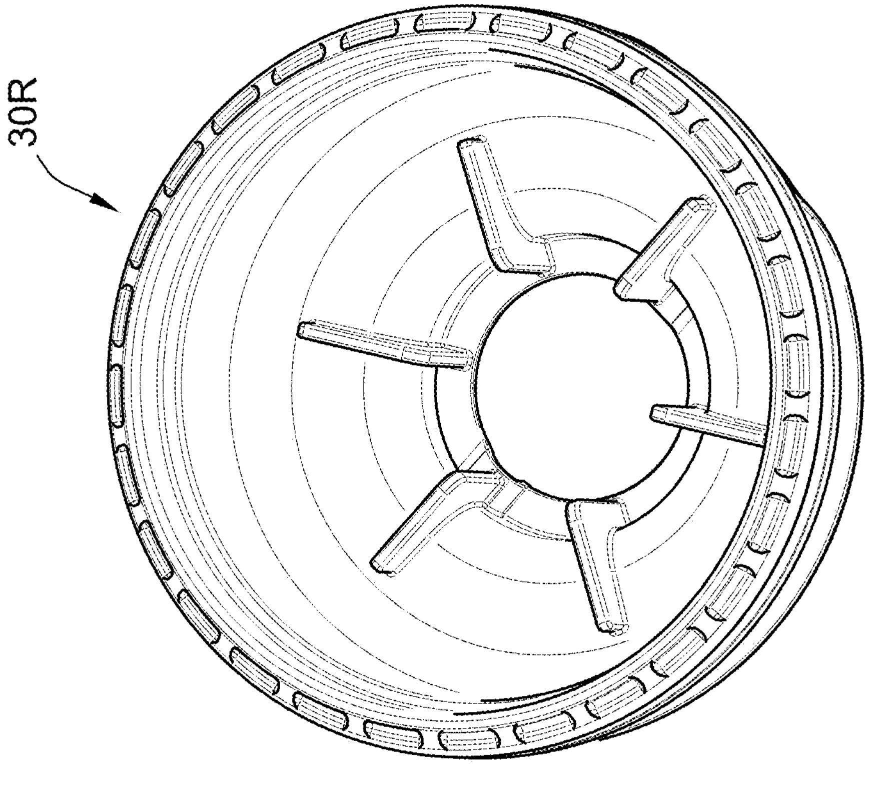
FIG. 55 is a bottom isometric view of the top member shown in FIG. 54.

It should be noted that throughout the present disclosure, reference has been made to a thread 42 as in FIG. 1 or 42P as in FIG. 41, which comprise two discrete and separate helical thread ribs at reference number 48 in FIG. 1 and reference No. 48P in FIG. 41. It is understood that these extend only partially around the filter cartridge and less than 360 degrees around the filter cartridge and are arranged at different annular orientations to provide for a filter cartridge that can readily attach to the filter head through less than a full turn of the filter cartridge. For a half-turn filter cartridge, these helical thread ribs 48 (or 48P as in the case of FIG. 41) extend one-half of the angular span of the filter cartridge and on opposite sides. This can be seen better in FIGS. 44 and 45 where, for example, the two discrete thread ribs 48, which make up the thread 42, are shown to be on opposite sides and in non-overlapping relationship in one embodiment, also including terminating flats shown on corresponding opposed sides which are the leading and/or trailing ends of the respective thread ribs.

Turning to the 20th illustrated embodiment shown in FIGS. 44-52, a filter is shown in the form of filter cartridge 10Q and filter head 12Q, that is understood to employ the same components and be the same as filter cartridge 10, filter head 12 and assembly 14 of FIGS. 1-5, other than indicated below. Accordingly, the disclosure of the first embodiment of FIGS. 1-5 is fully applicable to the present embodiment other than as indicated below Like reference numbers may be used and focus will be had relative to modifications and different parts relative to the first embodiment.

The filter cartridge 10Q of this embodiment includes a filter housing 16Q that is almost the same of that of the first embodiment. For example, the same canister in a form of metal can 32 is used in this particular embodiment. The cap 30Q is almost virtually the same in that it also is at the top end and includes top annular end wall 28Q that extends radially outward from nipple portion 50Q and that extends into shoulder region 52Q, which merges into the filter housing sidewall 24 like that of the first embodiment. Further, the thread 42 and two helical thread ribs 48 are also the same as in the first embodiment and provided just outboard of shoulder region 52 like the first embodiment. The differences in the filter housing 16Q relate to a larger diameter outer annular wall 64 that afford the further feature of a valve actuator member 230, which is provided at the nipple portion 50Q.

The valve actuator member 230 can be offset from the central axis 92 of the filter cartridge.

Further the valve actuator member 230 can be integrated with a torsion lock detent member 44Q as described below.

In this embodiment, the torsion lock detent member 44Q is not provided by the cap member 30Q, but instead provided by the internal filter element 60Q as part of top end cap 74Q. Filter element 60Q other than the configuration of top end cap 74Q may otherwise be the same and include also a ring of pleated filter media a bottom end cap and be spring loaded just like the first embodiment.

Another difference for cap member 30Q is the configuration of the axial spacer ribs 100Q along the internal surface of the filter housing 16Q that forms a key structure that may take the form of a slot 232 (see, e.g., two slots 232 that are provided 180 degrees apart and defined by adjacent axial spacer ribs 100Q). These slots 232 provide for a keying mechanism that can key and clock the filter element 60Q at a predetermined angular orientation relative to the cap member 30, which provides for the integral thread 42. As a consequence, the filter element 60 is therefore positioned at a predetermined angular orientation and clocked at a known angular location relative to the thread 42.

In this embodiment, angular clocking between element and housing is done because the housing provides the thread, while the filter element 60 provides for the torsion lock detent member 44Q. The torsion lock detent member 44Q may take the form of a pair of torsion lock tabs 82Q that extend axially above the shoulder region 52Q and face axially outwardly toward the filter head when in use.

The torsion lock tabs 82Q have end portions 83Q that additionally form keys in the form of key projections that are received in the corresponding key slots 232 provided by axial spacer ribs 100. Put another way, the end portions 83Q of torsion lock tabs 82Q at the top end of the filter element 60Q are received and fix the predetermined angular orientation between the filter element 60Q and the filter housings 16Q by being trapped between adjacent axial spacer ribs 100Q. The axial spacer ribs 100Q also separate the internal filter element 60Q from the filter housing 16Q to allow for fuel flow radially outwardly from the inlet port to the outer periphery of the filter element as was the case in the first embodiment.

Like the first embodiment, the top end cap 74Q includes a snout 80Q to provide for the inner annular wall 66Q and outlet port 58Q. The inlet port 56Q is similarly defined between the filter element and the filter housing at nipple portion 50Q to allow for incoming fuel flow much like the first embodiment.

However, additional structure in this case is provided at the nipple portion 50Q and specifically around the snout 80Q in the form of the valve actuator member 230. To provide for the valve actuator member 230, the top end cap includes an elevated abutment platform 234 is spaced from the ring portion 78 of the top end cap 74Q to which the filter media is bonded. This abutment platform 234 can be supported by truss ribs 236 that extend between the ring portion 78 of the top end cap 74Q, and the projecting abutment platform 234. Further, in this embodiment, the torsion lock tabs 82Q extend axially from and above the abutment platform 234. Torsion lock tabs 82 for example, may extend over the abutment platform and may connect directly with the inner annular walls 66Q and snout 80Q. Further, inner annular wall 66Q may further carry the inner radial seal 70 at a position axially above both the abutment platform 234 and torsion lock tabs 82Q.

With reference to filter head 12Q, the valve actuator member 230 can either be provided by the abutment platform 234 that can engage the valve provided by lock member in the filter head; alternatively by the height of torsion lock tabs 82Q which can provide a height and project to axially end face 85Q that can bottom out on the corresponding lock of the filter head to axially raise the lock member valve off its seat in the secured condition. While the end face 85Q of any torsion lock tab 87Q can be for valve actuation, the side faces 87Q of torsion lock tabs 82Q can provide for torsion locking as in other embodiments. Side faces 87Q extend toward away from the end cap ring portion and/or away from the abutment platform 234. At least one of the side faces 87Q engages the corresponding lock slot sidewall to facilitate torsion locking and prevent the filter cartridge from being decoupled during use due to ordinary vibrational forces or otherwise during ordinary use. Thus, valve actuator member 230 in the present embodiment can be provided either by way of the elevated abutment platform 234, which is one form of a projection or, alternatively, by the torsion lock tabs 82Q which are another form of projection to provide for the axially projected end face 85Q that can be positioned to bottom out on the lock slot bottom of lock member within the filter head.

Filter head 12Q may be substantially the same as filter head 12 as shown in FIGS. 1-5 however, modifications to the discharge port and lock assembly are made in this embodiment. In the present embodiment, the discharge port 122Q that flows through mounting base member 126Q is routed through the lock assembly 136 to mate with the inlet port 56Q of filter cartridge 10Q. The lock assembly and lock member 138Q is operable to open or close this discharge port 122Q. In particular, the lock member 138Q includes a portion to provide a valve 139Q that is urged by the spring 142Q to a closed position which shuts off the discharge port 122Q and thereby disconnects or stops fuel flow from flowing through filter head 12Q when in the closed position. The valve 139Q is opened against the action of the spring 142Q when the lock member 138Q is engaged with the valve actuator member 230 (e.g., end face portions 83Q of torsion lock tabs 82Q or elevated abutment platform 234) as shown. When the filter cartridge 10Q is threaded on into engagement with filter head 12Q, the valve actuator member 230 of the filter cartridge projects and engages the lock member 138Q and valve 139Q thereof to lift valve 139Q off of a valve seat 141Q and prop open the valve to open the discharge port 122Q to allow fuel to flow through the filter head 12Q as illustrated.

Lock member 138Q is otherwise very similar to that of the first embodiment and similarly includes lock member detent 140Q in the form of lock slots 148Q and ramp surfaces 150Q that lead into lock slots 148Q. In a similar fashion to that of the first embodiment, during installation and threaded engagement between the filter head and the filter cartridge, the torsion lock tabs 82Q will ride along the ramp surfaces 150Q and may start to lift the lock member 138Q and its annular valve 139Q off annular valve seat 141Q. Upon reaching the full rotational movement, the torsion lock tabs 82Q slide into the torsion lock slots 148Q to provide torsion locking like the first embodiment. Specifically, the torsion lock tabs 82Q will engage the sidewalls such as cam surface 158Q (which may connect ramp surface 150Q with lock slots 148Q) to prevent rotational disengagement absent the application of additional torqueing force. Thus, the sidewalls of the lock slots 148Q serve to provide for torsion locking. In a similar but different vein, it is the end face portions such as end portion 83Q of torsion lock tabs 82Q that bottom out along lock slot bottom 149Q to ensure that the valve 139Q is maintained in an open position once the torsion lock detent tabs 82Q are engaged with lock slots 148Q.

Alternatively or additionally, the elevated abutment platform 234 may bottom out and engage the axially downward facing end faces of stop tabs 160Q defined along the bottom of the lock member 138Q. The shop tabs 160Q can be provided on the side of the lock slots 148Q opposite the cam surface 158Q.

During the coupling of the filter cartridge relative to the filter head, the filter cartridge is twisted off of the filter head which causes the spring to push the lock member 138Q axially and cause the annular valve 139Q to seat upon valve seat 141Q. This closes discharge port 122Q to flow.

To ensure that the lock member 138Q is arranged at a predetermined angular orientation (and this may be employed for any of the embodiments herein) lock member 138Q may include a keyway such as spline 238 which mates with a corresponding projection and key from the mounting base member 126Q (similar to the first embodiment with key slot 164 and spline projection 164). Thus, the lock member 138 and the lock member detent thereof such as lock slots 148Q can be arranged at a predetermined angular orientation.

Turning to the 21st embodiment shown in FIGS. 53-60, a filter is shown in the form of a filter cartridge 10R for use with a filter head 12R, that is understood to employ the same components and be the same as filter cartridge 10, filter head 12 and assembly 14 of FIGS. 1-5, other than as indicated below. Accordingly, the disclosure of the first embodiment of FIGS. 1-5 is fully applicable to the present embodiment other than as indicated below Like reference numbers will be used and focus will be had relative to modifications and different parts relative to the first embodiment.

In this embodiment, the filter cartridge 10R is like filter cartridge 10Q of the previous embodiment in that a valve actuator member 230R is provided for actuating a corresponding valve 139R on the filter head 12R. However, the shape and configuration is slightly different but the operation and functionality is similar to that of the previous embodiment. Therefore, a more cursory treatment of the present embodiment will be afforded.

Like the previous embodiment of FIGS. 44-52, this embodiment of FIGS. 53-60 includes a filter housing 16R, including a top end and a bottom end with an annular sidewall 24R extending there between. The top end includes the top annular end wall 28R.

Further, there is a nipple portion 50R arranged at the top end. Further, fluid flow interface 54R is also provided at the top end that includes an inlet port 56 and an outlet port 58R for receiving and returning filtered fluid respectively. At least one of the inlet ports, and preferably both of the inlet and outlet ports, are through the nipple portion 50R, although one of the ports may also be located outside of the inlet port as is the case with the embodiment shown in FIG. 63, which can be employed in a further alternative embodiment. Further, a thread 42 is provided by the filter housing 16R. A filter element 60 is also provided that can be identical and is shown to be identical to that of the first embodiment and therefore, will not be again described Like the first embodiment, the filter element is contained in the filter housing 16R and interposed along a fluid flow path through the filter housing from the inlet port 56 to the outlet port 58R with the filter media of such filter element 60 being arranged in fluid series there between. Like the previous embodiments, a torsion lock detent member 44R may be arranged also at the top end. The valve actuator member 230R is provided at the nipple portion with the valve actuator member being offset from a central access 92 of the filter.

In this embodiment and similar to one of the variations of the filter cartridge 10Q of the previous embodiment, the valve actuator member 230R is combined with the torsion lock detent member 44R in that different portions of the overall structure facilitate the valve opening and torsion locking.

For example, the valve actuator member in this embodiment can comprise at least one slot and in this case two slots 82B that are provided at a top portion of the outer annular wall 64R of nipple portion 50R. The slot 82R has a slot sidewall 87R (also referred to as side faces in other embodiments), for providing the torsion lock detent member 44 for torsion locking with the filter head; and a slot bottom 85R (similar to axially end face 85Q of the earlier embodiment) that provides for the valve actuator member 230.

In the previous embodiment, the valve actuator member was provided by the filter element; whereas, in this embodiment, the valve actuator member 230R is provided by the filter housing 16R instead of the filter element 60. However, the valve actuator member 230R (and similarly the torsion lock detent member) could alternatively be integrated with and extend from the ring portion of the filter element end cap in an alternative embodiment.

Like other embodiments, the torsion lock detent member 44R may also be similarly configured with ramp surfaces 174R in front of the detent and valve actuating slot 82B, optional stop member 176R, and cam surfaces 178R that are disposed between the detent slot 82B and the ramp surface 174R. These structures function similarly to previously described similar structures with similar reference numbers.

The filter head 12R may include a mounting base member 126R that is adapted to have the filter cartridge 10R mounted thereto in a secured condition by virtue of threaded engagement.

The filter head 12R is similar to previous embodiments in that it includes a mating fluid flow interface 120R having a discharge port 122R for unfiltered fluid and return port 124R for returning filtered fluid. The discharge port 122R is directly connected to the inlet port 56R, while the return port 124R is connected to the outlet port 58R of the filter cartridge in the secured condition.

A lock assembly including lock member 138R includes a lock member detent in the form of a projecting pin 148R that is biased axially toward the filter cartridge such as by way of spring 142R. When the projection pin 148R is received in the corresponding torsion lock detent slot 82R, rotational disengagement between the filter cartridge and filter head is prevented due to ordinary vibration when in use. However, this force can be overcome manually by way of a mechanic with sufficient torque force to remove the filter cartridge from the filter head as previously described.

Further, the end of the projection pin 148R may be tapered such as rounded to thereby provide a cam surface as well at the end of projection pin 148R that can facilitate or control the amount of torque necessitated to overcome the torsion locking by a service mechanic.

Figure 57:
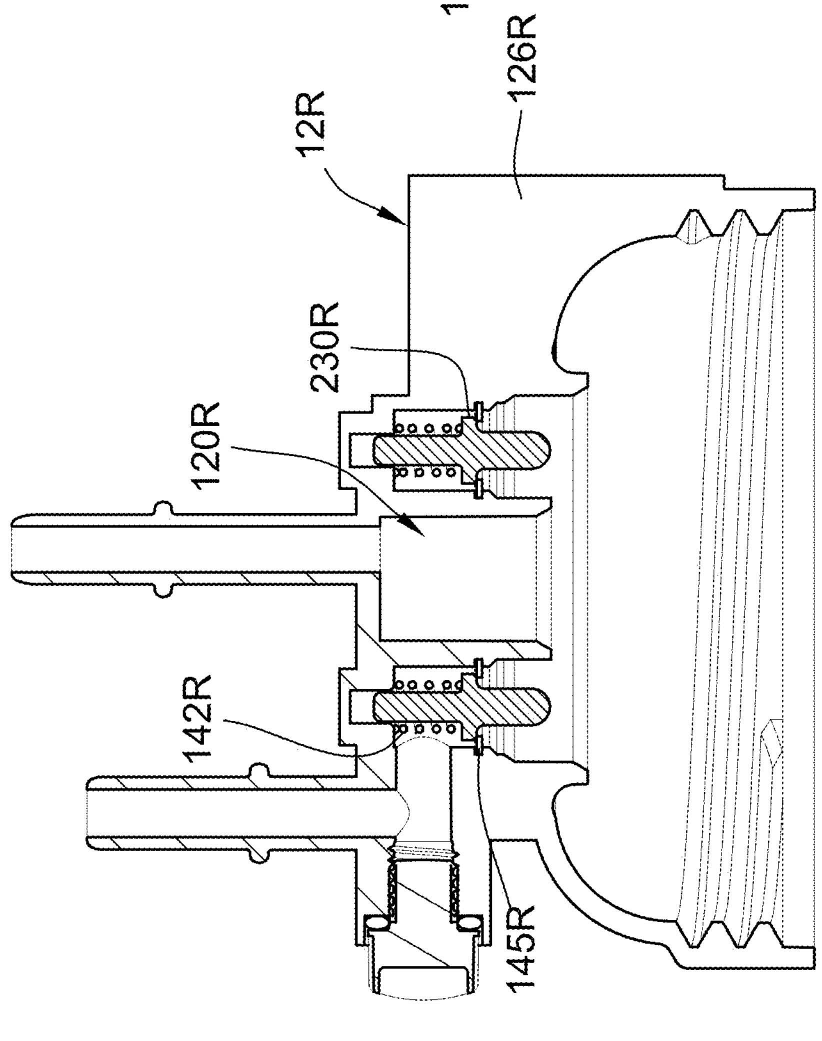
FIG. 57 is a cross-sectional view of the filter head shown in FIG. 56.
Figure 59:
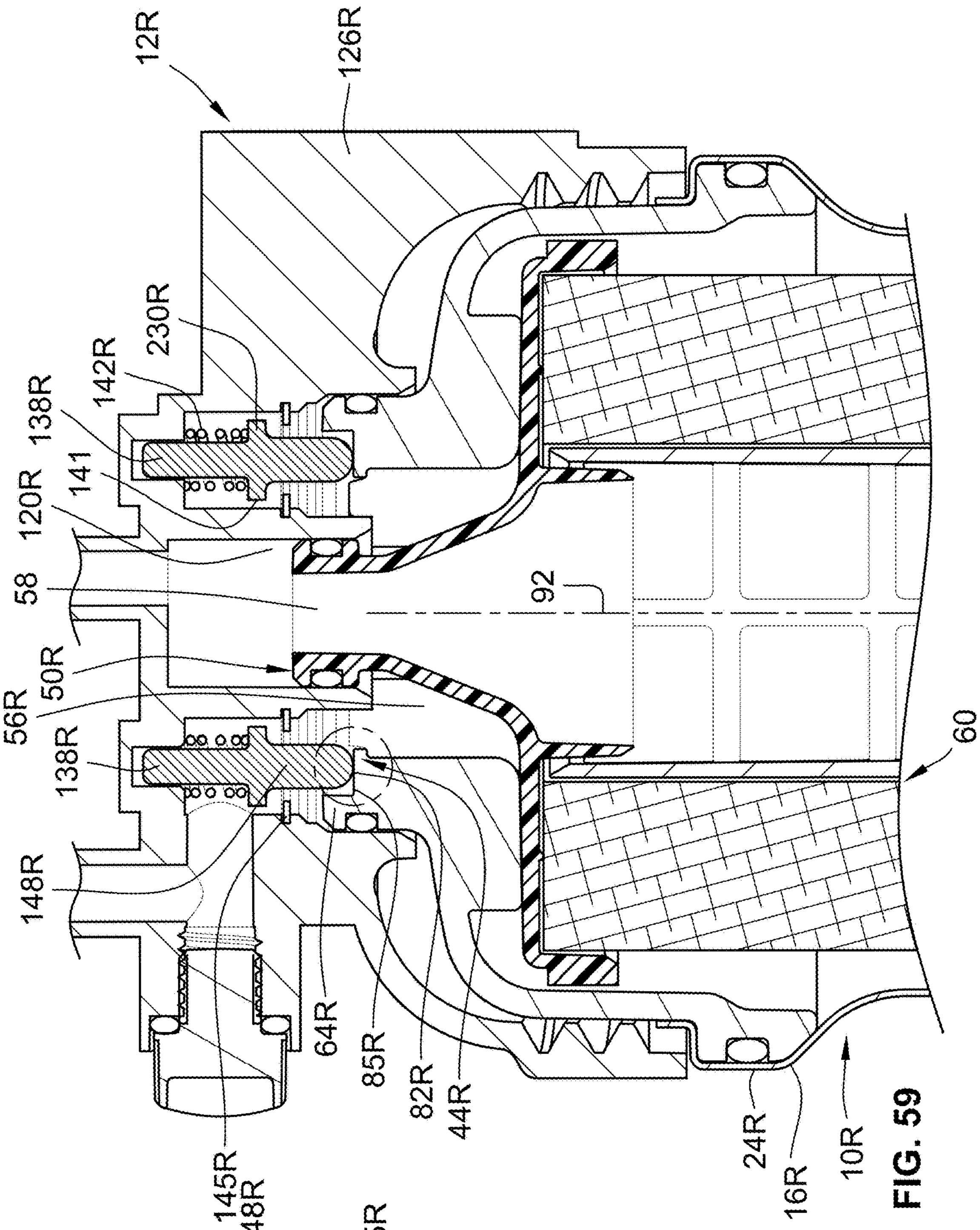
FIG. 59 is a cross-section view of a top portion of the filter cartridge shown in FIG. 53 in combination with the filter head shown in FIGS. 56 and 57 to form a cartridge and head assembly.
Figure 59A:
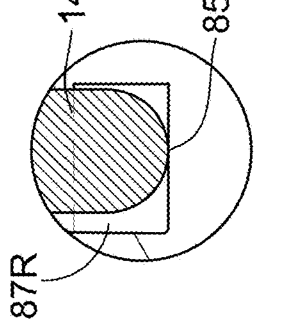
FIG. 59A is an enlarged view of a portion of FIG. 59.
Figure 60:
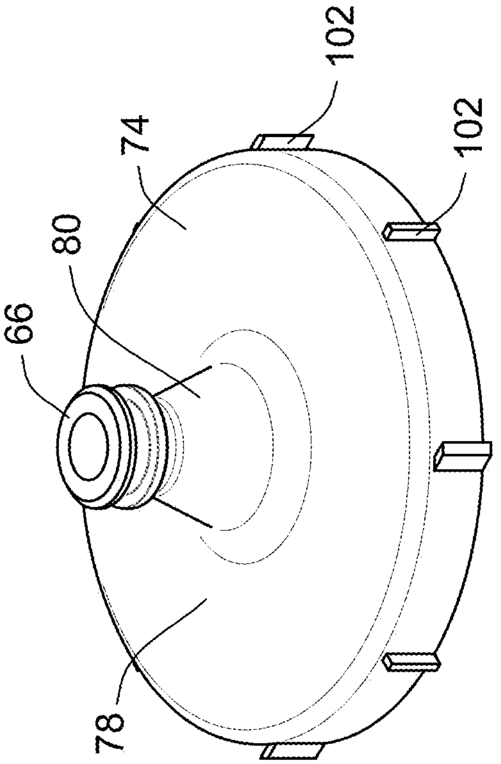
as shown in FIGS. 60-61), in accordance with a fourteenth embodiment of the present invention.

The valve member in the form of valve 139R is in an open position shown in FIG. 59 and a closed position as show in FIG. 57. The open position allows flow while the closed position closes flow through the discharge port 122R into the filter cartridge 10R. When the filter cartridge 10R is attached, the valve actuator member 230R which takes the form of slot bottom 85R maintains the valve member 139R in the open position as shown in FIG. 59.

Figure 58:
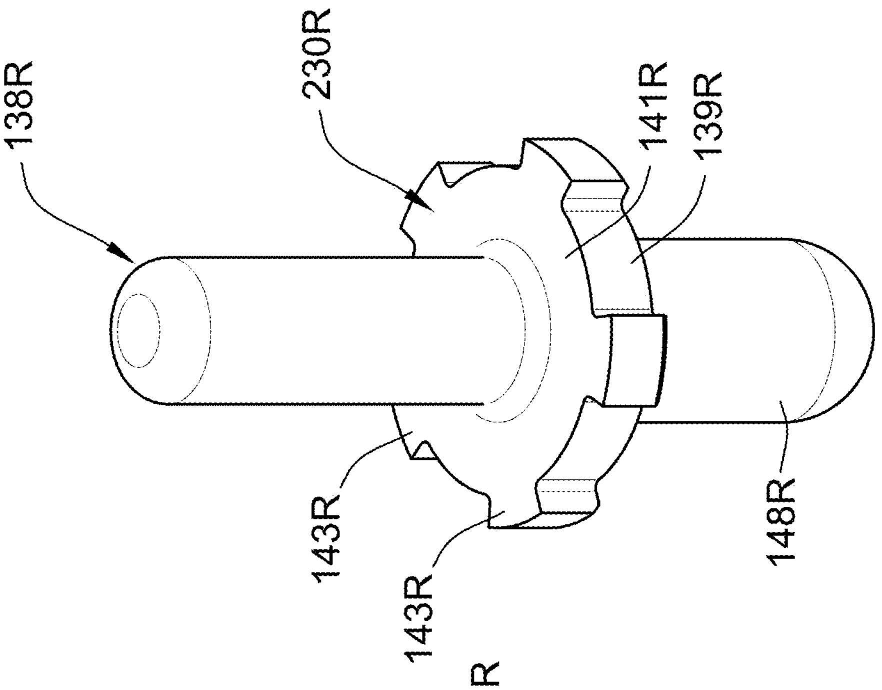
FIG. 58 is an isometric view of the lock member and valve member (portions of same component part) employed in the filter head shown in FIGS. 56 and 57.

The valve member can cover the discharge port 122R when the filter cartridge 10R is removed from the mounting head as shown in FIG. 57. For example, the valve comprises an enlarged annular radial projection or solid disc 141R as shown in FIG. 58 that provides for the valve 139R and may further include locating splines 143R which can guide axial movement of the lock member 138R within the mounting base 126R.

It is noted that the valve member 139R and its valve disc 141R will bottom out upon a valve seat 145R that may take the form of a snap ring situated within a groove formed in the mounting base member 126R. While this may not be necessarily a hermetic seal, it may be relatively close thereto or sufficient to prevent inadvertent fuel flow when desired so that one can be informed that an improper fuel filter cartridge has been mounted for example.

Turning to FIGS. 61 and 62 which show a 23rd embodiment, a filter is shown in the form of a filter cartridge 10S that is understood to employ the same components and be the same as filter cartridge 10 of FIGS. 1-5 and useable with a similar filter head 12 and assembly of FIGS. 1-5 with some limited modification as would be readily apparent to a person having ordinary skill in the art. Accordingly, the disclosure of the first embodiments of FIGS. 1-5 is fully applicable to the present embodiment other than as indicated below. Like reference numbers may be used and focus will be had relative to modifications and different parts relative to the first embodiment.

In this embodiment, the filter cartridge 10S includes a thread 42S that is formed as part of the lower housing member rather than the upper housing member.

For example, the thread 42S including a pair of helical thread ribs 48S on opposite sides to provide for a half turn element (alternative embodiments may be a quarter turn element or third turn element if so desired). Thread 42 is integrally formed as a one-piece structure in a metal can 32S. Thus, the top member or cap member need not provide for the thread in this embodiment as it is provided and formed integrally on the lower member. Further, the thread along its internal surface may define an internal flow channel 43S that provides a flow path around the periphery of the filter element and between the filter element and the inside of the filter housing 16S. The can 32S also includes a terminating edge portion 33S that is wrapped around a corresponding shoulder 52S of upper housing member 30S. And forms the overall shoulder region of the filter housing.

It is noted that the upper housing member 30S provides part of the filter housing 16S and also provides part of the filter element 60S in that it includes a portion to serve as the plastic cap as in previous embodiments and a bottom portion that serves as top end cap 74S. These regions may be considered to be separated by radial flow channels 242 that connect between the inlet port 56S and the internal periphery of the metal can 32S such that fuel or other liquid entering inlet port 56S can flow radially outward and then axially along the outside of the filter element 60S where it can be filtered by the filter media contained in the filter housing.

Additionally, this embodiment like other embodiments includes torsion lock detent member which may include torsion lock tabs 82S formed on member 30S. Member 30S may be either a one part or unitary component as shown, or may alternatively be provided as an assembly of components secured together to provide the overall structure. Torsion lock tabs 82S would function similar to that of previous embodiment and in conjunction with the thread 42S. It is noted that the thread 42S is to be located at a predetermined angular orientation relative to torsion lock tabs 82S such that when in use they are locked and would engage on the corresponding torsion lock member of a filter head (not shown) when the filter cartridge is twisted into the fully secured position. Clocking and a predetermined angular orientation between the metal can 32 which provides the lower housing member and the upper housing member 30S can be accomplished, for example, such as shown by the key structures utilized in the other embodiments and/or as disclosed for example in U.S. Pat. No. 8,057,669 which show corresponding king to lock the thread and a torsion clock detent member. So this embodiment is less preferred in that respect of necessitating keying or otherwise a predetermined clocking arrangement, but has the advantageous features discussed above.

Turning to the 24th embodiment shown in FIGS. 63-67, a filter is shown in the form of a filter element 60T. The filter element 60T may be combined with a lower housing member and in this case a housing bowl 32T that together may be considered a filter cartridge 10T and for use with a filter head 12T, that is understood to employ the similar components as filter cartridge 10, filter head 12 and assembly 14 of FIGS. 1-5 other than as indicated below. Accordingly, the disclosure of the first embodiments of FIGS. 1-5 is applicable to the present embodiment other than as indicated below. Like reference numbers may be used and focus will be had relative to modifications and different parts relative to the first embodiment.

In this embodiment, the filter (i.e. filter element 60T) is preferably a disposable member that can be readily removed and replaced within bowl 32T such that the bowl 32T may be considered reusable. This provides for potential cost savings, although the two can be permanently assembled to provide another filter requiring disposal of the entire filter cartridge.

A difference between embodiments is in the nature of the top end member assembly that is sealingly bonded to and supports the upper ring of the pleated filter media. For example, in the first embodiment, the top end member assembly included part of the housing and part of the filter element including plastic cap 30 and top end cap 74 as shown in FIGS. 1-5. In this embodiment, the top end member assembly simply comprises a single component part with different portions, namely top end cap 74T. While shown as a single unitary piece that provides for manufacturability, parts reduction and simplicity, it is also appreciated that the present embodiment could use a multiple piece assembly rather than a one-piece assembly.

Similarly, in both the first and present embodiments, the top end member assembly defines an upper annular wall in a central opening through the upper annular end wall. For example, this is provided by either of annular wall 64, 66 and ports 56 and 58 in FIGS. 1-5; or for example, annular wall 66T and outlet port 58T as part of the filter element 60T shown in the present embodiment of FIG. 63. Further, such top end member assembly also has an upper annular end wall which is in the first embodiment the top annular end wall 28 provided by top cap 30 as in FIGS. 1-5; whereas, in the present embodiment it is the top annular end wall 28T that is provided by top end cap 74T.

Figure 63:
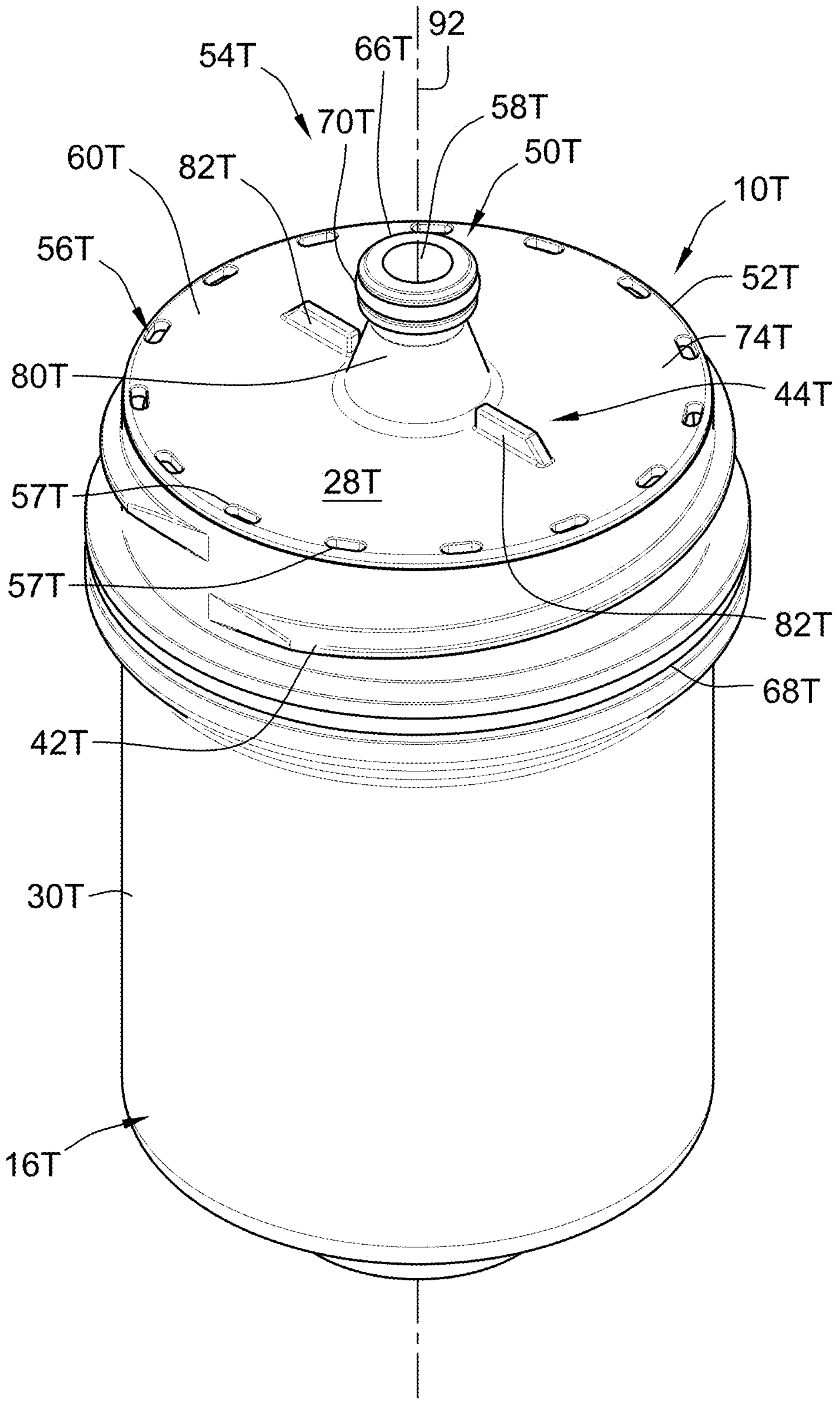
FIG. 63 is a filter in the form of a filter element, in which the filter element is in combination with a preferably reusable bowl to provide a filter cartridge in accordance with a twenty-fourth embodiment of the present invention.

Similarly, each embodiment includes a snout 80 as in FIGS. 1-5 and 80T as shown in FIG. 63. Each embodiment includes a fluid flow interface including inlet and outlet ports as described for the prior embodiment. For the present embodiment in FIG. 63, fluid flow interface 54T includes the outlet port 58T at a central axis 92 and peripheral inlet port 56T that can be provided by a plurality of through holes 57T that can be defined through the upper annular end wall 28T. As is the case in the first embodiment, one of the inlet ports and in this case the outlet port 58T is through the snout 80T. The inlet port 56T and outlet port 58T serve to receive unfiltered fluid from filter head 12T and return filtered fluid to filter head once passing through filter element 60T.

Additionally, both embodiments include a bottom end member which could either be the bottom end cap or alternatively an external housing portion such as bowl but in both embodiments are bottom end caps. For example, in this embodiment, bottom end member includes bottom end cap 76T that is sealingly bonded to and supports the lower end of the ring of pleated filter media 72T.

Also, like the first embodiment, this embodiment also includes a torsion lock detent member 44T arranged at the top end. Also, similar to the first embodiment, torsion lock detent member 44T is elevated above the top annular end wall 28T and extends axially higher than any portion of the top member assembly radially outside of the torsion lock detent member. For example, the torsion lock detent member 44T is elevated axially higher than shoulder region 52T formed at the juncture of filter element 60T and bowl 32T.

In this embodiment, a combination of reusable and disposable components provides for the filter housing 16T. For example, the lower member of the filter housing 16T is provided by a combination of the lower housing member in the form of bowl 32T and the top end cap 74T. However, a distinction is that the filter housing 16T and this embodiment do not fully enclose the filter element 60T within filter housing 16T. Instead, the filter element 60T or at least top end cap 74T resides along the outside and covers the uppermost surface of housing bowl 32T. This allows for readily ready removal and replacement of filter element 60T from filter housing lower member, in the form of bowl 32T. In this fashion, when the filter element 60T is spent having been subjected to removing particulates and/or coalescing water for some time, the filter element 60T can be removed and replaced within the bowl 32T.

A further distinction between the first and the present embodiment is that in this embodiment the thread 42T is located on the lower housing member in the form of the bowl 32T as opposed to the top housing member. As a consequence, clocking or keying between the filter element 60T and bowl 32T are required in this embodiment to facilitate a predetermined angular orientation between the filter element 60T and the bowl 32T in order arrange the torsion lock detent member (in the form of torsion lock tabs 82T) at a predetermined angular orientation relative to the thread 42T. The keys can be seen in different alternative embodiments shown in FIGS. 88-90 for corresponding inter fitting keys at the juncture of the top end cap and the bowl.

This embodiment can also achieve the feature of the torsion lock detent member being elevated above the top annular end wall and higher than any portion of the top end member assembly such as the shoulder region. Considering that there is a peripheral inlet port 56T provided by through holes 57T and that not both ports are through nipple portion 50T, this embodiment employs an outer radial seal 68T that is below the shoulder region 52T and below the thread 42T provided by the bowl 32T, contrary to what was done in the first embodiment. Outer radial seal 68T will seal against a corresponding cylindrical inner wall seal surface on filter head 12T. In this manner, leakage between the filter cartridge 10T and the filter head 12T is not permitted when the filter cartridge is threadingly engaged and torsion locked thereto.

The inner radial seal 70T however may be similar to that of the first embodiment and supported by a radially outward facing groove formed in the snout 80T as shown.

The dimension and configuration of the torsion locked tabs 82T may otherwise be configured similar to that of the first embodiment in terms of size and shape. It will be readily understood that the filter cartridge operates in a similar fashion then as compared with the first embodiment relative to torsion locking. For example, the overall filter cartridge 10T when the filter element is assembled with filter bowl can be twisted onto the filter head through a half turn, for example, to facilitate a threaded connection thereto. The torsion lock detent member 44T in the form of lock tabs 82 will engage similarly a lock assembly including lock member 138T and torsion lock detent 140T against action of spring 142T, all of which are carried by mounting base member 126T of filter head 12T.

Figure 64:
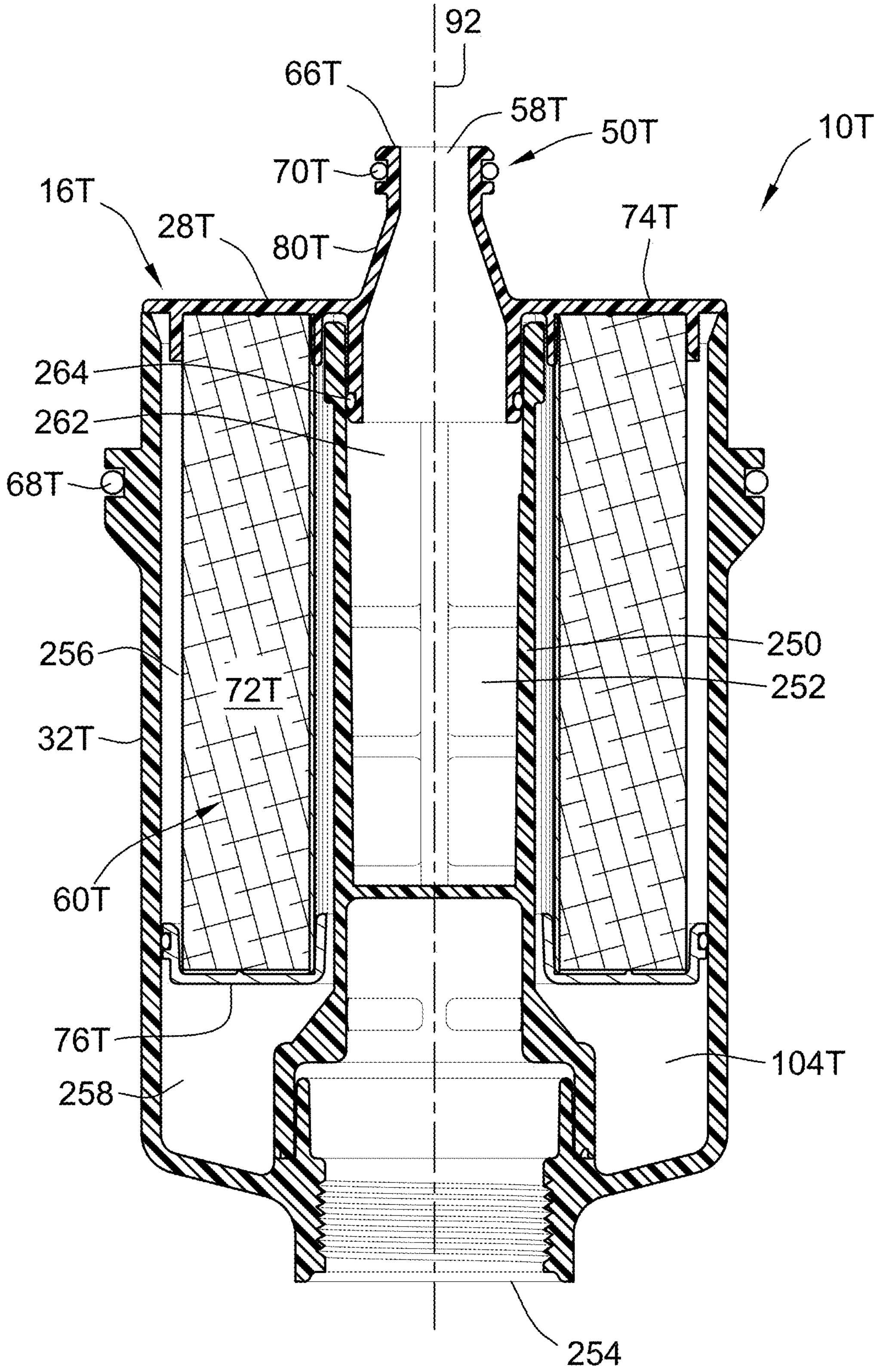
FIG. 64 is a cross-sectional view of the filter cartridge shown in FIG. 63.
Figure 65:
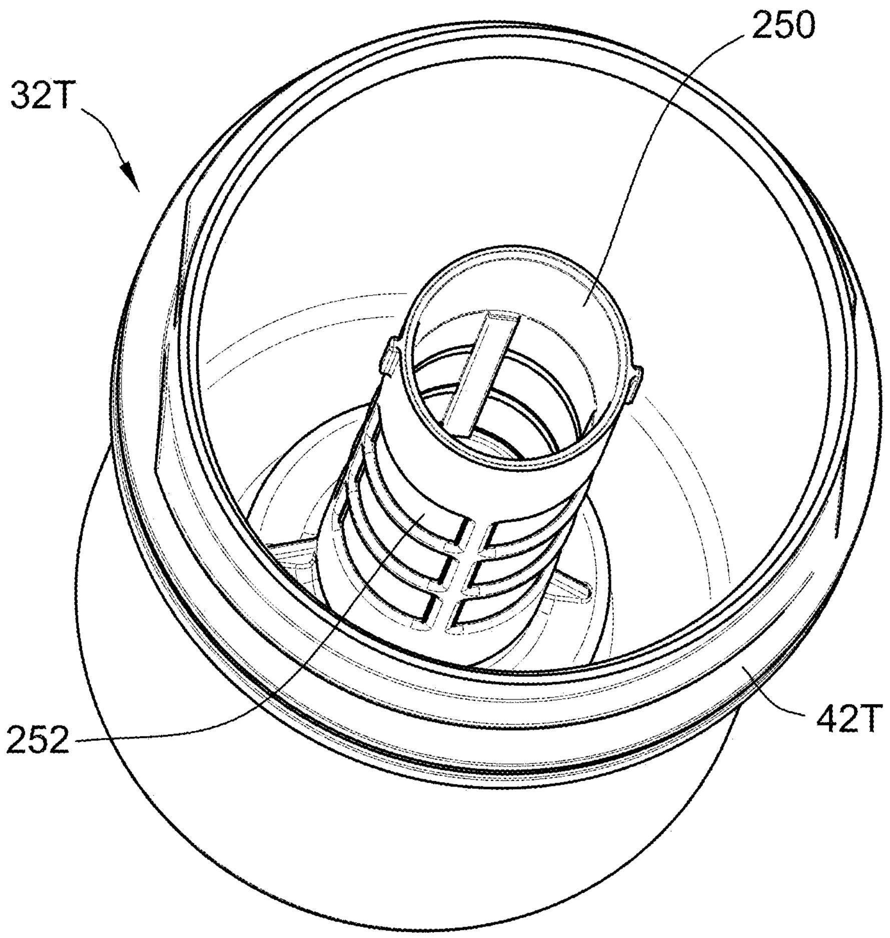
FIG. 65 is a perspective view illustration of the bowl employed in the filter of FIG. 63.
Figure 67:
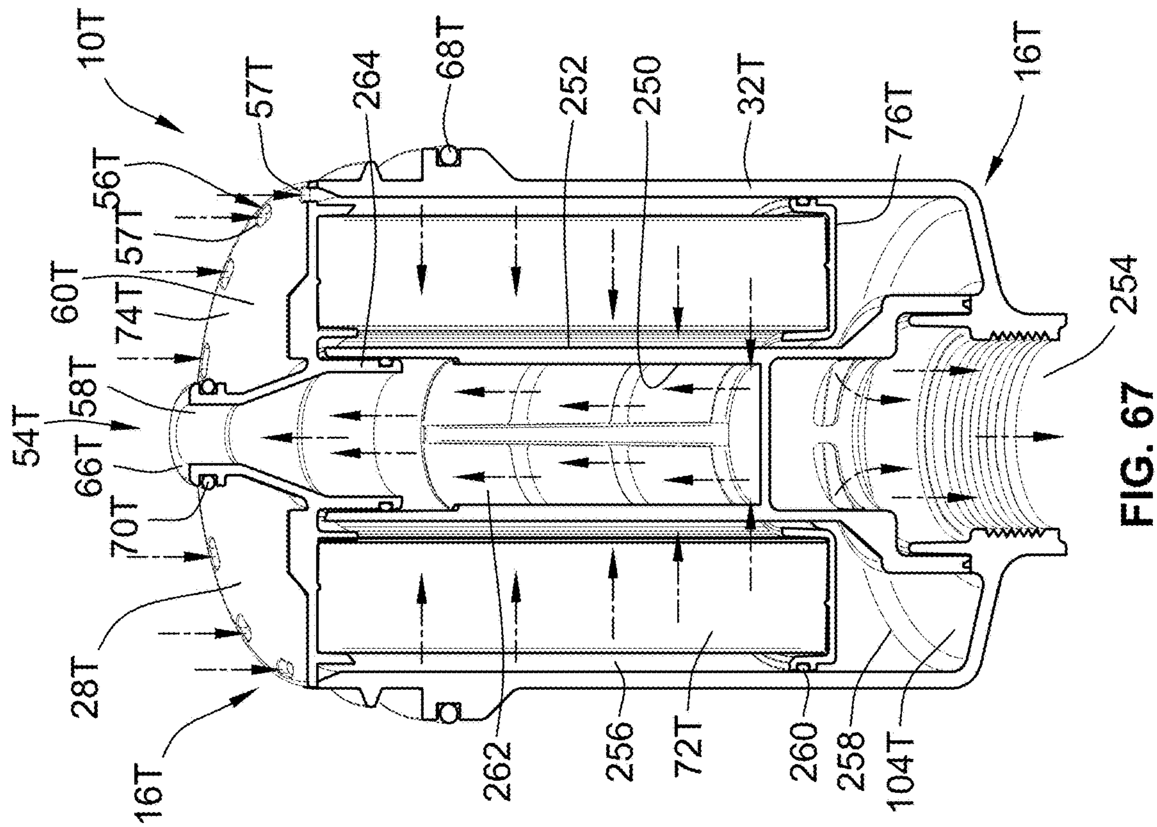
FIG. 67 is an isometric and cross-sectional view of the filter cartridge shown in FIG. 64.
Figure 66:
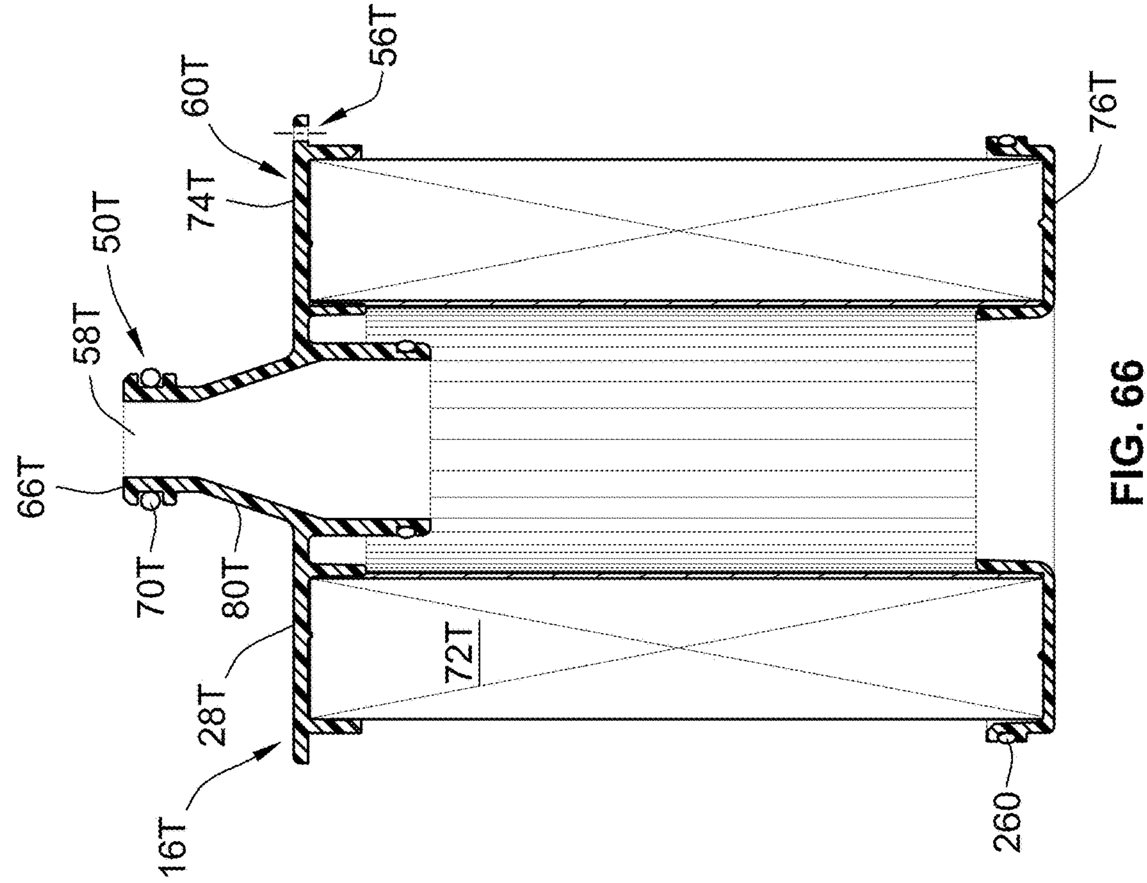
FIG. 66 is a side view of the filter element employed in the filter of FIG. 63.
Figure 68:
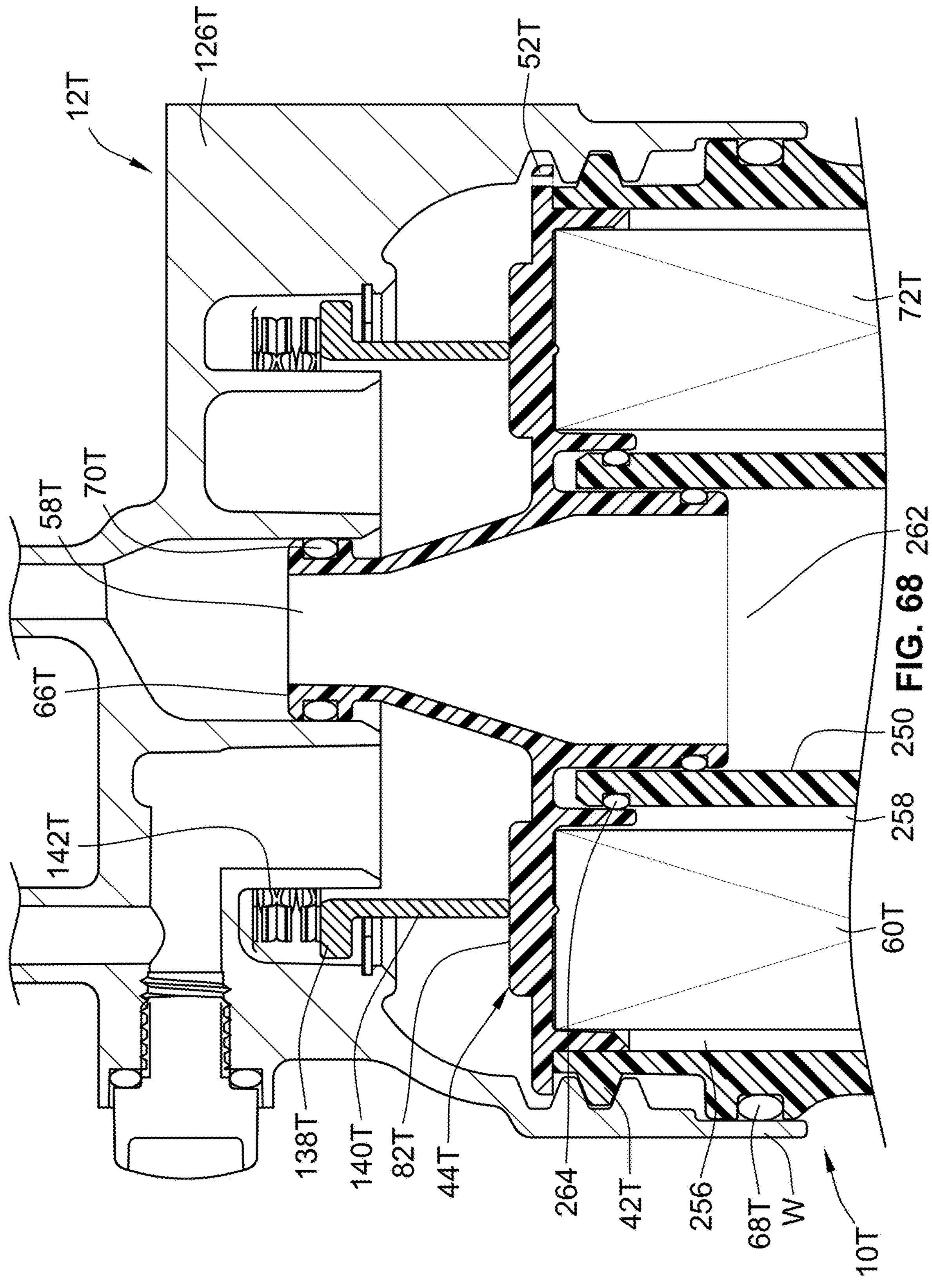
FIG. 68 is a cross-sectional view of a top portion of the filter cartridge shown in FIG. 63 in combination with a filter head to form an assembly.

There are also some functional distinctions relative to filtering occurring within bowl 32T as shown in the cross sectional illustrations of FIGS. 64 and 67 for example. Specifically, in this embodiment, the bowl 32T includes a standpipe 250 that supports a water strainer 252 that provides for water separation and to remove water, for example, from a fuel flow stream. This provides for two stage filtration including particulate filtration facilitated by the pleated filter media ring 72T and water stripping facilitated by strainer 252. Standpipe 250T may be a separate tubular member that is spun welded to a remainder of the bowl 32T. Further, at the bottom end wall, a drain cock may be provided similar to the first embodiment. However, this embodiment includes a larger threaded opening 254 that can facilitate a drain bowl attachment or alternatively a drain cock as in the first embodiment. In either event, bottom opening 254 is provided for removal of unwanted water.

Additionally, to facilitate two stage filtration, the bowl and filter element, when assembled into cartridge 10T, define a first stage chamber 256 and a second stage chamber 258 separated by annular seal 260. The annular seal 260 which may take the form of an O-ring gasket is supported in an outwardly facing groove extending from the bottom end cap 76T against the internal surface of the bowl 32T to provide a seal therebetween and section off first stage chamber 256 at a location upstream of the pleated filter media ring 72T. Below the seal is a gravitational sump 104T that is part of a second stage chamber 258. Second stage chamber 258 extends up into a region between standpipe 250 and the pleated filter media ring 72T and is disposed fluidically in series between the pleated filter media ring 72T and strainer 252. In the second stage, the fluid flow such as fuel is free of particulate being filtered by the pleated filter media ring, but still may have water contained therein which can then be removed by strainer 252. Due to gravity and when oriented in the orientation that facilitates the gravitational sump 104T, water migrates to the bottom of bowl 32T where it is capable of draining through bottom opening 254 either by way of a drain cock or into a separate water collection bowl (not shown). The outlet port 58T is connected to a third clean chamber 262 that is downstream and separate from the second stage chamber 258. A seal 264 may be used to separate clean chamber 262 from second stage chamber 258. The bottom of the standpipe 250 on the inside is closed with a solid bottom end wall such that liquid can only reach the clean chamber by way of passing through the strainer 252.

As shown, annular seal 264 may be used to seal between the top end cap 74T and the standpipe 250 to sealingly separate the respective chambers.

Figure 88:
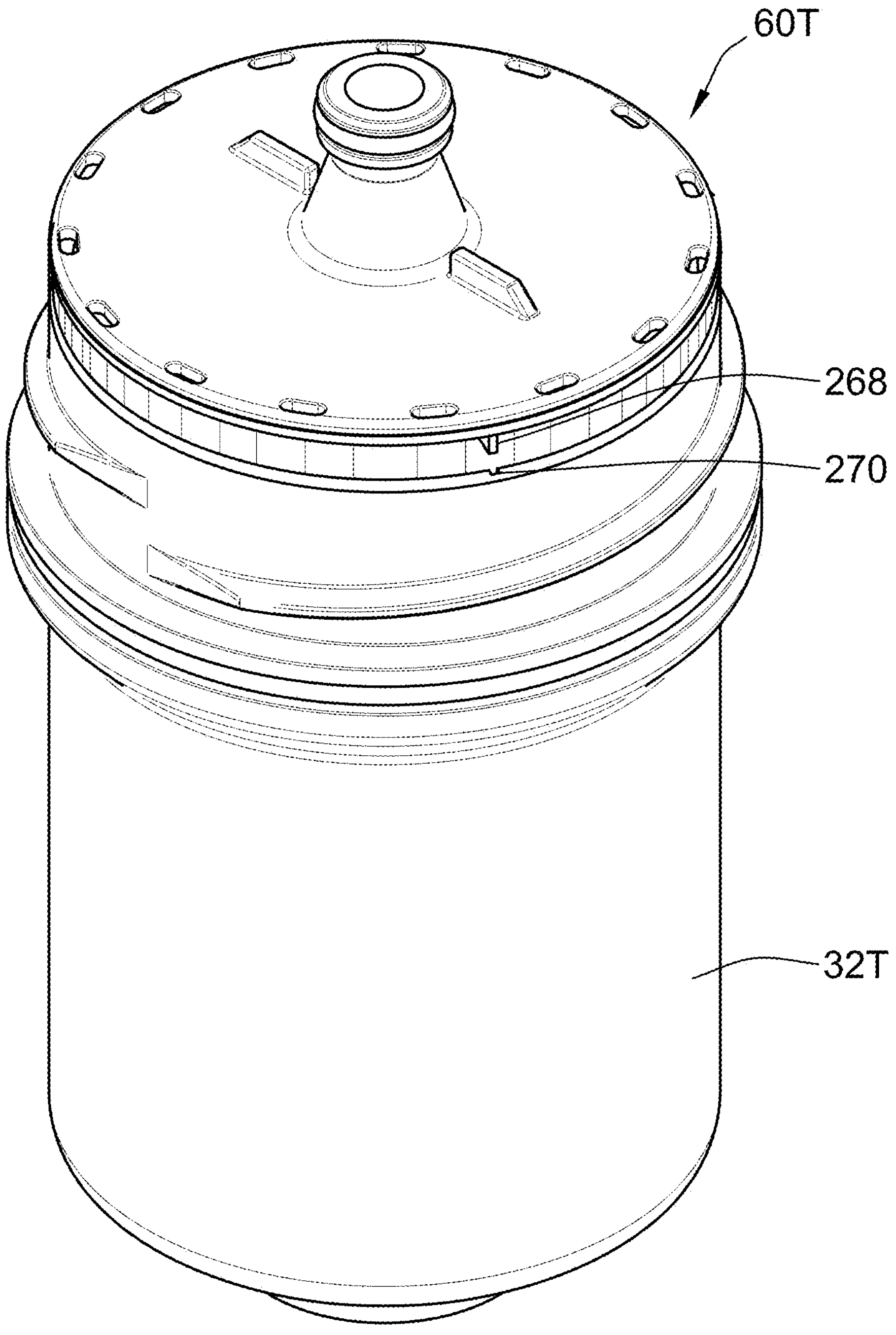
FIG. 88 is an isometric view of a filter in the form of a filter element, in which the filter is in combination with a preferably reusable bowl as shown in FIG. 63 in which element and bowl keys are further provided to facilitate predetermined clocking or angular orientation of the torsion lock detent member relative to the thread.
Figure 89:
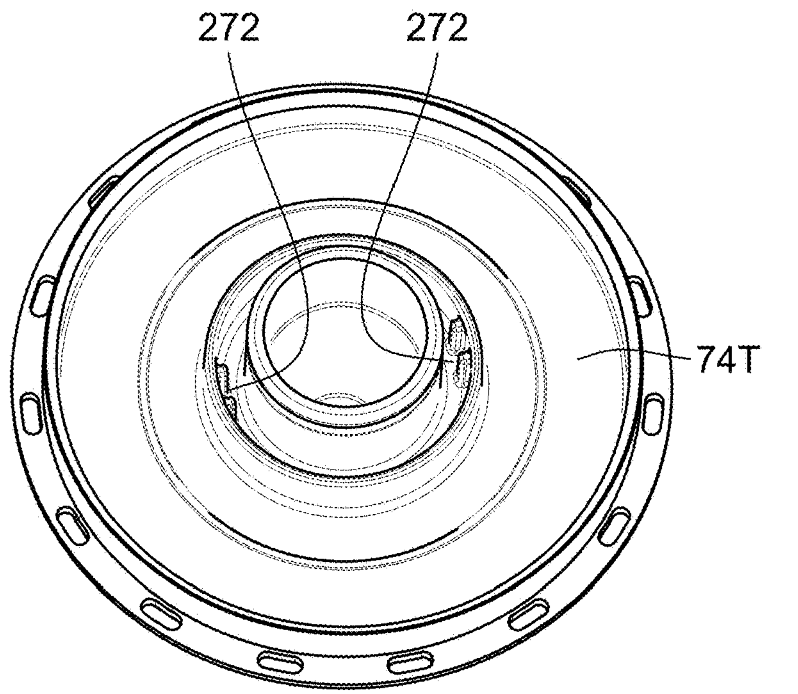
FIG. 89 is a bottom view of a top end cap with additional keys that can be used in with the filter element shown in FIG. 63.
Figure 90:
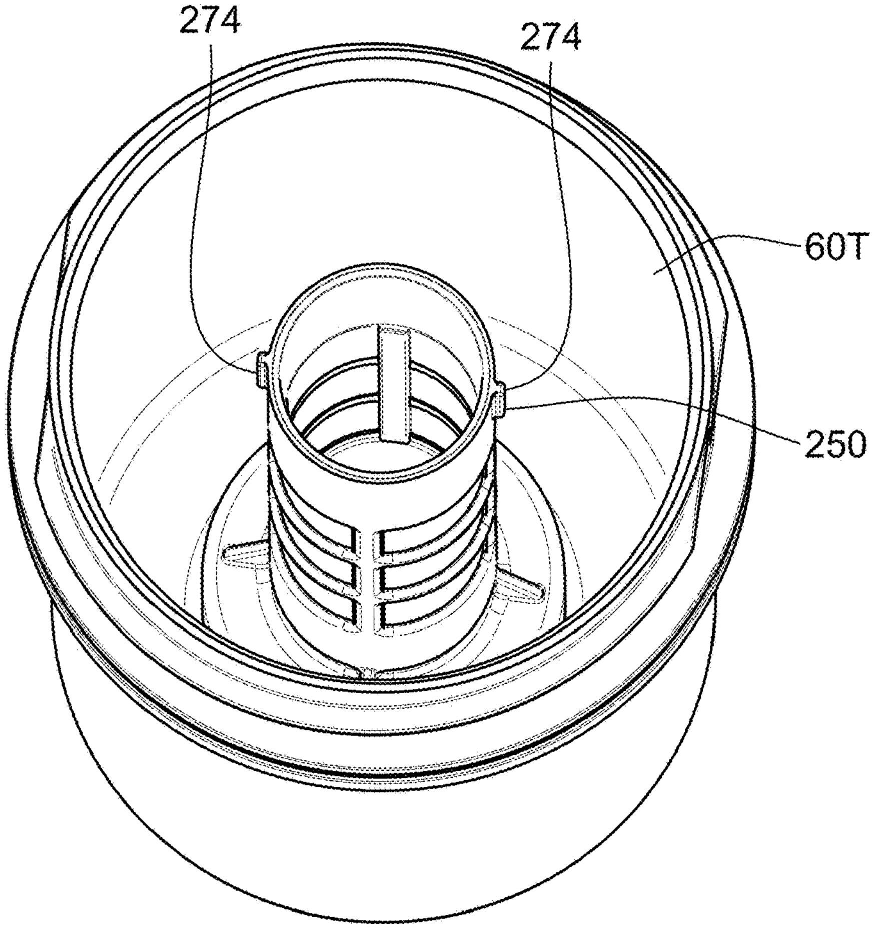
FIG. 90 is an isometric view of a bottom bowl with additional keys that can be used with the filter element having the top end cap shown in FIG. 89.
Figure 91:
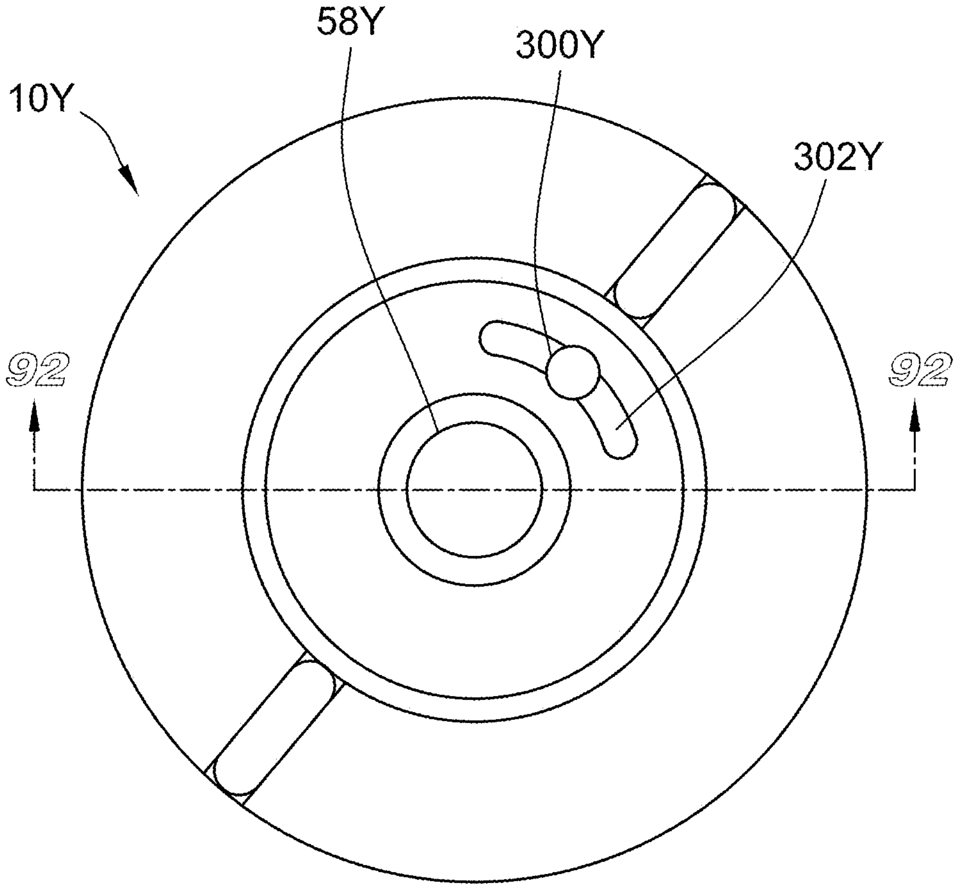
FIG. 91 is a schematic top view of a filter cartridge in accordance to a thirtieth embodiment of the present invention that is similar to that shown in FIG. 1-15 but with a fuel flow restrictor device in the form of a valve actuator pin.
Figure 92:
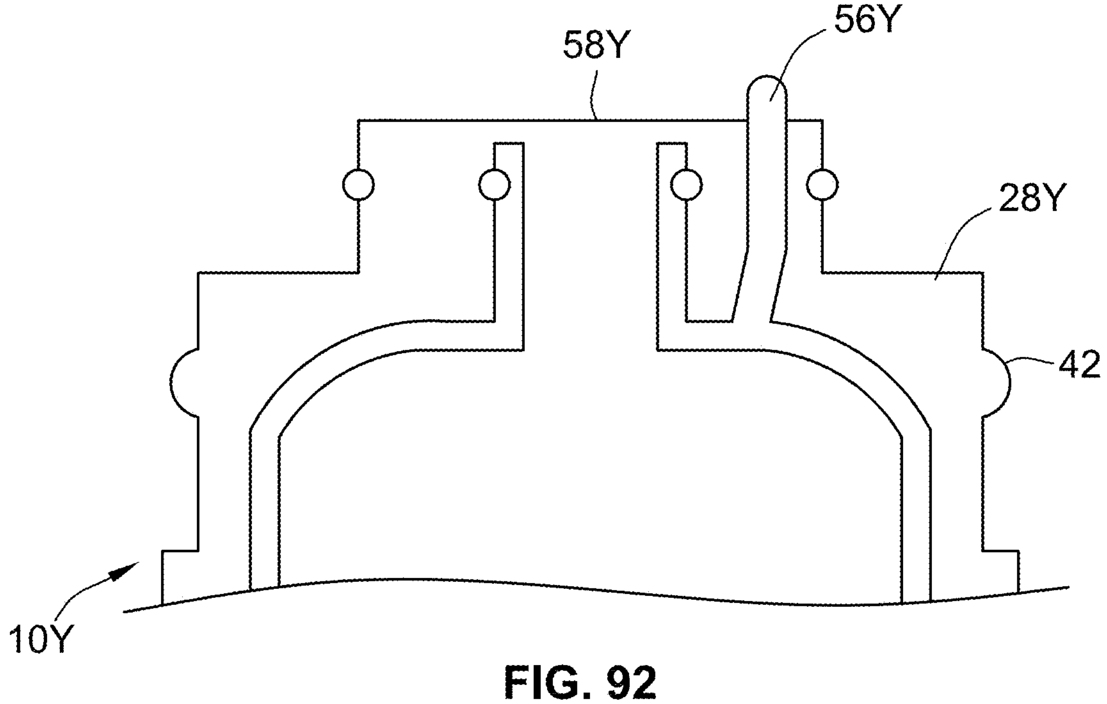
FIG. 92 is a schematic side cross-section view of the filter cartridge as is shown in FIG. 91.
Figure 93:
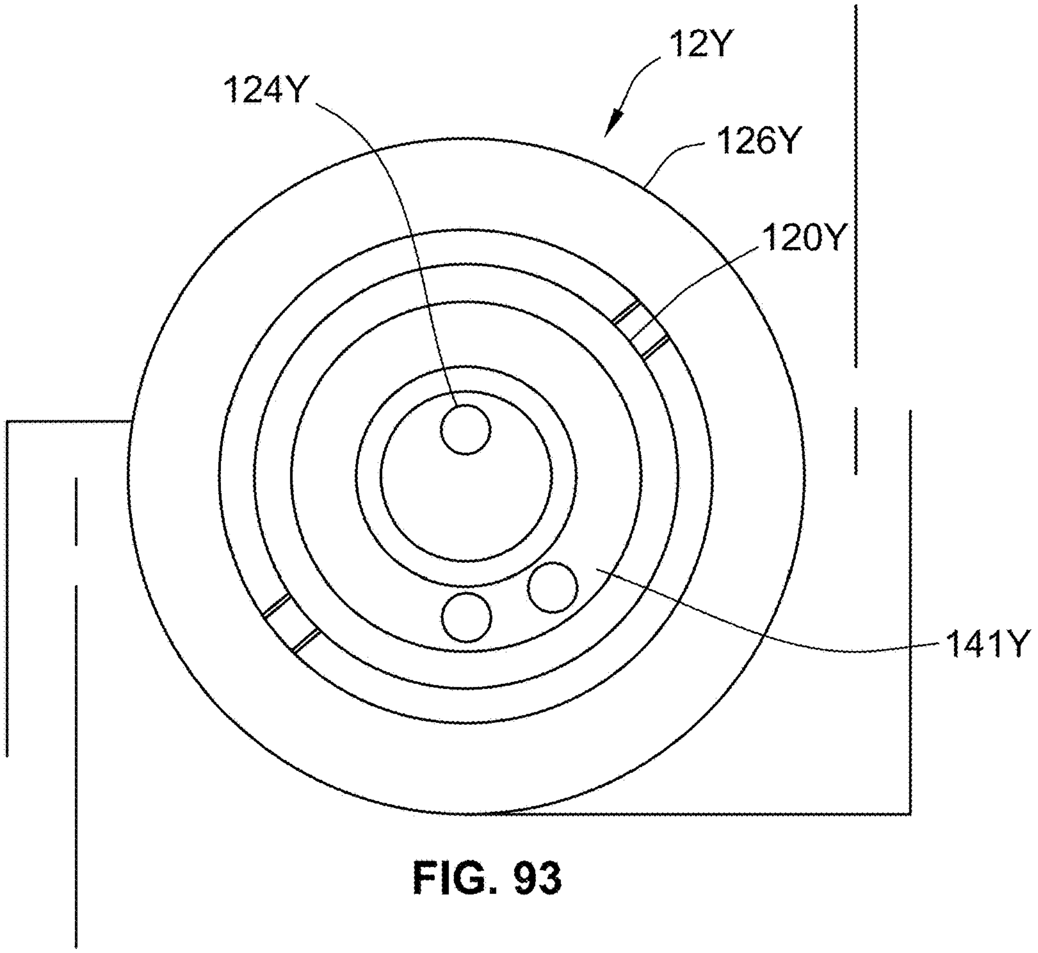
FIG. 93 is a schematic bottom view of a filter head as would be used in the filter as is shown in FIG. 91.

While the earlier embodiments advantageously do not necessitate keying, unless the filter element 60T is permanently joined to the bowl 32T at a predetermined angular orientation due to clocking during manufacture, to facilitate use of the torsion lock 44T, and for use with a disposable type of filter element 60T, keying or clocking is disclosed in FIGS. 88-90 in alternative forms. In FIG. 88, element and bowl keys 268 and 270, which may take the form of key tab and key slot arrangement, are provided at the outer periphery and just inside of shoulder region 52T to facilitate predetermined clocking or angular orientation of the torsion lock detent member relative to the thread. In the alternative, in the embodiment shown in FIGS. 89-90, it is shown that corresponding interlocking keys 272 and 274 may alternatively be provided at the inner diameter such as at a location between the standpipe 250 and a portion of the top end cap.

Figure 69:
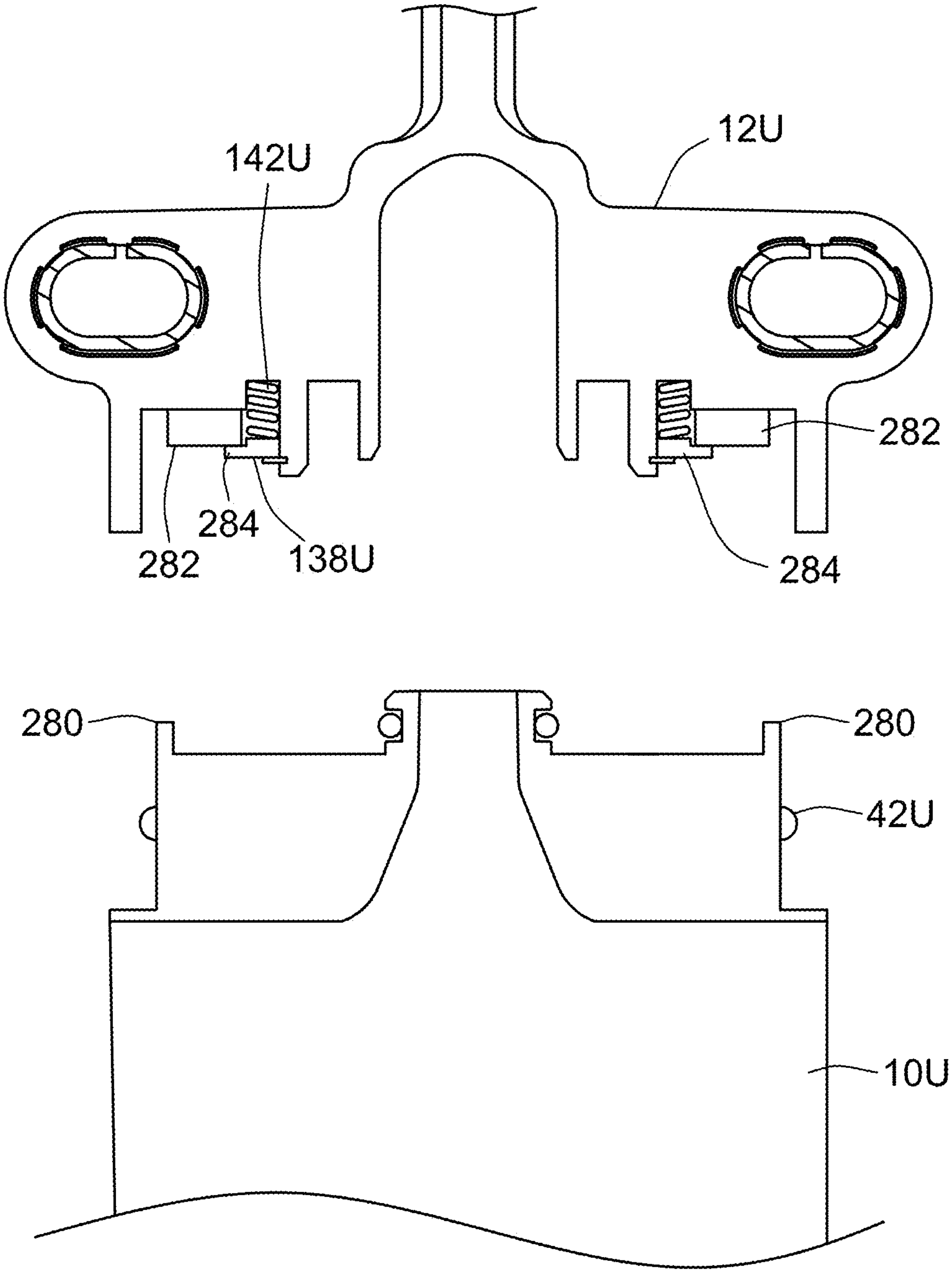
FIG. 69 is a partial schematic and partly cross sectional side view of a filter cartridge and filter head in an unsecured condition and spaced axially apart wherein the filter cartridge further includes a key to be used in conjunction with the lock ring at the interface between the head and the filter in accordance with a twenty-fifth embodiment of the present invention.
Figure 70:
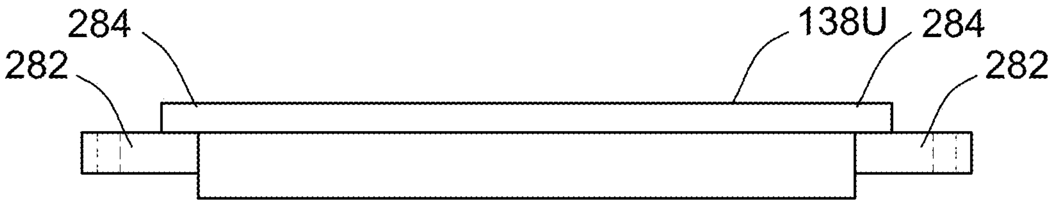
FIGS. 70-73 are partly schematic side and top views illustrating parts and operation of the lock member and the latch that holds the lock member and prevents actuation absent the key on the filter cartridge.
Figure 71:
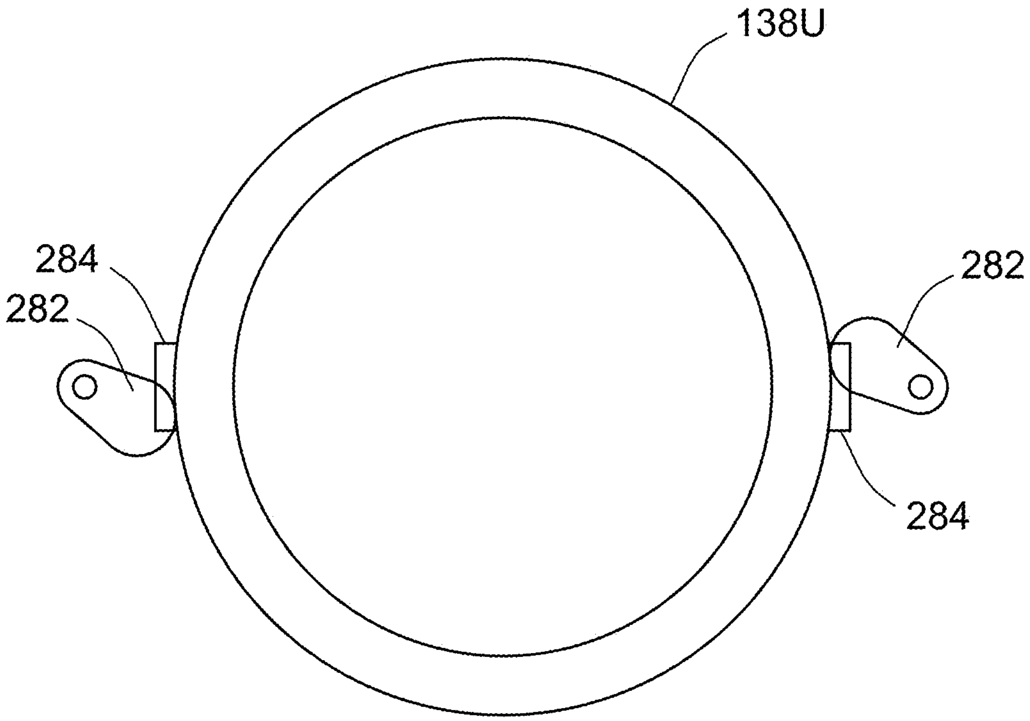
Figure 72:
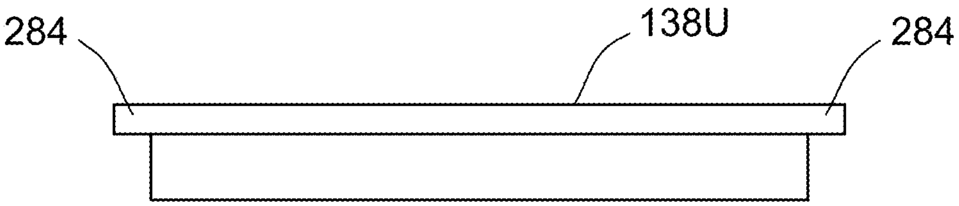
Figure 73:
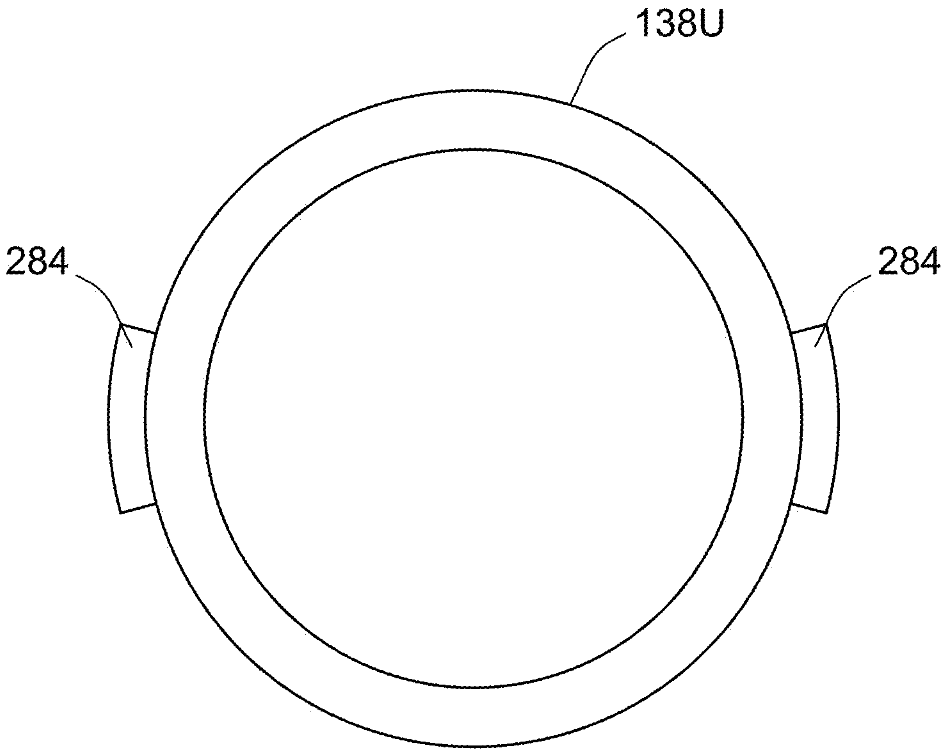

Turning to embodiment 25 shown in FIGS. 69-70, a schematic illustration of an additional header lock ring and element keying is provided that may be used for example with the filter cartridges of the other embodiments such as filter cartridge 10, filter head 12 and assembly of FIGS. 1-5 or other embodiments. Accordingly, the disclosure of the first embodiment of FIGS. 1-5 is fully applicable to the present embodiment, and this embodiment can be used, or as an additional feature, added to other embodiments disclosed herein. Like reference numbers will therefore be used and focus will be had relative to the additional aspects herein that may be used an employed.

As schematically shown, the filter cartridge 10U may be the same as that of filter cartridge 10 of the first embodiment and include torsion lock detent such as lock tabs that actuate a lock member 138U that is urged axially toward the filter cartridge 10U by spring 142U, in filter head 12U. This embodiment also includes a thread 42U provided by the filter housing to facilitate mounting of filter cartridge 10U relative to filter head 12U.

Relative to the other embodiments, this embodiment includes the provision of lock ring and element keying to unlock the lock member 138U and allow it to travel against the action of the spring 142U. Specifically, the filter element includes external keys 280 at the top end. Unlike the previous embodiment, these external keys 280 are not provided to facilitate keying between the filter element and the filter housing or between different housing members but instead are used to facilitate keying between the filter cartridge and the filter head.

The keys 280 are arranged to engage with latch members 282 that may be pivotally mounted to the mounting base of filter head 12U. Latch members 282 may have torsion springs causing them to have a normally latched condition in which the latch member 282 overlaps a portion of the lock member 138U and prevents lock member 138U from axially translating. The latch member 282, however, can be released and pivoted out of overlapping relation with the lock member 138U by the external keys 280 that extend axially from the housing of filter cartridge 10U and toward the filter head. Thus, the keys 280 are freely located and extend toward terminating freely engageable ends that are aligned with and arranged to engage with latch members 282. As a result, the latch members 282 are moveable between a latched condition preventing axial movement of the lock member and an unlatched condition allowing axial movement of the lock member. The key in the secured condition acts upon the latch member to provide and keep the latch member in the unlatched condition; the key 280 is arranged at a predetermined orientation relative to the lock member such that during rotation of the filter cartridge from an unsecured position to a secured position, the key is sufficiently forward of the torsion lock detent member (such as lock tabs 82 shown in FIGS. 1-5) to engage the latch member before the torsion lock member drives the lock member against the action of the spring member.

To provide for an overlapping condition between latch member 282 and the lock member 138U, the lock member body may have tabs 284 extending radially outward therefrom that provide structure which can overlap with the latch members 282 in the unsecured condition.

Figure 75:
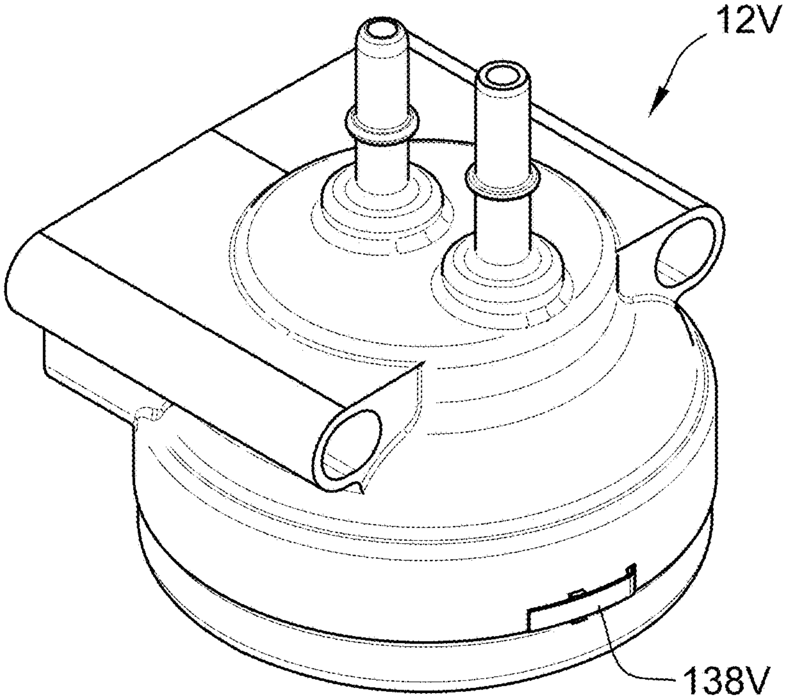
FIG. 75 illustrates an isometric view of a filter head usable with a filter cartridge that employs the cap of FIG. 74.
Figure 76:
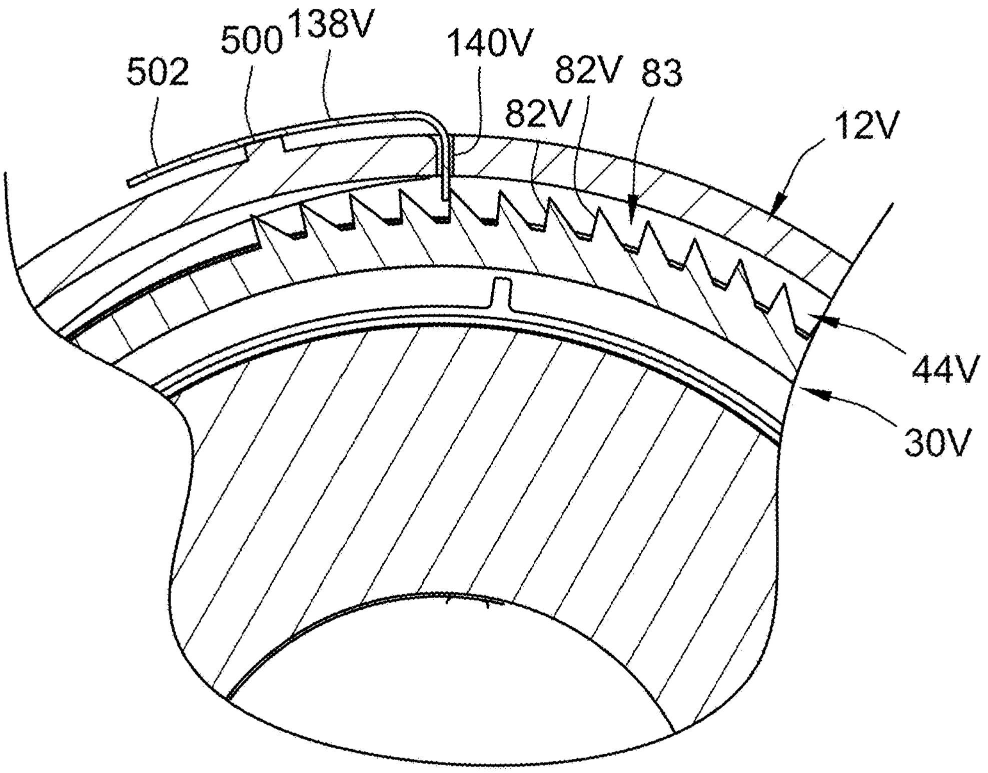
FIG. 76 is a cross section taken through a portion of the filter head of FIG. 75 with a filter cartridge using the cap of FIG. 74 mounted thereto showing radial detent locking, the cross section being taken through a horizontal plane and through the radially acting detent.

Turning to the 26th embodiment shown in FIGS. 75-76, an alternative embodiment for a top cap member 30V is illustrated that can be substituted for the top cap member 30 of the first embodiment shown in FIGS. 1-5 to provide for a filter cartridge that is the same as filter cartridge 10, other than the configuration difference of the top member 30V. Accordingly, the disclosure of the first embodiment of FIGS. 1-5 is fully applicable to the present embodiment as the present embodiment merely involves a substitution of a different top cap member to provide for a different type of torsion lock detent action.

Like the first embodiment, plastic cap member 30V includes the same portions including top annular end wall 28 that extends radially outward from outer annular wall 64 and transitions through shoulder region 52 into annular sidewall 24 where a thread 42 is provided that may be provided by a pair of helical thread ribs 48 on opposing sides of the cap 30V. The difference is that the torsion lock detent member 44V is different in that rather than extending axially higher along the top annular wall 28, instead this torsion lock detent member 44V extends radially along the annular sidewall 24, proximate the top end rather than at the top end (i.e. in other embodiments the torsion lock detent member includes a location radially inward from the annular sidewall or shoulder). The torsion lock detent member 44V may take the form of a plurality of detent tabs 82V that together may form a linear gear rack 83 that can interact and provide for radial detent action with a lock member 138V that may take the form of a spring loaded ratchet with a detent pin 141V that projects into recessed slots formed between detent tabs 82V during use. Thus, the configuration of the present embodiment employs a concept similar to a cable tie in that detent tabs 82V have one side that is slanted or provides for a cam surface to allow the ratcheting detent pin 140V to deflect outwardly and around the detent tabs 82V. Such ratcheting during cartridge attachment can occur until reaching a secured condition between the filter head and the filter cartridge.

As shown in FIG. 76, the lock member 138V may be provided by a segment of spring steel and with a bent end forming the lock member detent 140V in the form of pin 141V that extends radially inward through the outer cylindrical sidewall of the filter head 12V to be in alignment with detent tabs 82V during use. Thus, the spring in this embodiment is integrally provided by the spring steel of lock member 138V. Lock member 138V has a portion that is affixed such as bonded or welded to the mounting base of the filter head 12V.

Figure 74:
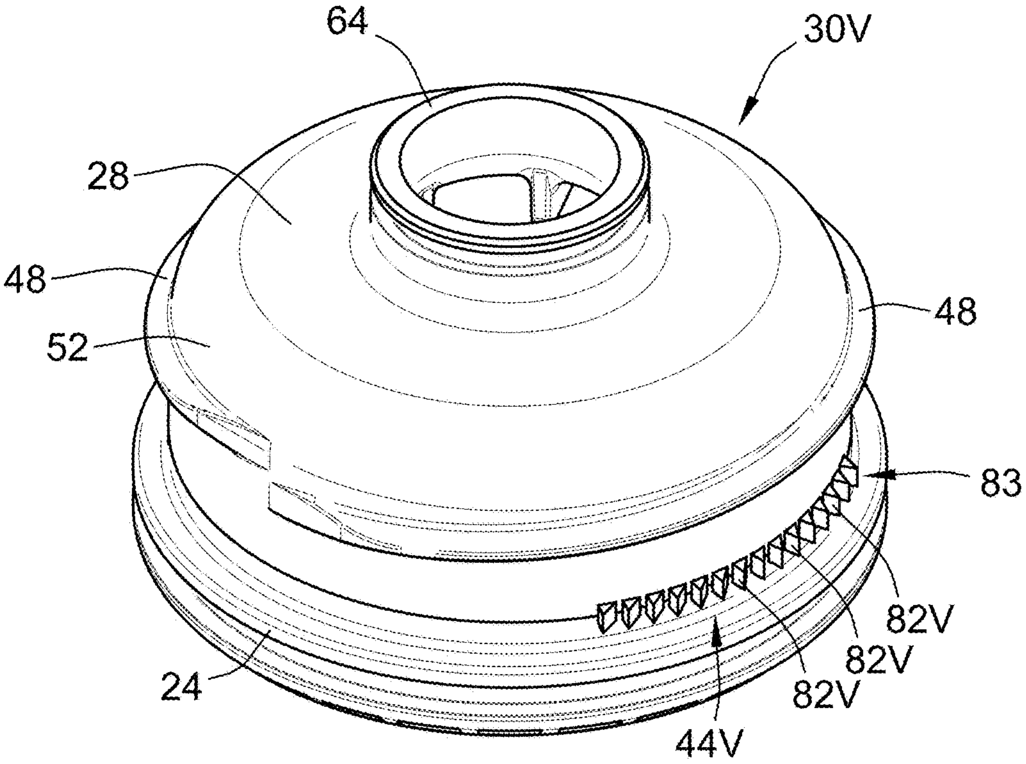
FIG. 74 is an isometric view of a top member in the form of a cap that may be employed in place of the cap on filter cartridge of the first embodiment and which provides a radially acting torsion lock detent member in accordance with a twenty-sixth embodiment of the present invention.
Figure 77:
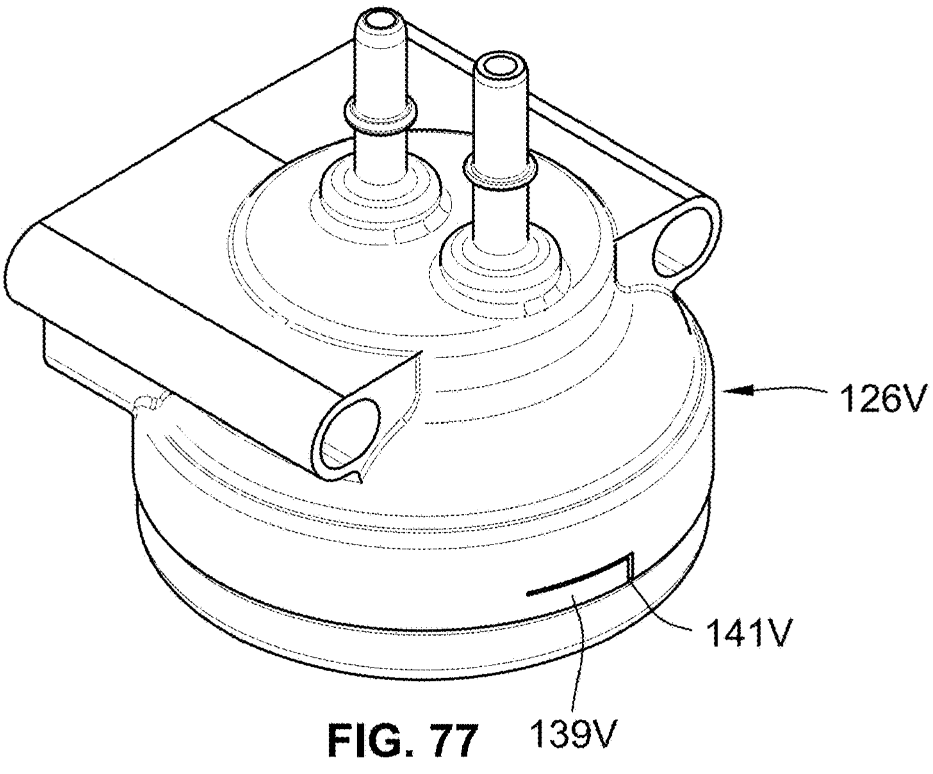
FIG. 77 is an isometric view of a filter head according to a twenty-seventh embodiment that is the same as that shown in FIG. 75 but with an integrally formed locking member on the filter head.

FIG. 77 shows an embodiment of the filter head also usable with the cap 30V shown in FIG. 74, but in this case the lock member is integrally provided by the filter head as part of a one-piece unitary filter head mounting base member 126V through the material of the filter head which may be plastic or, alternatively, possibly cast metal material, the detent pin 141V can flex radially inwardly and outwardly to engage ratchet inwardly and outwardly around detent tabs into locked relationships and unlocked relationships if sufficient force and torque is provided in the released condition.

The release face of the detent tabs 82V (face that engages during filter removal action) is less inclined than the install face (face that engages during filter installation). Alternatively, the release face may be 90 degrees or more to prevent detachment or cause an overcenter condition that prevents release of the filter unless the mechanic manually deactivates the lock member 138V much like tie cables. For example, lock member 138V can be attached at a resilient hinge 500 (potentially a living hinge) and a press arm 502 positioned on a side opposite the lock member detent 140V can be pressed to pivot the lock member 138V as a whole and lift the lock member detent 140V entirely out of engagement with the torsion lock detent tabs 82V of the filter cartridge, such that no additional torque to overcome the detent locking is required to unthread. Instead, by actuating and deactivating the lock member 138, the torsion locking is released and one can readily unthread the filter.

Figure 78:
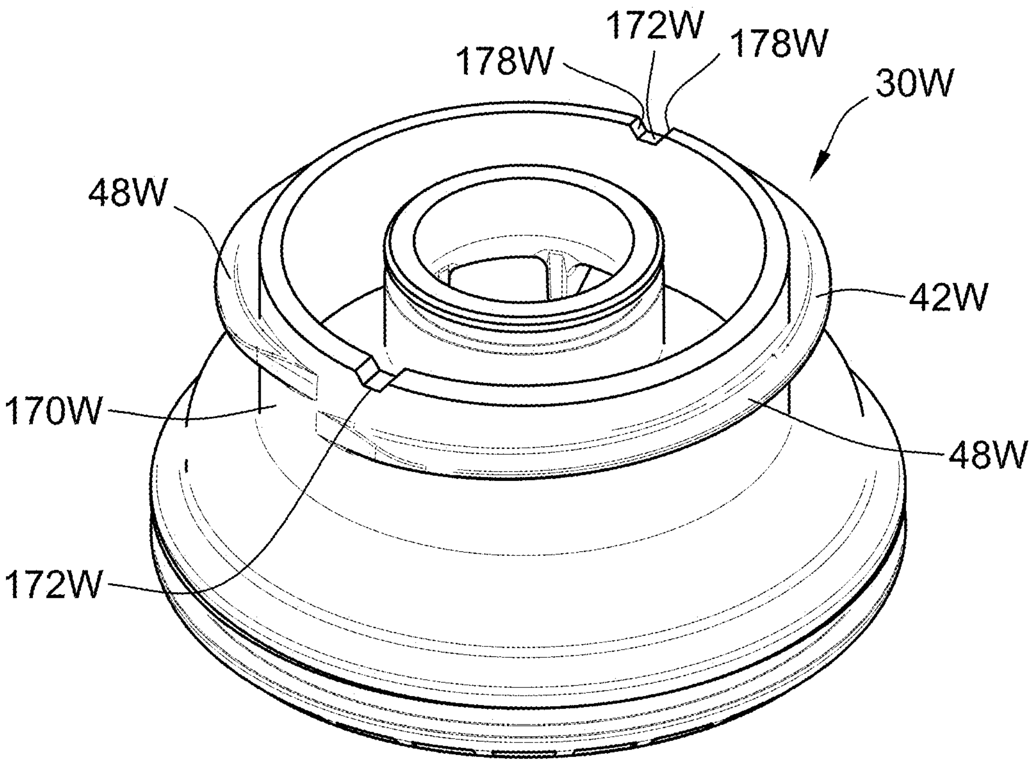
FIG. 78 is an isometric view of a top cap member for a filter cartridge in accordance with a twenty-eighth embodiment that would otherwise be the same as the filter cartridge shown in the first embodiment of FIGS. 1-5.
Figure 79:
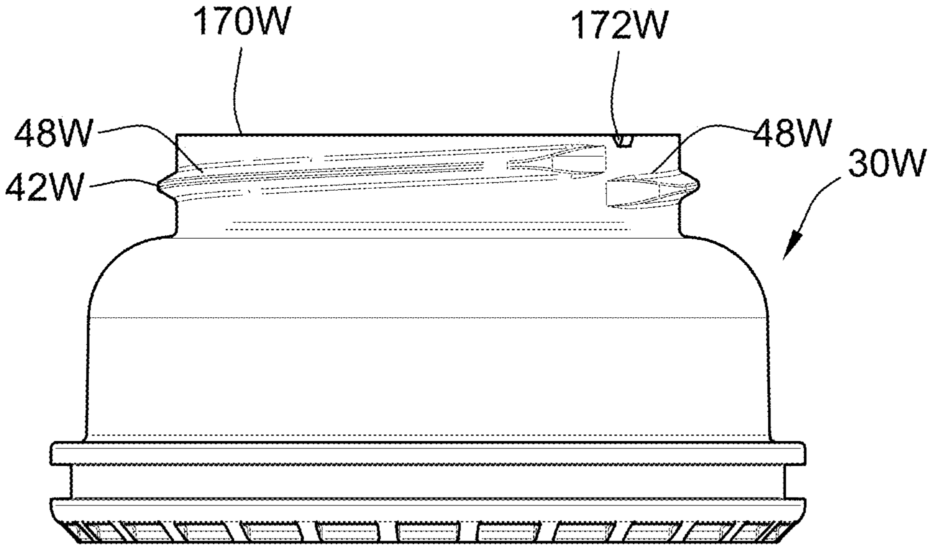
FIG. 79 is a side view of the top cap member shown in FIG. 78.
Figure 80:
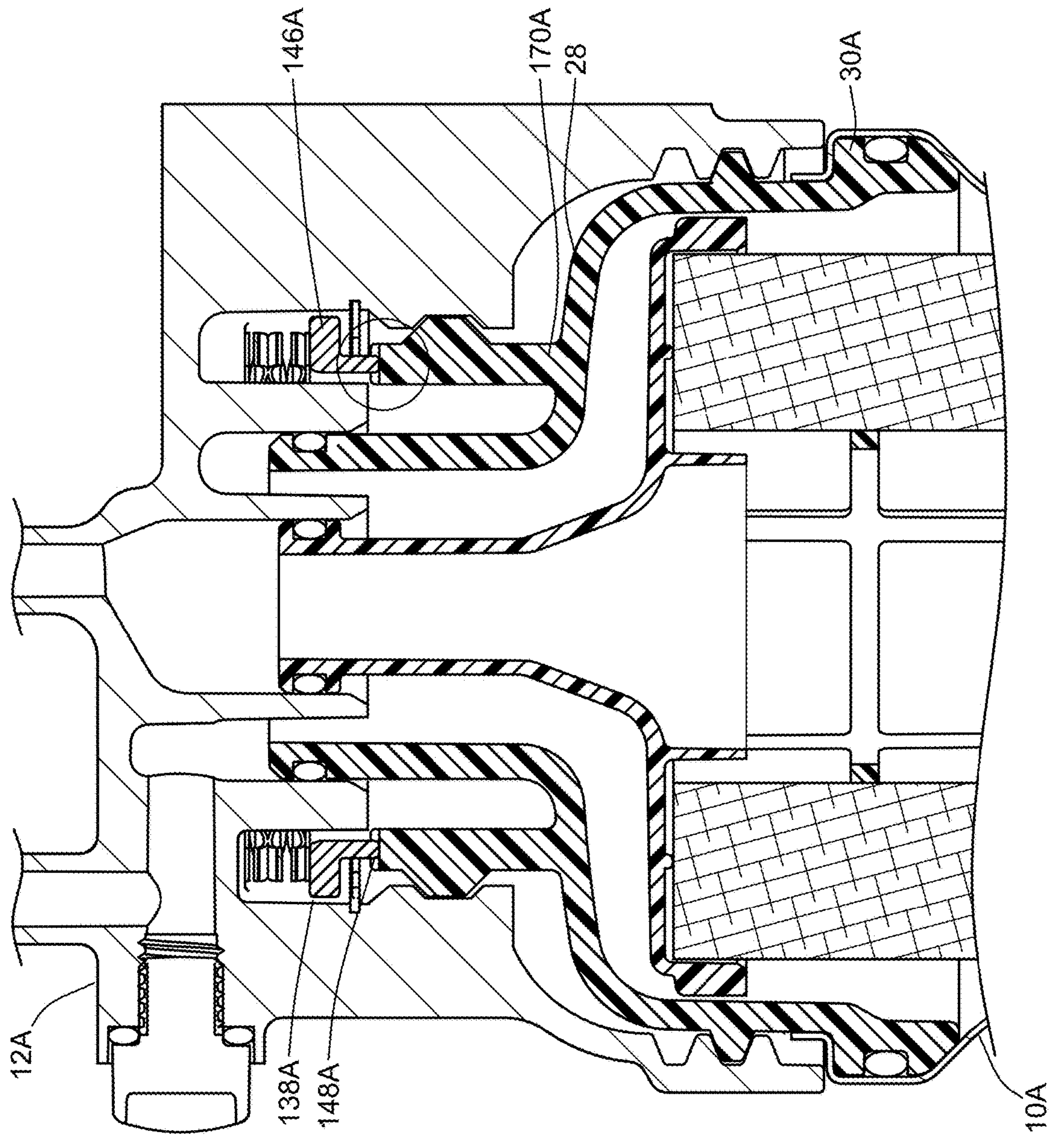
FIG. 80 is a cross section of a filter head and a top portion of a filter cartridge employing the cap shown in FIG. 78.
Figure 80A:
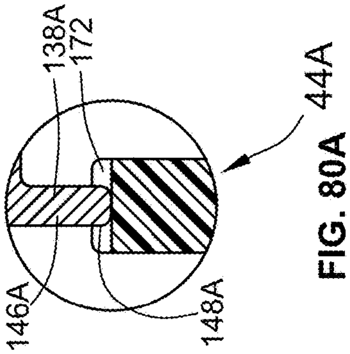
FIG. 80A is an enlarged view of the interlocking tab and slot of FIG. 80 that provides for torsion locking.
Figure 81:
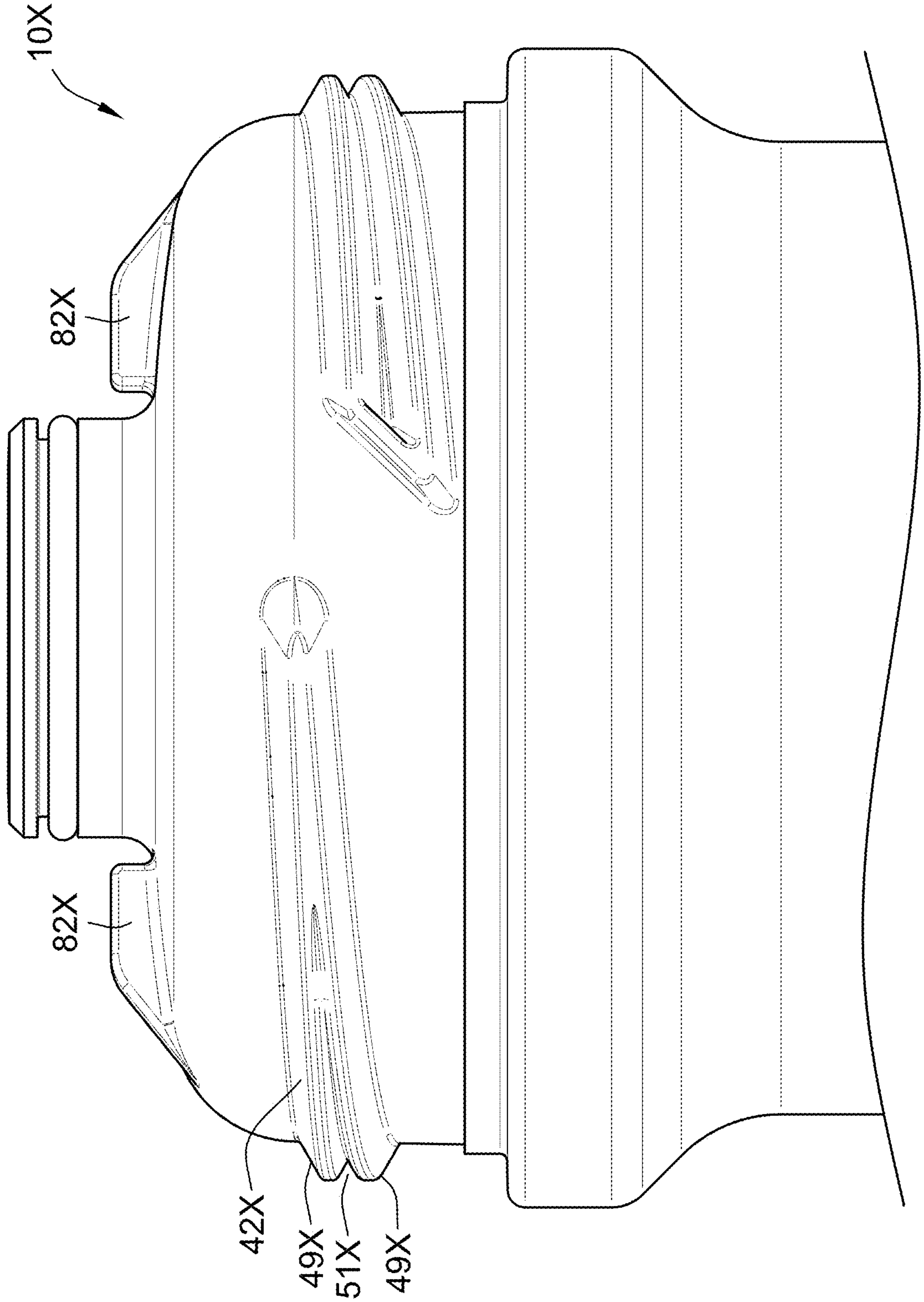
FIG. 81 is a side view of a top portion of a filter cartridge according to a twenty-ninth embodiment.
Figure 82:
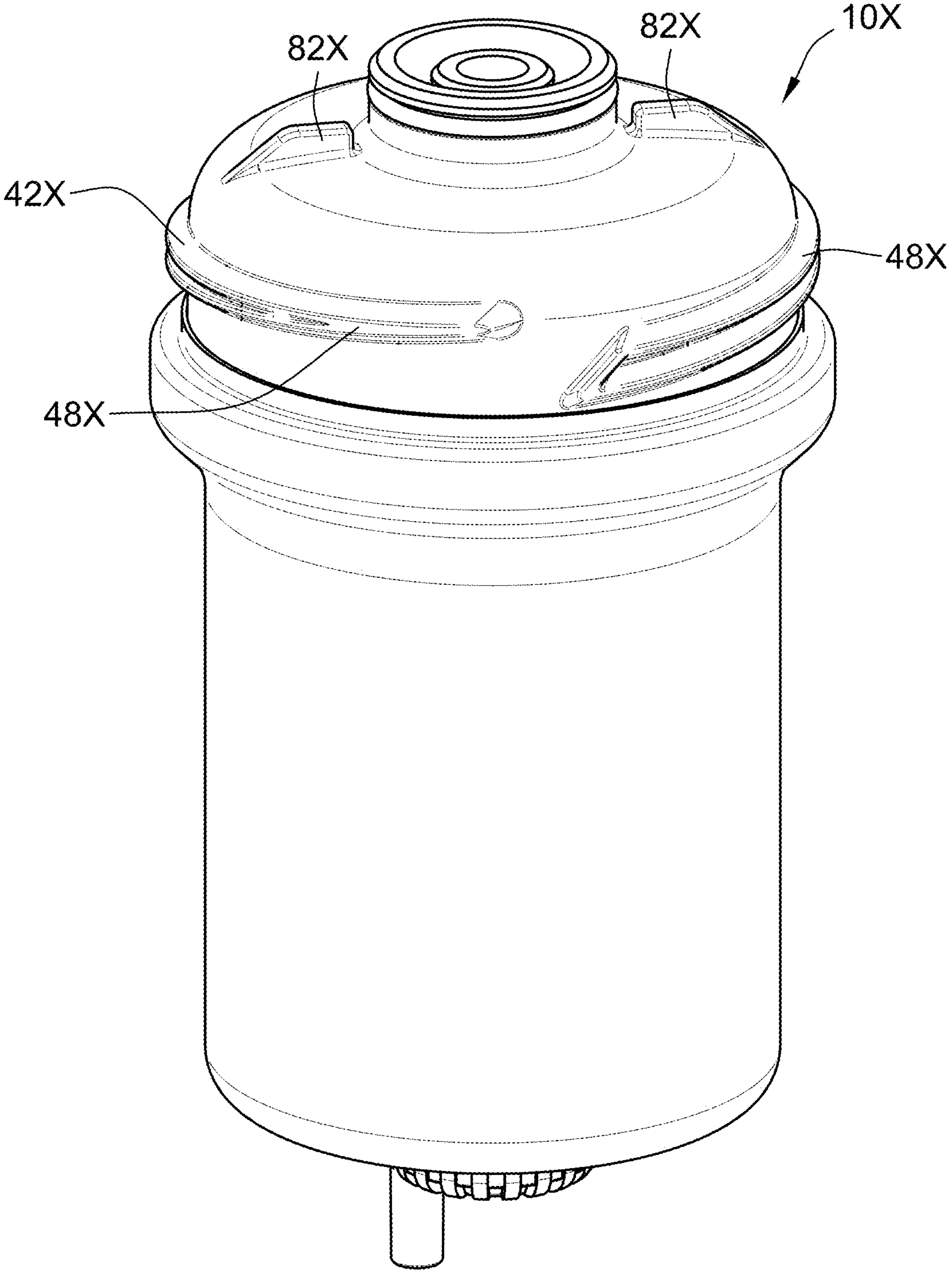
FIG. 82 is an isometric view of the filter cartridge shown in FIG. 81.
Figure 83:
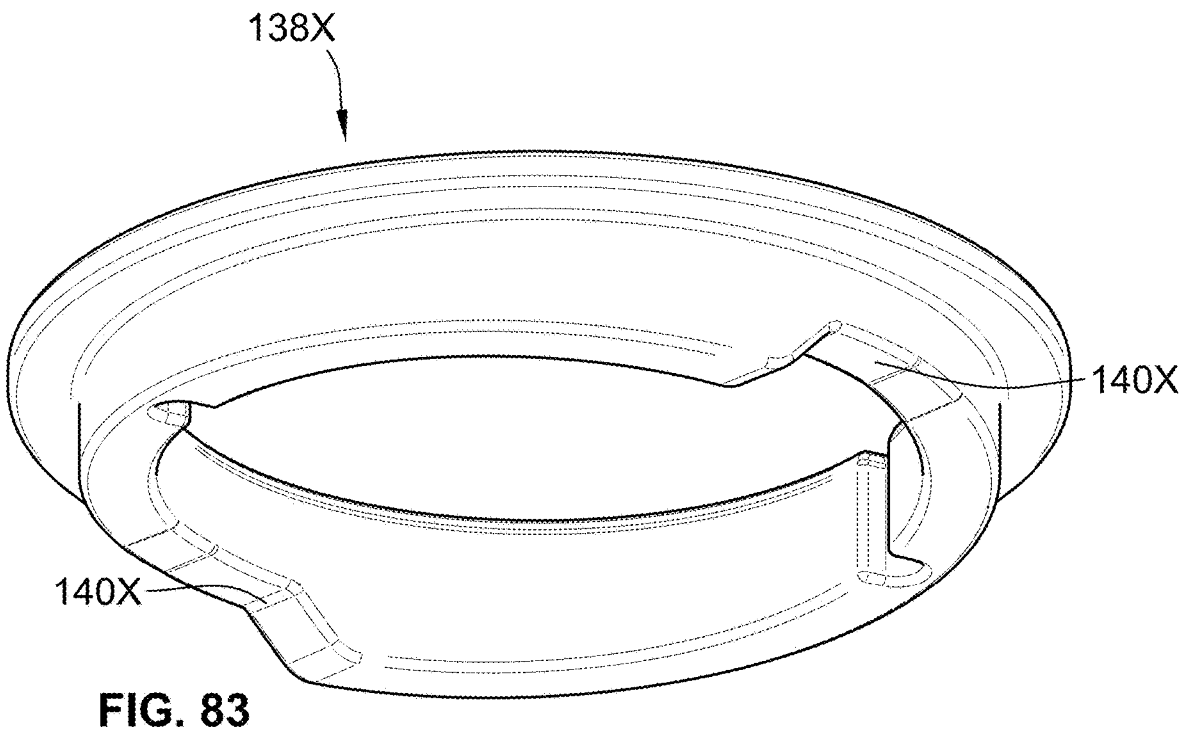
FIG. 83 is an isometric illustration of the lock member for implementation in a filter head usable with the filter cartridge shown in FIG. 82.
Figure 84:
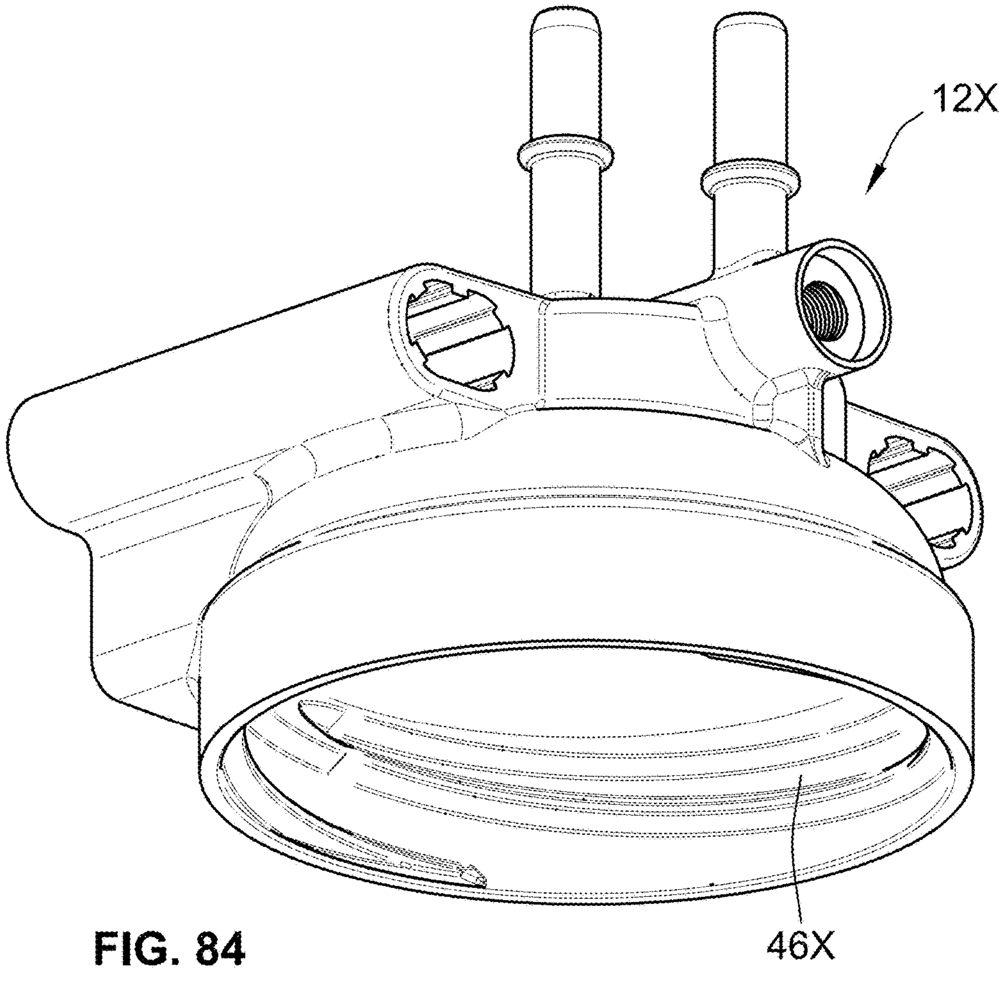
FIG. 84 is an isometric view of a filter head usable with the filter cartridge shown in FIG. 81.
Figure 85:
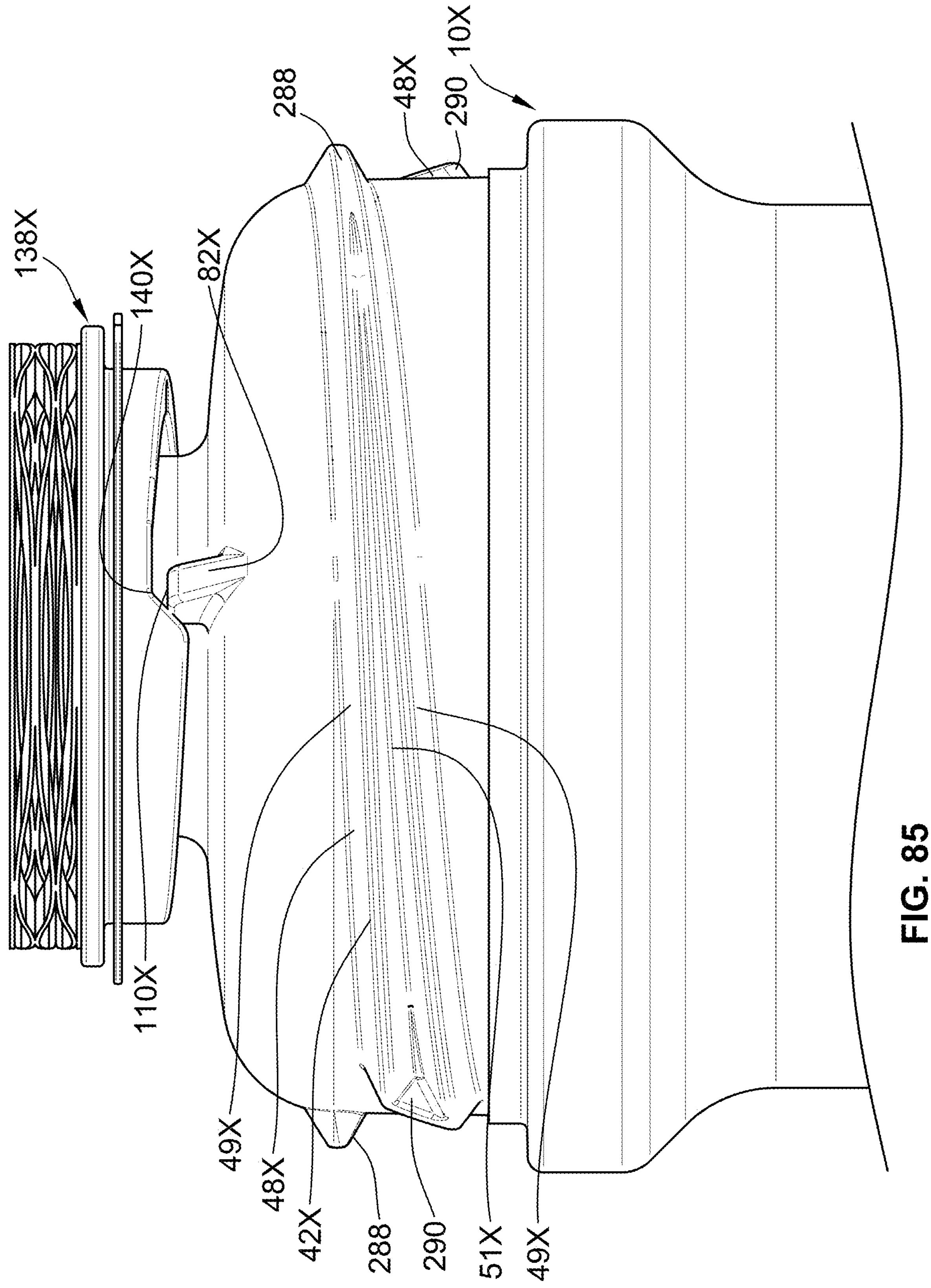
FIG. 85 a side view of a top portion of the filter cartridge shown in FIG. 81 in combination with the lock member assembly of the filter head employing the lock member of FIG. 83, the remainder of the filter head not being shown to better illustrate the lock member.
Figure 86:
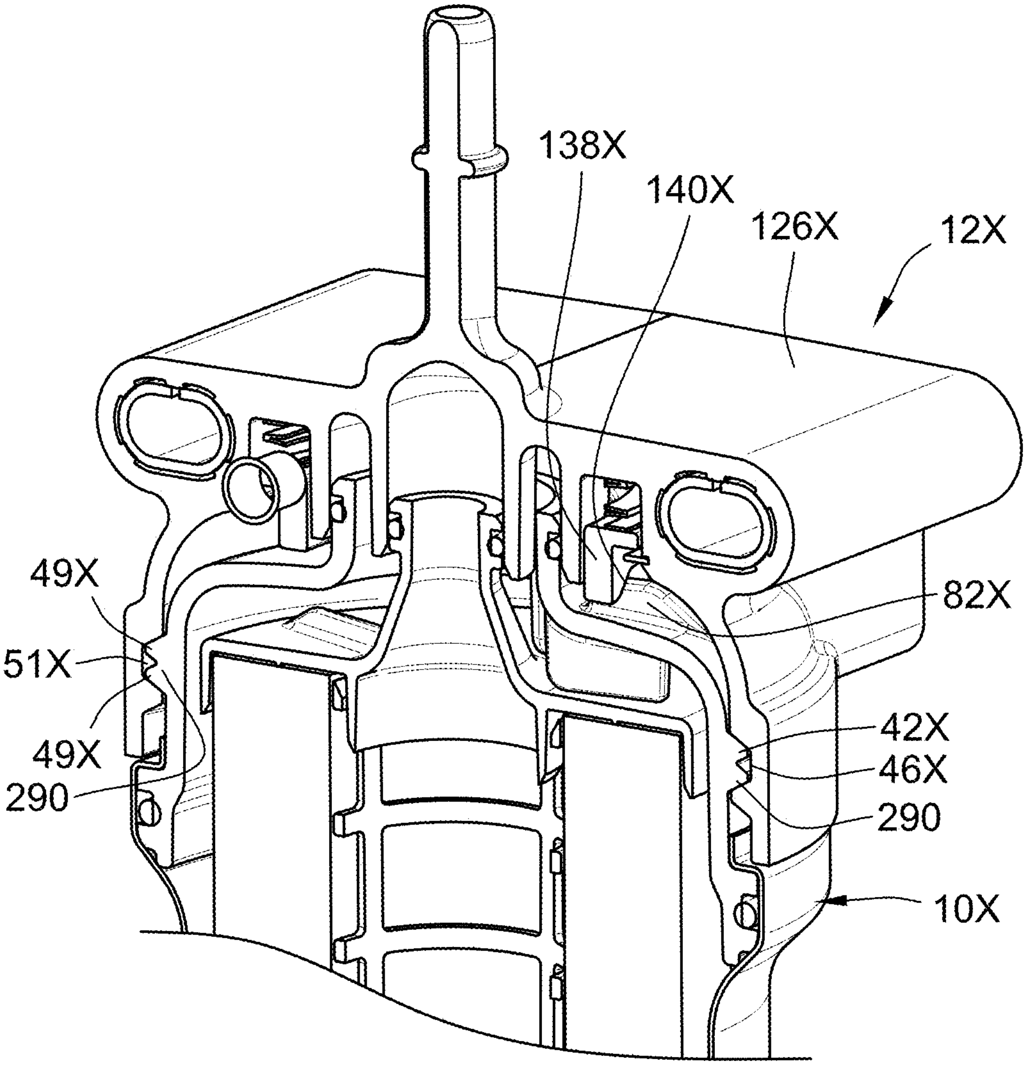
FIG. 86 an isometric cross section of a top portion of the filter cartridge shown in FIG. 81 in combination with a filter head to form an assembly.
Figure 87:
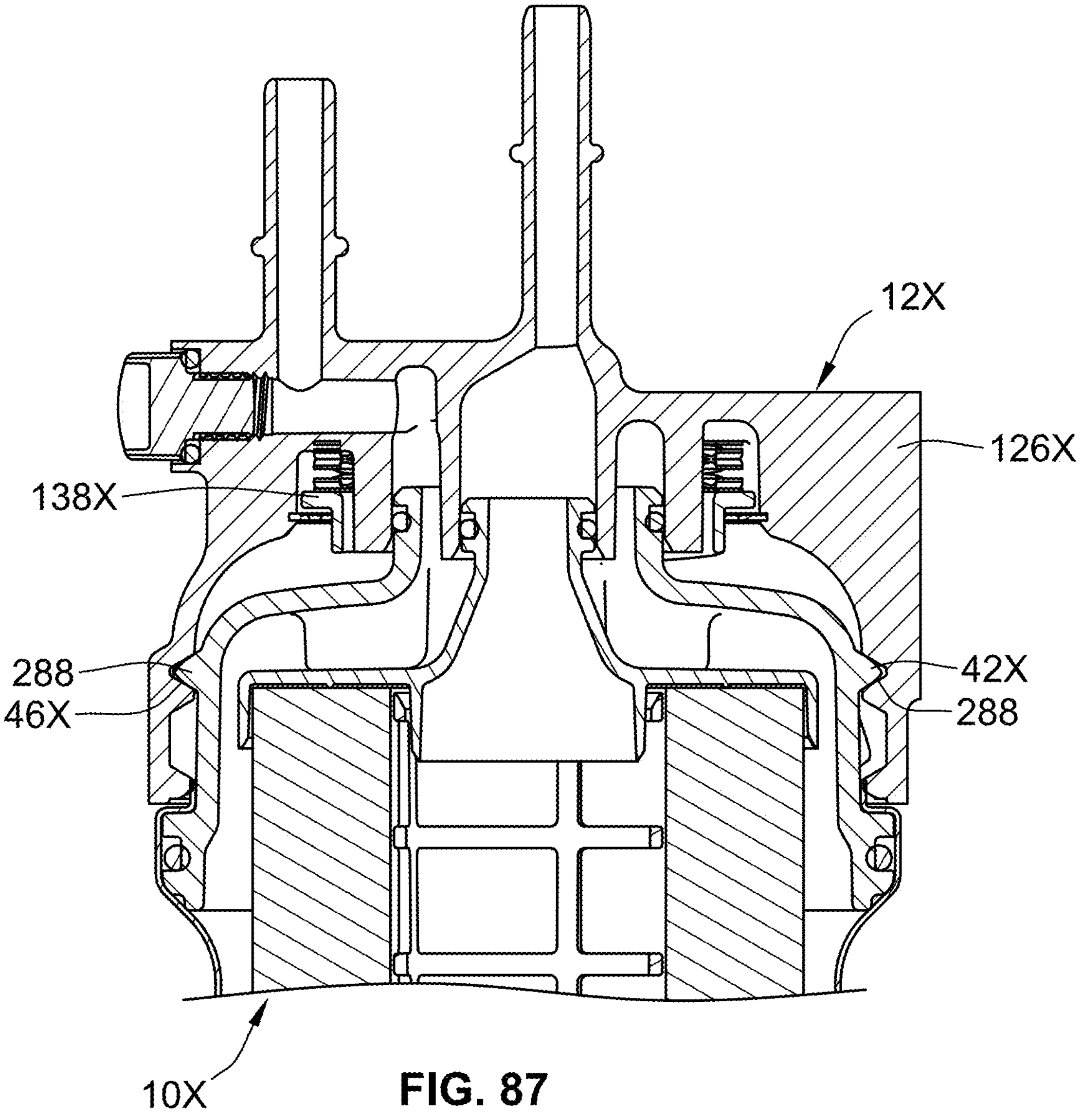
FIG. 87 is a cross sectional view of a top portion of the filter cartridge shown in FIG. 81 in combination with the filter head shown in FIG. 84 to form an assembly.

Turning to the 28th illustrated embodiment shown in FIGS. 78-80, a filter is illustrated in the form of a filter cartridge 10W for use with a filter head 12W that is understood to employ the same components and be the same filter cartridge 10, filter head 12 and assembly of FIGS. 1-5 other than as indicated below. Accordingly, the disclosure of the first embodiment of FIGS. 1-5 is fully applicable to the present embodiment other than as indicated below Like reference numbers may be used and focus will be had relative to modifications and different parts relative to the first embodiment.

Relative to the filter cartridge 10W, the only change in this embodiment is the configuration of the plastic top cap member 30W like the second embodiment shown in FIGS. 6 and 7, this embodiment is very similar in that it also includes a raised ring at the top end to provide for the torsion lock detent member which can comprise a detent slot 172W at the top end. Further, the slot walls may be inclined to provide cam surfaces 178W to allow a service mechanic to overcome the torsion locking by starting to cause axial movement of the lock member of the filter head during a release twisting motion of filter cartridge 10W. However, the ramp surfaces in this embodiment may be provided by the lock member 138W carried in mounting base member 126W of filter head 12W.

While similar to the second embodiment, this embodiment changes the location of the thread with a thread 42W formed on the outer peripheral surface of the raised ring 170W as opposed to the outer periphery of the top endcap 30W. Thread 42W may comprise a pair of thread ribs 48W that engage with thread ramps 46W formed in the corresponding mounting base 126W.

Figure 2:
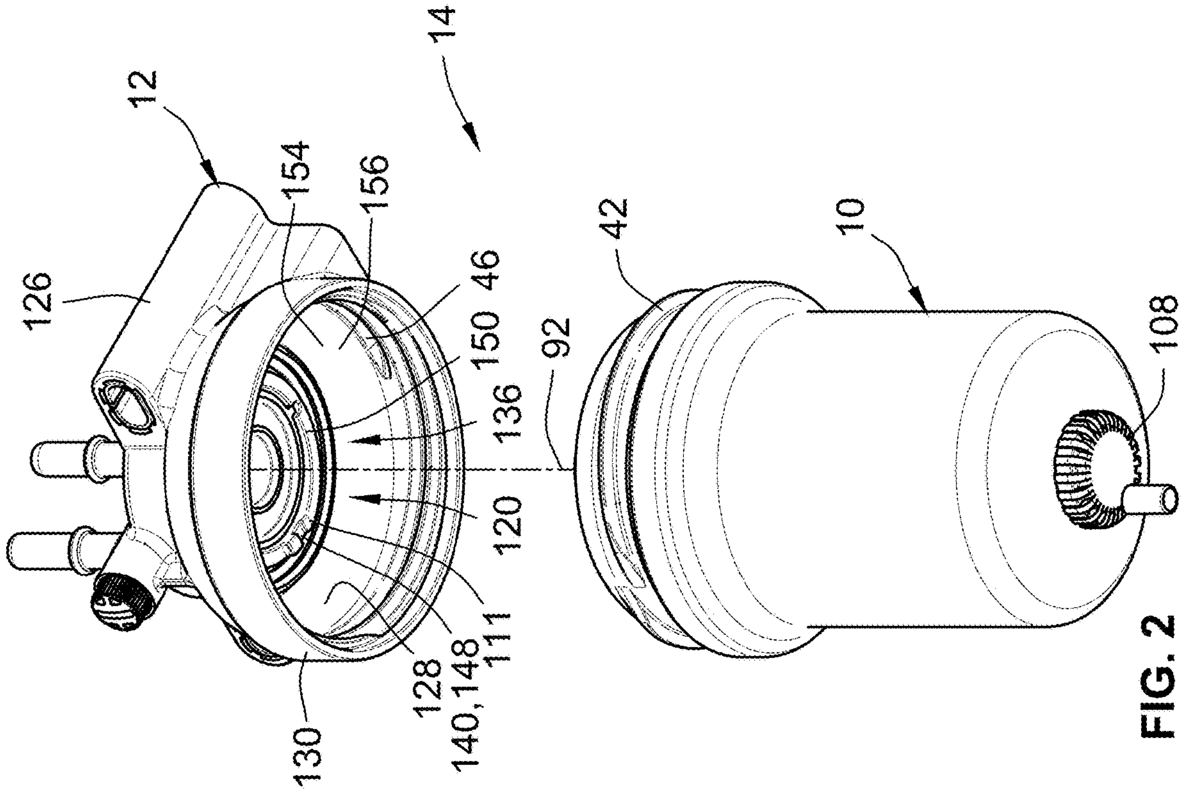
FIGS. 2 and 3 are isometric views of the filter cartridge shown in FIG. 1 in combination with a filter head to provide a filter head and filter cartridge assembly in accordance with an embodiment of the present invention, with FIG. 2 showing more of a side isometric view and FIG. 3 illustrating more of a bottom isometric view, and in both instances with the filter cartridge shown detached in an unsecured state relative to the filter head.
Figure 3:
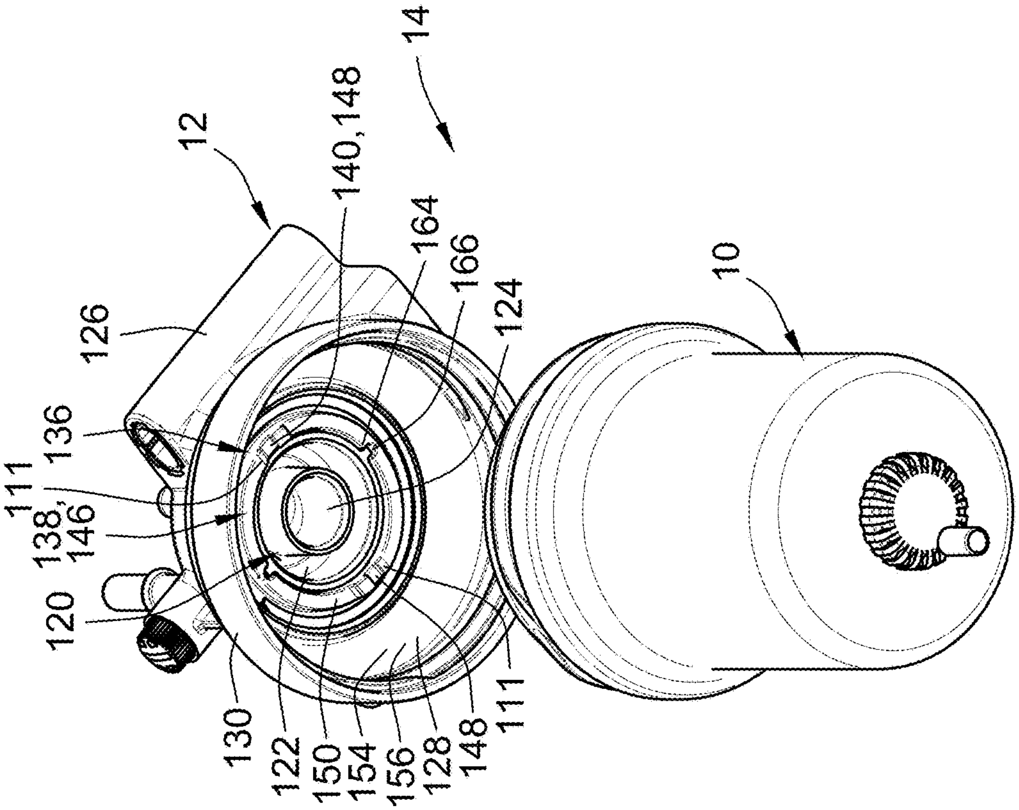

Other than as described above, filter cartridge 10W may be the same as that of the first embodiment shown in FIG. 1 or the second embodiment shown in FIG. 2 which also employs a raised ring portion.

Turning to the 29th embodiment shown in FIGS. 81-87, a filter is shown in the form of a filter cartridge 10X usable with a filter head 12X that is understood to employ the same components and be the same as filter cartridge 10, filter head 12 and assembly of FIGS. 1-5 other than as indicated below. Accordingly, the disclosure of the first embodiment of FIGS. 1-5 is applicable to the present embodiment Like reference numbers may be used and focus will be had relative to modifications and different parts relative to the first embodiment.

In this embodiment, the only notable differences on the filter cartridge 10X are that the torsion lock detent member is not directly connected to the nipple portion or outer annular end wall but spaced radially outward therefrom as shown by shortened torsion lock tabs 82X, which are still in the correct region to engage with the lock member from the filter head. Another difference is the provision of the thread 42X takes the form of spiral thread ribs 48X that comprise a pair of spaced apart flanges 49X that come together and join at a leading end that is narrower and diverge apart as the thread extends toward a trailing end 290. Between the flanges 49X is defined a channel 51X that also diverges from a location proximate the leading end 288 toward the trailing end 290 where the channel 51X is widest. This may provide for a deformable thread in which the flanges 49X can be forced inwardly or outwardly similar to that discussed for the embodiments of FIGS. 36-40, which description of those embodiments is applicable to the present embodiment. More importantly relative to this embodiment, the corresponding header and filter cartridge threads are shaped the way they are to create a “wedge” effect within the header to keep the two rigid against one another upon reaching the fully engaged condition. This prevents axial wiggle movement between the filter cartridge and the filter head. Slop and clearance gap between the filter head thread and filter cartridge thread are eliminated due to the wedging effect in the installed condition.

The advantage of this embodiment is that the leading end 288 may not have much, if any, deformation or deflection to make it easier to initially and freely install during a securing twisting motion for an initial portion of the movement and most of the movement. Towards the end of the movement thread a wedging effect occurs which tend to tighten the thread 42X relative to the corresponding thread channel 46X in the filter head. Thread channel 46X is narrower than thread 42X to pinch and resiliently wedge with each other upon reaching an installed condition. Thread deformation may be minimal as much thicker thread flanges are employed, but thread deformation only occurs in this embodiment proximate and/or at the fully installed condition when the wedging effect occurs.

Further shown in this embodiment are additional images and depictions of portions of parts such as lock member 138X that may be similar or substituted for that used in the first embodiment as shown in FIGS. 1-5 that key the lock member 138X relative to the mounting base 126X of filter head so that the lock member and its corresponding lock member detent 140X (in the form of a slot but without stop member) is aligned at a predetermined angular orientation relative to the thread ramp and annular thread channel 46X provided in the mounting base 126X. This ensures proper engagement and alignment between the torsion lock detent tabs 82X of the filter cartridge and the lock member detent 140X of the lock member 138X. Further, it can be seen that in this embodiment the configuration of an appropriate cam surface 110X on the lock member 138X and cam surfaces 110X on the torsion lock tabs 82 in form of curved edges are employed to control the amount of torque that is required to overcome the locking engagement provided by the lock member 138X and its lock member detent 140X in use.

Turning to the 30th embodiment shown in FIGS. 91-94, a filter is shown in the form of a filter cartridge 10Y usable with a filter head 12Y that is understood to employ the same components and be the same as filter cartridge 10, filter head 12 and assembly of FIGS. 1-5 other than as indicated below. Accordingly, the disclosure of the first embodiment of FIGS. 1-5 is applicable to the present embodiment. Like reference numbers may be used and focus will be had relative to modifications and different parts relative to the first embodiment.

In this embodiment the filter head 12Y is substantially the same as that shown in FIGS. 1-5 in that it includes a mating fluid flow interface 120Y having a discharge port 122Y for unfiltered fluid and return port 124Y for returning filtered fluid. The discharge port 122Y is directly connected to the inlet port 56Y, while the return port 124Y is connected to the outlet port 58Y of the filter cartridge in the secured condition. However, this embodiment additionally includes a valve in the form of a valve disk.

Likewise, the cartridge 10Y is the same as the cartridge 10 in FIGS. 1-5, but additionally includes a valve actuator in the form of valve actuator pin 300Y. The actuator pin 300Y is supported on filter cartridge 10Y. A pin rib 302Y may be at the base of pin 300Y to provide strength and support for pin 300Y.

Figure 94:
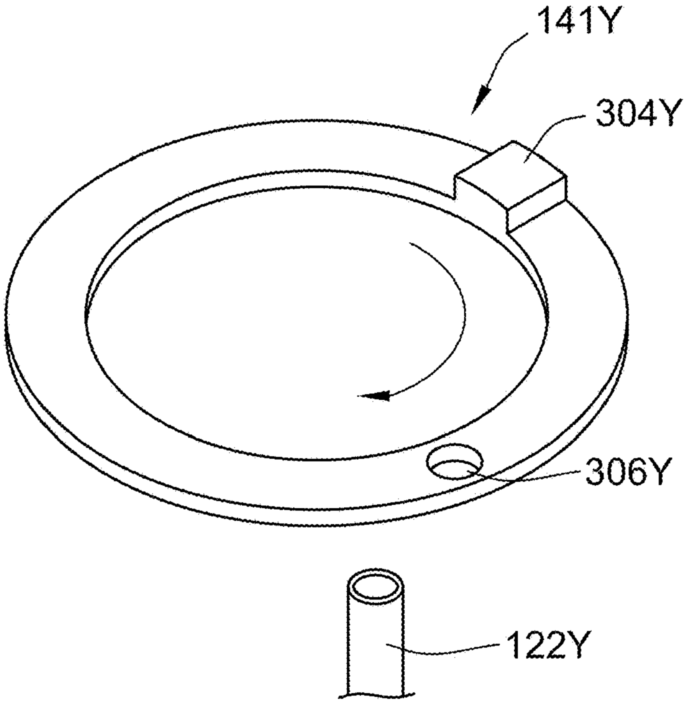
FIG. 94 is a schematic exploded perspective view of a valve disk and partial extension of a discharge port as would be used in the filter head as is shown in FIG. 93.
Figure 95:
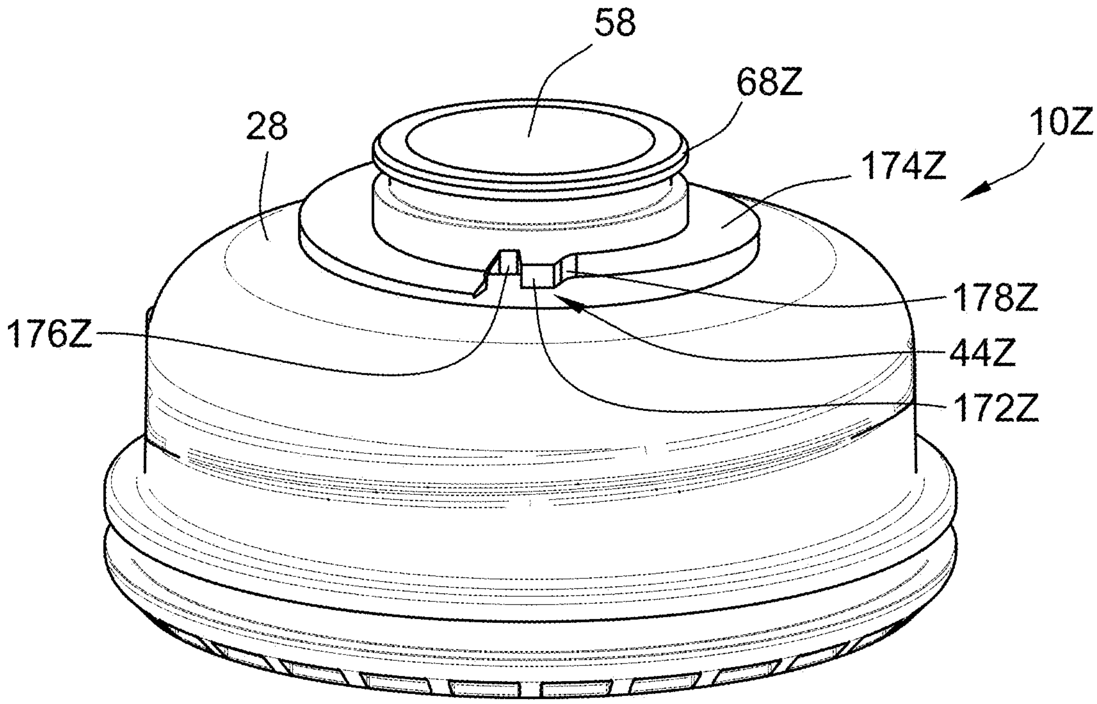
FIG. 95 is directed toward a thirty-first embodiment of the present invention which is similar to the embodiment shown in FIGS. 6 and 7, and illustrates an isometric view of a top portion of a filter cartridge.

The valve member is a valve disc 141Y that is rotatably mounted on the mounting base member 126Y of the filter head. The valve disk 141Y is rotatable to both open and closed positions to allow or close flow through the discharge port 122Y. The valve disk 141Y has an opening 306Y therein arranged to align with the discharge port 122Y in the open position. FIG. 94 shows an exploded view of valve disk 141Y as would be situated in the open position over and covering discharge port 122Y. The valve actuator pin 300Y rotationally engages the valve actuator abutment 304Y during movement of the filter cartridge 10Y from an unsecured position to the secured position, to move the valve disc 141Y from the closed position to the open position.

In the closed position the valve disk covers the discharge port 122Y, stopping flow. The valve disk rotates such that the valve actuator abutment 304Y engages with the solid pin 300Y during threaded filter cartridge attachment. In this position the valve disk opening 306Y is aligned with the discharge port 122Y to allow flow. A spring, not shown, may be used to move the valve disk back to the closed position.

Turning to the 31st embodiment shown in FIGS. 95-99, a filter is shown in the form of a filter cartridge 10Z usable with a filter head 12Z that is understood to employ the same components and be the same as the second embodiment shown in FIGS. 6 and 7. Accordingly, the disclosure of the second embodiment of FIGS. 6 and 7 (and thereby the first embodiment of FIGS. 1-5) is applicable to the present embodiment Like reference numbers will be used to and focus will be had relative to modifications and different parts relative to the first and second embodiments.

In this embodiment, the filter head 12Z utilizes a lock member 138Z in the form of a pair of lock pistons 310Z. Unlike prior embodiments that use a spring 142 that may be a circular wave spring as in the embodiments of FIGS. 1-7 and others, each lock piston 310Z is actuated by a compression coil spring 312Z. Spring 312Z may be retained in an annular chamber by a plug member 318Z above the lock piston 310Z with plug member 318*z* affixed to the filter head mounting base.

In comparison it is noted the first embodiment of FIGS. 1-5 may preferably use a metal die cast circular ring locking members (e.g. such as lock member 130 as shown), and requires a wave spring and a snap ring assembly. This embodiment has a potential assembly and cost advantage over large die cast circular locking members, wave springs, and snap rings. In contrast to the second embodiment, this embodiment allows for the installation of the less expensive compression coil spring 312Z and much smaller lock piston 310Z into the piston chamber 314Z through an opening in the top of the filter head 12Z (two of such pistons 310Z, piston chambers 314Z and coil springs 312Z shown at 180 degrees of separation around the central axis). This opening 316Z can then be plugged by plug member 318Z which would typically be, but is not necessarily, threaded into engagement with the filter head mounting base.

Like the second embodiment, a ramp surface 174Z is located on the filter cartridge 10Z. The ramp 174Z, if built of plastic, wears overtime if located on the header. Locking member 138 of the first embodiment may therefore be made of metal that is harder and does not readily wear when engaged with plastic. However, this embodiment employs no ramp surface on the filter head allowing for much a smaller torsion lock detent member. Placing the ramp on the filter cartridge does not greatly impact the cost because the filter cartridge top cap is relatively inexpensive plastic, versus a filter head based ramp as seen in the first embodiment shown in FIGS. 1-5.

In this and in the first embodiment, the remainder of the filter head (e.g. mounting base member 126) may be molded of plastic and made inexpensive, although a more robust design may be cast or machined metal of aluminum or steel. However, the pistons 310Z of the present embodiment are of small construction and can be made of plastic, but are more preferably metal such as die cast to resist wearing off of the lock detent on the filter head that is reused when filter cartridge is replaced. The pistons 310Z are much smaller and less costly as compared to a much larger annular die casting such as lock member 138. Like the second embodiment, the torsion lock detent member 44Z comprises a raised ring that may project from the top annular end wall 28. The raised ring in this embodiment defines a pair of detent slots 172Z, stop members 176Z, and cam surfaces 178Z, with the detent slots 172Z configured for torsion locking.

Figure 96:
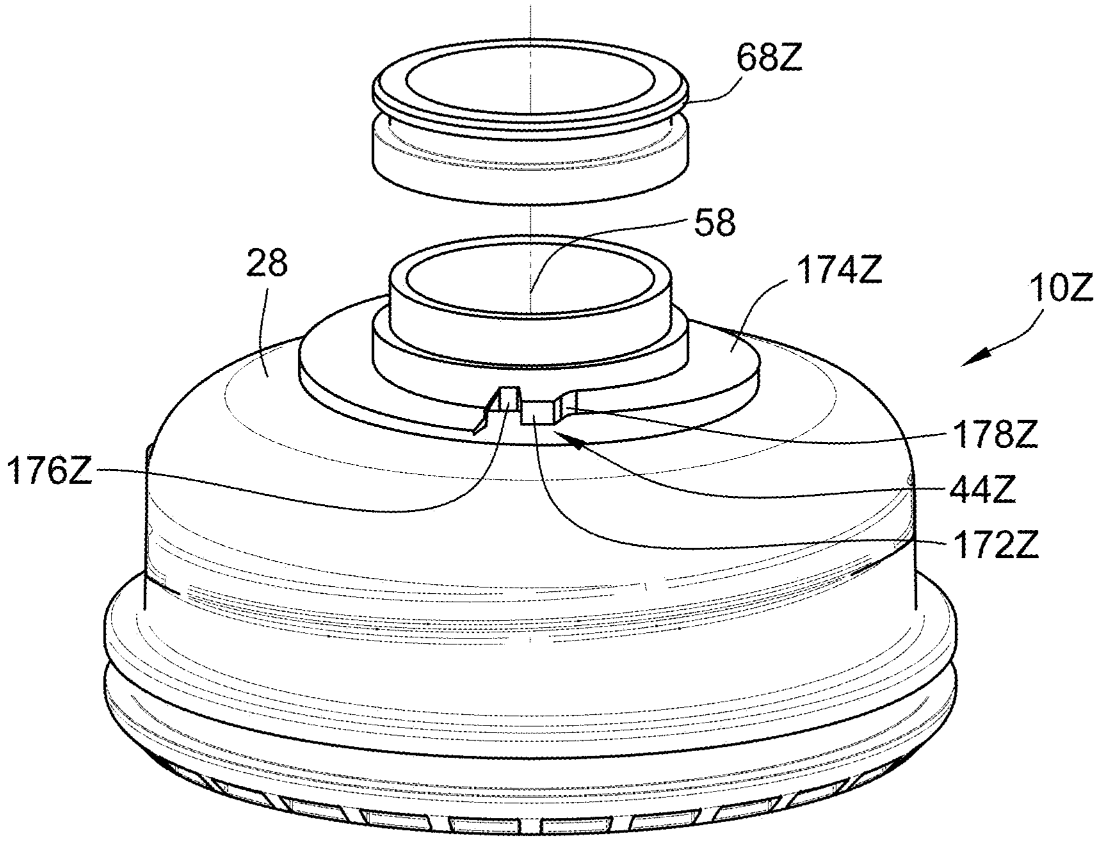
FIG. 96 is an exploded isometric view of the top portion of the filter cartridge shown in FIG. 95, to better show the tooled outer radial seal.
Figure 97:
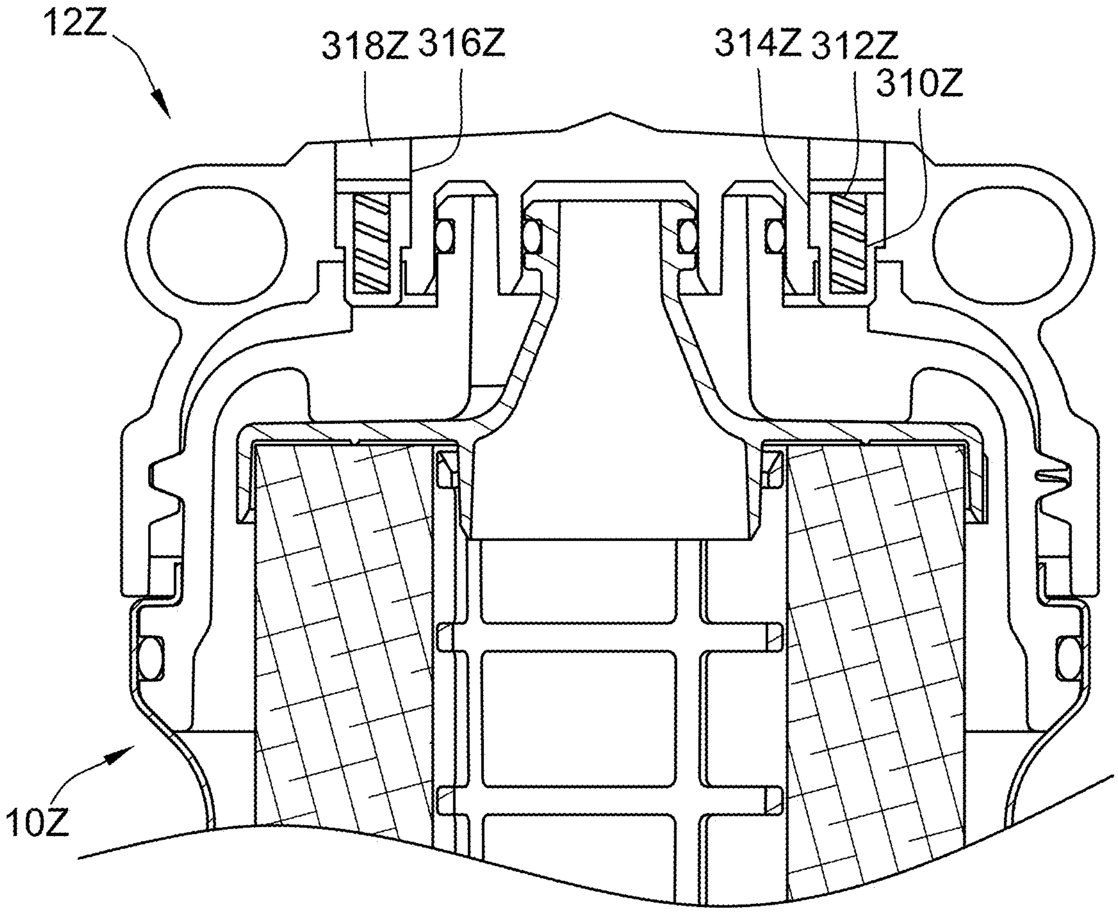
FIG. 97 is a schematic cross section view of the filter cartridge shown in FIG. 96 mounted to a filter head to form an assembly.
Figure 98:
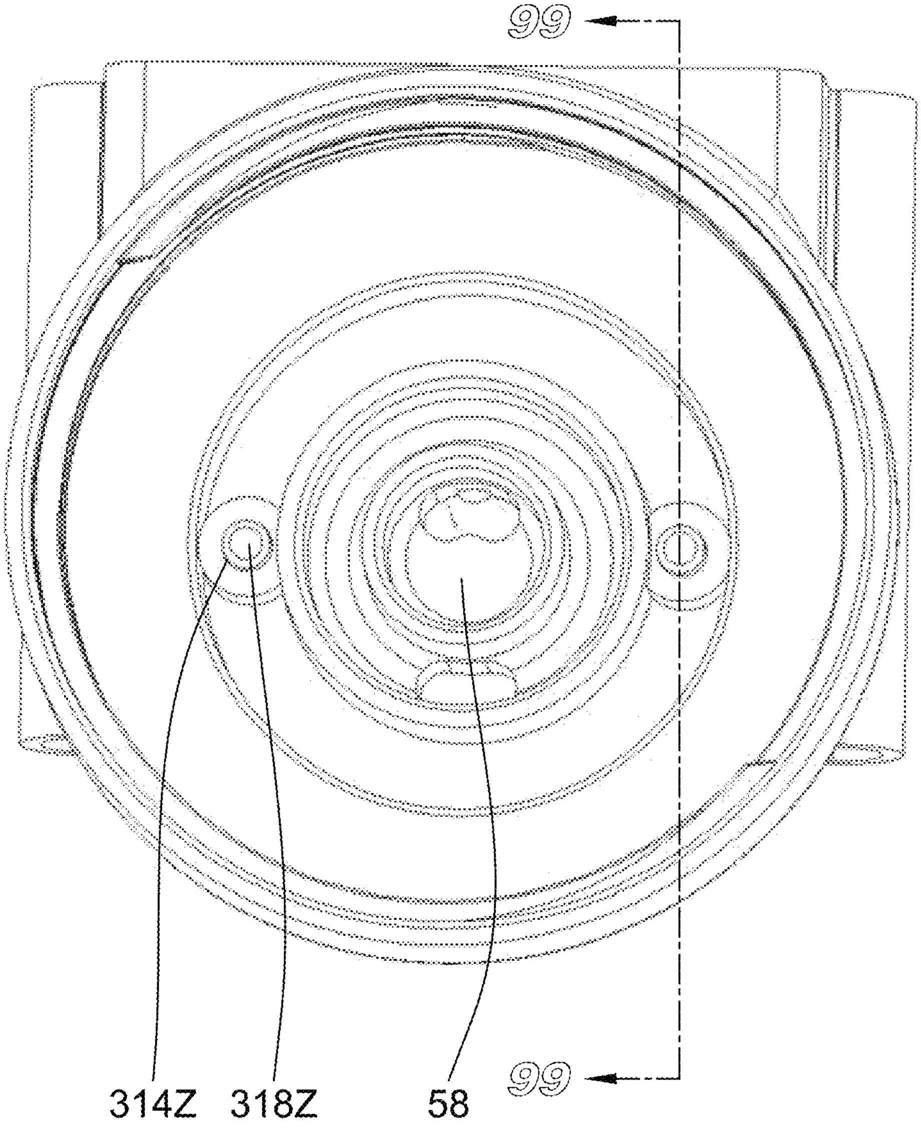
FIG. 98 is a bottom isometric view of a filter head as shown in FIG. 97.
Figure 99:
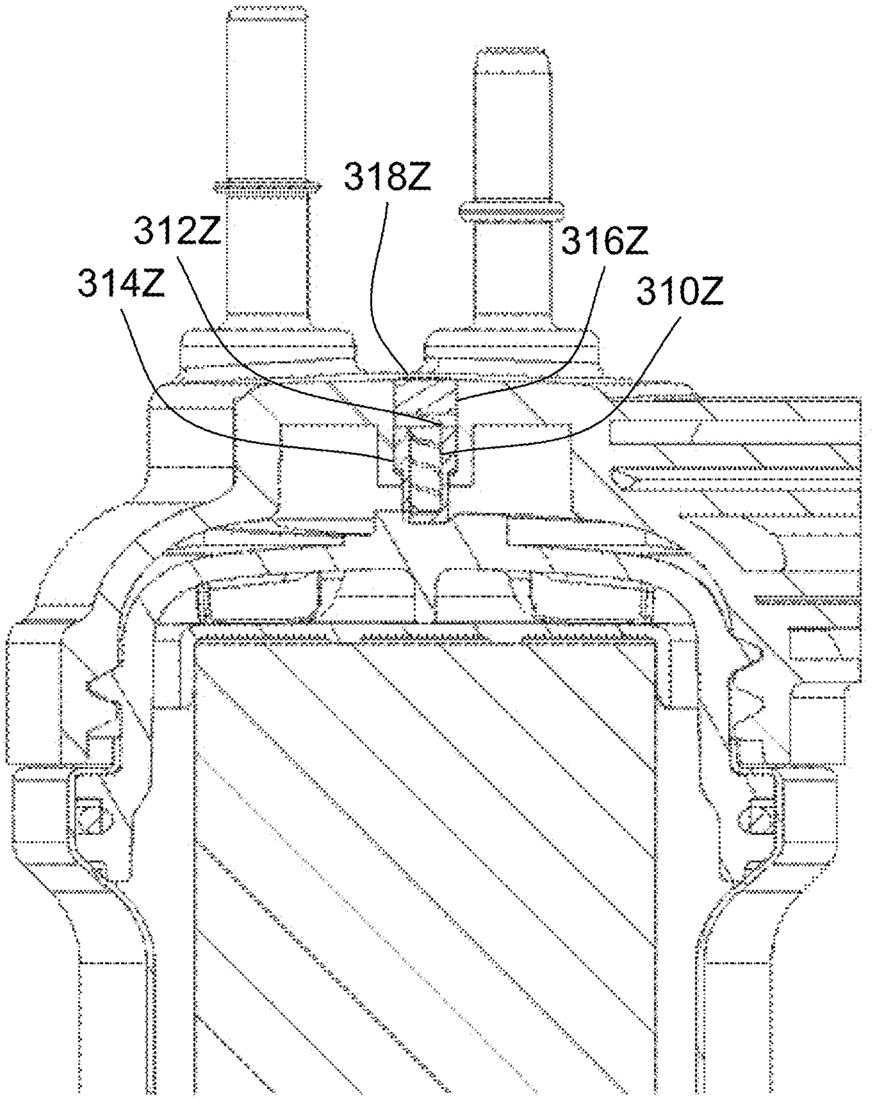
FIG. 99 is an off center schematic cross section view of the filter head shown in FIG. 98 with a filter cartridge mounted thereto, the cross section being taken through a horizontal plane through the lock detent as shown in FIG. 98, and a similar cross section taken through the attached filter cartridge.

A further potential benefit of this embodiment over prior embodiments is that the outer radial seal 68Z on filter cartridge 10Z can be installed and retained mechanically as is or more permanently with adhesive if desired as shown in FIG. 96. This can simplify the injection molding tooling required for top cap of the filter cartridge 10Z.

Turning to a 32nd embodiment shown in FIGS. 100-107, a filter is shown in the form of a filter cartridge 410 usable with a filter head 412 that is understood to employ the same or similar components and be the same as that shown in the first embodiment of FIGS. 1-5. Accordingly the disclosure of the first embodiment is applicable to the present embodiment unless otherwise provided and disclosure of this embodiment is likewise applicable to the first embodiment also unless otherwise provided. Like reference numbers will be used to the extent possible (except the reference numbers here are in the 400 series) and focus will be had relative to modifications and different parts relative to the first embodiment. Additionally, it is noted that this embodiment similar to the embodiments of FIGS. 74-77 and the embodiment of FIGS. 28-31, in that all of these embodiments employ a variation of radially acting torsion lock detent member on the filter cartridge and a corresponding radially acting detent on the filter head. As such reference to such other radially acting detent embodiments and vice versa can be had to appreciate a greater understanding of radial detent action in torsion lock detent members.

Figure 100:
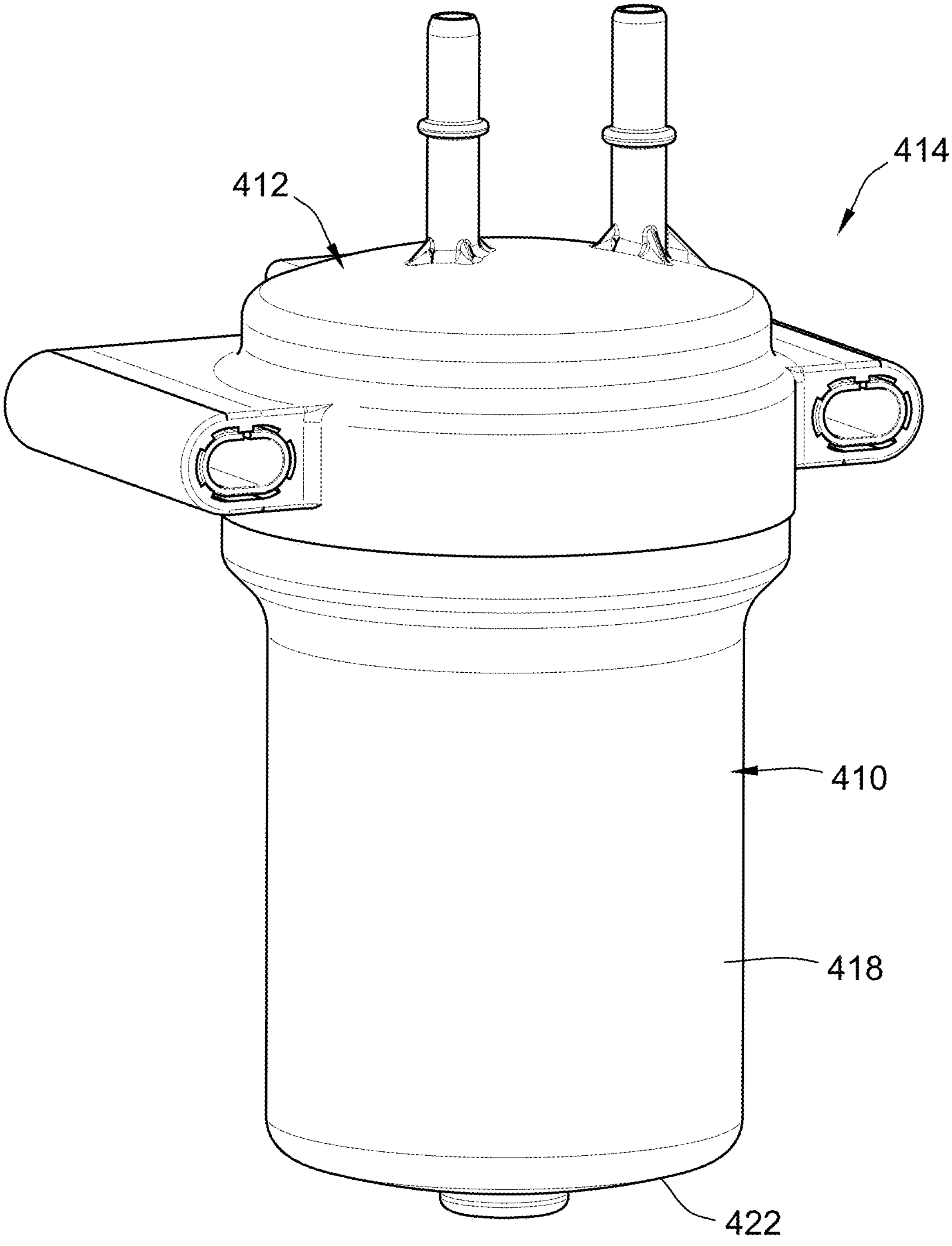
FIG. 100 is an isometric illustration of an assembly comprising a filter head and a filter cartridge in accordance with a 32nd embodiment of the present invention.
Figure 101:
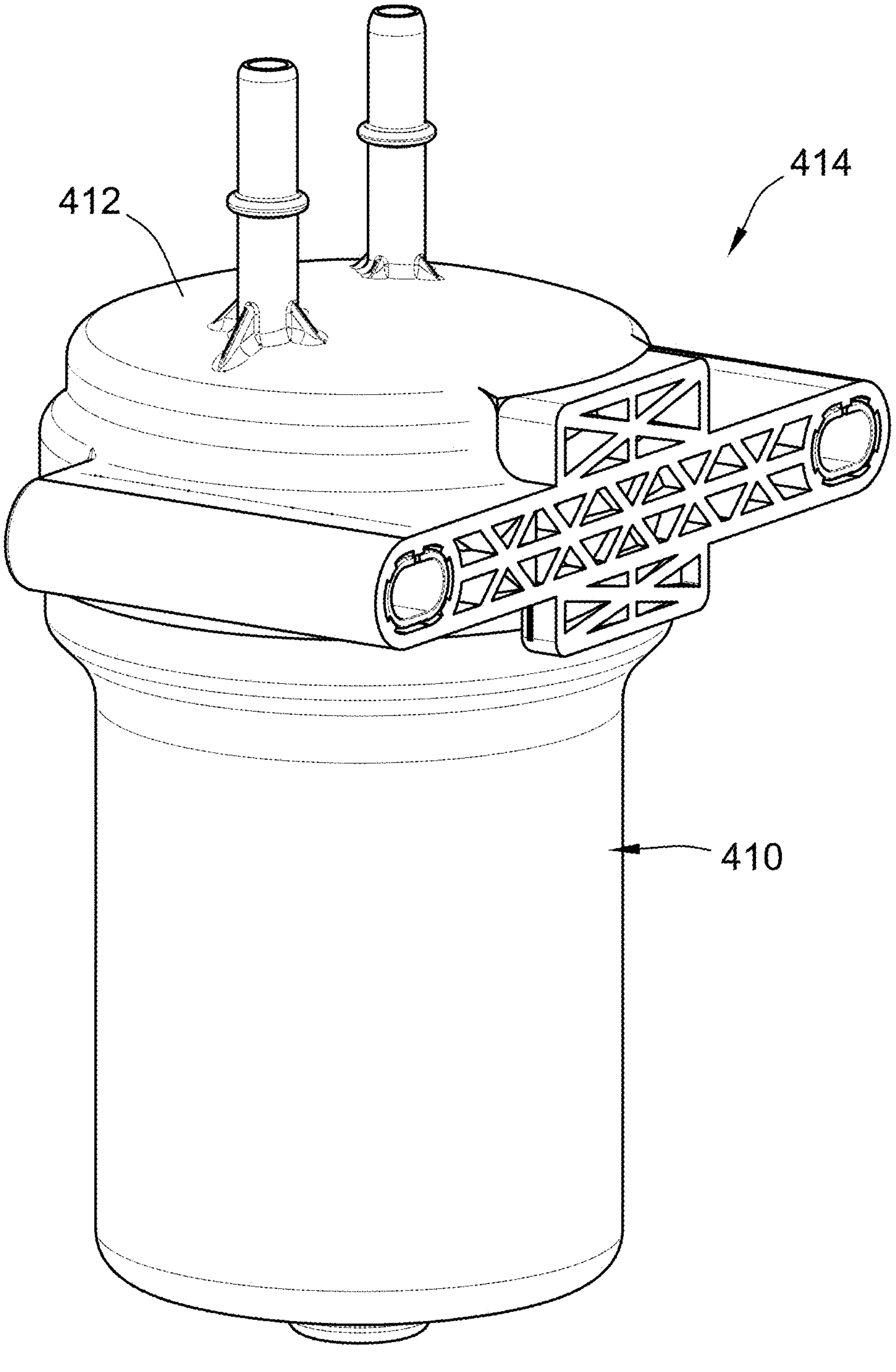
FIG. 101 is an isometric view of the assembly shown in FIG. 100 but taken from a different perspective.
Figure 102:
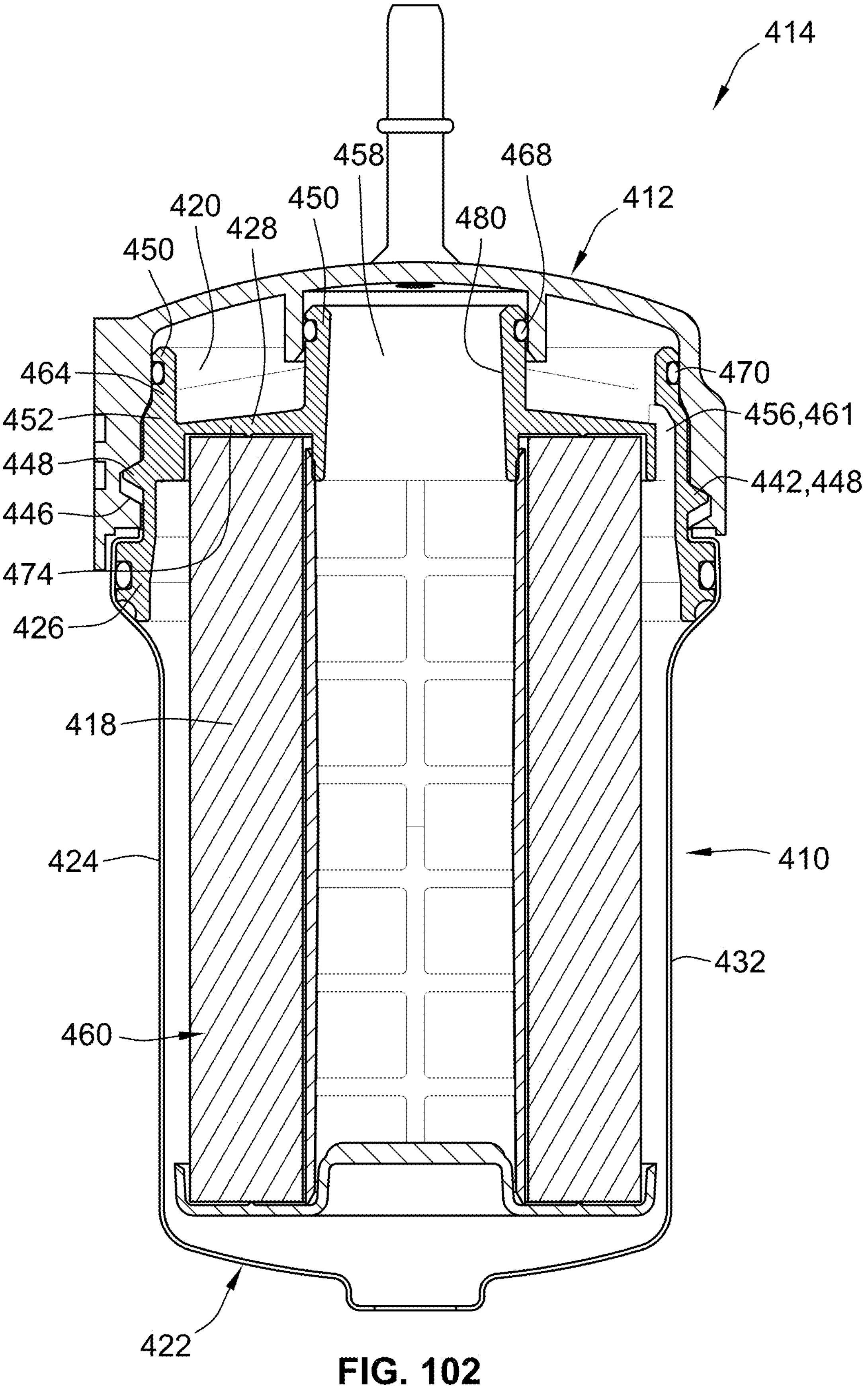
FIG. 102 is a cross-section of the assembly shown in FIG. 100 taken through a vertical plane along the central axis.
Figure 103:
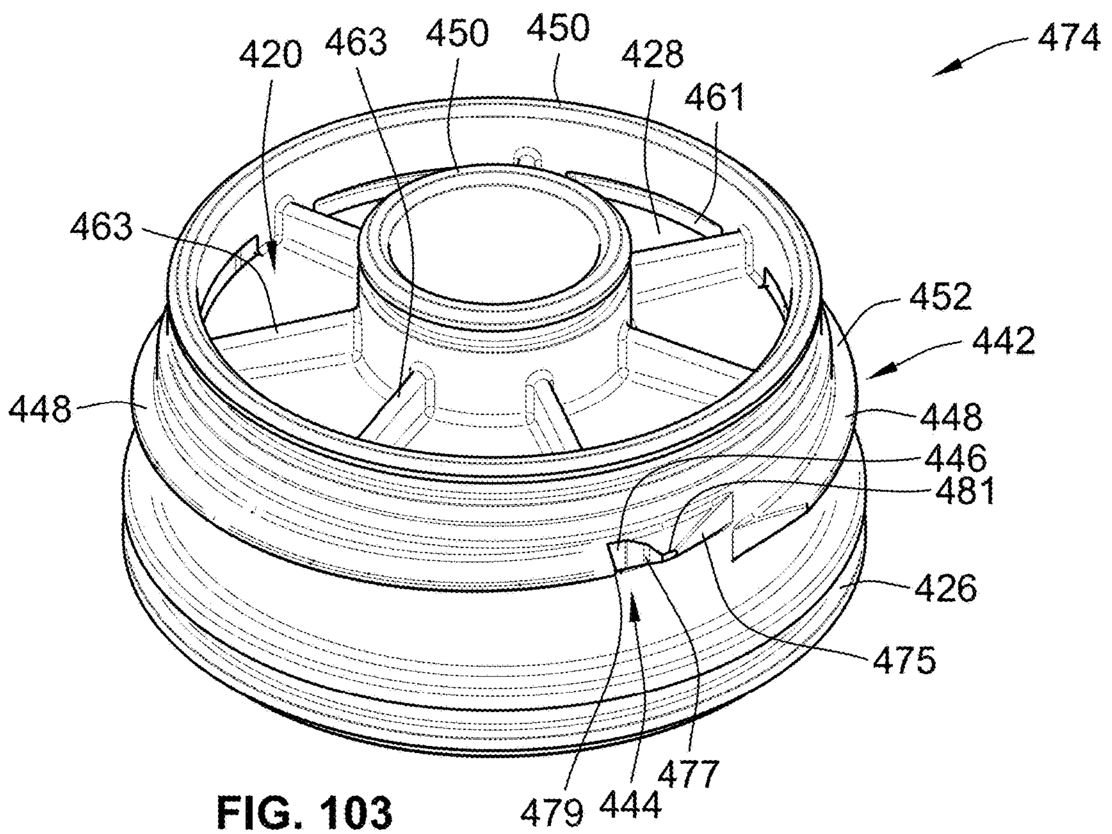
FIG. 103 is an isometric view of the top member in the form of top end cap used in the filter cartridge of the 32nd embodiment shown in FIG. 100.
Figure 104:
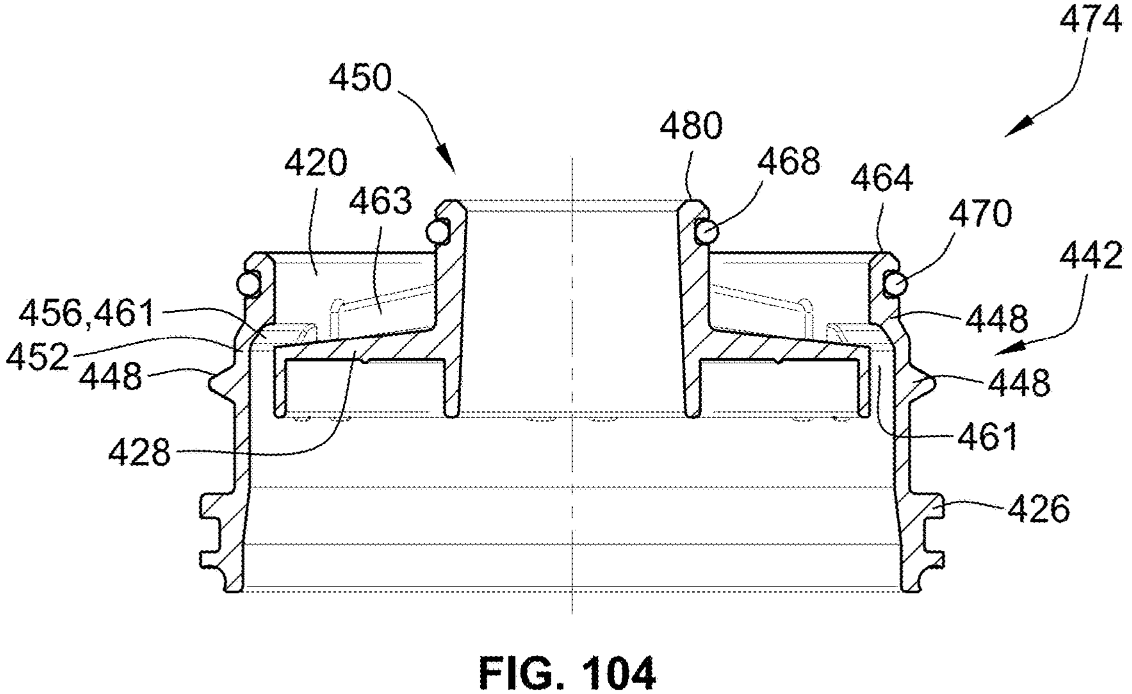
FIG. 104 is a cross-section of the top end cap shown in FIG. 103 taken along the central axis.
Figure 105:
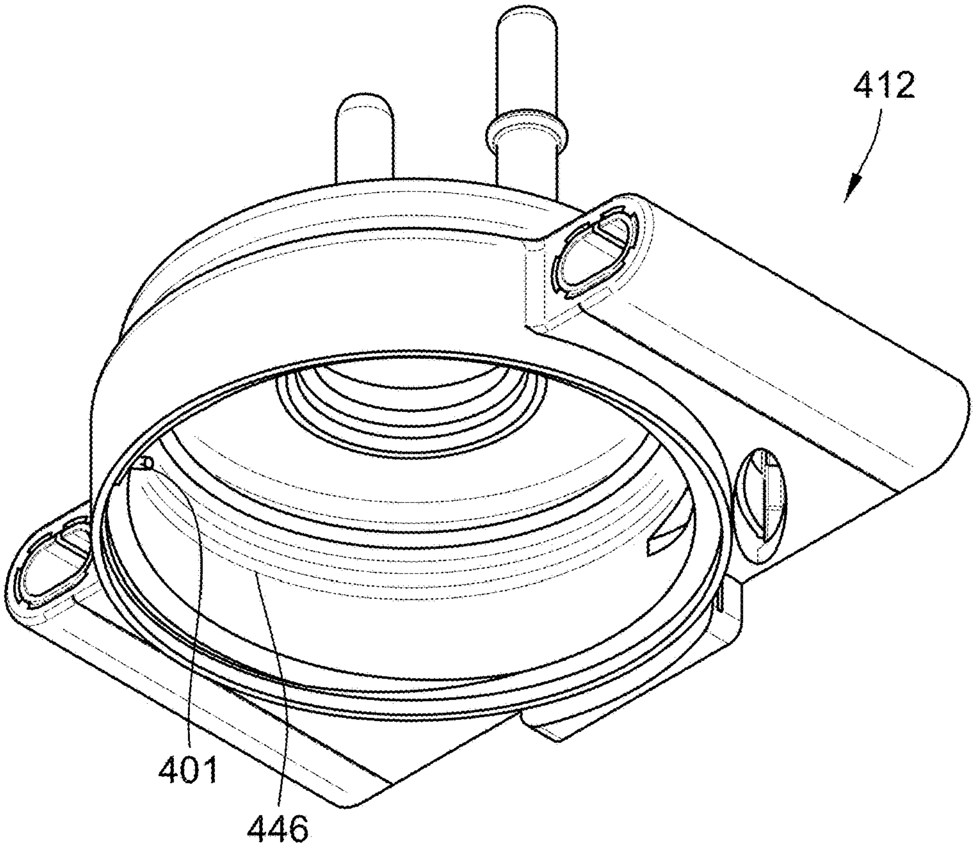
FIG. 105 is an isometric partially bottom side view of the filter head employed in the assembly shown in FIG. 100.
Figure 106:
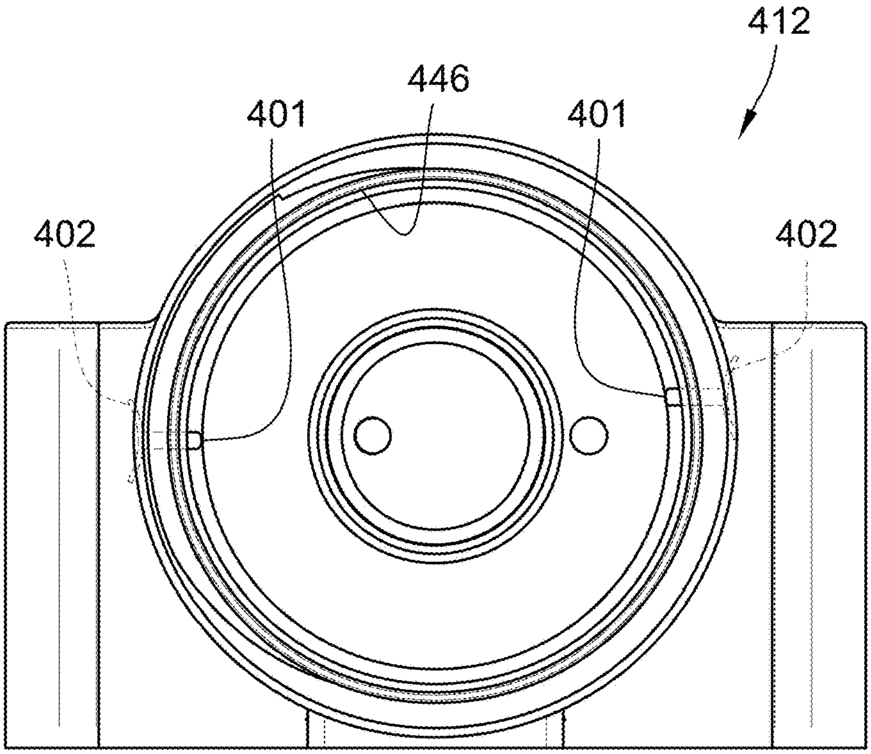
FIG. 106 is a bottom view of the filter head shown in FIG. 105 and FIG. 100, with the wave spring actuation of the detent pin shown in dashed lines (indicating that the wave spring is housed in an internal cavity)
Figure 107:
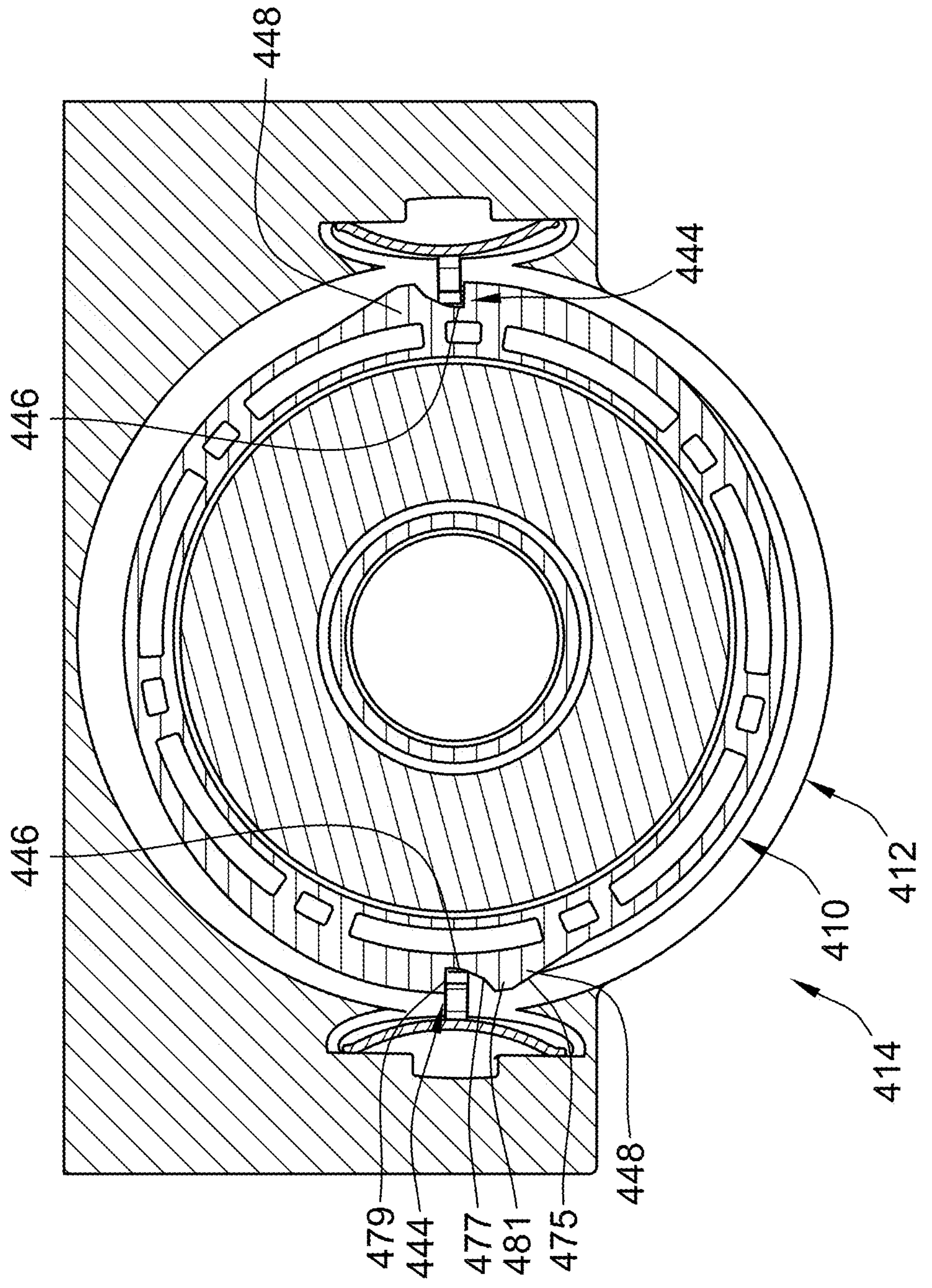
FIG. 107 is an enlarged portion of a horizontal cross-section of the assembly shown in FIG. 100 taken through the radially acting detent mechanism.
Figure 108:
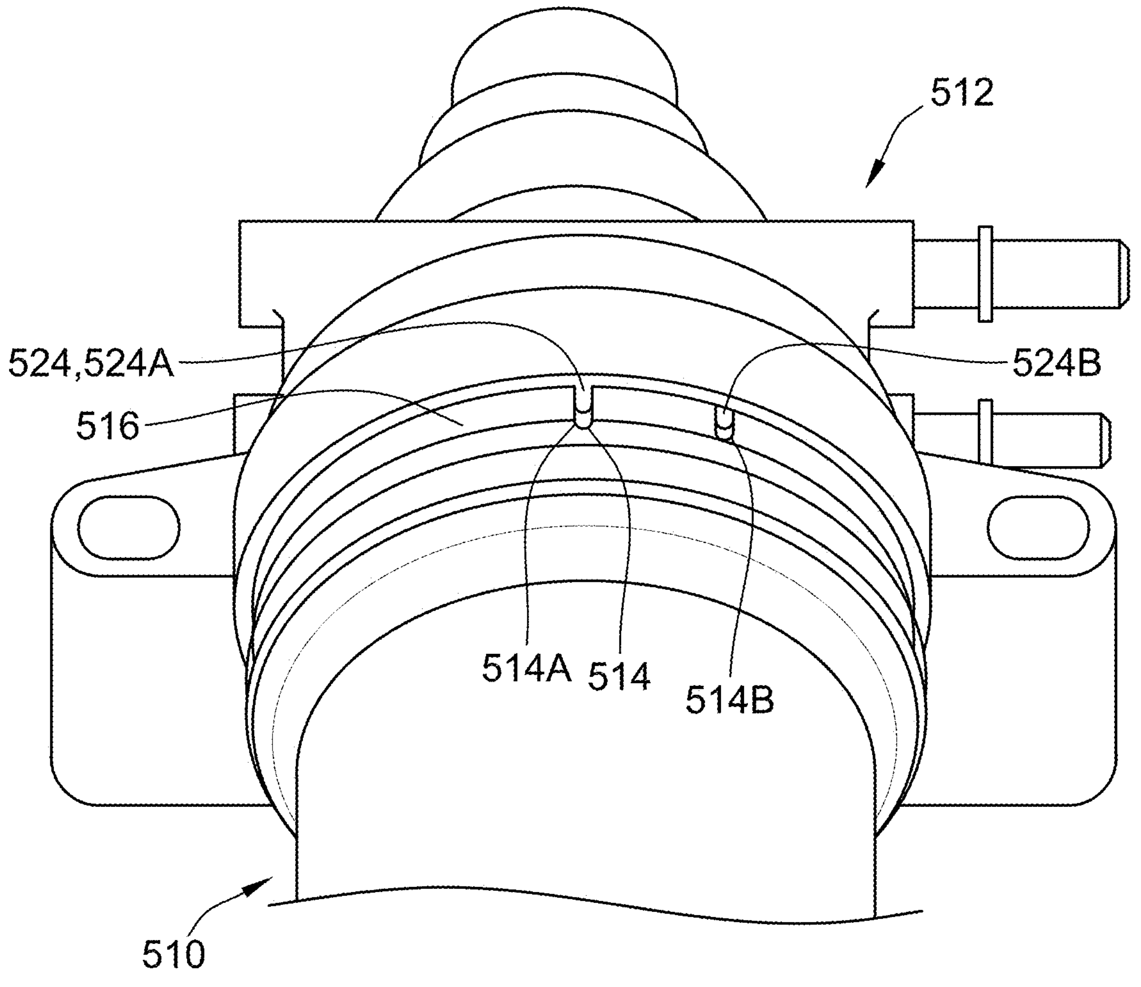
FIG. 108 is a partial isometric illustration of an assembly comprising a filter head and a filter cartridge in accordance with a 33rd embodiment of the present invention that is similar to the first embodiment but additionally including keying along the thread.
Figure 109:
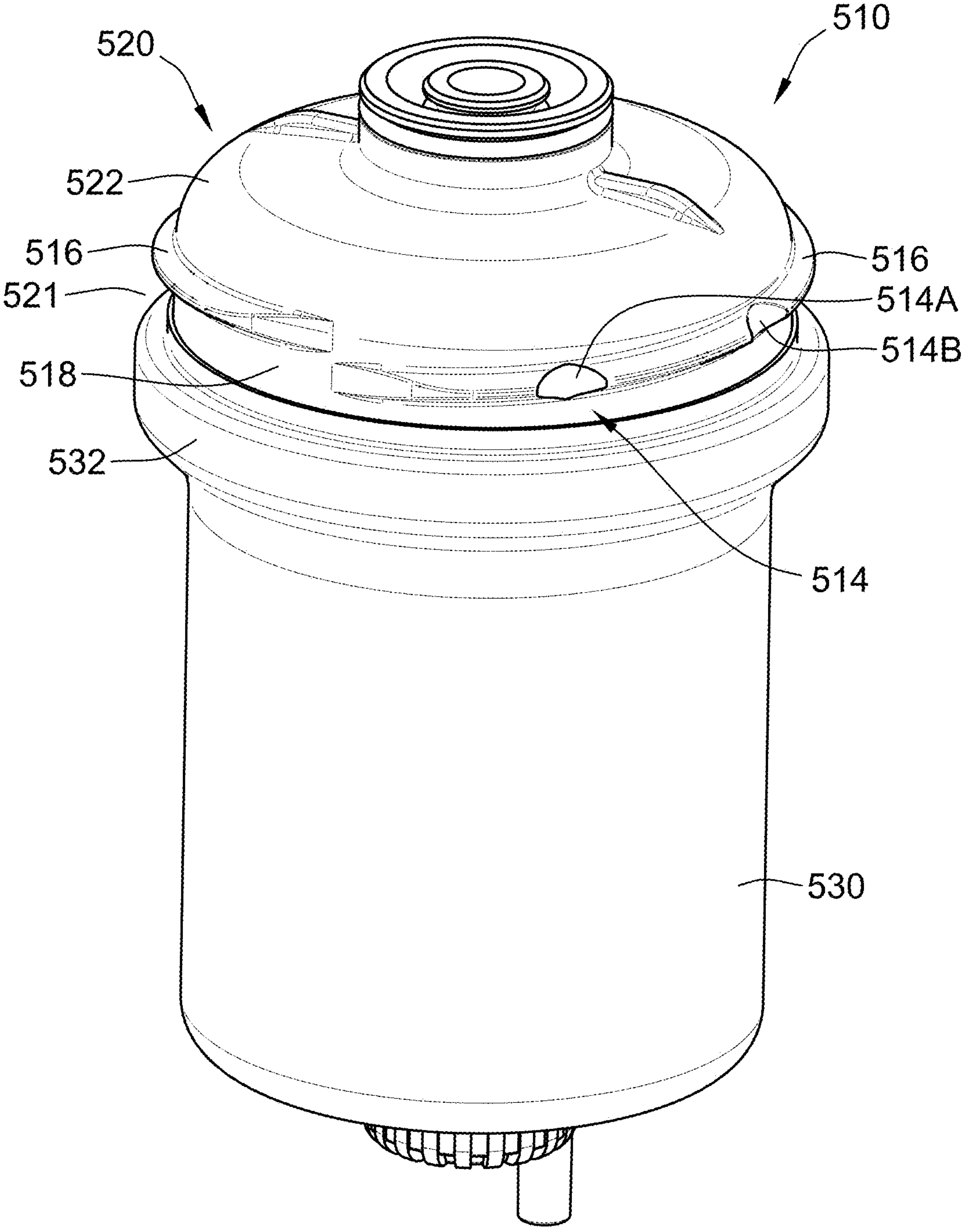
FIG. 109 is an isometric view of the filter cartridge shown in the embodiment of FIG. 108.
Figure 110:
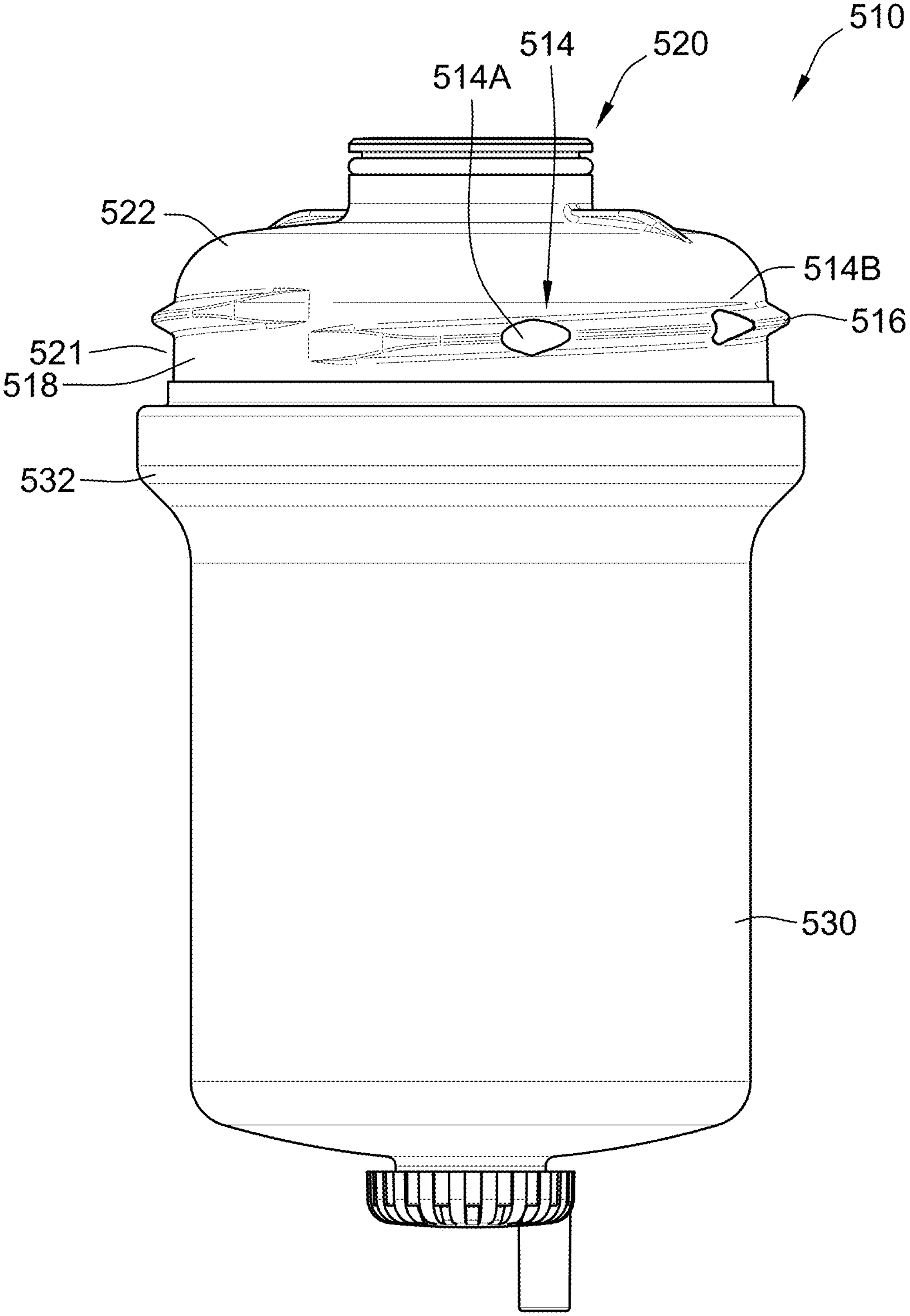
FIG. 110 is a side view of the filter cartridge shown in FIG. 108, also showing that when two keyways (axial channels) are provided in the thread that the keyways may be axially offset due to the helical ramping of the thread.
Figure 111:
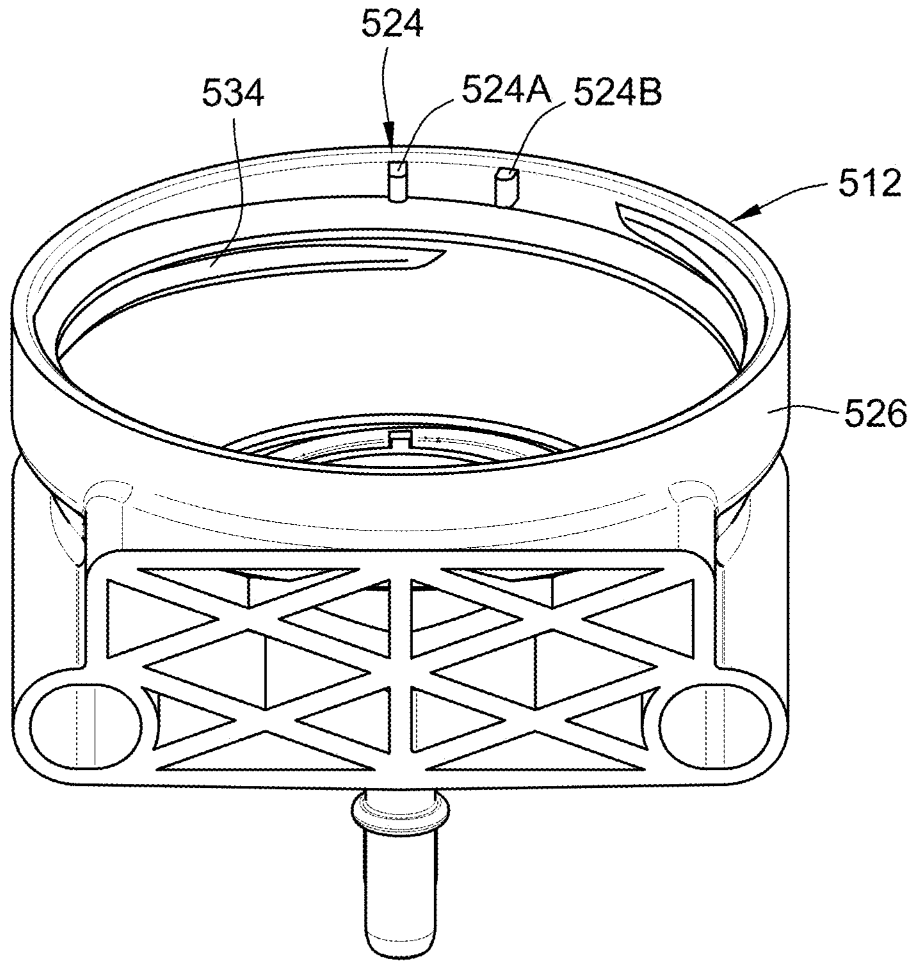
FIG. 111 is an isometric view of the filter head shown in FIG. 108 without the filter cartridge attached to better show the radial key projections.
Figure 112:
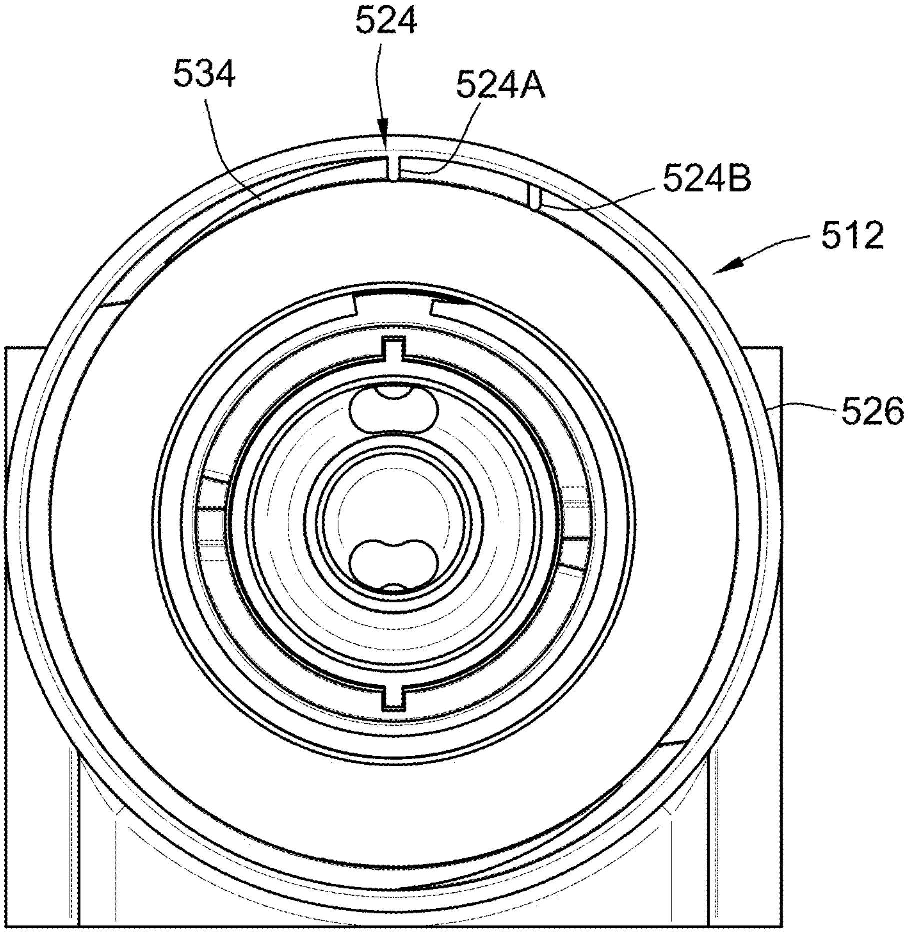
FIG. 112 is a bottom view of the filter head shown in FIG. 108 to better show the radial key projections.
Figure 113:
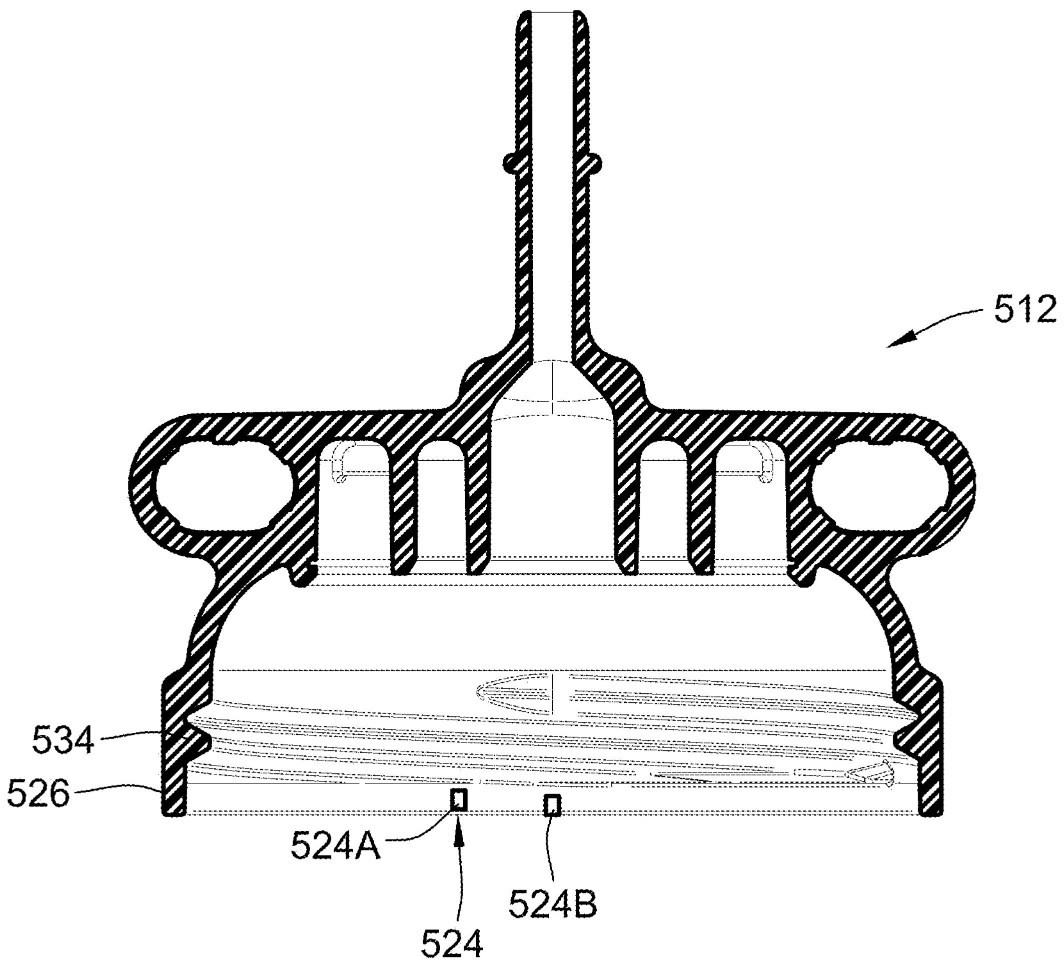
FIG. 113 is a cross section of the filter head shown in FIG. 108 with the keys positioned axially spaced at the pitch of the thread to correspond to the pitch of the keyways of the filter cartridge such as shown in FIG. 110.

The filter cartridge 410 is shown in conjunction with filter head 412 to provide a filter cartridge and filter head assembly 414 as shown in FIGS. 100-102. The filter head 412 is generally the component that can be permanently mounted to an engine or other fluid system and additional detail of such mounting structure for example is shown in FIGS. 100 and 102 to include bolts and a planar mounting face that includes cavities to facilitate mounting. The filter cartridge 410 can be mounted or detached from the filter head 412 through a threaded connection to allow for installation and replacement at periodic maintenance intervals.

The filter cartridge 410 generally includes a filter housing 416 that encloses and thereby protects filter media 418 contained within. The filter housing 416 generally includes a top end 420, a bottom end 422 and an annular sidewall 424 extending therebetween, which is shown to be cylindrical in shape. This filter housing 416 includes a top annular end wall 428 that when in use faces a corresponding receptacle surface along the filter head 412.

To provide for the filter housing 416, the filter housing 416 comprises a top member such as top end cap 474, which may be molded from plastic material, and a bottom member such as a metal can 432 that can be joined together such as by way of roll forming the top edge of the metal can 432 over the corresponding depending lower annular flange abutment 426 of the top end cap 474.

Annular seals similar to that shown in earlier embodiments can be used to seal between the annular flange and the metal can as shown in FIG. 102.

Similar to the first embodiment, the top member and the bottom member can be joined together at a key free interface. This is because the top member in the form of the top end cap 474 provides for a thread 442 (typically also comprising two 180° spaced helical thread ribs 448). The thread 442 is configured as a projection that is adapted to ride along a thread ramp 446, like the first embodiment defined by two helical channels formed in the filter head 412.

This embodiment also includes a nipple portion 450 at the top end 420 that is provided entirely in this embodiment by the top end cap 474. However in this embodiment, the nipple portion 450 is much wider to provide a much larger port area to facilitate fluid flow and pressurization aspects.

In this embodiment, the top annular end wall 428 is encompassed within the nipple portion 450. For example nipple portion 450 includes a snout portion 480 and an outer rim projection that provides outer annular wall 464, with the top annular end wall 428 disposed generally therebetween. The top annular end wall 428 extending through the outer annular wall 464 and is connect with and through the shoulder region 452 to the annular sidewall 424 provided in part by an annular sidewall portion of the top end cap 474. Thus, the outer annular wall 464 is at a periphery of the top annular end wall 428 proximate the shoulder region 452 of the housing as illustrated. Further the shoulder region 452 is shown at being at an intersection between the top end 420 and the annular sidewall 424.

Similar to early embodiments, both the snout portion 480 and the outer rim projection in the form of outer annular wall 464 can both carry seals such as radial seal members as illustrated at 468, 470. These seals 468, 470 seal with corresponding port walls formed in the filter head 412.

As can be seen, the snout portion 480 readily provides for an outlet port 458, while the inlet port 456 is facilitated by inlet port openings 461 formed into the top annular end wall 428. Inlet port openings 461 are facilitated by a web portion of the top annular end wall 428 such as connecting ribs 463 that interconnect the outer annular wall 464 with the snout portion 480.

With this construction, it can also be seen that the top end may not be an assembly of different separately formed component parts, but may comprise a single part such as the top end cap 474 of the internal filter element 460. The internal filter element 460 may otherwise be the same or similar to that described for the first embodiment and/or other embodiments and therefore need not further be described as it typically includes a cylindrical ring of pleated filter media and a closed bottom end cap and optionally a center tube support structure with flow openings.

In this embodiment, the radially acting detent member is similar to the embodiment shown in FIGS. 74-77 and is not above the shoulder region 452 but below the shoulder region and can be formed in this embodiment directly into a thread 442 along the sidewall portion such as providing the torsion lock detent member 444 as a detent structure formed directly into the thread 442. In the figures, the detent member is illustrated as being formed by at least one axially extending channel formed into the helical thread 443.

For example, when at least two threads are provided in angular spaced relation about the central axis, the torsion lock detent member 444 can comprise at least two corresponding detent notches 446 formed into the corresponding thread ribs 448 at angular spaced locations.

As can be seen, each notch 446 is formed proximate a leading end of each of the thread ribs 448 in which the leading end is located closer to the top end as compared with the trailing end of each of the two threads. In this manner, the detent notches 446 engage only at the final moment of rotation with corresponding structure on the filter head 412.

Similar to other embodiments, camming action is provided to assist installation and removal with the detent notch 446 structure. For example, each of the thread ribs 448 can include an installation cam surface 475 that forms a first ramp defined into the thread and also a removal cam surface 477 in the form of a second ramp formed into the thread as well as a stop surface 479. As shown, the first and second ramp surfaces provided by cam surfaces 475, 477 intersect at a ridge region 481 formed along the thread with the mechanical stop surface 479 and the removal cam surface 477 defining end walls of the detent notch 446.

When the filter cartridge 410 is used in connection with the filter head 412, radially acting detent action occurs. For example, the filter head includes a corresponding lock member detent that can be provided by detent pins 401 that are spring loaded such as by means of a coil spring or a leaf spring (see e.g. leaf spring 402 shown in dashed lines in FIG. 106 that is housed in the filter head body). These detent pins 401 are located in angular spaced relation around the central axis of the filter cartridge to interact with and correspond to the locations of the corresponding detent notches 446 in the filter cartridge. For example, this embodiment is shown to include the spring 402 supported by the body of the filter head that urges the detent pins 401 radially inwardly.

With this configuration and during rotational twisting action, the detent pins 401 will travel along the surfaces of the thread and engage with all of the structures of torsion lock detent member 444 along the thread ribs 448 to include the installation and removal cam surfaces 475, 477 during installation and removal, respectively, and will come to rest within the detent notches 446 and if necessary engage stop surface 479 to prevent over rotation. When the detent pins 401 are engaged within the corresponding detent notches 446, the filter cartridge 410 is torsionally locked to the filter head 412 and cannot be removed therefrom without overcoming the torsion lock force provided by the spring loaded detent pins 401.

Typically the force necessitated is that of a service mechanic and simple vibrations or working operation of the overall assembly 414 during use does not overcome this torsion locking force. However at a maintenance interval when it is desired to remove the filter cartridge 410, a service mechanic can rotate the filter cartridge and provide enough torqueing and rotational force to the filter cartridge 410 to cause the spring loaded detent pin 401 to move radially outwardly and overcome its force due to the ramping provided by the removal cam surface 474, to clear the bridge region 481. This allows for a user to selectively attach and detach a filter cartridge 410 while having the filter cartridge 410 rotationally locked in place for use when desired and allow for a user to remove the filter cartridge 410 readily, which can also be done by hand without the need for a spanner wrench or other removal tools.

Further, a clicking sound may be created when rotated into the locked condition and due to the snap action to give an audible indication to a service mechanic that the filter is installed.

Another advantage independent of the torsion lock detent member which can be used independently and separately therefrom is the provision of the widened fluid connection mouth region facilitated by the larger diameter outer annular wall 464 and snout portion 480 as compared with the first embodiment.

For example this can provide an enlarged pressure region formed between the inner port wall provided by snout portion 480 and the outer port wall provided by outer annular wall 464 that can achieve a natural frequency of 200 Hz or higher when subjected to a pressurization to a point between 2 bar and 6 bar. In other words, at some point during the pressurization between 2 bar and 6 bar, the overall assembly achieves a natural frequency of at least 200 Hz or higher.

Further, in an embodiment, this enlarged pressure region can be formed that creates an axial force of at least 200 lbs. upon the thread 442 when subjected to a pressurization of 2 bar. This axial force also helps to prevent inadvertent detachment of the filter cartridge from the filter head when in use, and also helps to achieve a higher natural frequency of the filter cartridge, which is desirable to prevent vibrational issues from the engine when it is employed in use.

Turning to a 33rd embodiment shown in FIGS. 108-113, a filter is shown in the form of a filter cartridge 510 usable with a filter head 512 that is understood to employ the same or similar components and be the same as that shown in the first embodiment of FIGS. 1-5. Accordingly the disclosure of the first embodiment is applicable to the present embodiment unless otherwise provided and disclosure of this embodiment is likewise applicable to the first embodiment also unless otherwise provided. Focus will be had relative to modifications relative to the first embodiment. Additionally, this embodiment like the 32nd embodiment of FIGS. 100-107 also includes an interrupted helical thread having an axially extending channel formed therein, however in this instance it is for keying rather than for torsion locking.

In this embodiment, and other than the additional keying structures, the filter cartridge 510 and filter head 512 can be considered identical to that of the first embodiment of FIGS. 1-5 with the same torsion locking structures and same torsion locking as the first embodiment. Further, the filter cartridge, nipple portion, fluid ports and internal filter element arrangements are the same as that of the first embodiment of FIG. 1, as such those will not be further described here and reference to FIG. 1 can be had for understanding that this embodiment of a filter element assembly. For example, from reference to FIGS. 1-5 it can be seen this 33rd embodiment also comprises: a ring of filter media circumscribing a central axis and arranged in a central cavity of a housing an end cap assembly at an end of the media ring, the end cap assembly including: i) an annular sidewall portion; ii) an annular end wall connected to the annular sidewall portion at a shoulder; iii) a central opening into the central cavity through the annular end wall, and b) a helical thread on an exterior surface of the sidewall portion. However, in this embodiment, an axially extending channel 514 is defined along the length of at least one of the two helical threads 516. Further, the sidewall portion 518 of the top member 512 (also referred to as end cap assembly) defines an annular clearance area such as an annular gap 521 adjacent the helical thread 516 on a side opposite of the shoulder region 522.

In this embodiment, the filter element assembly is for use with a radial key 524 that projects radially inward from the surrounding cylindrical sidewall 526 of the filter head 512. The axially extending channel 514 enables the radial key 524 to be axially inserted through the axially extending channel 514 via axial movement and past the thread and then received within the annular gap 521 that allows the filter cartridge to rotate freely relative to the filter head.

Different keying systems may be employed to ensure the correct cartridge or filter rating is applied to the correct filter head. For example, the axially extending channel 514 may comprises at least two axially extending channels 514A, 514B that are defined through the helical thread 516 in angular space locations about the central axis to provide a multi-faceted keyway along the helical thread. Corresponding key projections 524A, 524B of radial key 524 align with the channels 514A, 514B. It is appreciated that the spacing and size of the key projection and axially channels can be different among different filter platforms to prevent improper use. For example, an oil filter may have one type of keying, while a fuel filter may have another type of keying. Among different types of fuel filters that have different filtration requirements or capacities, the keying configurations also may be different by modifying the keys and spacing.

To facilitate the same, the cylindrical sidewall 526 of the filter head 512 may have an insert area in which a key insert body having the keying configuration is attached. In otherwords, part of the cylindrical sidewall 526 may be integral such as monolithic with the mounting base body, while the keying structure (including key projections 524A, 524B) may be a ring with the thread flight and/or separate insert mounted and affixed to the mounting base body to allow different keying configurations to be used with the same design otherwise for the mounting base body.

To provide the clearance area, the metal or plastic canister 530 surrounding the ring of filter media, has a distal end fixed to the sidewall portion 518 at a radially outward flange portion 532 similar to the first embodiment. The clearance area can thus be provided by the annular gap 521 defined between the flange portion 532 and the helical thread 516.

As such, the filter cartridge 510 fits into the interior chamber of the filter head 512, with the filter head 512 having a helical flight 534 (provided by helical groove therein) and the radially-inward projecting key 524 along an inside surface of the filter head chamber. Notably, the radial key 524 spaced axially-outward from the flight 534 so as to engage the cartridge thread before being received or movable along the flight 534. As noted above, the key 524 has a configuration that is received through the axially extending channel 516 in the thread of the body on the end cap assembly and into the annular clearance gap 521 to enable the helical thread 516 on the end cap assembly to cooperate with the helical flight 534 on the head to enable the filter element assembly to be threaded onto and off of the head. Further, engagement between the key and the axially extending channel aligns the thread with the radial flight at a start location of threaded engagement between the helical flight and the helical thread. This way mechanic does not need to twist the cartridge relative to the body to "find the thread" but instead the thread and thread flight are angularly aligned for the start of threaded engagement movement.

While the 33rd embodiment is for keying, as evidenced in the previous 32nd embodiment, such an axially extending channel can instead be used as a torsion locking detent arranged and configured to be releasably engaged with the radially movable lock element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element assembly configured for use with a mounting head that has a radial key and a thread rib having a thread rib start, with the radial key axially outward of the thread rib, comprising:

a ring of filter media circumscribing a central axis and arranged in a central cavity of a housing, an end cap assembly at an end of the ring of filter media providing a portion of the housing at a top end thereof, the end cap assembly including:

i) an annular sidewall portion;

ii) an annular end wall connected to the annular sidewall portion at a shoulder, the shoulder being an outermost shoulder at an outer radial periphery of the top end;

iii) a central opening into the central cavity through the annular end wall, and a helical thread having a thread start, the helical thread on an exterior surface of the sidewall portion below the outermost shoulder, the sidewall portion defining an annular clearance area adjacent the helical thread on a side opposite of the shoulder, and with an axially extending channel defined along the length of the thread;

wherein the axially extending channel is configured to enable the radial key to be axially inserted through the axially extending channel and to be received within the annular clearance area; and wherein the axially extending channel is configured and arranged along the helical thread to pass through the radial key and to align the thread start with thread rib start.

2. The filter element assembly of claim 1, wherein the helical thread has a leading end portion and a trailing end portion, the axially extending channel being located on the trailing end portion and not the leading end portion.

3. The filter element assembly of claim 1, wherein the axially extending channel comprises at least two axially extending channels that are defined along the helical thread in angular space locations about the central axis to provide a multi-faceted keyway along the helical thread.

4. The filter element assembly as in claim 1, wherein the housing comprises a canister surrounding the ring of filter media, the canister having a distal end fixed to the sidewall portion at a flange portion, the clearance area being provided by an annular gap defined between the flange portion and the helical thread.

5. The filter element assembly as in claim 1, wherein the end cap assembly includes an axially projecting outer nipple wall surrounding the central opening, and an annular seal supported by the outer nipple wall, and further comprising a torsion lock detent member provided along the annular end wall extending outwardly from the outer nipple wall.

6. The filter element assembly of claim 1, further comprising:

wherein the housing includes a top end and a bottom end with an annular sidewall extending therebetween, the top end including the annular end wall, wherein the housing comprises a top member and a bottom member that are joined together, the top member providing the top end and the bottom member providing the bottom end, the end cap assembly including the top member;

a fluid flow interface at the top end, the fluid flow interface including an inlet port for receiving unfiltered fluid and an outlet port for returning filtered fluid; the filter media arranged in the housing with the filter media along a fluid flow path through the filter housing from the inlet port to the outlet port with the filter media being arranged in fluid series between the inlet port and the outlet port; and a torsion lock detent member provided by the top member, wherein the top member integrally provides both of the thread and the torsion lock detent member in a predetermined angular orientation.

7. The filter assembly of claim 6, further comprising:

a nipple portion at the top end, the annular end wall extending radially outwardly beyond the nipple portion and connecting with the annular sidewall at the shoulder, the nipple portion projecting away from the bottom end and above the annular end wall;

wherein the torsion lock detent member extends between the nipple portion and the shoulder, the torsion lock detent member being positioned axially below the nipple portion and axially above a surface of the top annular end wall and entirely above the shoulder region; and wherein at least part of the nipple portion is integrally provided by the top member.

8. The filter element assembly of claim 1, wherein the annular sidewall portion from where the thread resides surrounds the ring of filter media.

9. The filter element assembly of claim 1, wherein the thread is positioned radially outboard of the ring of filter media.

10. The filter element assembly of claim 1, wherein a canister is joined to the annular sidewall portion to provide the housing, wherein the thread is at an outermost periphery location between the shoulder and the canister.

11. A filter head and element assembly including a header in combination with the filter element assembly of claim 1, the header including an interior chamber circumscribing the central axis, the header having a helical flight and a radially-inward projecting key along an inside surface of the chamber, with the radial key spaced axially-outward from the flight, wherein the key has a configuration that is received through the axially extending channel in the thread of the body of the end cap assembly and into the annular clearance area to enable the helical thread of the end cap assembly to cooperate with the helical flight of the header to enable the filter element assembly to be threaded onto and off of the header.

12. The filter head and element assembly of claim 11, wherein engagement between the key and the axially extending channel aligns the thread with the helical flight at a start location of threaded engagement between the helical flight and the helical thread.

13. A filter element assembly configured for use with a radial key of a mounting head comprising:

a filter media arranged in a central cavity of a housing, an annular sidewall portion;

an annular end wall connected to the annular sidewall portion at a shoulder region at an outermost radial periphery of the annular end wall;

a central opening into the central cavity through the annular end wall; and a spiral thread radially outboard of the shoulder region on an exterior surface of the sidewall portion with an axially extending channel through the spiral thread for passing through the radial key, wherein the spiral thread has a leading end portion and a trailing end portion, the axially extending channel being located on the trailing end portion and not the leading end portion.

14. The filter element assembly of claim 13, wherein the axially extending channel enables the radial key to be axially inserted through the axially extending channel.

15. The filter element assembly of claim 13, wherein the axially extending channel comprises at least two axially extending channels that are defined along the spiral thread in angular space locations about a central axis to provide a multi-faceted keyway along the spiral thread.

16. The filter element assembly as in claim 13, wherein the housing comprises a canister surrounding the filter media, the canister having a distal end fixed to the sidewall portion at a flange portion, with a clearance area adjacent the spiral thread on a side opposite of the annular end wall, the clearance area being provided by an annular gap defined between the flange portion and the spiral thread.

17. The filter element assembly as in claim 13, further comprising an outer nipple wall extending axially from the annular end wall, the outer nipple wall surrounding the central opening, and having an annular seal, and further comprising a torsion lock detent member provided along the annular end wall extending outwardly from the outer nipple wall.

18. The filter element assembly of claim 13, wherein the filter media is provided by an internal filter element positioned inside of the housing, the filter element comprising:

a ring of pleated filter media;

a top end cap sealingly bonded to an upper end of the ring of pleated filter media, the top end cap being positioned below the annular end wall, wherein a fluid flow path is provided between the top end cap and the annular end wall; and a bottom end cap sealingly bonded to a lower end of the ring of pleated filter media.

19. The filter element assembly of claim 13, wherein the top annular end wall is part of the housing and defines an external upper surface that is non-flat and tapers continuously downwardly as the filter housing extends along top annular end wall from a nipple portion through a shoulder region with the shoulder region continuing to taper continuously downwardly to transition into the annular sidewall.

20. The filter element assembly of claim 13, wherein the annular sidewall portion from where the thread resides surrounds the ring of filter media.

21. The filter element assembly of claim 13, wherein the thread is positioned radially outboard of the ring of filter media.

* * * * *